(12) United States Patent  (10) Patent No.: US 8,657,189 B2
Berkun  (45) Date of Patent: Feb. 25, 2014

(54) SYSTEMS AND METHODS FOR GENERATING, READING AND TRANSFERRING IDENTIFIERS

(75) Inventor: Kenneth A. Berkun, Kailua, HI (US)

(73) Assignee: Labels That Talk, Ltd., Redmond, WA (US)

( * ) Notice: Subject to any disclaimer, the term of this patent is extended or adjusted under 35 U.S.C. 154(b) by 55 days.

(21) Appl. No.: 12/836,465

(22) Filed: Jul. 14, 2010

(65) Prior Publication Data

US 2010/0301115 A1    Dec. 2, 2010

Related U.S. Application Data

(63) Continuation of application No. 11/674,969, filed on Feb. 14, 2007, now Pat. No. 7,775,428, and a continuation-in-part of application No. PCT/US2005/029531, filed on Aug. 18, 2005, and a continuation-in-part of application No. 11/197,754, filed on Aug. 4, 2005, now Pat. No. 7,427,018.

(60) Provisional application No. 60/773,600, filed on Feb. 15, 2006, provisional application No. 60/678,549, filed on May 6, 2005.

(51) Int. Cl.
*G06K 5/00* (2006.01)
(52) U.S. Cl.
USPC ............................ 235/380; 235/375; 235/487
(58) Field of Classification Search
USPC ............... 235/380, 375, 487, 472.01, 472.02, 235/462.45, 462.1
See application file for complete search history.

(56) References Cited

U.S. PATENT DOCUMENTS

| | | | |
|---|---|---|---|
| 4,337,375 | A | 6/1982 | Freeman |
| 5,288,976 | A | 2/1994 | Citron et al. |
| 5,378,881 | A | 1/1995 | Adachi |
| 5,406,024 | A | 4/1995 | Shioda |
| 5,489,769 | A | 2/1996 | Kubo |
| 5,550,365 | A | 8/1996 | Klancnik et al. |
| 5,631,457 | A | 5/1997 | Fukuda et al. |
| 5,938,727 | A | 8/1999 | Ikeda |
| 5,986,651 | A | 11/1999 | Reber et al. |
| 6,042,014 | A | 3/2000 | Zanetti |
| 6,095,418 | A | 8/2000 | Swartz et al. |

(Continued)

FOREIGN PATENT DOCUMENTS

| | | |
|---|---|---|
| DE | 10146624 A1 | 9/2001 |
| EP | 1101351 | 5/2001 |

(Continued)

OTHER PUBLICATIONS

Olympus Optical Co., Ltd. Annual Report 1999, ScanTalk Reader R200, p. 18.

*Primary Examiner* — Edwyn Labaze

(74) *Attorney, Agent, or Firm* — Foster Pepper PLLC; Richard T. Black; P. G. Scott Born

(57) ABSTRACT

Systems and methods for generating, reading and transferring identifiers are disclosed. In one embodiment, a handheld system for associating a selected audio content with an object includes an identifier applied to a surface of the object and having a predetermined graphical format that is configured to encode the selected audio content, and a handheld device operable to encode the identifier and further operable to detect an audio content associated with the identifier.

20 Claims, 85 Drawing Sheets

(56) References Cited

U.S. PATENT DOCUMENTS

| | | | |
|---|---|---|---|
| 6,144,848 A | 11/2000 | Walsh et al. | |
| 6,400,482 B1 | 6/2002 | Lupton et al. | |
| 6,418,457 B1 | 7/2002 | Schmidt et al. | |
| 6,437,229 B1 | 8/2002 | Nobumoto | |
| 6,574,441 B2 | 6/2003 | McElroy | |
| 6,587,127 B1 | 7/2003 | Leeke et al. | |
| 6,604,682 B2 | 8/2003 | Wakamiya et al. | |
| 6,629,635 B1 | 10/2003 | Akamine | |
| 6,633,685 B1 | 10/2003 | Kusama et al. | |
| 6,906,812 B2 | 6/2005 | Koakutsu et al. | |
| 6,928,421 B2 | 8/2005 | Craig et al. | |
| 2002/0037168 A1 | 3/2002 | Horii et al. | |
| 2002/0042878 A1 | 4/2002 | Westendorf et al. | |
| 2003/0012557 A1 | 1/2003 | Tingey et al. | |
| 2003/0048882 A1 | 3/2003 | Smith, II | |
| 2003/0103645 A1 | 6/2003 | Levy et al. | |
| 2003/0136837 A1 | 7/2003 | Amon et al. | |
| 2003/0155368 A1 | 8/2003 | Giancarlo | |
| 2003/0189089 A1 | 10/2003 | Raistrick et al. | |
| 2004/0108381 A1 | 6/2004 | Elliott et al. | |
| 2005/0010409 A1 | 1/2005 | Hull et al. | |
| 2005/0041120 A1 | 2/2005 | Miller | |
| 2005/0099318 A1 | 5/2005 | Gilfix et al. | |
| 2005/0199699 A1 | 9/2005 | Sato et al. | |
| 2006/0029296 A1* | 2/2006 | King et al. | 382/313 |
| 2006/0054702 A1 | 3/2006 | Lei | |
| 2006/0096142 A1* | 5/2006 | Chen et al. | 40/717 |
| 2006/0111967 A1 | 5/2006 | Forbes | |
| 2008/0159533 A1 | 7/2008 | Schryer et al. | |

FOREIGN PATENT DOCUMENTS

| | | |
|---|---|---|
| EP | 1143372 A2 | 10/2001 |
| EP | 1146418 A2 | 10/2001 |
| EP | 1190375 | 3/2002 |
| EP | 1183641 B1 | 12/2002 |
| EP | 1480160 A2 | 11/2004 |
| JP | 07-085085 | 3/1995 |
| JP | 01-51368 A | 2/2001 |
| JP | 01-108513 | 6/2001 |
| WO | 0232108 A1 | 4/2002 |
| WO | 0232109 A1 | 4/2002 |
| WO | 02069243 A1 | 9/2002 |
| WO | 2004008378 A1 | 1/2004 |

\* cited by examiner

*Fig. 44B*
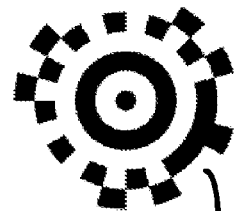
*Fig. 44C*
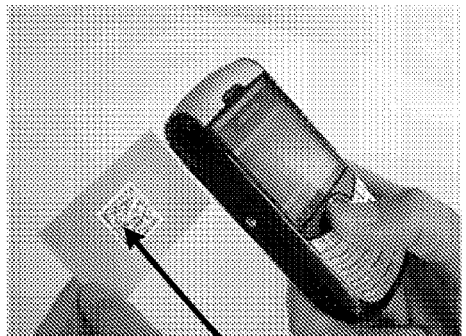
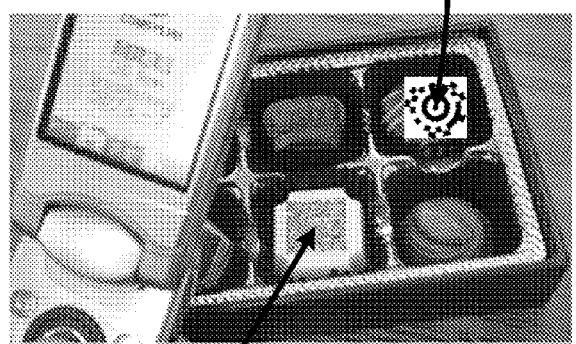
*Fig. 44D*
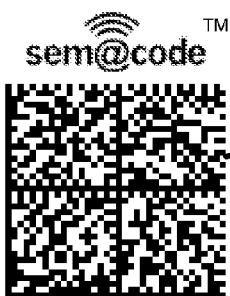
*Fig. 44A*

| CODEC | RATE (kHz) | BITRATE (kbps) | DELAY (ms) | MULTI-RATE | VBR | PLC | BIT-ROBUST |
|---|---|---|---|---|---|---|---|
| SPEEX | 8, 16, 32 | 2.15–24.6 (NB) 4–44.2(WB) | 30 (NB) 34 (WB) | YES | YES | YES | |
| iLBC | 8 | 13.3 | 30 | | | YES | |
| AMR-NB | 8 | 4.75–12.2 | 20 | YES | | YES | YES |
| AMR-WB (G.722.2) | 16 | 6.6–23.85 | 20 | YES | | YES | YES |
| G.729 | 8 | 8 | 15 | | | YES | YES |
| GSM-FR | 8 | 13 | 20 | | | | |
| GSM-EFR | 8 | 12.2 | 20 | | | YES | YES |
| G.723.1 | 8 | 5.3 6.3 | 37.5 | | | YES | |
| G.728 | 8 | 16 | 0.625 | | | | |
| G.722 | 16 | 48 56 64 | | | | | |

*Fig. 51*

The Problem:

The Solution:

SYSTEMS AND METHODS FOR GENERATING, READING AND TRANSFERRING IDENTIFIERS

CROSS REFERENCE TO RELATED APPLICATIONS

This application is a continuation U.S. patent application Ser. No. 11/674,969, filed Feb. 14, 2007 now U.S. Pat. No. 7,775,428, titled Systems and Methods For Generating, Reading and Transferring Identifiers, said application claiming the benefit of priority to U.S. Provisional Patent Application Ser. No. 60/773,600 filed Feb. 15, 2006.

This application is a continuation in part and claims the benefit of priority to International Application Serial No. PCT/US2005/029531 filed Aug. 18, 2005, titled Systems and Methods For Generating, Reading, and Transferring Identifiers.

This application is a continuation in part and claims the benefit of priority to U.S. patent application Ser. No. 11/197,754 filed Aug. 4, 2005 now U.S. Pat. No. 7,427,018, titled Systems and Methods For Generating, Reading and Transferring Identifiers, that in turn claims priority to U.S. Provisional Patent Application Ser. No. 60/678,549 filed May 6, 2005, titled System and Method for Reading and Printing Barcodes.

All related applications incorporated by reference in their entirety as if fully disclosed herein.

FIELD OF THE INVENTION

This invention relates generally to systems and methods for generating, reading and transferring identifiers and, more specifically, for reading, transferring and printing identifiers encoding selected digital audio content.

BACKGROUND OF THE INVENTION

One-dimensional barcodes utilize a series of lines and spaces to encode information. Although one-dimensional barcodes are useful for storing information, one-dimensional barcodes have a limited information storage capacity.

Two-dimensional barcodes utilize a series of lines and spaces that are oriented with respect to a pair of generally perpendicular axes to encode information. Accordingly, two-dimensional barcodes may be used to store information in the same manner as one-dimensional barcodes with the added benefit of an enhanced information storage capability due to the additional barcode dimension. The added storage capacity of two-dimensional barcodes makes them highly suitable for new and creative uses that extend beyond typical one-dimensional barcode applications.

Audible information such as speech data, or other sounds may be stored in various digital formats. Typically, digital audiotapes, compact disks (CDs), digital videodisks (DVDs), computers, and other similar devices are operable to store digital representations of sound and voice data. The foregoing storage media are also advantageously configured to store large amounts of data. A significant drawback, however, is that the foregoing storage media are not readily integrated into a paper product.

Paper products that include informational content are also widely used in a number of well-known applications. For example, photo albums, books, greeting cards, cereal boxes, posters, newspapers, fliers, magazines, business memos, faxes, and labels all include information in a graphical form. Consequently, users of the foregoing products must rely exclusively on their visual sensory system to read and interpret the graphical forms included on these paper products. Other sensory systems, such as the human auditory system, are not generally useable in interpreting the informational content present in such paper products.

Therefore, what is needed are methods and systems for storing information on paper products that allow the human auditory system to complement the human visual system when interpreting information presented paper products.

SUMMARY OF THE INVENTION

The present invention is directed to systems and methods for generating, reading and transferring identifiers. In one aspect, a handheld system for associating a selected audio content with an object includes an identifier applied to a surface of the object and having a predetermined graphical format that is configured to encode the selected audio content, and a handheld device operable to encode the identifier and further operable to detect an audio content associated with the identifier.

BRIEF DESCRIPTION OF THE DRAWINGS

Embodiments of the present invention are described in detail below with reference to the following drawings.

FIG. 44A through FIG. 44D are pictorial views that will be used to describe still another application of the disclosed embodiments of the invention;

FIG. 51 is a table of compressor/decompressor algorithms (CODECs) for encoding audio sound into an identifier.

DETAILED DESCRIPTION OF THE PREFERRED EMBODIMENT

Figure 1:
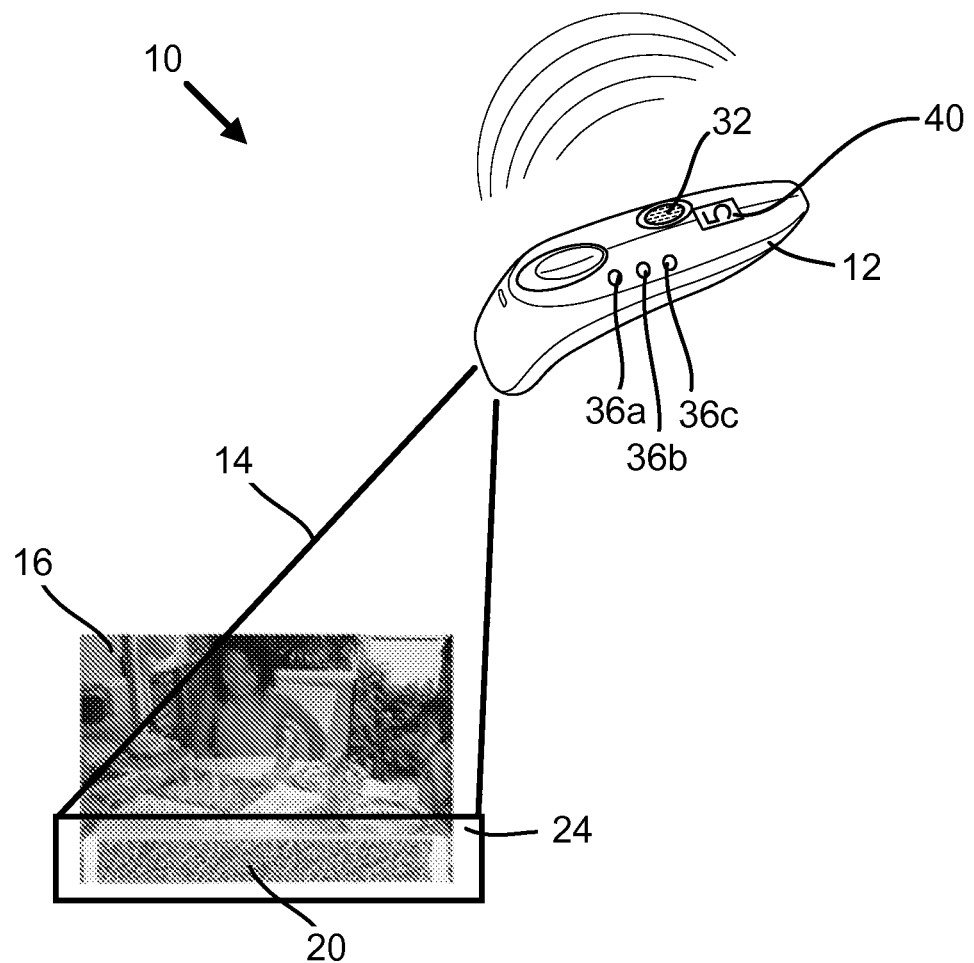
FIG. 1 is an isometric view of a handheld identifier reader system, according to an embodiment of the invention.

The present invention relates generally to systems and methods for reading and printing identifiers and, more specifically, for reading and printing identifiers that encode alphanumeric information and/or digital representations of sound. Particular embodiments of the present invention are shown in FIGS. 1 through 61D to provide a thorough understanding of such embodiments. One skilled in the art, however, will understand that the present invention may have additional embodiments, or that the present invention may be practiced without several of the details described in the following description.

FIG. 1 is an isometric view of a handheld system 10 that is operable to read and generate identifiers, according to an embodiment of the invention. The system 10 includes a handheld reader 12 and an identifier 20. The identifier 20 may include a one-dimensional (1D) bar code, a two-dimensional (2D) bar code, or other suitable graphical arrangements of optically detectable and readable symbols. The identifier 20 contains audio content, such as voice signals or other sounds that are digitally encoded on the identifier 20. The reader 12 is configured to read the identifier 20 by receiving optical information within a sector-shaped viewing wedge 14 that is positioned over or proximate to an image 16. Although the image 16 of FIG. 1 is depicted as a photograph, it is understood that the image 16 may include graphical information in other forms that are positioned on surface portions of various objects such as a newspaper, a magazine or other similar printed articles, a wall of a container, a greeting card, a museum display panel, or any other surface of an object that a reader may view. The identifier 20 may be positioned along a border of the image 16. Alternately, the identifier 20 may be positioned at other locations within the image 16. The identifier 20 may be applied over or upon the surface of the image 16 or may be integral with the surface of the image 16. The image 16 that includes the identifier 20 may be faxed, scanned, imaged, copied and emailed, since the identifier 20 and the image 16 are both optically detectable and readable. Alternatively, the identifier 20 may also be in the form of a magnetic stripe or a radio frequency identification (RFID) tag that are readable with a wand attachment (not shown) coupled to the reader 12 that is configured to sense respective magnetic and radio signals.

The reader 12 may include a built-in speaker 32, a plurality of control buttons 36a, 36b, and 36c, and a timer 40. The control buttons 36a-36c are configured to implement various user commands. The control buttons 36a-36c thus allow a user of the reader 12 to play and record auditory informational content, such as music, voice, and environmental sounds associated with the image 16. For example, control button 36a may be a record button, control button 36b may be a play button, and control button 36c may be a stop button. The control buttons 36a-36c may also be configured to perform other functions. For example, a selected one of the buttons 36a-36c may be operable to perform a print function that permits the identifier 20 or a representation of the identifier 20 to be printed on a suitable printer (not shown in FIG. 1). The printer may be configured to print the identifier 20 on any suitable substrate material. The control buttons 36a-36c shown in FIG. 1 are operable to initiate a predetermined function by actuating the necessary software and circuitry to perform the designated functions. In other alternate embodiments, the control buttons 36a-36c may be located on another remote device such as a printer (not shown in FIG. 1) as described in other embodiments, which will be described in greater detail below. In a further alternate embodiment, the control buttons 36a-36c may be omitted, so that the prescribed functions corresponding to the buttons 26a-36c may be voice activated.

Still referring to FIG. 1, the hand held reader 12 includes an optical imaging device that may include a charge-coupled device (CCD) array, a complimentary metal-oxide semiconductor (CMOS) array, Foveon light sensors, a laser-based or LED-based scanning device that may be moved across the identifier 20 to detect the image thereon. The information encoded in the identifier 20 typically appears in a pixel array within the identifier 20, but other digital media forms may be used, that include non-pigmentation-based representations, which may further include raised bumps on an exposed surface of a semi-rigid medium or pit-like depressions on the exposed surface of the semi-rigid medium, which will be discussed in greater detail below. In another embodiment, the digital media form may present the encoded information in a combination of non-pigmented or pigmented bumps and/or depressions. Magnetic inks or plastic stationary strips of compact disk pits-and-lands may serve as another manifestation of a 2D pixel array of the sound-encoded identifier. Yet other digital forms may include magnetic stripes and RFID tags to encode information associated with the image 16. When the identifier 20 includes an RFID tag, the reader 12 also includes an interrogator that is configured to interrogate the RFID, and a receiver that is operable to receive signals emanating from the RFID in response to the interrogation. The receiver may also be configured to process signals received from the RFID tag.

The hand held reader 12 also includes a processor (not shown in FIG. 1) that is coupled to the buttons 36a-36c, the optical imaging device, the timer 40 and the speaker 32 that is operable to scan a pixel-containing image of the encoded identifier 20, and to process the received image. The suitably processed digital information may then be translated into an audible form and transferred to the speaker 32 for audible reception by a user. The timer 40 is operable to time a play period of sound and/or voice playback from the speaker 42. As shown in this embodiment, the timer 40 may visually indicate the elapsed time for sound recordings or sound playbacks using a visual display positioned on the hand held reader 12. Alternatively, the timer 40 may visually indicate an elapsed time for recording a voice or ambient sound.

Figure 2:
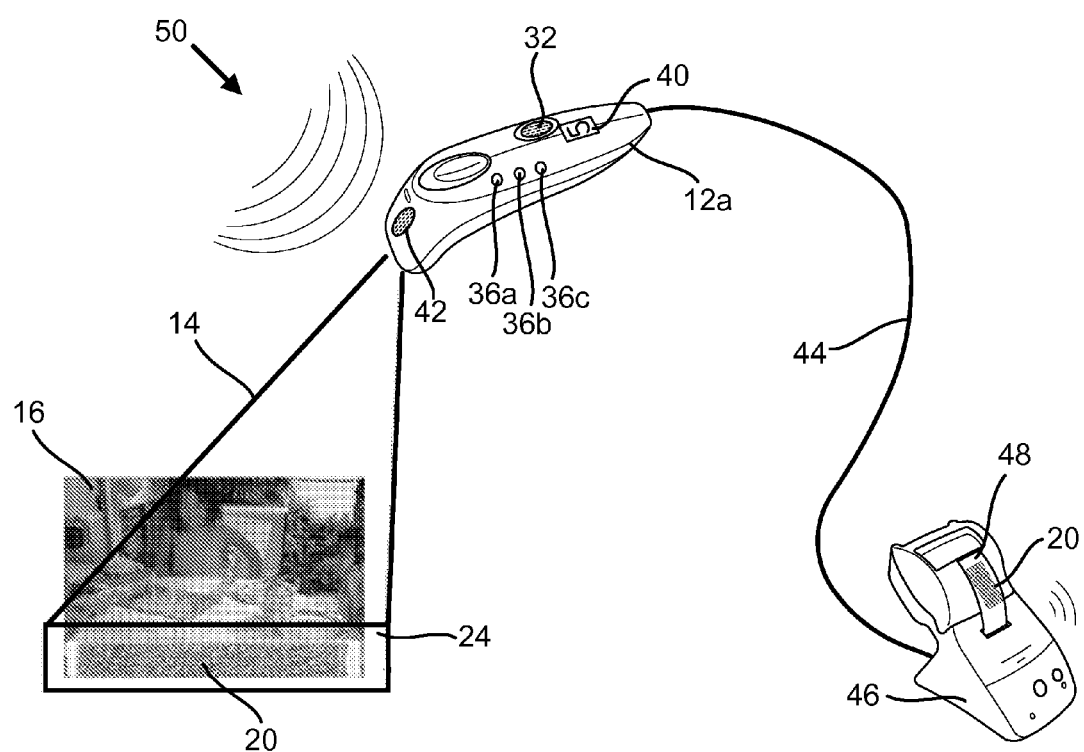
FIG. 2 is an isometric view of a handheld identifier reader system, according to another embodiment of the invention.

FIG. 2 is an isometric view of a handheld reader system 50 that is operable to read and generate identifiers, according to another embodiment of the invention. The system 50 includes a reader 12a, an identifier 20, and a printer 46 coupled to the reader 12a by a conduit 44. Many of the details of the reader 12a and the identifier 20 have been previously discussed in detail, and in the interest of brevity, will not be discussed further. The system 50 is configured to receive sound from the environment in which the reader 12 is located, and to convert the sound to a digital form. The digitally encoded sound may be printed onto an identifier 20 so that the encoded digital sound and/or voice information resides in the identifier 20. The identifier 20 may then be read by the reader 12a, and an audio signal may be transferred to the speaker 42 for confirmation purposes.

The reader 12a further includes a microphone 42 that is operable to capture sound and convert the sound into electrical signals. The microphone 42 receives auditory information such as voice or speech information, or other sounds from the environment for a time period that is identified by the timer 40. The voice information or other audible sound signals are converted from analog signals to digital signals by an analog-to-digital (A/D) converter located within the processor. The digital-encoded sound is routed to the printer 46 through the conduit 44, which may include metallic conductors, or alternately, may include fiber-optic elements. In still another particular embodiment, the reader 12a and the printer 46 communicate wirelessly. In either case, the printer 46 prints the identifier 20 having an optically viewable image of the digitally encoded sound onto a medium 48. The medium 48 may be a paper-based medium, or it may be polymer-based, and in either case, the medium 48 may also include an adhesive backing. In a particular embodiment, the printer 46 includes the circuitry and software necessary to perform the image processing functions, such as image encoding and decoding. The printer 46 may include a laser printer or an ink-jet printer having a color printing capability, and print on commonly available paper stocks. Alternately, the printer 46 may be configured to transfer a non-pigment based identifier 20 onto a semi-rigid, or even a rigid substrate in the form of raised projections or depression-like pits. In a specific embodiment, the printer 46 is configured to etch, abrade or laser imprint the identifier 20 onto the rigid or semi-rigid substrate. In yet another particular embodiment of the invention, the printer 46 creates labels and coded with two-dimensional barcodes suitable for fixing on surfaces of objects or surfaces of images of objects. In yet another particular embodiment, the speaker 42 may be located on the printer 46. The speaker 42, whether located on the reader 12a or printer 46, may be configured to operate as a microphone. The identifier 20 may also take the form of a magnetic stripe or an RFID tag, and the reader 12a would be suitably equipped with a wand (not shown) configured to sense magnetic or radio signals, respectively.

Figure 3:
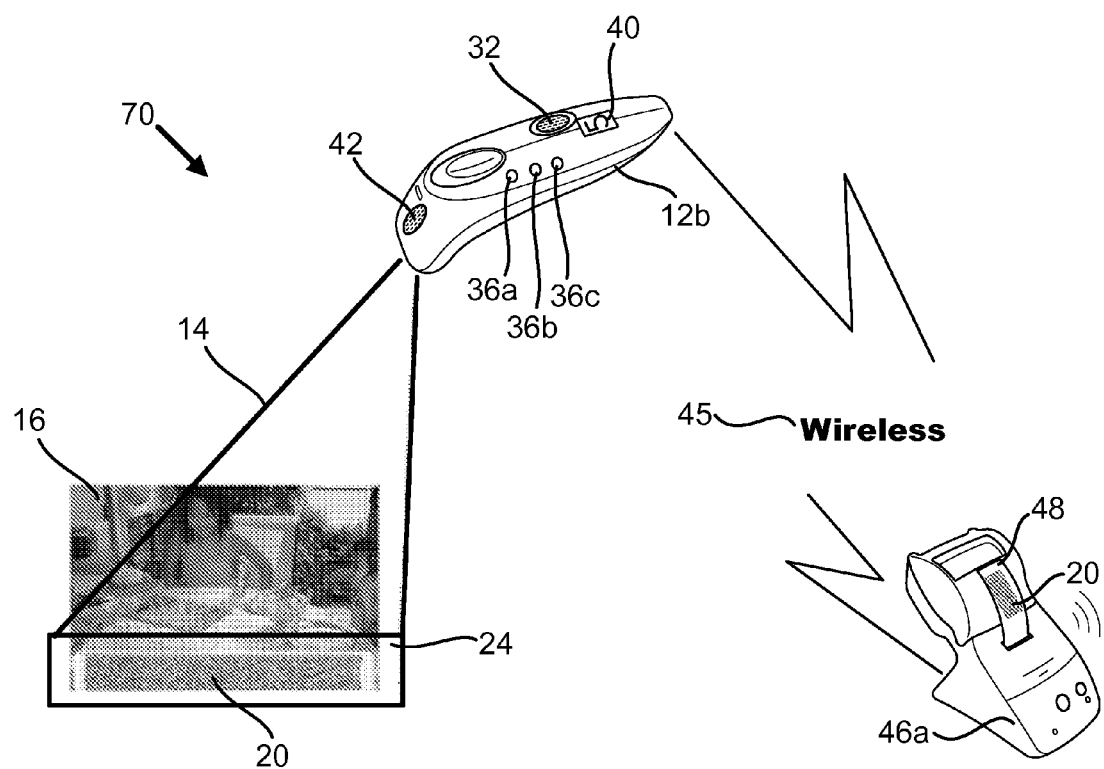
FIG. 3 is an isometric view of a handheld identifier reader system, according to another embodiment of the invention.

FIG. 3 is an isometric view of a handheld reader system 70 that is operable to read and generate identifiers, according to another embodiment of the invention. Many of the details of the present embodiment have been discussed in connection with the foregoing embodiments, and accordingly, will not be described further. The system 70 includes a reader 12b, the identifier 20, and a printer 46 that is operable to communicate wirelessly with the reader 12b by means of wireless signals 45. The reader 12b includes a transceiver (not shown in FIG. 3) that is operable to radiate the wireless signals 45, and also to receive wireless signals 45 from a corresponding transceiver located within the printer 46. The wireless signals 45 may include radio frequency (RF) radiation, visible light or infrared radiation.

Figure 4:
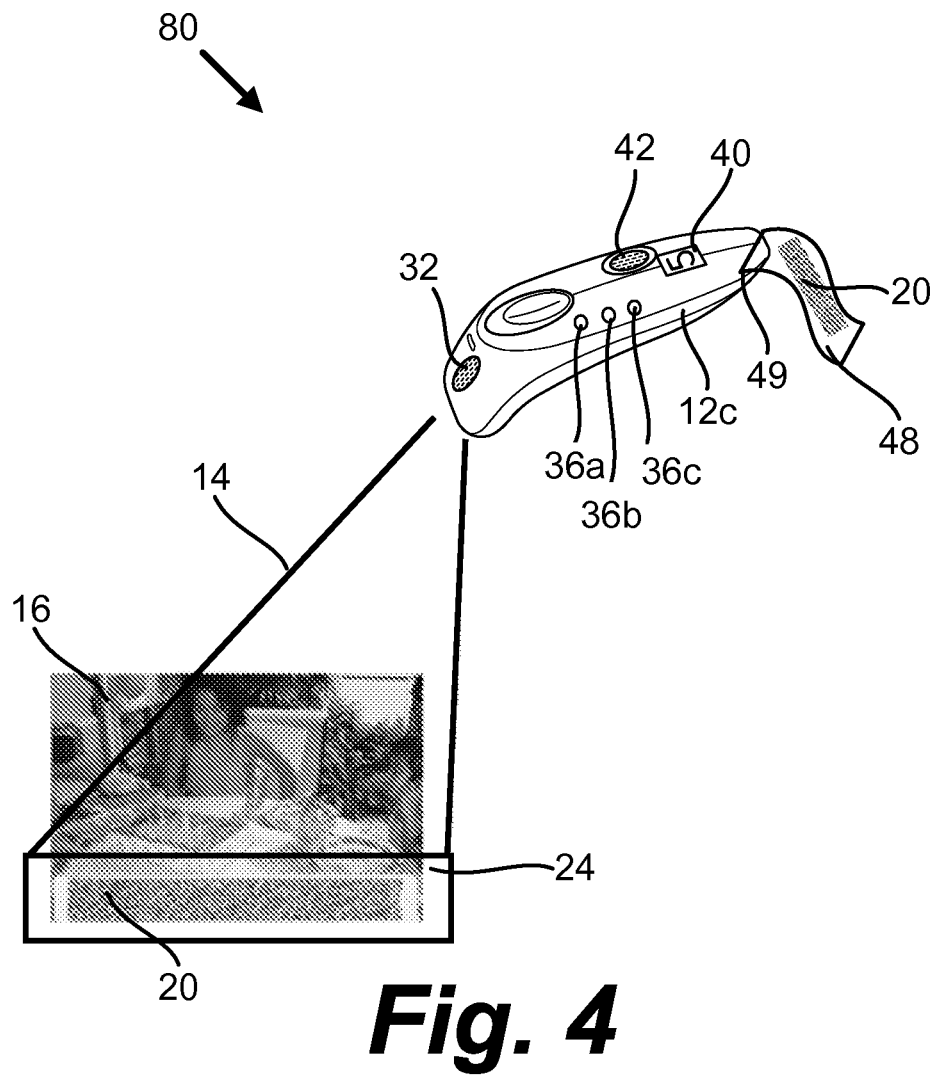
FIG. 4 is an isometric view of a handheld identifier reader system according to another embodiment of the invention.

FIG. 4 is an isometric view of a handheld reader system 80 that is operable to read and generate identifiers, according to another embodiment of the invention. The system 80 includes a reader 12c that incorporates a printer 49 located within the reader 12c. The printer 49 is configured to generate an identifier 20 that may be printed on a medium 48a that is stored within the reader 12c before printing. The medium 48a may be printed on any suitable flexible substrate material, such as a polymeric or a paper-based material. The medium 48a may also include an adhesive material applied to a side of the medium 48a so that the medium 48a may be adhesively affixed to a surface. Alternately, the printer 49 may also eject a stamped-out non-pigmented identifier 20.

Figure 5:
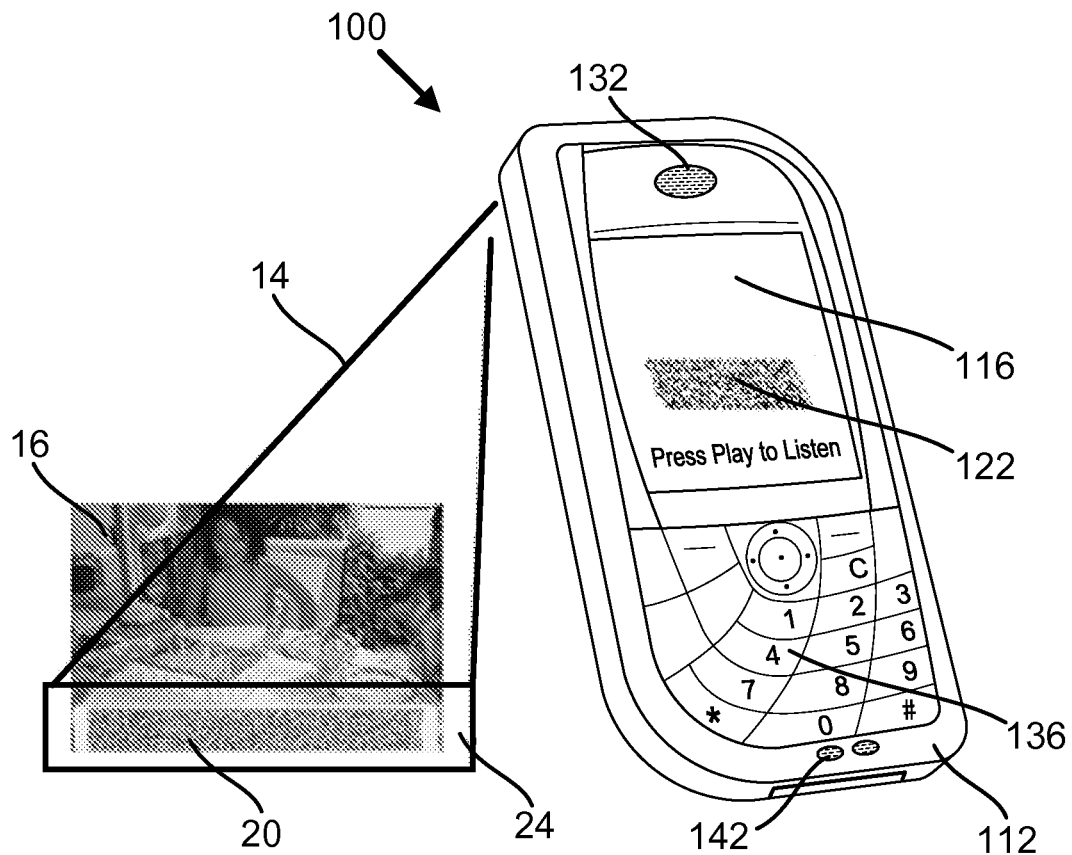
FIG. 5 is an isometric view of a handheld identifier reader system according to still another embodiment of the invention.

FIG. 5 is an isometric view of a handheld reader system 100 that is operable to read and generate identifiers, according to still another embodiment of the invention. The system 100 includes a lightweight, handheld computer 112 that is operable to perform many of the functions of the foregoing embodiments of the invention, as will be described in detail below. The handheld computer 112 may be readily incorporated into various known and commercially available devices, such as a cellular phone having a Personal Digital Assistant (PDA) function that is operable as a personal organizer, or a PDA or other microprocessor equipped device operable to execute algorithms configured to generate original voice or sound-encoded identifiers or to make replicates of original sound containing identifiers. The handheld computer 112 may also be incorporated into a cellular telephone or a cellular telephone having an integral digital camera. The handheld computer 112 includes a display surface 116 that is configured to communicate visual information to a user, a speaker 132 configured to communicate audible information to a user, and a keypad 136 that allows a user to communicate various commands to the computer 112. In the present embodiment, the computer 112 optically reads the identifier 20 and an image 122 of the identifier 20 is displayed on the display surface 116. The computer 112 may be configured to present a user with various "prompts" on the display surface 116 to engage the user to actuate a selected one of the keys on a keypad 136 in order to initiate a function corresponding to the selected key. For example, a prompt may direct a user to "press play to listen", whereupon the user presses a key on the keypad 136 to begin a play sequence that extracts the audio content from the identifier 20 and to audibly communicate the extracted audio content to a user through the speaker 132. Alternately, a pen or a stylus device may be used to select the prompt shown on the display surface 116, and to initiate the desired action. Suitable stylus devices are commonly used with PDA's and other similar devices. Alternate embodiments of the handheld computer 112 may include an integral microphone 142. As with the other printer embodiments of the prior devices, the identifier 20 may be of an ink-on-media or a variety of modified pitted surface or raised projections, i.e., non-pigmented pixel arrays.

Figure 6:
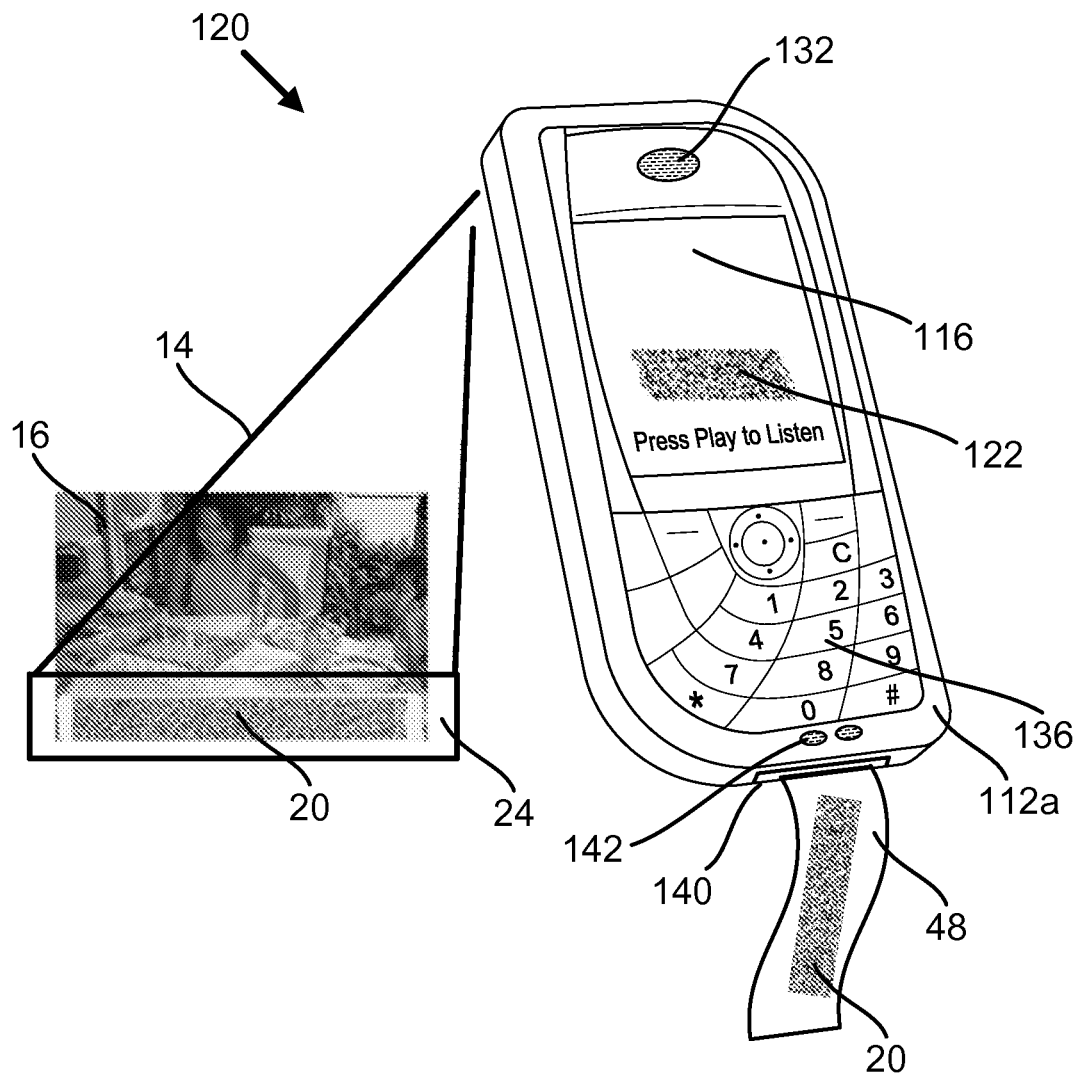
FIG. 6 is an isometric view of a handheld identifier reader system according to another embodiment of the invention.

FIG. 6 is an isometric view of a handheld barcode reader system 120 that is operable to read and generate identifiers, according to another embodiment of the invention. The system 120 includes the handheld computer 112 of FIG. 5, and further includes an integral printer 140 that is positioned within the computer 112. The integral printer 140 is operable to print an identifier 20 on a medium 48, as previously described. The computer 112 may also be incorporated into various commercially available devices, including cellular telephones and cellular telephones that incorporate digital cameras.

Still other embodiments of the computer 112 of FIG. 5 and FIG. 6 are possible. For example, the computer 112 may be configured to capture images from a printed identifier 20 and to transfer the data to digital devices using an infrared data link, a satellite data link, by means of the Internet or by other direct or indirect communication systems. Accordingly, data encoded on the identifier 20 may be emailed or faxed to a corresponding computer 112 by the reader 112. In another embodiment, the key pad 136 may be employed to allow commands to be input by a user that may be used to print, read or play the digital content coded in the identifier 20.

Figure 7:
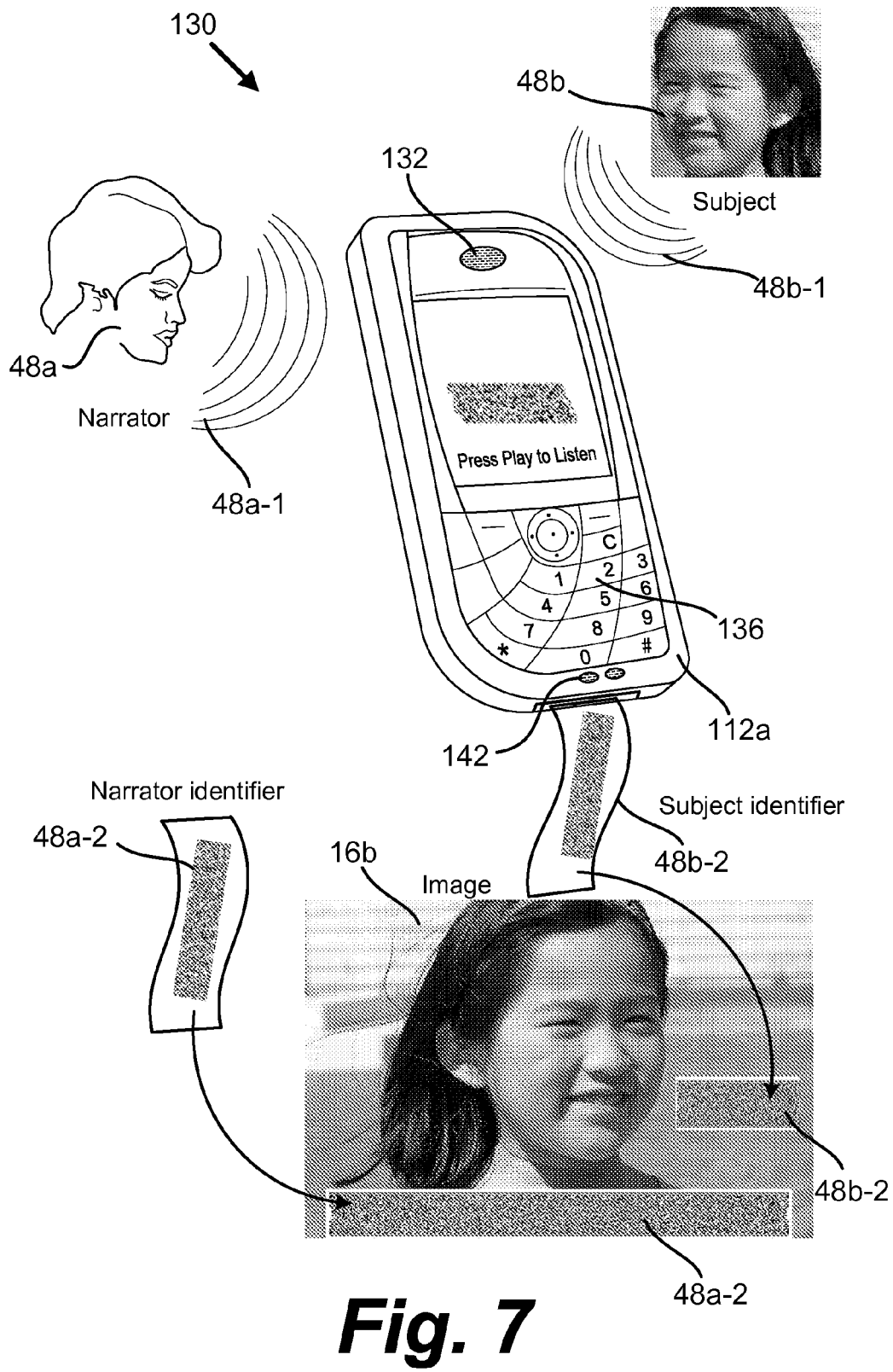
FIG. 7 is an isometric view that will be used to describe a method of recording and printing identifiers using a speaking narrator and a speaking subject, according to still another embodiment of the invention.

FIG. 7 is an isometric view that will be used to describe a method 170 of recording and printing identifiers using a speaking narrator 48a and a speaking subject 48b, according to still another embodiment of the invention. The narrator and subject, in this embodiment, provide different speech content to the identifier generator 112. The speaking subject 48b is part of the image 16b, while the narrator 48a is not a part of the image 16b. The narrator 48a speaks into the microphone 142 via sound waves 48a-1 and a narrator identifier 48a-2 is generated by the identifier generator 112. The narrator identifier 48a-2 may contain a narrator voice message having, for example, a commentary describing the significance of events associated with the image 16b. The subject 48b depicted within the image 16b also speaks into the speaker 142 via sound waves 48b-1 of the identifier generator 112a, and a subject identifier 48b-2 is generated by the identifier generator 112a. The subject identifier 48b-2 may contain, for example, a subject's voice message having content that describes the subject's response to events shown in the image 16b. The narrator identifier 48a-2 is associated or otherwise affixed to the image 16b, and the subject identifier 48b-2 is also affixed to the image 16b, but at a selected portion of the image 16b. For example, the subject identifier 48b-2 may be positioned on the image 16b at or near a mouth location of the subject shown within the image 16b. Although the narrator identifier 48a-2 is shown positioned along an edge of the image 16b, and the subject identifier 48b-2 is shown positioned on an interior portion of the image 16b, it is understood that the narrator identifier 48a-2 and the subject identifier 48b-2 may be located at other positions proximate to the image 16b.

Figure 8:
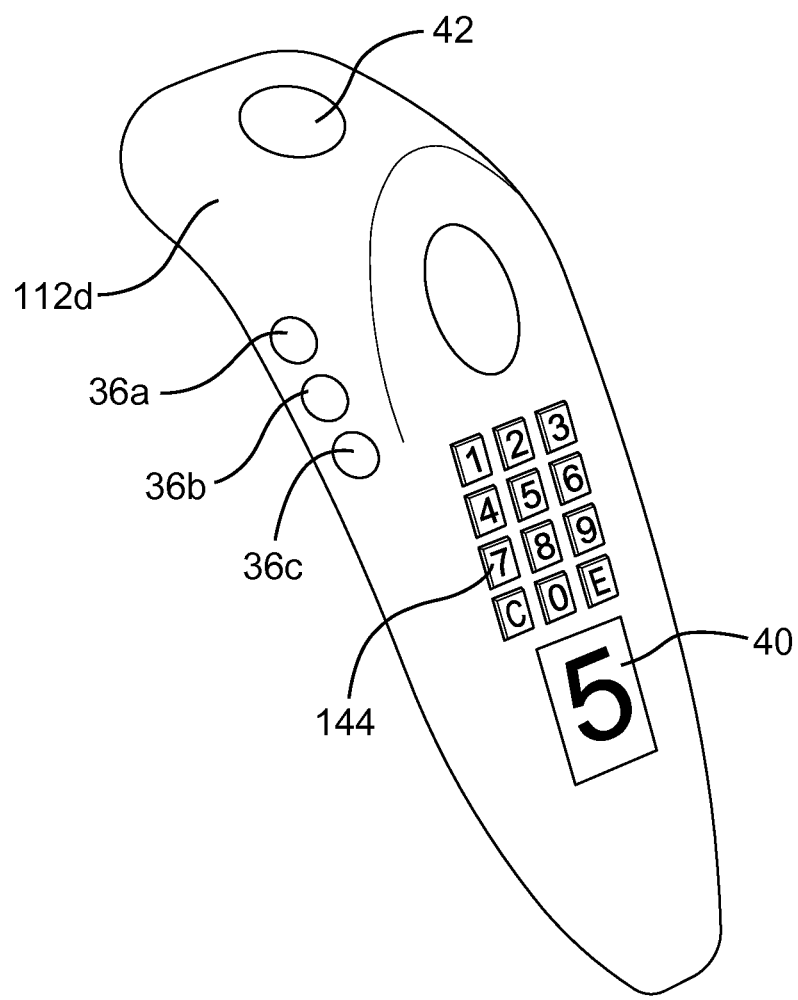
FIG. 8 is an isometric view of a reader according to still another embodiment of the invention.

FIG. 8 is an isometric view of a reader 112d, according to still another embodiment of the invention. The reader 112d includes function buttons 36a-c as previously described, and also includes a keypad 144. The key pad 144 permits a password code that may include a Personal Identification Number (PIN) or other sequence to be entered into the identifier generated by the reader 112d. Accordingly, when a password is associated with the identifier, a user is required to enter the password before the identifier is read by the reader 112d. The PIN may be stored in the identifier itself so that an authorized user can decode the identifier with a reader, or the PIN may be established to activate a reader to decode identifiers that have not been encrypted with a PIN based password.

Figure 9A:
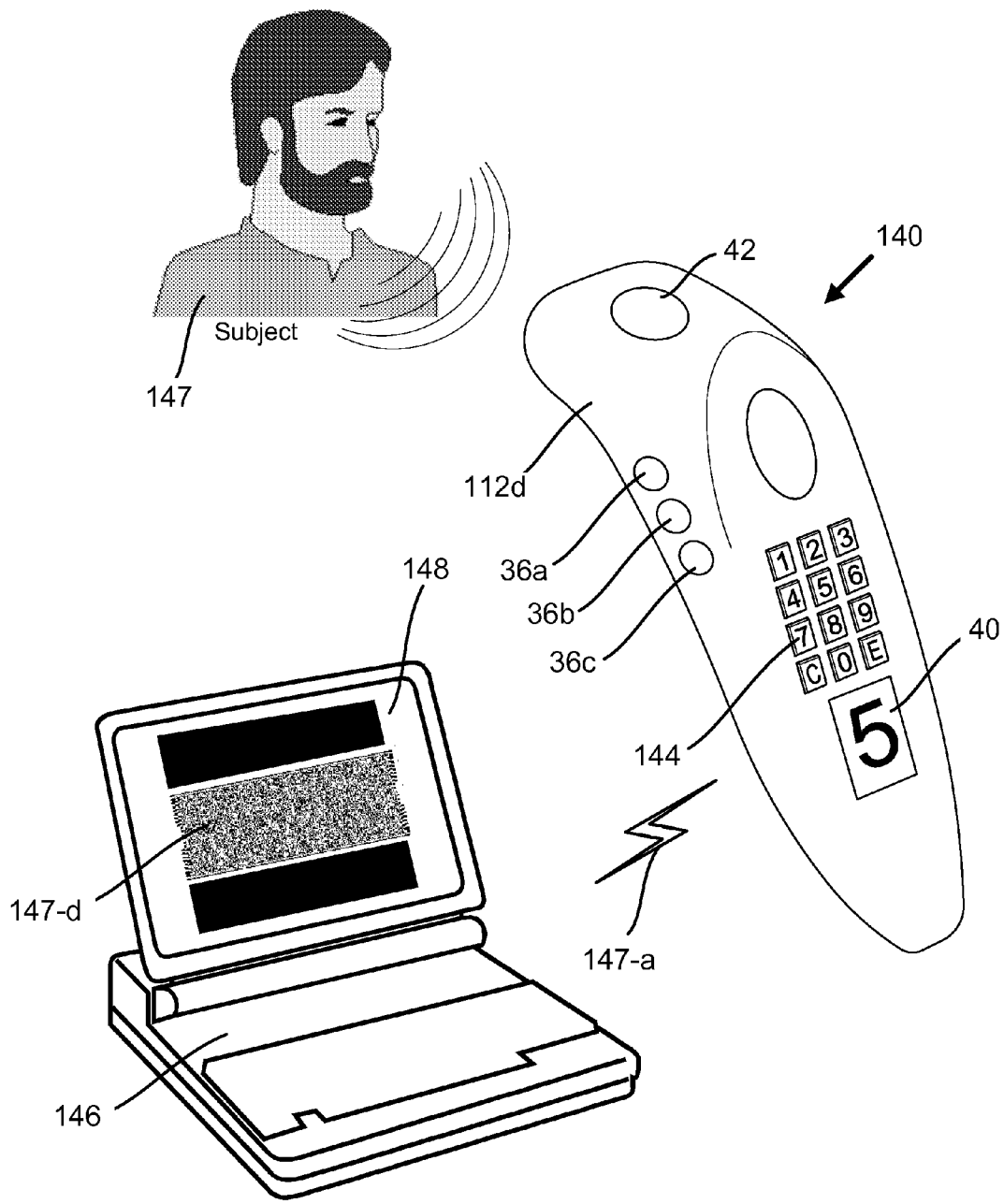
FIG. 9A is a depiction of an identifier manufacturing system using the reader of FIG. 8, according to yet another embodiment of the invention.

FIG. 9A is a depiction of an identifier manufacturing system 140 using the reader 112d of FIG. 8, according to yet another embodiment of the invention. The system 140 includes a general-purpose computer 146 or other similarly equipped microprocessor devices that also may include a display 148. Audio content from a speaking subject 147 is received by the microphone 42 of the reader 112d and are processed by the reader 112d and transferred to the general-purpose computer 146 by wireless signals 147a. The general-purpose computer 146 receives the wireless signals 147a and processes the signals using algorithms executable by the general-purpose computer 146. Accordingly, an image of an identifier 147d is presented on the display 148. Password encryption may be encoded within the signal 147a using the keypad 144 on the reader 112d. Alternatively, password encryption may also be provided using a keyboard or other entry means associated with the general-purpose computer 146.

Figure 9B:
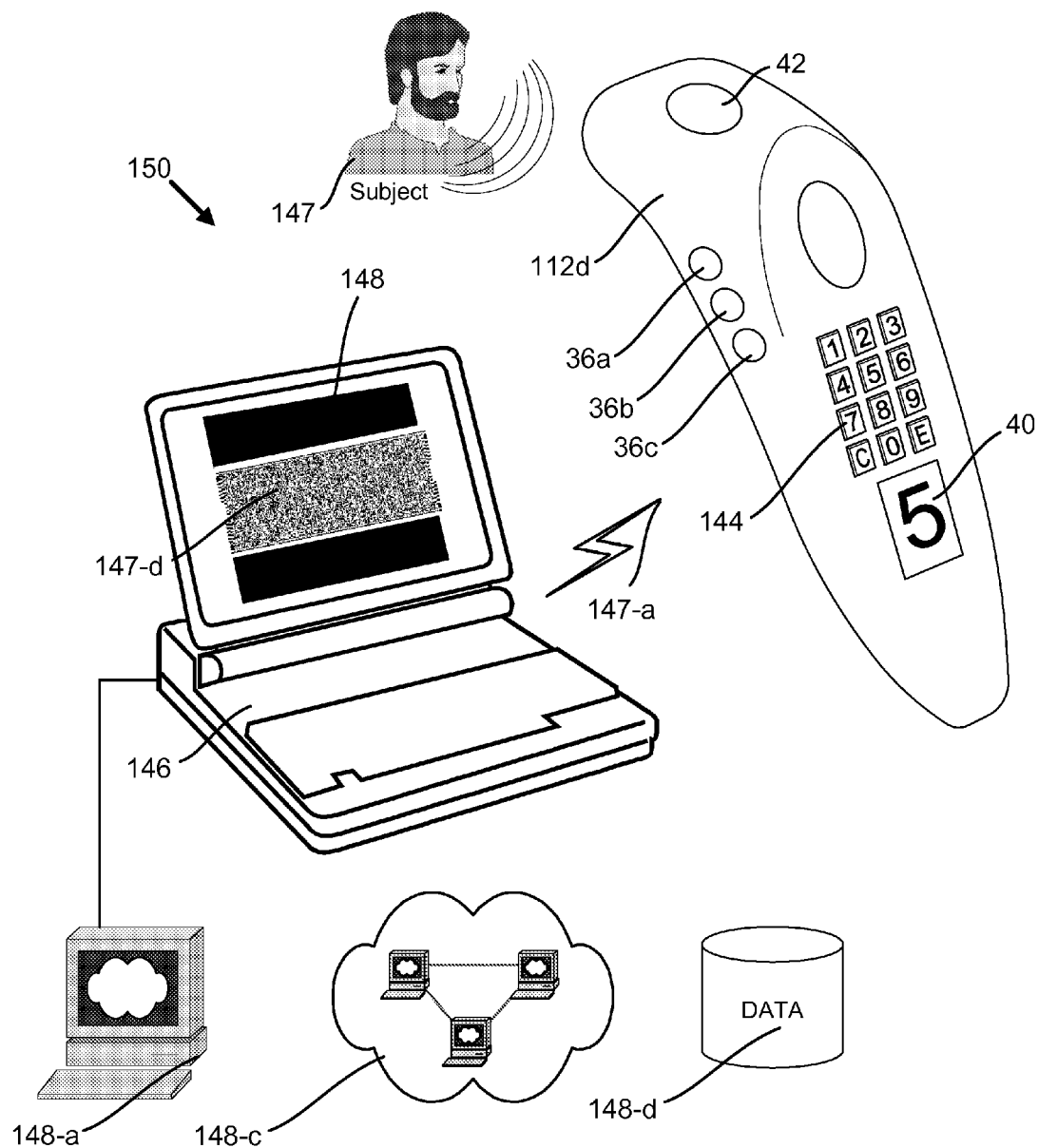
FIG. 9B is a depiction of the identifier manufacturing system of FIG. 9A that shows still other details of the embodiment.

Referring now to FIG. 9B and with continued reference to FIG. 9A, still other details of the embodiment shown in FIG. 9A will be described. The identifier 147d displayed on the display 148 may be routed to a server 148a that is coupled to a communications system 148c, such as the Internet, to a mass storage device 148d that includes a database. The reader 112d may also receive software updates through the communications system 148c.

Figure 10A:
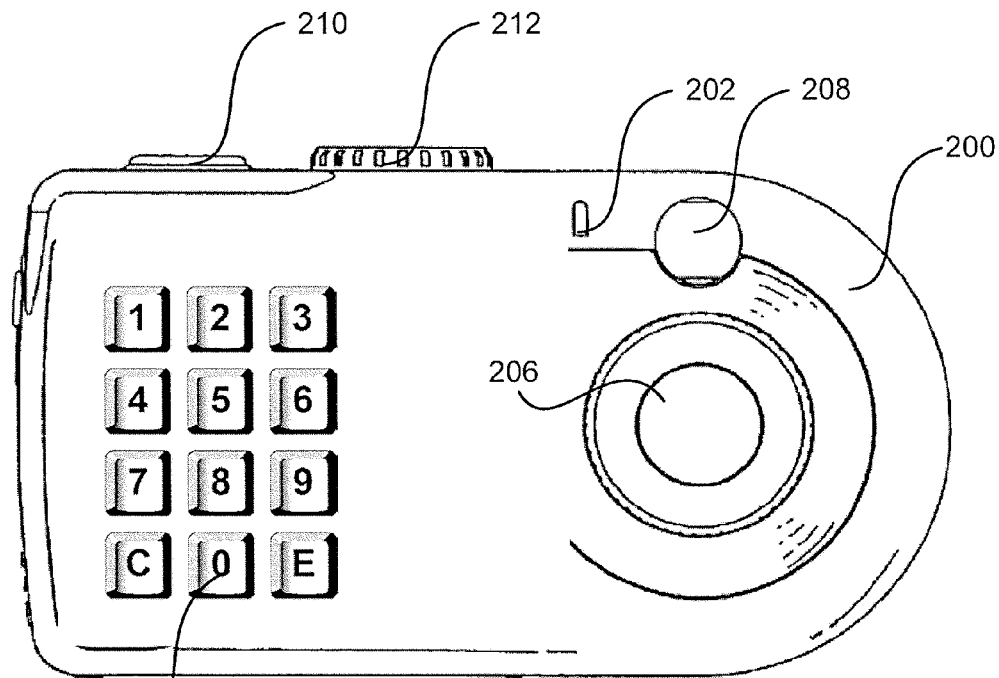
FIG. 10A and FIG. 10B are front and rear plan views, respectively, of a digital camera apparatus according to another embodiment of the invention.
Figure 10B:
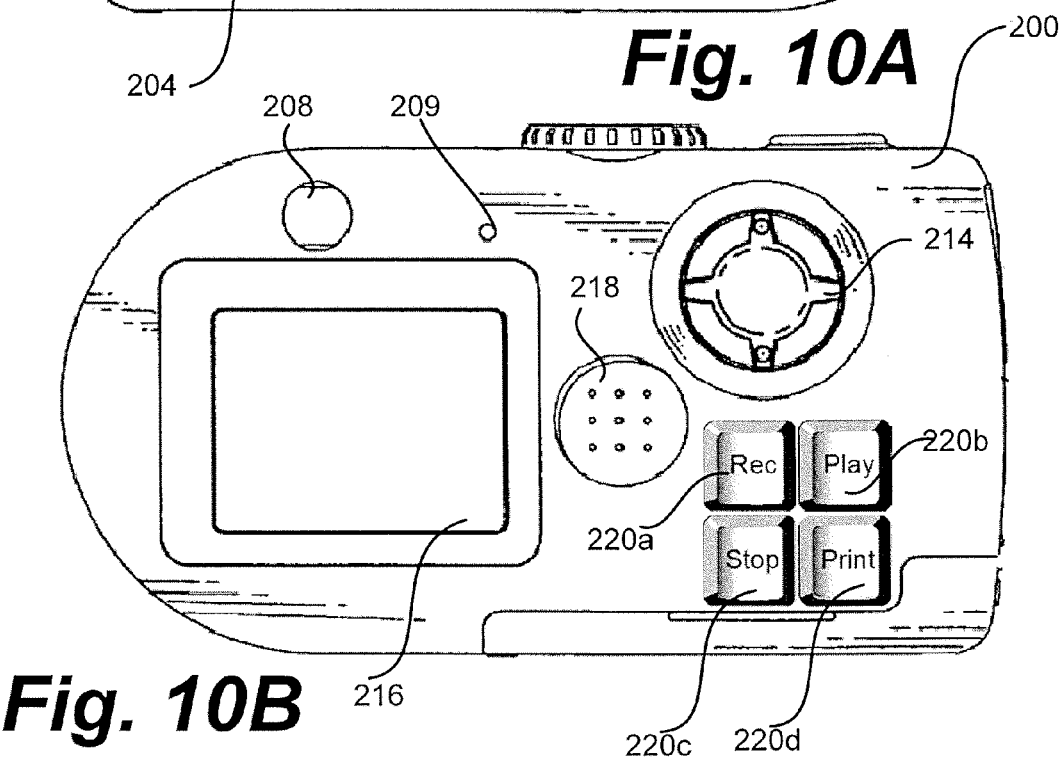

FIG. 10A and FIG. 10B and front and rear plan views, respectively, of a digital camera apparatus 200 according to another embodiment of the invention. The digital camera apparatus 200 includes various devices that are commonly associated with digital recording devices that cooperatively permit still or moving images to be captured and internally stored. Optionally, apparatus 200 may be equipped to encode a password or digital signature into identifier 20. The digital camera apparatus 200 includes a viewfinder 208, a lens 206, an exposure shutter release 210, a shutter control dial 212, as well as other known devices commonly associated with digital recording devices. The apparatus 200 also includes a keypad 204 and a microphone 202. The keypad 204 may include numerals 0-9, or alphabetical letters, or other suitable alphanumeric characters. The keypad 204 may also include various function buttons, such as "C", which is operable to clear an entry made on the keypad 204 by a user, and/or "E", which is operable to enter an entry made on the keypad 204. Referring now in particular to FIG. 10B, the digital camera apparatus 200 further includes a digital display 216 that is configured to display images within a field of view of the lens 206, and to view images stored within the apparatus 200. The apparatus 200 also includes a scrolling wheel 214 that is operable to select different magnification ranges so that a selected portion of an image displayed on the display 216 may be selectively enlarged or reduced. An image switch lever 218 is also included that is configured to selectably move an image of an identifier to a foreground portion of an image displayed on the display 216. The lever 218 may be a rocker switch in which an identifier image is brought forward and presented on the display 216. Function buttons 220a-220d are also present on the apparatus 200 that are operable to initiate selected functions. For example, a button 220a may correspond to a record function, a button 220b may correspond to a play function while a button 220c may correspond to a stop function. A button 220d may further correspond to a print function button.

Figure 10C:
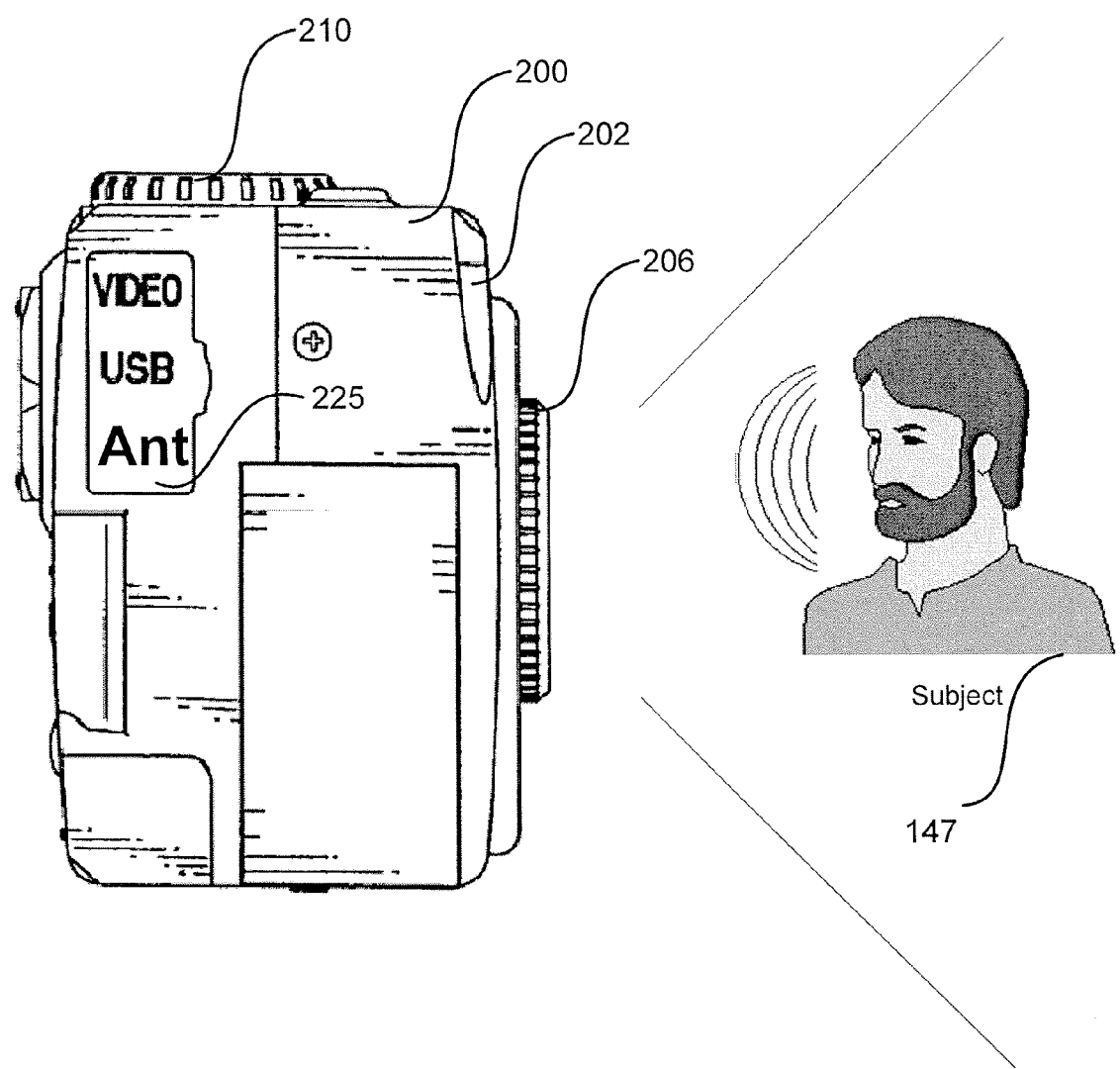
FIG. 10C is a side elevational view of the camera apparatus of FIG. 10A and FIG. 10B that are used to describe various operational details of the apparatus.

FIG. 10C is a side elevational view of the camera apparatus 200 of FIG. 10A and FIG. 10B that will be used to describe various optional operational details of the apparatus 200. The apparatus 200 records an image a subject 147 and also captures audible sounds, including speech from the subject 147. The camera apparatus 200 includes a communications panel 225 that provides various interface locations, which may include a video output interface (VIDEO) for an analog video signal output, a Universal Serial Bus (USB) interface that digital video signal output, and a wireless interface (ANT) that is operable to convey wireless analog and/or digital signals to a computer, a printer, or other microprocessor-based devices. For example, the VIDEO interface may be used to couple analog signals to other devices configured to accept analog signals, such as a television set or analog computer monitor. The USB interface may be used to couple digital signals to a computer, or other devices that are configured to accept digital signals in accordance with the USB data exchange protocol, while the ANT interface may be used to wirelessly couple the apparatus 200 to a variety of digital devices.

Still referring to FIG. 10C, audible sounds emanating from the speaking subject 147 are received by the microphone 202 and are converted into analog signals. The analog signals are converted to digital and stored in an audio digital file within the apparatus 200. Alternately, the audio digital file may be transferred to other devices that are communicatively coupled to the camera apparatus 200 by means of the interface locations in the communications panel 225.

Figure 10D:
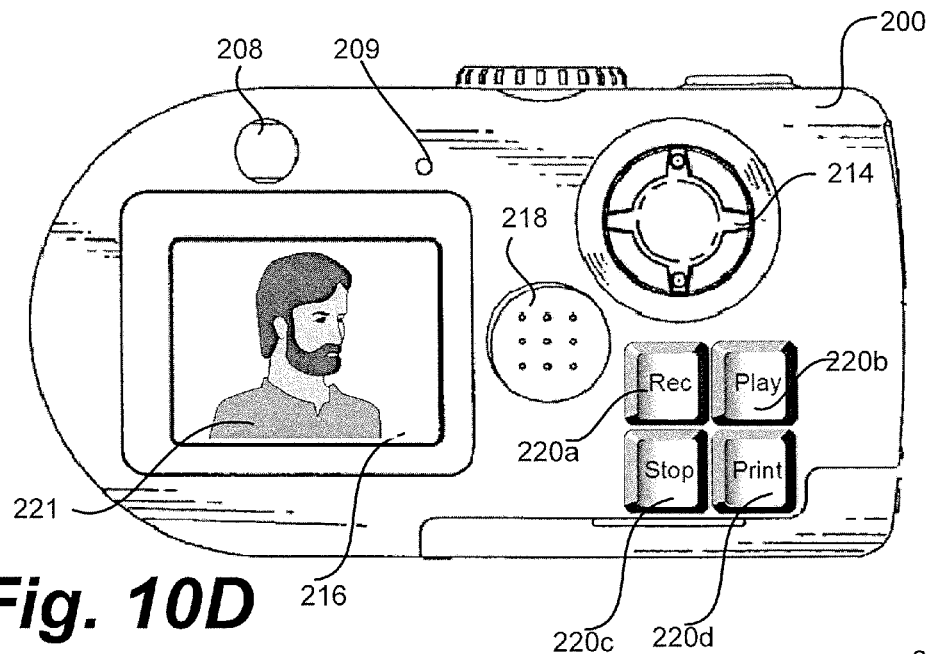
FIG. 10D is a depiction of the digital camera having a non-bar code image of the subject.
Figure 10E:
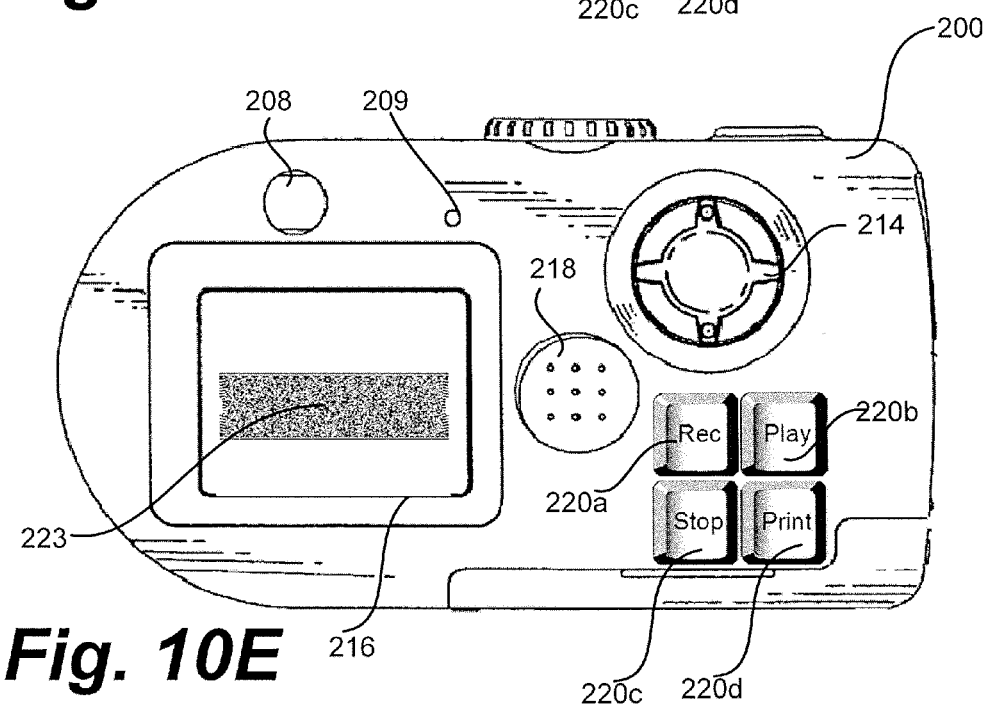
FIG. 10E is a depiction of the digital camera having an image of the 2D barcode from the speaking subject.

Referring now also to FIG. 10D and FIG. 10E, an image 221 of the subject 147 (FIG. 10C) is shown on the display 216. When the switch 218 is actuated, the image of the identifier 223 is presented on the display 216. The identifier 223 preferably includes a digital representation of the audible sounds and video content associated with the image 221 of the subject 147.

Figure 11:
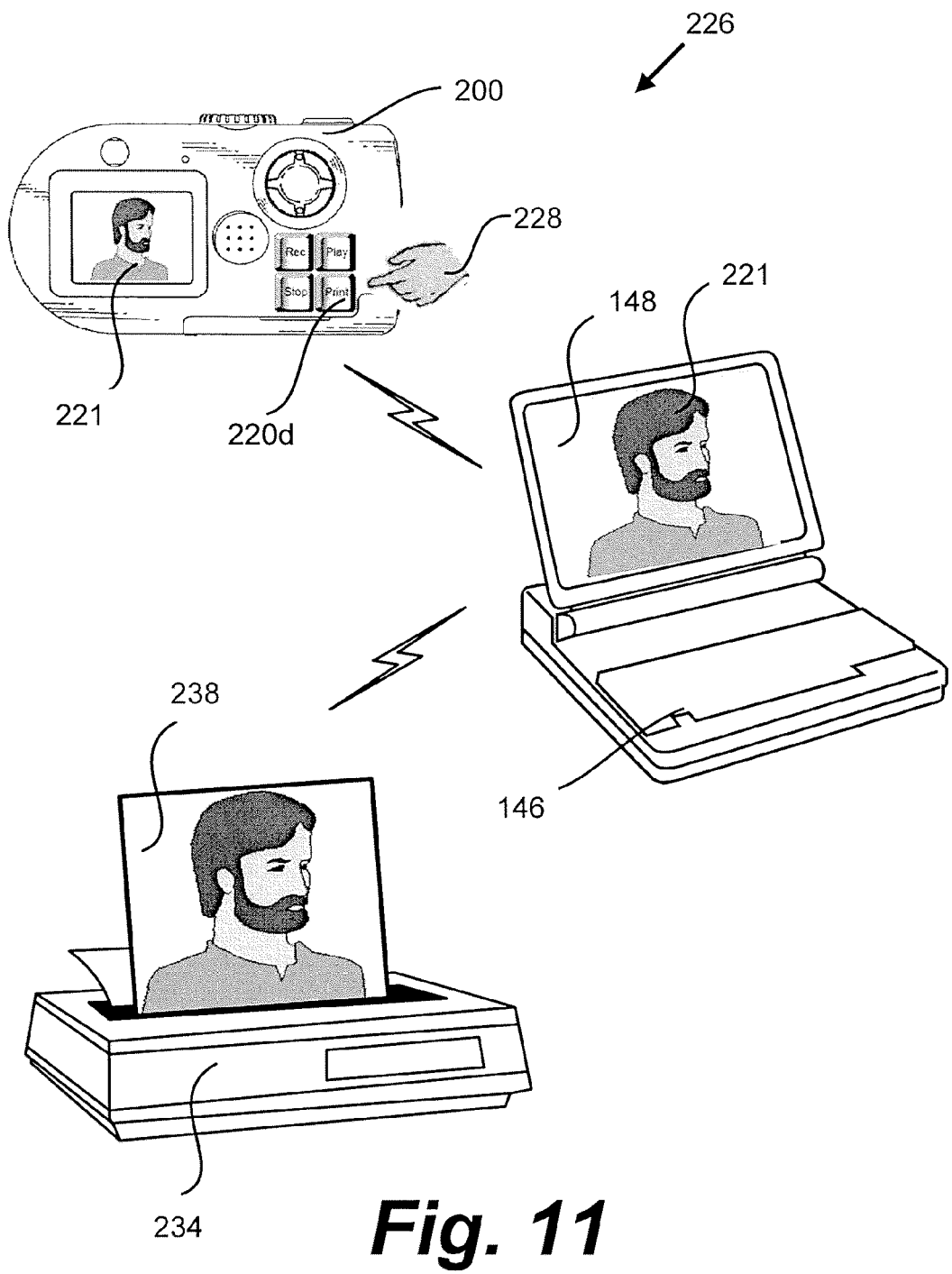
FIG. 11 is an isometric view of an image acquisition, presentation and transfer system according to another embodiment of the invention.

FIG. 11 is an isometric view of an image acquisition, presentation and transfer system 226 according to another embodiment of the invention. The system 226 includes the camera apparatus 200, as described in detail in connection with FIGS. 10A through 10E. The system 225 also includes a computer 146 and a printer 234 that are operatively coupled to the camera apparatus 200, by wireless, or other suitable means. In operation, a user 228 touches or otherwise activates a print key 220d and the apparatus 200 wirelessly transmits the image 221 to the computer display 148 of the computer 146. The computer 146 may, in turn, wirelessly relay the image 221 to a printer 234 so that the image 221 may be printed on a suitable print medium 238. Although FIG. 11 depicts the wireless exchange of signals between the apparatus 200, the computer 146 and the printer 234, it is understood that in other particular embodiments of the invention, one or more of the foregoing devices may be coupled using metallic, fiber optic or other conductors.

Figure 12:
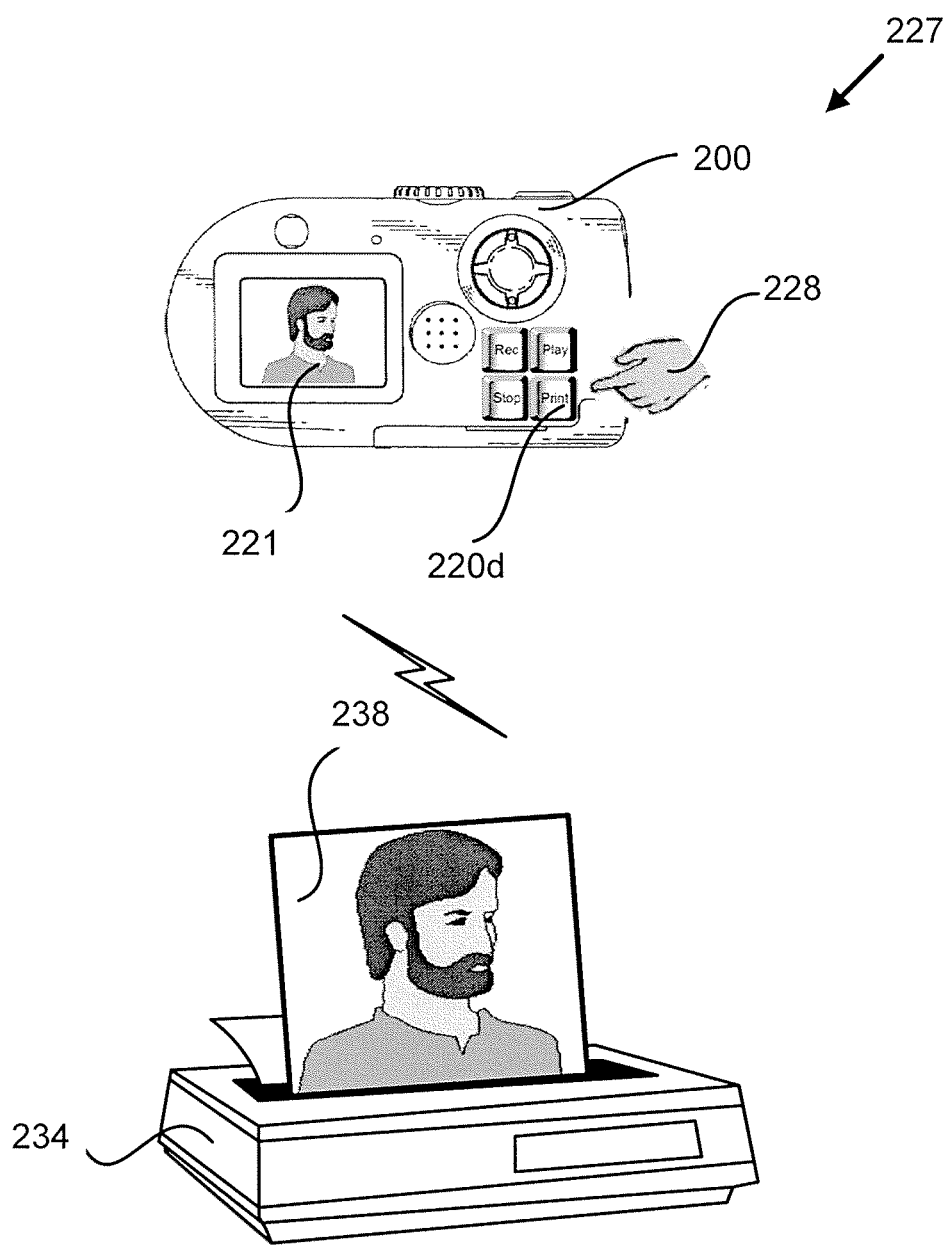
FIG. 12 is an isometric view of an image acquisition, presentation and transfer system according to another embodiment of the invention.

FIG. 12 is an isometric view of an image acquisition, presentation and transfer system 227 according to another embodiment of the invention. The camera apparatus 200 wirelessly communicates with the printer 234 so that the image 221 shown on the display 216 of the camera apparatus 200 is transferred to the printer 234. The transfer of the image 221 is affected when the user 228 actuates the print key 220d. When the printer 234 receives the image 221, the printer 234 reproduces the image 221 on a suitable print medium 238.

Figure 13A:
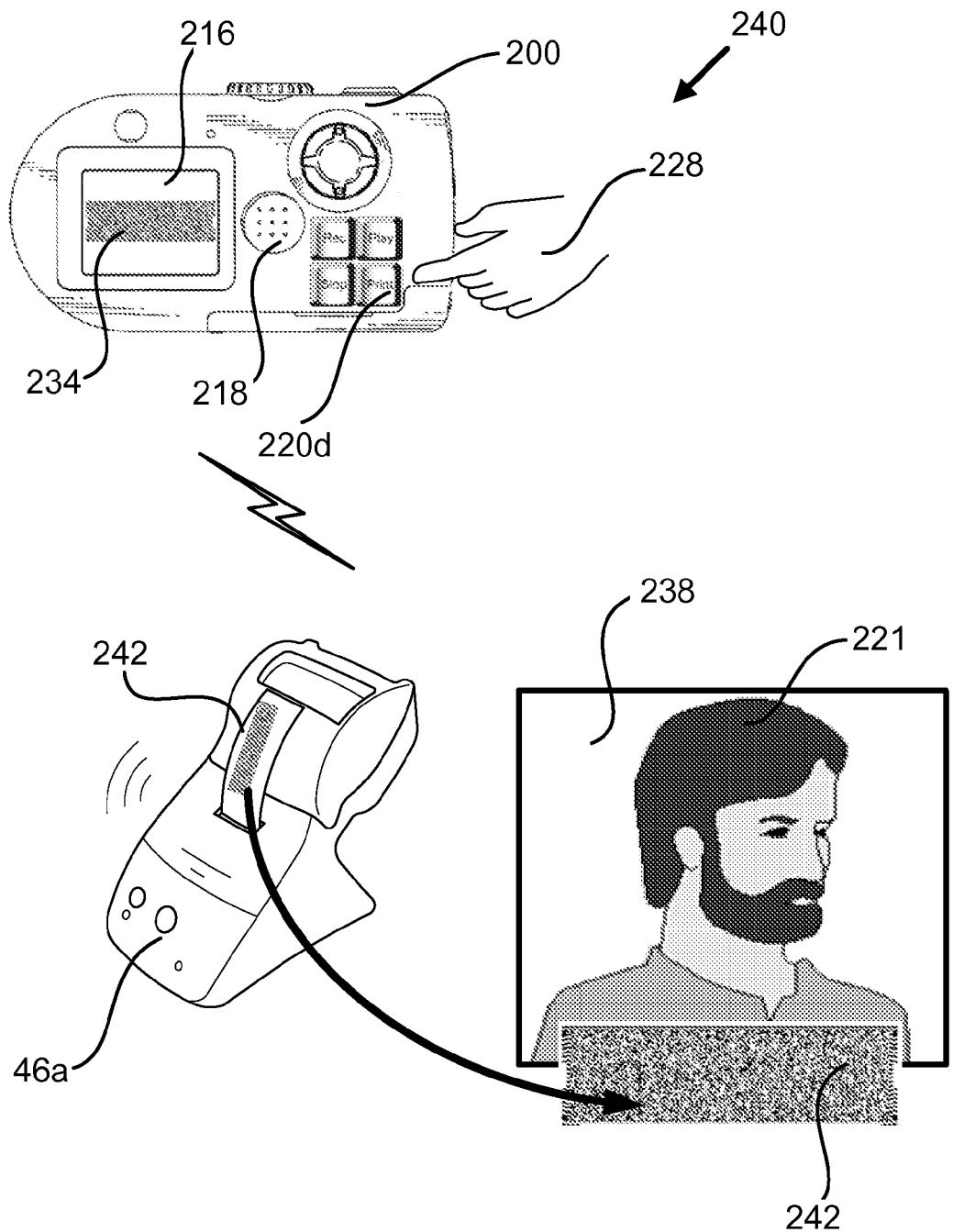
FIG. 13A is an isometric view of an image acquisition, presentation and transfer system 240 according to another embodiment of the invention.

FIG. 13A is an isometric view of an image acquisition, presentation and transfer system 240 according to another embodiment of the invention. The system 240 includes a camera apparatus 200 and a printer 46a configured to print an identifier 242. The display 216 of the camera apparatus 200 displays the identifier 234 that includes voice and audio encoded information. In operation, the print function button 220d is actuated by the user 228 so that the identifier 234 is wirelessly communicated to the printer 46a so that the identifier 242 is printed by the printer 46a on a suitable print medium. The identifier 242 is then ejected by the printer 46a, and removed from the printer 46a and associated or affixed to an image 238 of the subject 238 previously printed from the printer 234 of FIG. 12. In this operation, the identifier 242 that is generated as an original 2D barcode containing a voice message from the speaking subject 147 is not password coded with a PIN or any other similarly functioning password. For non-password coded operations, the camera apparatus need not be equipped with a keypad 204.

Figure 13B:
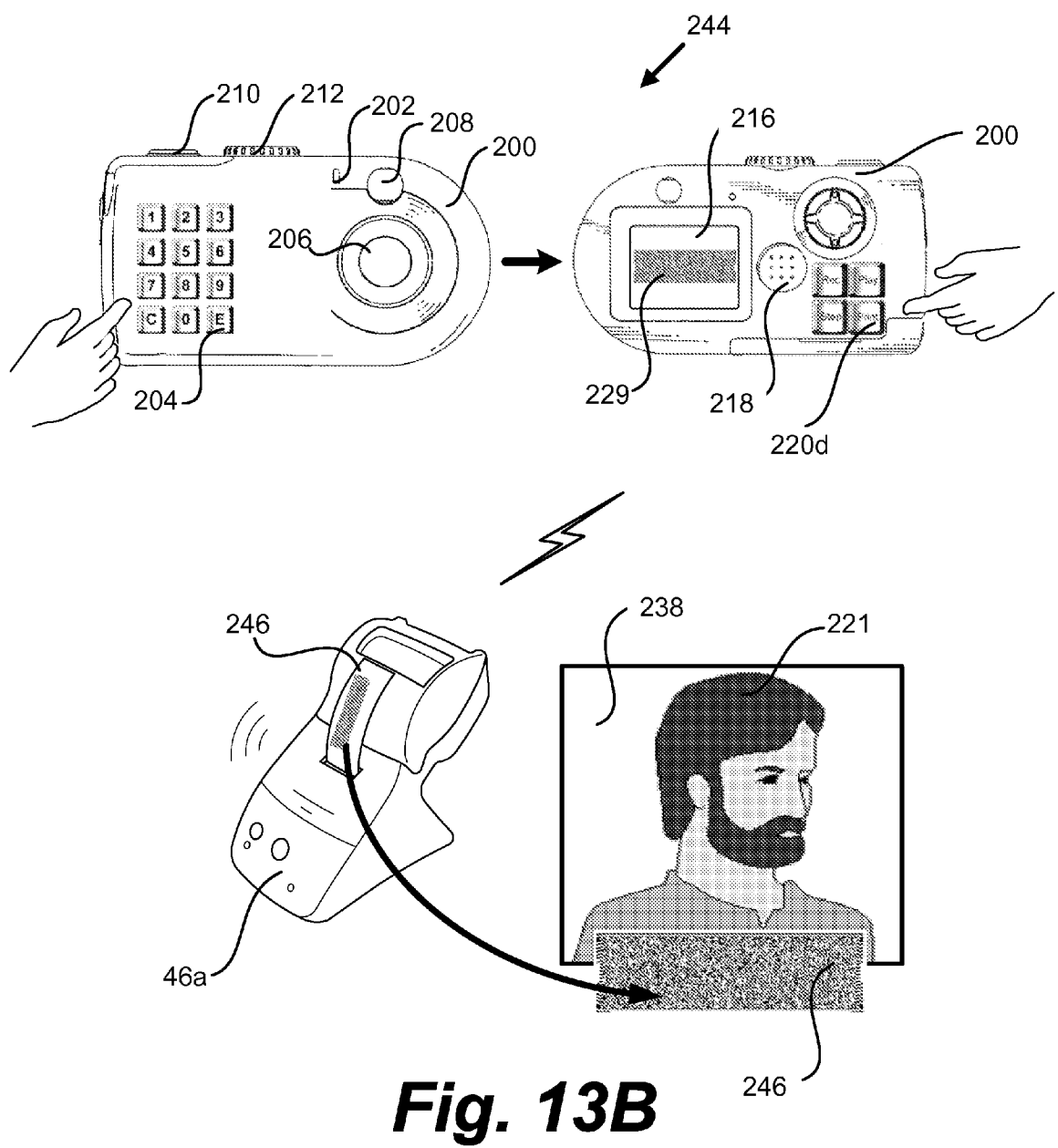
FIG. 13B is an isometric view of an image acquisition, presentation and transfer system according to another embodiment of the invention.

FIG. 13B is an isometric view of an image acquisition, presentation and transfer system 244 according to another embodiment of the invention. The camera apparatus 200 is operable to receive a password and to encrypt the password before the password is associated with the identifier. The encryption scheme may employ either the well-known private (or secret) key encryption, or it may rely upon public key encryption, thus affording greater security if encryption speed is not a concern. In a specific embodiment, a public key encryption method is combined with a private key method in a "digital envelope" to provide an enhanced level of security with greater speed. Accordingly, the user 228 may provide the password to the system 224 by entering the password on the keypad 204 of the camera apparatus 200. The password is then encrypted and transferred to the identifier 229 that is shown on the display 216 of the camera apparatus 200. A user 228 may then actuate the print function key 220d so that the apparatus 200 wirelessly transmits the identifier 229 to the printer 46a, whereupon an identifier 246 having an encrypted password is printed and ejected by the printer 46a. The identifier 246 having the encrypted password may then be affixed or otherwise associated with the image 221 that was previously printed on a suitable print medium 238.

The various embodiments of the foregoing identifier generation systems as shown in FIGS. 1-13B require the separate application of an independently generated identifier to be applied to the surface of an object or to the surface of an image or an object. Other embodiments advantageously avoid the separate application of a printed or stamped identifier to an object or object image. The microprocessor executable algorithms may be implemented either within the various readers and/or camera embodiments, or by a microprocessor attached to peripheral devices, such as the computer 146 or the printer 46. For example, sound files that are maintained in a separate database may be merged with image files from an image database, such that the combined sound and image file may be printed as an integral image having both the image 16 merged with the identifier 20. The microprocessor executable algorithms advantageously permit the placement of the identifier about the perimeter of the image 16 in a manner that minimizes the visual obstruction of details within the image 16. Other embodiments would include the computer 146 or printer 46 having a microphone, so that separate sound containing identifiers, are generated separately from the image 16 obtained by the readers 12, 12a-d, 112, or camera 200. Alternatively, an independently generated identifier may be digitally combined with the digital file of the image 16, positioned as desired, then printed as a composite identifier-picture image.

Figure 14:
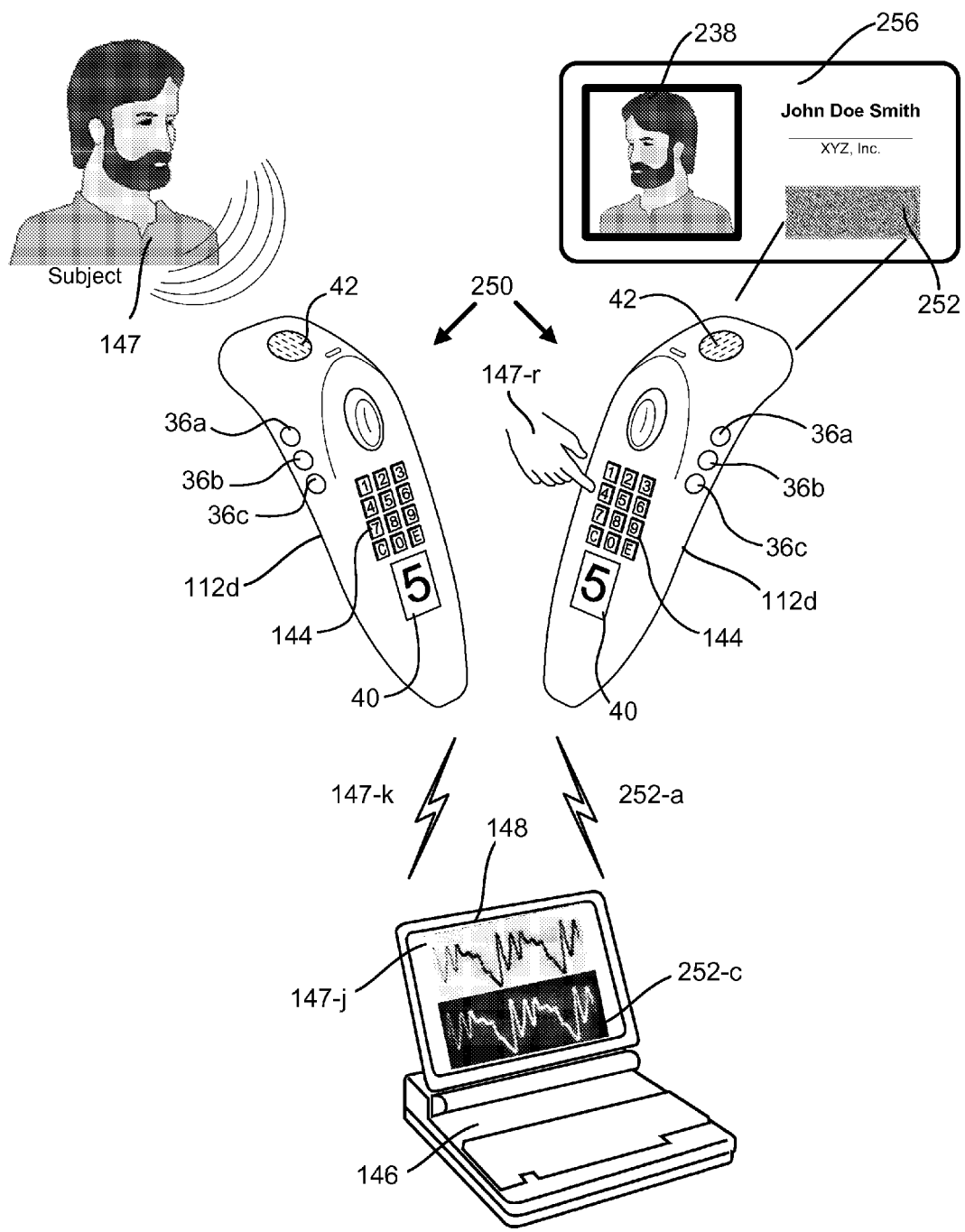
FIG. 14 is an isometric view of a speech analysis and voice identification system according to another embodiment of the invention.

FIG. 14 is an isometric view of a speech analysis and voice identification system 250, according to another embodiment of the invention. The system 250 includes at least one reader 112d, as previously described in connection with the embodiment shown in FIG. 8. Alternately, at least one camera apparatus 200, as described in detail in connection with FIG. 10A through FIG. 10E may also be used instead of one or both of the readers 112d. The system 250 also includes a computer 146, and an identification card 256 that includes an image 238 of the subject 147, and an identifier 252. The identifier 252 includes speech content that has been encoded on the identifier 252.

A preferred operation of the system 250 will now be described. In one operational mode, a subject 147 records a speech message on a selected one of the readers 112*d*. The subject 147 generally recites the same message that was previously encoded on the identifier 252, although other messages may be used. The reader 112*d* then transmits a wireless signal 147-*k* to the computer 146. For example, the subject 147 may recite the message "I am John Doe Smith, an employee of XYZ, Inc.", and the speech content is transferred to the computer 146 for further processing. The computer 146 includes speech recognition software, and an analytical image 147-*j* of the encoded message may be generated on the display 148.

In another operational mode, the identifier 252 on the identification card 256 is scanned by the reader 112*d*, and the audio content encoded on the identifier 252 is wirelessly communicated to the computer 146. The audio content may be processed by the computer 146 and compared to the record obtained from the subject 147 for the subject 147 in order to verify an identity of the subject 147. Simultaneously or asynchronously, the identification card 256 may be examined to verify that the image 238 corresponds to the subject 147.

Still referring to FIG. 14, the reader 112*d* may be operated by the subject 147, or alternately, an approved user may enter a password on the keypad 144 of the reader 112*d* to unlock an encrypted audio content on the identifier 252. The unlocked audio content from the identifier 252 is then sent in a wireless signal 252*a* from the reader 112*d* to the computer 146. The pattern of the identifier-derived audio content is presented on the display 148 as an image 252*c* for comparison. If the speech processing analysis software indicates high probably match, an identity of the subject 147 is confirmed.

In other specific embodiments, the system 250 may include a database within the computer 146 having a plurality of stored audio records obtained from a plurality of different individuals. Moreover, the database may be remotely located from the computer 146 and accessed by the computer 146 through a communication system, such as a wide area network (WAN), a local area network (LAN) and the Internet.

Figure 15:
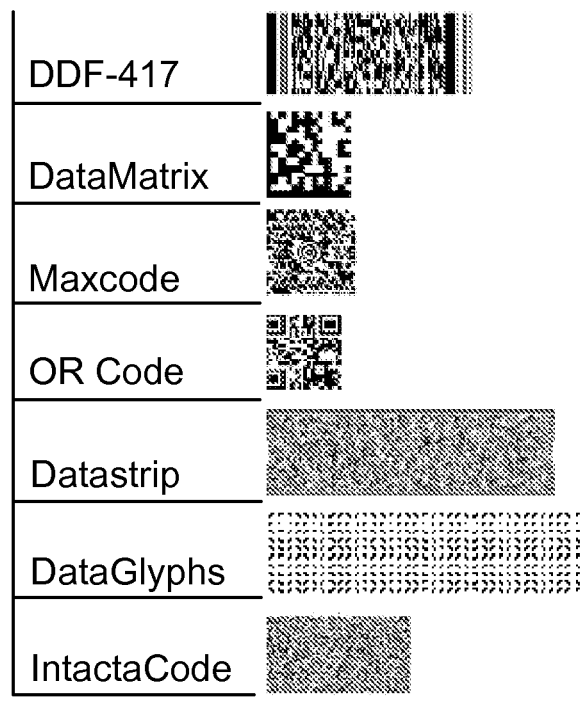
FIG. 15 is a plan view of respective patterns that may form a part of the identifier described in the foregoing embodiments.

FIG. 15 is a plan view of respective patterns that may form a part of the identifier described in the foregoing embodiments. The codes include a PDF-417 barcode pattern, a DataMatrix barcode pattern, a Maxicode barcode pattern, an QR Code barcode pattern, a DataStrip barcode pattern, a DataGlyphs barcode pattern, and an Intacta Code barcode pattern, although other suitable 2D patterns may also be used. The foregoing identifiers may be pigment-based identifiers that are applied to rigid and semi-rigid substrates. Alternately, the identifiers may include a pigment-base and/or be applied to a plastic film or to a paper product.

Figure 16:
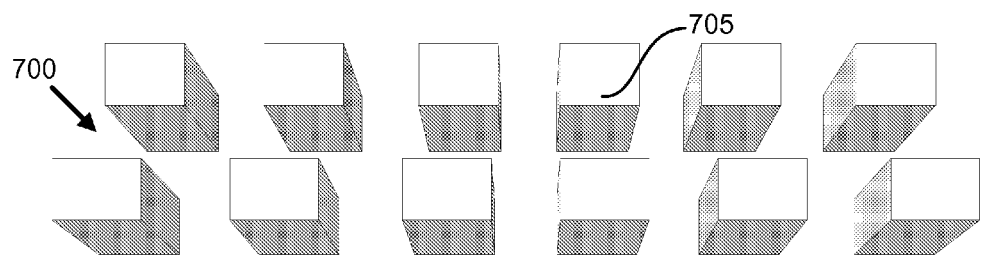
FIG. 16 is a plan view of a non-pigment-based identifier according to an embodiment of the invention.

FIG. 16 through FIG. 23 are respective plan views that show portions of non-pigment based identifiers that may be formed onto a surface of an object. The non-pigment-based identifiers may be formed by known stamping, embossing, etching engraving, photolithographic or other processes. FIG. 16 is a plan view of a non-pigment-based identifier 700 according to an embodiment of the invention. The identifier 700 includes an array of raised box-like structures 705 that may vary in relative spacing and size.

Figure 17:
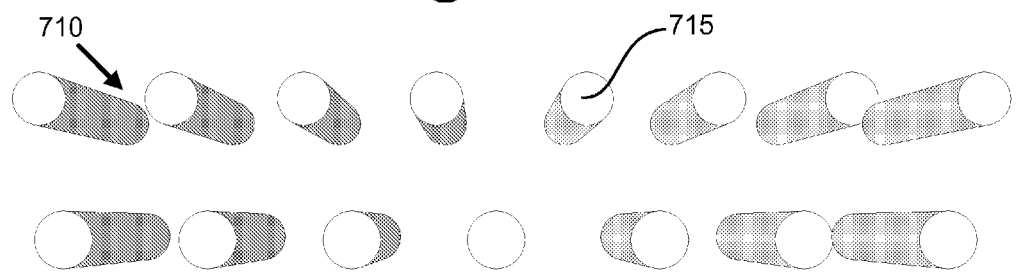
FIG. 17 is a plan view of a non-pigment-based identifier according to another embodiment of the invention.

FIG. 17 is a plan view of a non-pigment-based identifier 710 according to another embodiment of the invention. The identifier 710 includes an array of raised cylinders 715 that may have a different relative spacing, and/or different relative diameters.

Figure 18:
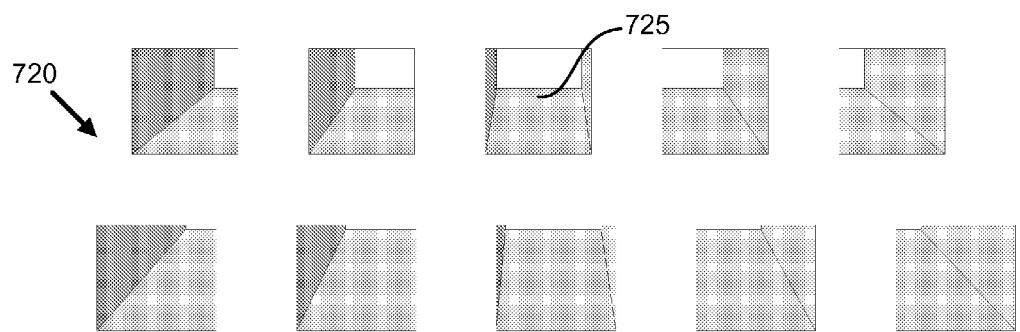
FIG. 18 is a plan view of a non-pigment-based identifier according to an embodiment of the invention.

FIG. 18 is a plan view of a non-pigment-based identifier 720 according to an embodiment of the invention. The identifier 720 includes an array of depressions 725 that extend inwardly into a surface. Although the identifier 720 shown in FIG. 18 is generally rectangular in appearance, it is understood that the depressions 725 may be applied to the surface in other arrangements. For example, hexagon, L-shaped, and circular arrangements may also be used.

Figure 19:
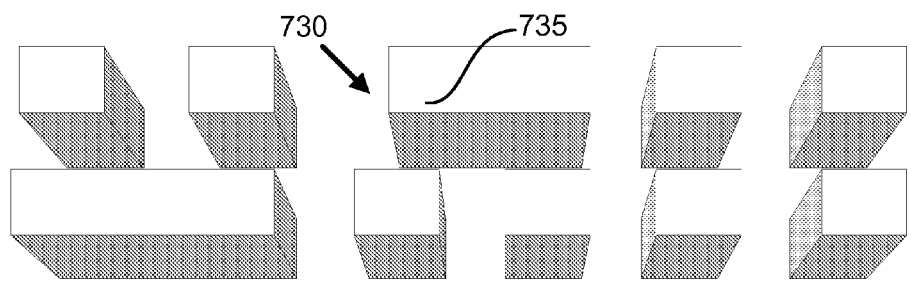
FIG. 19 includes respective plan views of a non-pigment-based identifiers according to another embodiment of the invention.
Figure 20:
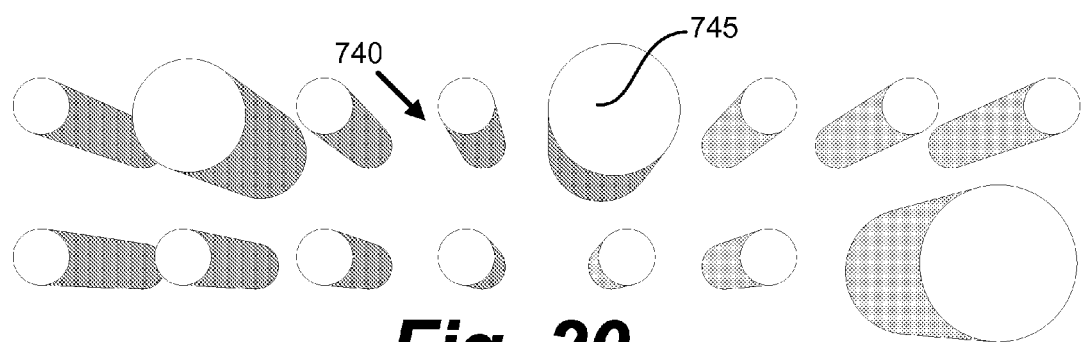
FIG. 20 includes respective plan views of a non-pigment-based identifiers according to another embodiment of the invention.

FIG. 19 and FIG. 20 are respective plan views of a non-pigment-based identifiers 730 and 740, according to another embodiment of the invention. The identifier 730 includes generally rectangular-shaped elements 735 that are arranged in a relatively rectangular pattern of the elements 735, although other patterns may be used. The identifier 740 of FIG. 20 includes generally cylindrically shaped elements 745 that may be arranged in a selected rectangular arrangement, or in other suitable arrangements.

Figure 21:
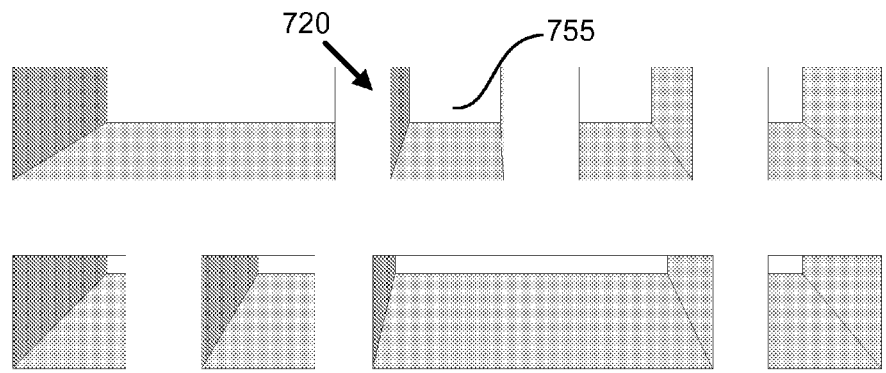
FIG. 21 is a plan view of a non-pigment-based identifier according to an embodiment of the invention.

FIG. 21 is a plan view of a non-pigment-based identifier 750 according to an embodiment of the invention. The identifier 750 includes generally rectangular-shaped depressions 755 that extend into a surface of an object. The elements 755 may be arranged in a selected rectangular arrangement, or in other suitable arrangements.

The foregoing embodiments may utilize the identifier patterns shown in FIG. 15 through FIG. 21 may incorporate Exchangeable Image File format (EXIF) coded information with the encoded sound or voice message by keypad or voice activated commands. The EXIF information is subsequently decoded and separately spoken along with the sound or voice container identifier The EXIF related information may be spoken before or after the subject-derived or narrator derived speech, or printed separately from the subject or narrator messages. For example, in a photographic device, selected exposure-related information such as f-stop (aperture setting) and exposure times may be EXIF incorporated into the identifier, and may also be printed alongside the identifiers in alphanumeric symbols. The EXIF or other alphanumeric encoded information may be further encoded with a synthesized voice in a non-subject voice field of the identifier to distinguish non-subject sourced speech from subject-derived speech located in the speaking subject voice field of the identifier. The synthesized voices may have robotic, male, female, or other voice characteristics. The identifier patterns may also be further encoded with the date and a number of times the identifier was created, revised and/or reproduced, along with version number and/or a serial number of the created or reproduced identifier in the non-voice pattern fields of the identifier. Particular EXIF embodiments of the foregoing reader and identifier generating systems permit the generation of original identifiers under optimal photographic conditions and to generate replicates of original sound-containing identifiers under the same optimal photographic conditions, thereby assuring consistent and controlled duplication of original identifiers.

Figure 22:
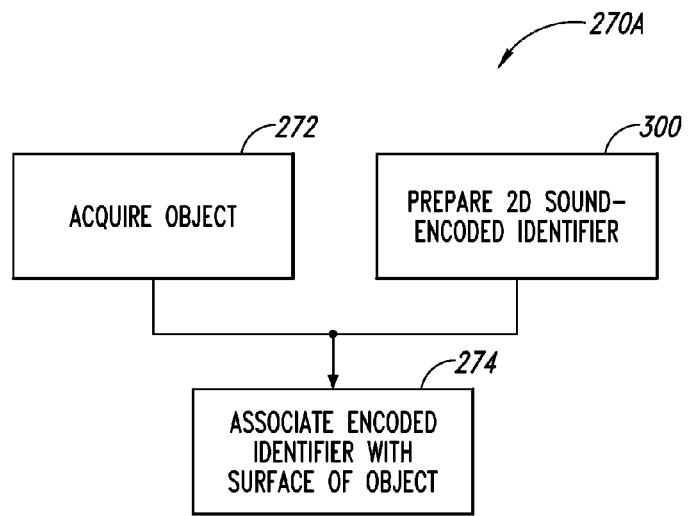
FIG. 22 is a flowchart that describes a method for associating an identifier with a surface of an object, according to an embodiment of the invention.

FIG. 22 is a flowchart that describes a method 270*a* for associating an identifier with a surface of an object, according to an embodiment of the invention. At block 272, a user acquires an object that is to be identified. The object may be a book, a menu, a medical record, a warning sign, a museum display board, a greeting card, or a newspaper to which an identifier is to be associated. At block 300, the user prepares the audio content and encodes the audio content onto the identifier. The encoded identifier may include voice or other environmentally recorded sounds that are pertinent to the objects. At block 274, the encoded identifier is associated with the surface of the object, by affixing the encoded identifier to a surface of the object.

Figure 23:
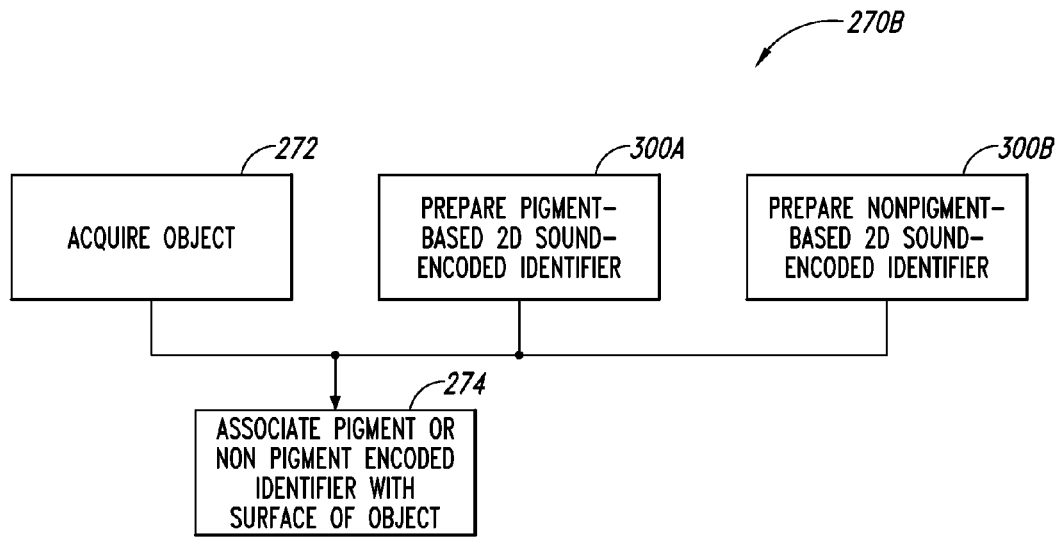
FIG. 23 includes respective plan views that show portions of non-pigment based identifiers that may be formed onto a surface of an object.

FIG. 23 is a flowchart that describes a method 270*b* for associating an identifier with a surface of an object, according to another embodiment of the invention. At block 272, a user acquires an object that is to be identified. At block 300*a*, a pigment-based identifier is prepared by encoding a desired audio content onto the identifier. Alternately, at block 300B, a non-pigment based identifier may be prepared by similarly associating a desired audio content onto the identifier. In a non-pigment based identifier, stamping, etching or subjecting the surface of the object alters the surface of the object. At block 274, either the pigment based or non-pigment based identifier are associated or otherwise preferably affixed to the surface of the object. The identifiers may also include magnetic stripes and RFID tags.

Figure 24:
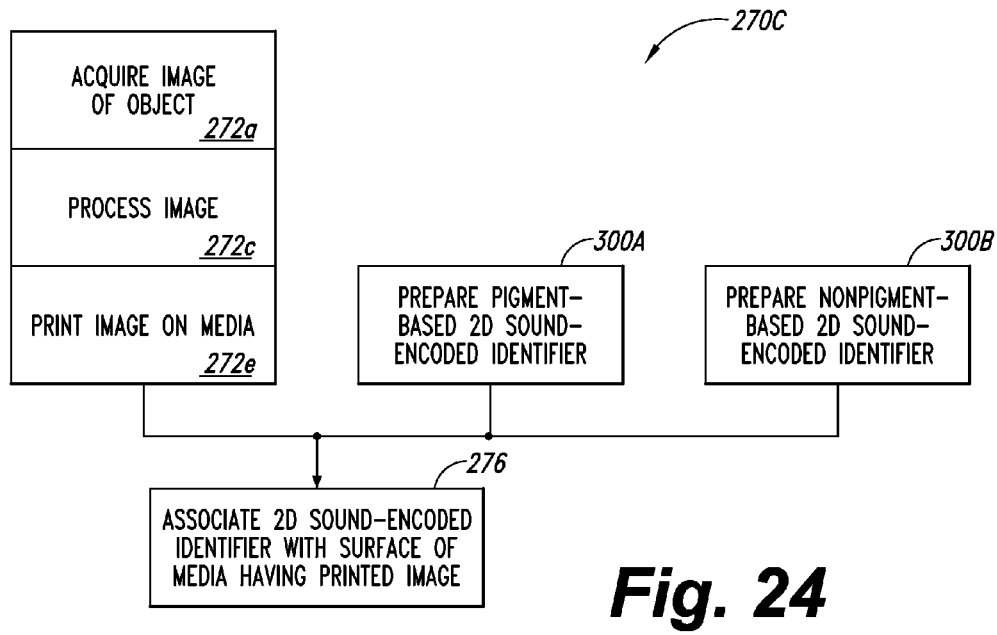
FIG. 24 is a flowchart that describes a method for associating an identifier with a surface of an object, according to another embodiment of the invention.

FIG. 24 is a flowchart that describes a method 270*c* for associating an identifier with a surface of an object, according to another embodiment of the invention. At block 272*a*, an image of the object is acquired. At block 272*c*, the image is processed. The suitably processed image may then be applied to a suitable media, as shown in block 270*e*. Suitable media includes a paper-based product such as copy paper, newsprint, cardboard, plastic, wood, or metal-based surfaces. At block 300*a*, a pigment-containing identifier is prepared by associating the desired audio content with the identifier. At block 300*b*, a non-pigment containing identifier may be prepared. Non-pigment containing identifiers are stamped or otherwise embossed on the surface. At block 276, at least one of the pigmented and the non-pigmented identifiers is then associated with a surface portion of the object.

Figure 25:
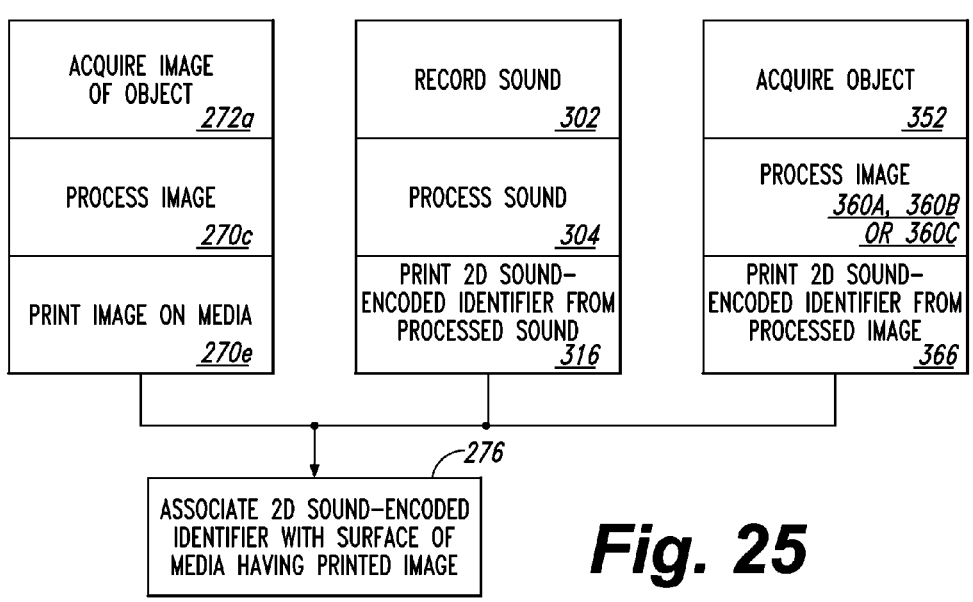
FIG. 25 is a flowchart that will be used to describe a method for associating an identifier with a surface of an object, according to another embodiment of the invention.

FIG. 25 is a flowchart that will be used to describe a method 270D for associating an identifier with a surface of an object, according to another embodiment of the invention. The method 270D includes expanding the method block 300*a* in the form of either preparing identifiers or making visual reproductions of original identifier-containing sound codes. Visual reproductions of identifiers also apply to reproductions of non-pigmented identifiers. The method 270-*d* includes expanding the block 300*a* of FIG. 25 into three sub-algorithms including recording sound at block 302, processing sound at block 304, and printing identifiers from at block 316. The sub-algorithms to reproduce either pigment-based identifiers or non-pigment based identifiers are shown in blocks 352, 360A, 360B, 360C and 366. At block 352 an image of an identifier object is acquired. The image of the identifier is processed at block 360A, block 360B, or block 360C. Block 360A includes image processing and reproducing the same pixel shape as presented by the original identifier. Block 360B includes image processing and reproducing a pixel shape that differs from the original identifier. Process block 360C, described more fully in FIGS. 68-73 below, concerns image-processing sub-regions of an original 2D barcode object for re-assembly into a combined or composite barcode image that has substantially the same audio content as the original 2D barcode object. The processed image of the identifier may be printed from the processed image.

As previously described, the printed identifier may also be a stamped or non-pigmented copy of an identifier. The printed image of the media at block 270-*e* may be combined with one of the printed identifier from the process sound at block 316 and the copy of the original identifier object at block 366. The combination of printed image on the media and either the original identifier or the duplicate of the identifier is associated at block 276 with the surface of the media. Association includes affixing or otherwise attaching the corresponding identifiers to the surface of the media.

Figure 26A:
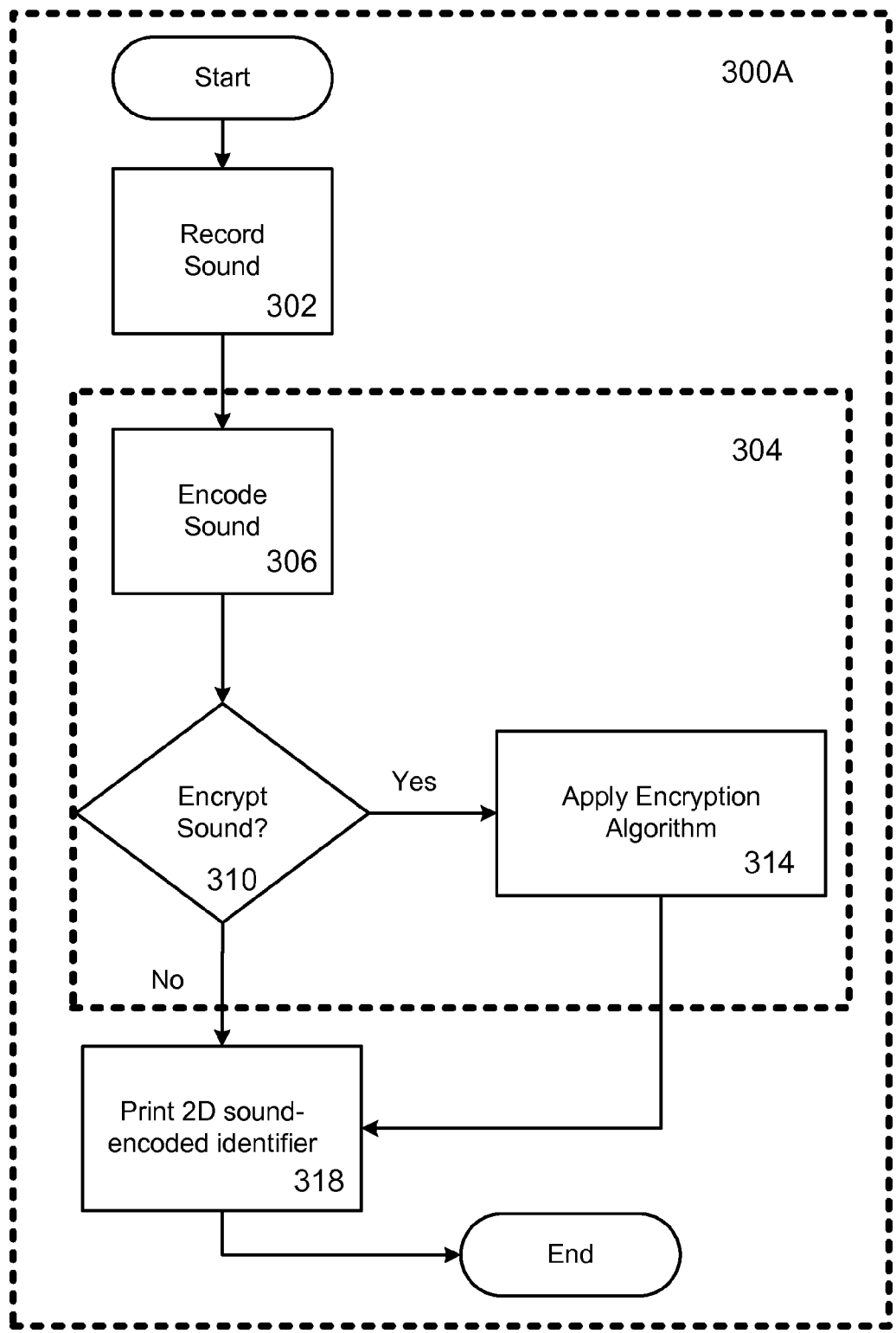
FIG. 26A is a flowchart that is a further expansion of the process sound block 304 of FIG. 25.

FIG. 26A is a flowchart that is a further expansion of the process sound block 304 of FIG. 25 to generate an identifier. At block 302, the sound is recorded, and the algorithm within block 304 includes encoding the sound at block 306 and then making a decision whether or not to encrypt the sound at decision diamond 310. If the decision is "no" then the identifier is printed at block 318. If the answer is "yes" to encrypt sound, then an encryption algorithm is applied at block 314. The encrypted identifier is printed at block 318.

Figure 26B:
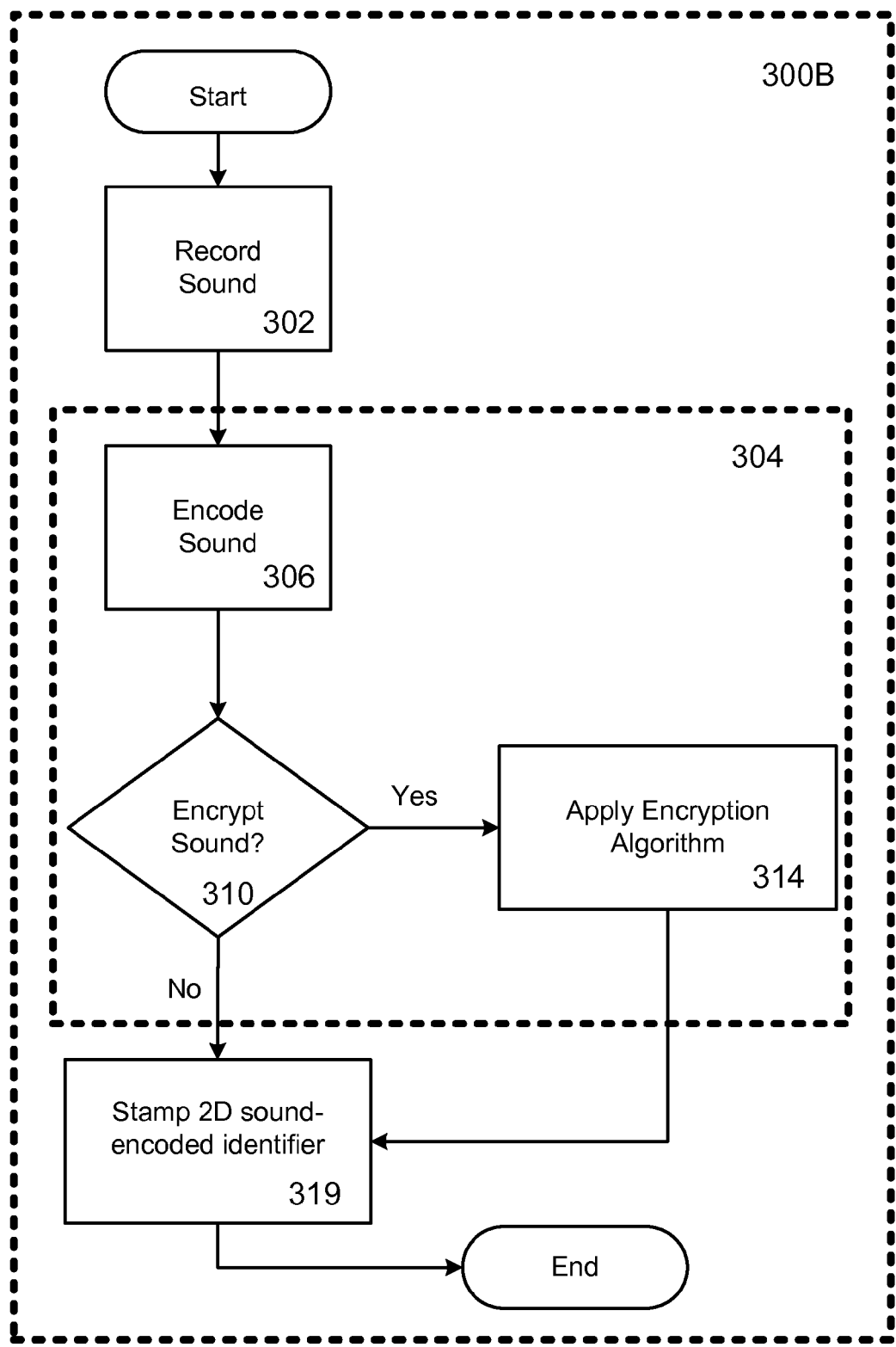
FIG. 26B is a flowchart that further illustrates the preparation of stamped identifiers by expanding the algorithm contained in block 304 of FIG. 26A.

FIG. 26B is a flowchart that further illustrates the preparation of stamped identifiers by expanding the algorithm contained in block 304 of FIG. 26A. At block 304, sound is encoded at block 306, and a decision to encrypt sound is made at block 310. One of the non-encrypted sound and the encrypted sound is stamped or embossed into an identifier at block 318.

Figure 27:
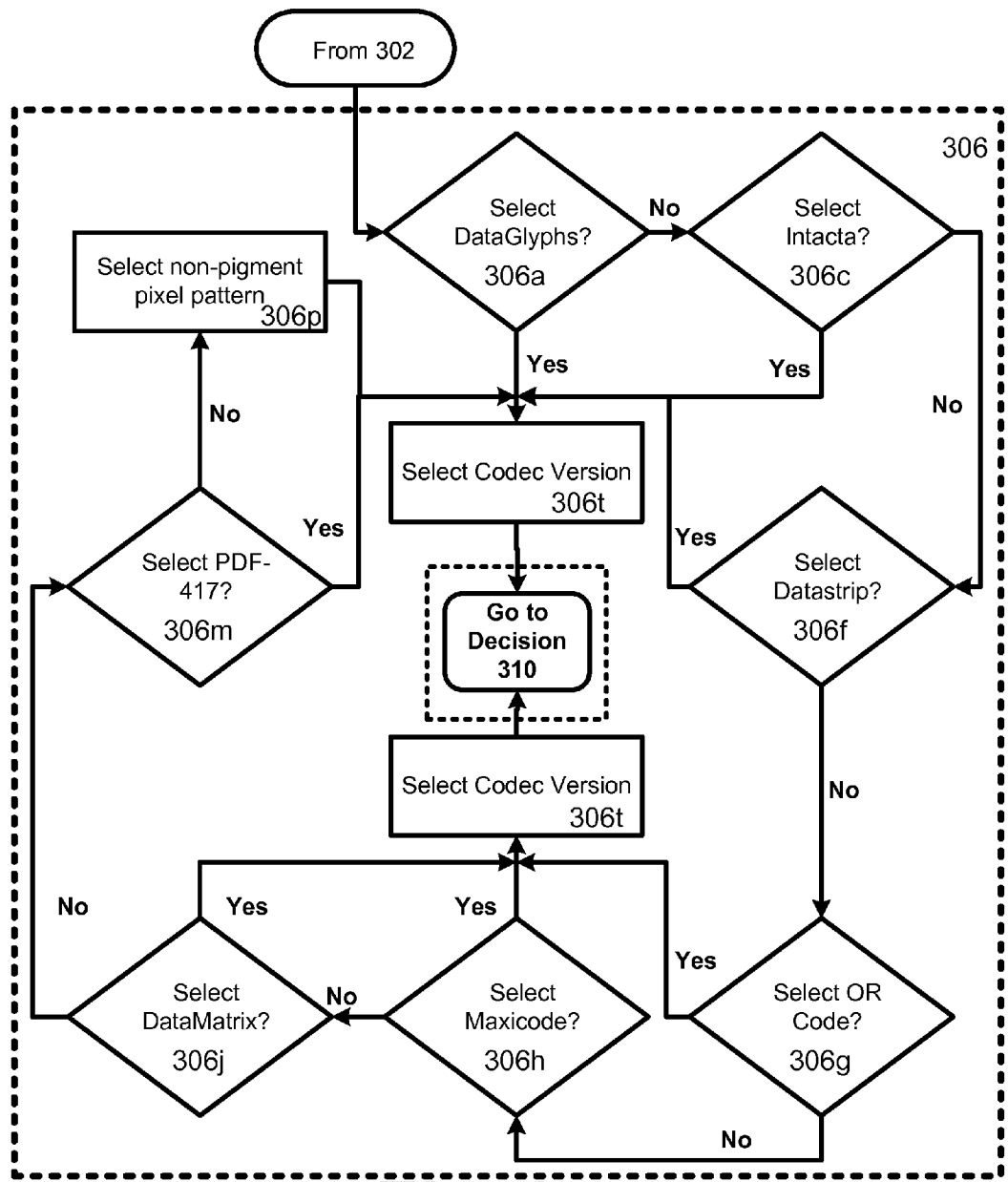
FIG. 27 is an expansion of the processes within block 306 of FIGS. 26A and 26B.

FIG. 27 is an expansion of the processes within block 306 of FIGS. 26A and 26B. Algorithm 306 includes deciding which pixel configuration format is selected for a pigmented identifier or which non-ink pattern is selected. The algorithms of block 306 include a series of decision diamonds to select a compression/decompression (CODEC) algorithm and which CODEC version number is to be selected. Beginning with block 306*a* a question is presented, and DataGlyphs, for example, is selected. If the answer is negative, then decision diamond 306*c* allows the selection of Intacta. If the decision is negative, then decision diamond 306*f* allows the selection of DataStrip. If the answer is negative, the decision diamond 306 allows the selection of OR code. Decision diamond 306*h* allows the selection of Maxicode. If the response is negative, decision diamond 306*j* is reached, that permits the selection of DataMatrix. A decision diamond 306*m* permits the selection of PDF-417. If all of the foregoing decisions are negative for printed identifiers, then the decision to select a non-pigmented pattern or a stamped or embossed pattern 306*j* decision diamond is reached. If any of these decision diamonds have an affirmative answer, then the CODEC version number is selected at block 306*t*.

Figure 28:
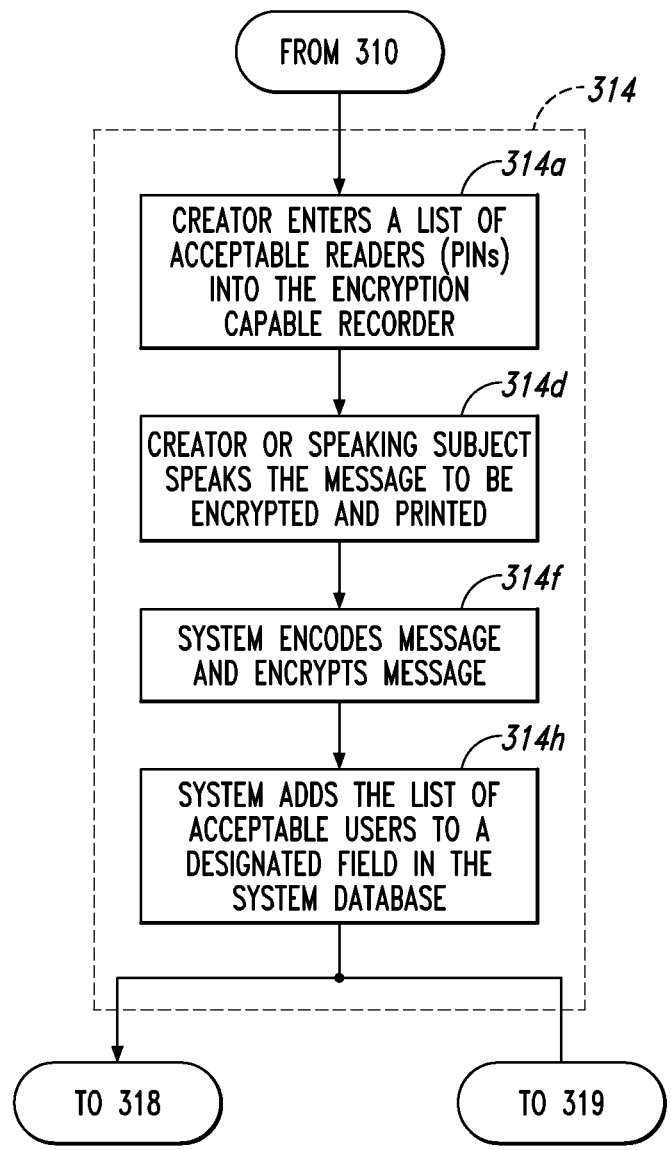
FIG. 28 is an expansion of the algorithms contained within block 314 of FIGS. 26A and 26B.

FIG. 28 is an expansion of the algorithms contained within block 314 of FIGS. 26A and 26B. Once the decision is made in the affirmative at decision diamond 310 to encrypt sound, the algorithms at block 314 for applying a friction algorithm begins at block 314*a* wherein a creator enters a list of acceptable readers and personal identification numbers (PINs) into the encryption capable reader. The encryption capable reader includes the devices previously described. For readers not having a keypad having an entry and a clear function, suitable keystrokes may be entered using a device coupled to the reader, such as a computer 146. Accordingly, the desired commands may be entered. At block 314*d*, the creator speaks the message to be encrypted and printed. Creator means the speaking subject 147 as previously illustrated. At a block 314*f*, systems as previously illustrated a message is encoded and encrypted. The encryption block 314 completes the encryption, and at block 314*h*, a list of subsequent users is written to a field in the database. The database may be located within a computer in communication with the reader or alternately, the database may be accessible through a communications system, such as the Internet. In the database, a special field is listed for the types of encryption code utilized. At block 314*h*, the method returns to one of printing an identifier at block 318 and stamping a non-pigmented identifier, as shown at block 319. In one embodiment, the stamping may be accomplished by having the surface topology of the receiving media correspondingly modified to have square or circular projections, irregularly shaped or regularly shaped, or pitted equivalents into any receiving media.

Figure 29:
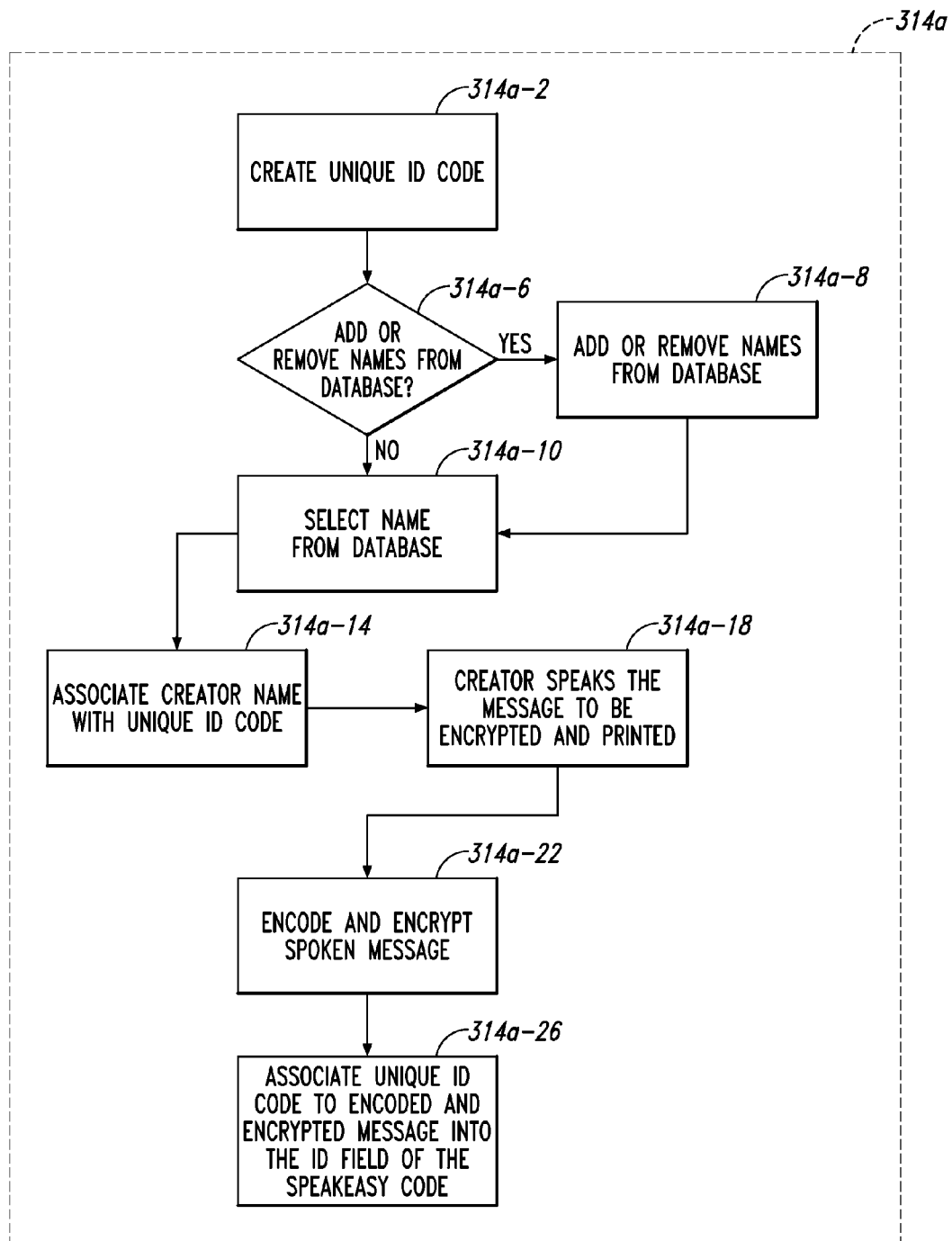
FIG. 29 is an expansion of the create list block 314a of FIG. 28.

FIG. 29 is an expansion of the create list block 314*a* of FIG. 28. The algorithm at block 314*a* begins with block 314*a*-2 where a unique ID code is created. Thereafter, a decision is presented to add or remove names of the database at decision diamond 314*a*-6. If there is no need to add or remove names from the database, then a name selected is selected from the database at process block 314a-310. If on the other hand, there is a reason to add or remove names from the database, then block 314a-8 permits names in the database to be either added or removed. Block 314a-8 proceeds to select one or more names from database process block 314a-10. Once a name is selected from the database at a process block 314a-14, the creator or subject name is associated with a unique ID code. Once the code is assigned to a particular speaker or creator at a process block 314a-18, the creator or subject speaks the message to be encrypted and the spoken message is printed. After the subject speaks the message, it is encoded and encrypted at a process block 314a-22. The algorithm contained in block 314a is completed at process block 314a-26 wherein the unique ID code is associated to the encoded encrypted message in the ID field of the encryption code.

Figure 30:
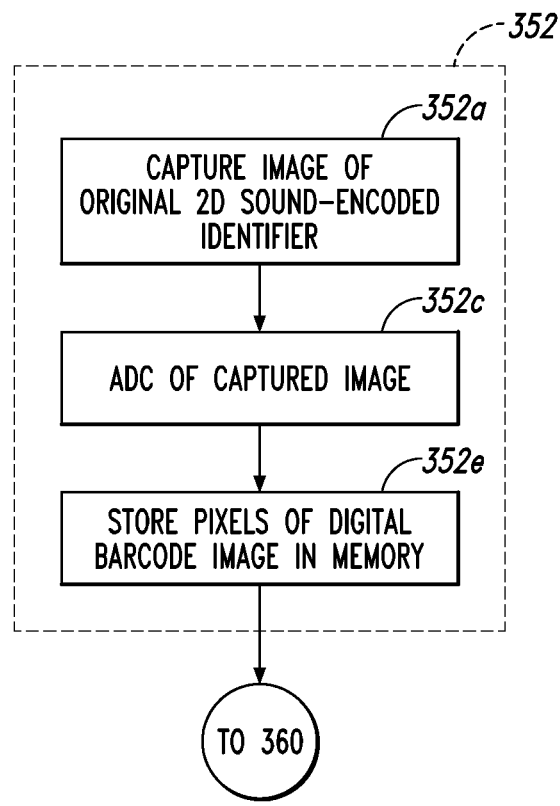
FIG. 30 is a further elaboration of the process shown in block 352 of FIG. 25.

FIG. 30 is a further elaboration of the process shown in block 352 of FIG. 25. Process block 352 begins with capturing an image of an original identifier at a process block 352a. The captured image is then analog-to-digital (A/D) converted at process block 352c and included in a digital file. At process block 352e, the pixels of the captured digital identifier image contained within the digital file is stored in memory. The process block 352 then proceeds to process block 360.

FIG. 31A through FIG. 33 describe image processing and distortion-correcting methods that may be used to decode and reproduce visual images of pigmented and non-pigmented identifiers. The pigmented and non-pigmented identifiers generally include pixel arrays that may be rectangular, orthogonal, circular, or oval configured patterns. The shape of individual pixels may be similarly configured to be rectangular, oval, angled lines, L-shaped, or other shapes. Suitable image filtering methods may include edge detection algorithms, contrast adjustment algorithms, and pixel block estimation algorithms as described in detail in: Kimberly Moravec, *A Grayscale Reader for Camera Images of Xerox DataGlyphs*, Paul L. Rosin, A. David Marshal (Eds.), 698-707, *Proceedings of the British Machine Vision Conference* 2002, BMVC 2002, Cardiff, UK, 2-5 (September 2002), which is incorporated herein by reference.

Figure 31A:
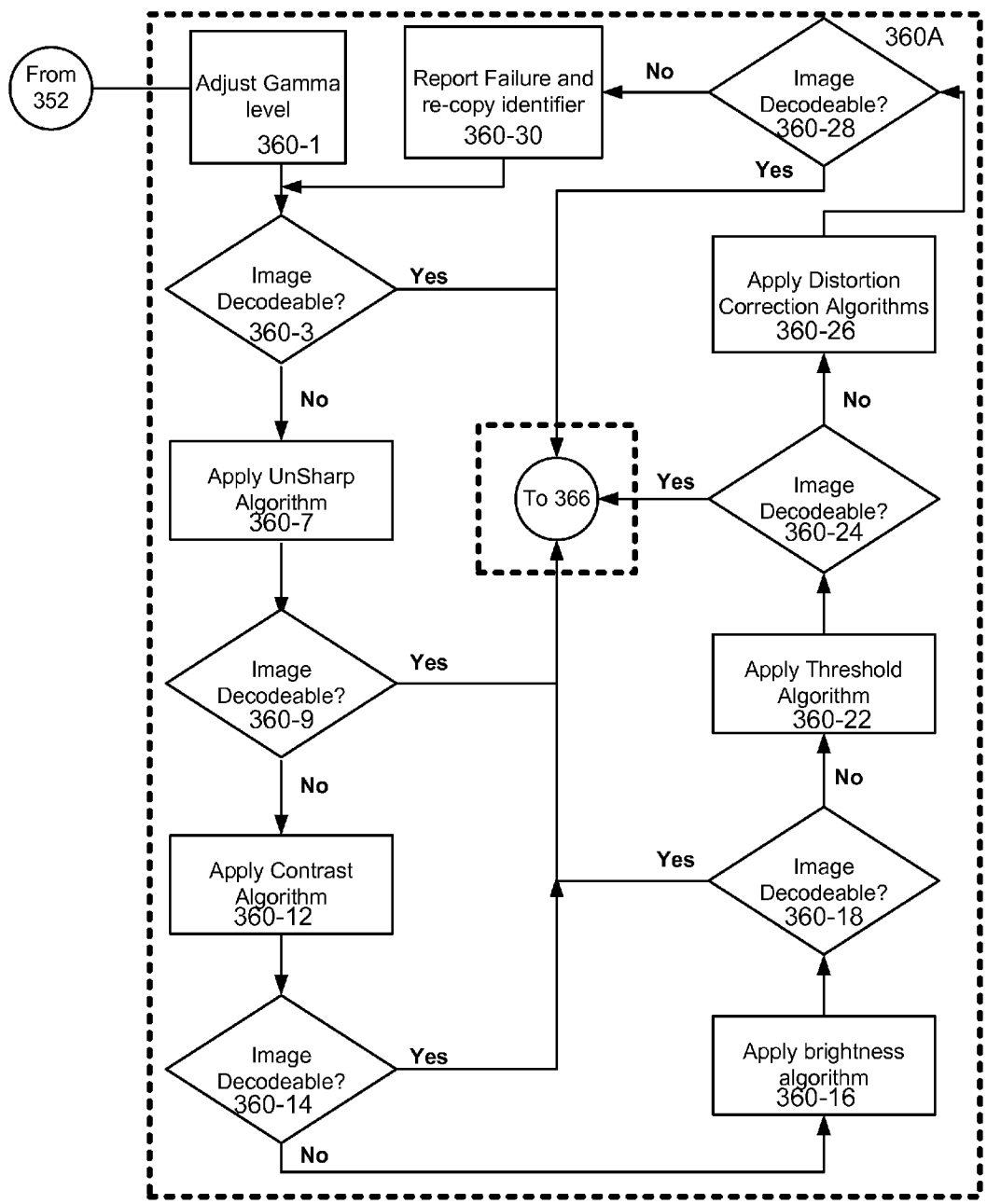
FIG. 31A describes image processing and distortion-correcting methods that may be used to decode and reproduce visual images of pigmented and non-pigmented identifiers.

FIG. 31A is an expansion of the algorithm contained within the block 360A of FIG. 25. The processes performed in block 360A may be performed in a sequential mode that offers the advantage of performing only those processes that are needed to optimize the image processing and to compensate for any identifier image distortion. A single correcting process may be used, or a series of processes may be used depending on whether the image is decodable after applying a single or multiple process series. The following processes may be engaged independently and in separate or different sequences as described. By way of example, at block 360-1, a gamma level adjustment is performed. A query is made if the image is decodable at decision diamond 360-3. If the image is not decodable, then an unsharp algorithm is applied at block 360-7. At decision diamond 360-9, if the image is not decodable, then a contrast algorithm is applied at process block 360-12. At decision diamond 360-14, a determination is made to determine if the image is decodable. If it is not decodable, then brightness adjust algorithm may be applied at block 360-16. At decision diamond 360-18, if the image is not decodable, then the threshold of the pixels is modified at process block 360-22. At decision diamond 360-24, a test for image decodability is performed if the image is still not decodable. If not decodable, distortion correcting algorithms are applied at a process block 360-26. After applying the distortion correction algorithms, the image is checked for decodability at decision diamond 360-28. If it is still not decodable, then a failure to image process is reported at process block 360-30 and the original identifier is copied and the processing loop cycles again at decision diamond 360-3.

Figure 31B:
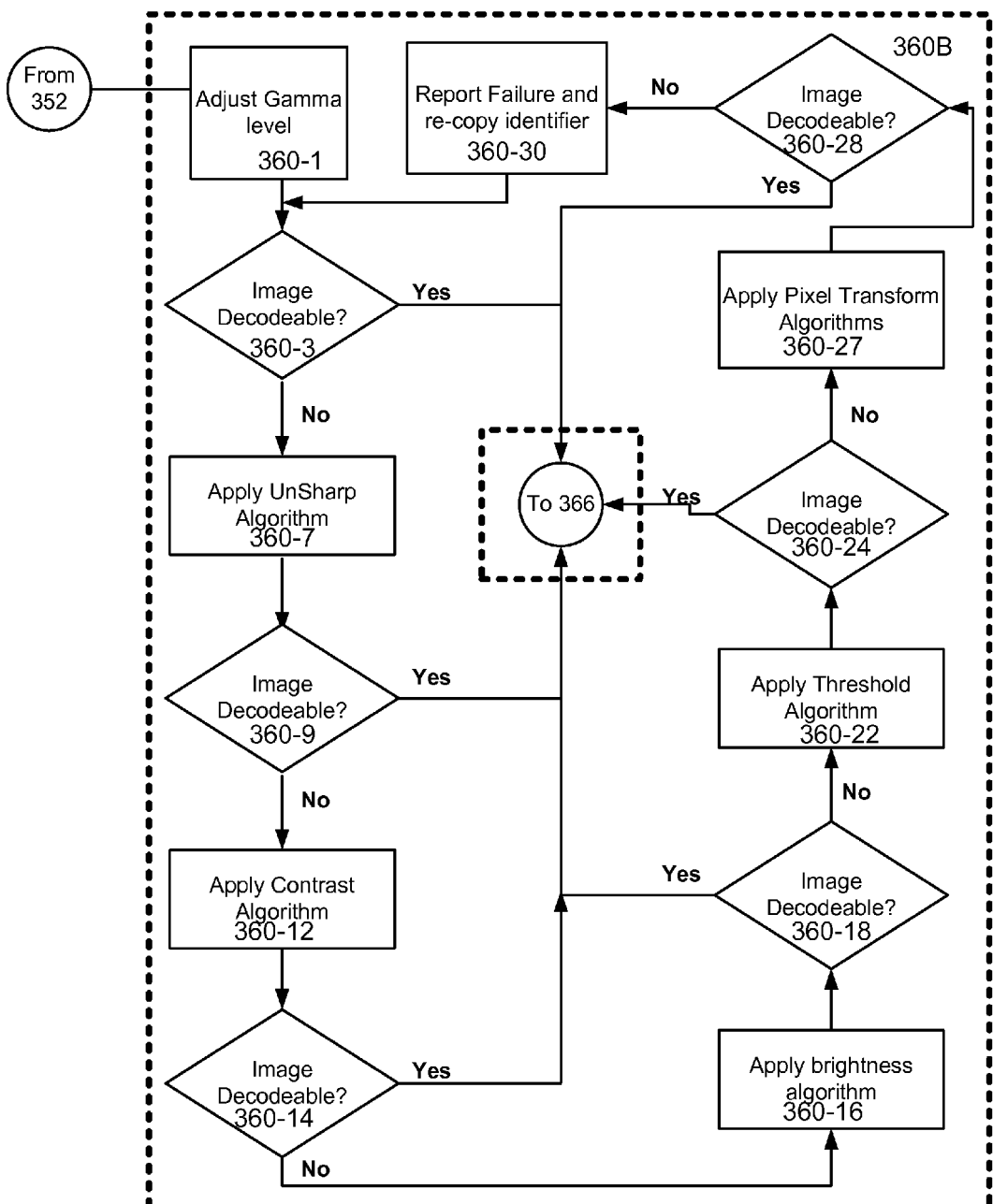
FIG. 31B is an expansion of the algorithm contained within block 360B of FIG. 25.

FIG. 31B is an expansion of the algorithm contained within block 360B of FIG. 25. Block 360B concerns image processing and reproducing a different pixel shape from that as presented by the original barcode. Block 360B has the same process blocks and decision diamonds as for block 360A, except block 360B lacks the applied distortion correcting algorithms process block 360-26. Instead, block 360B has an applied pixel transform algorithm at block 360-27. The applied pixel transform algorithm block 360-27 describes how the originally shaped pixels from the original identifier are transformed into a different shape in the reproduced image of the identifier. The processes performed in block 360B, like 360A, may be performed in a sequential mode so that a single correcting process may be used, or a series of processes may be used to correct an identifier image depending on whether or not an image is decodable after applying a single or process series.

Figure 32:
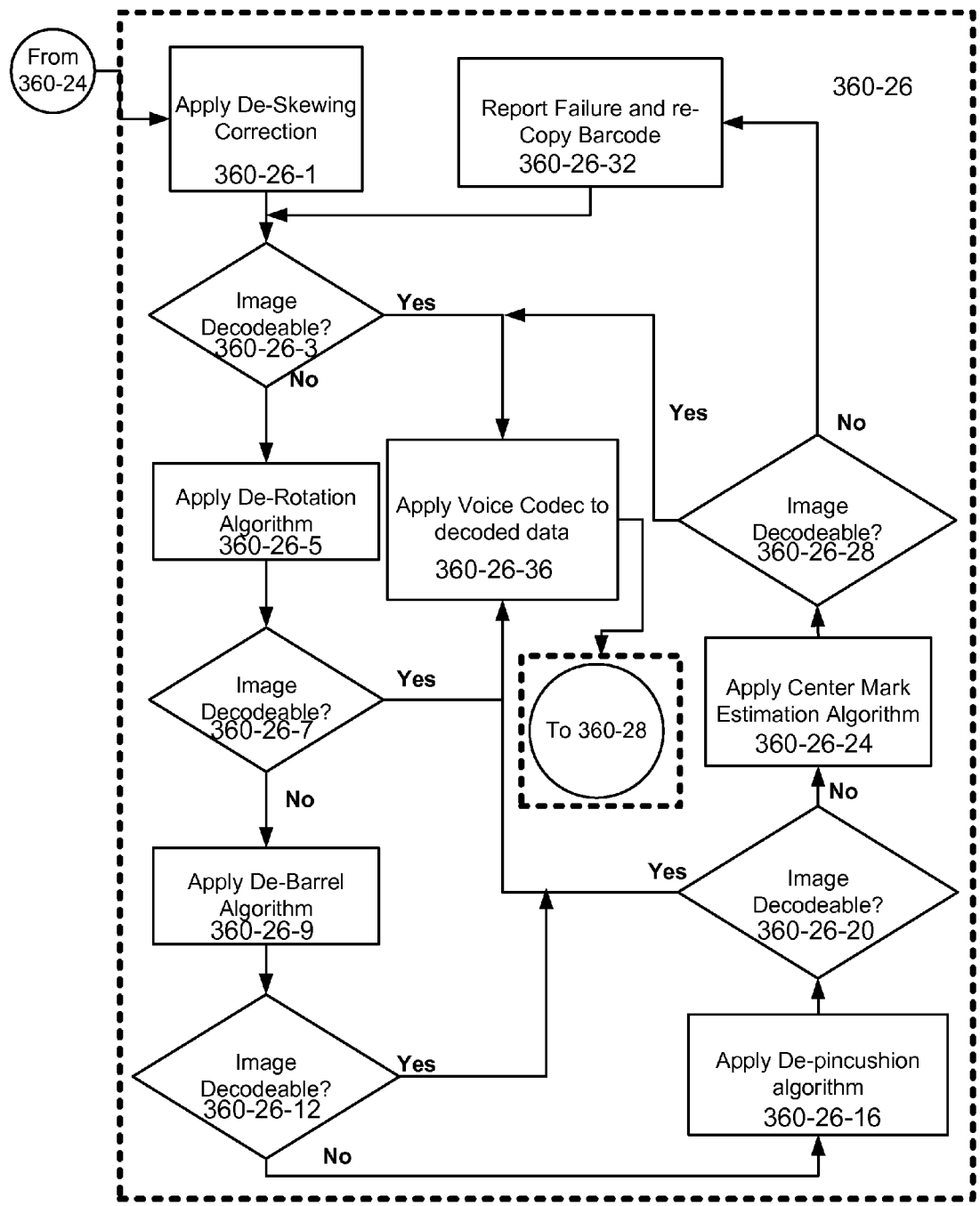
FIG. 32 is an expansion of the block 360-26 from FIG. 31A.

FIG. 32 is an expansion of the block 360-26 from FIG. 31A. The distortion-correcting algorithms of process block 36-26 is primarily, though not exclusively limited to, correcting rectangular or stacked linear array pixel patterns. Angled lines, such as used in the slashed-based DataGlyph pixel patterns, unless severely distorted, may not require the skewing and perspective-correcting algorithms. Process block 360-26 begins with applying a de-skewing correction process at block 360-26-1. A test for image decodability is attempted at decision diamond 360-26-3. If it is not decodable, then a de-rotation algorithm is applied at process block 360-26-5. A query or test for image decodability at decision diamond 360-26-7 is attempted and if it is not decodable, then a de-barrel algorithm is applied at process block 360-26-9. Upon testing for image decodability at decision diamond 360-26-12, should the image still not be decodable, then a de-pin-cushioning algorithm is applied at a process block 360-26-16. If the image is still not decodable at decision diamond 360-26-20, then an apply center mark estimate algorithm is attempted at a process block 360-26-24. Upon applying the center mark estimation algorithm, the query is asked if the image is decodable and if the image is not decodable, then a failure is reported and the barcode is recopied at process block 360-26-32. The distortion algorithm is reapplied on the recopied barcode beginning at decision diamond 360-26-3.

Figure 33A:
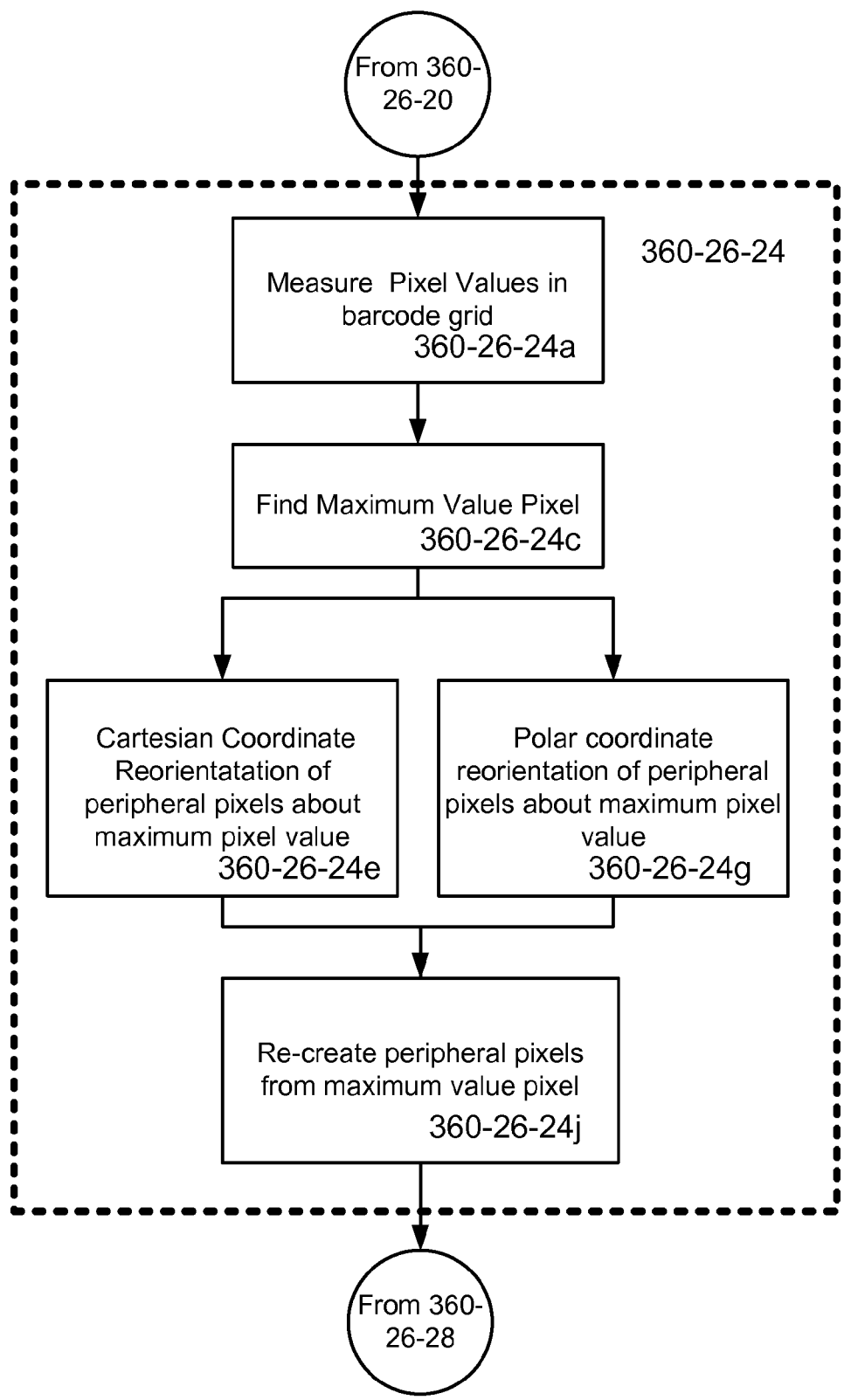
FIG. 33A is an expansion of the algorithm contained within block 360-26-24 from FIG. 32.

FIG. 33A is an expansion of the algorithm contained within block 360-26-24 from FIG. 32. The apply center mark estimation algorithm includes measuring pixel values in the barcode grid at process block 360-26-24a. Thereafter, a determination to find the maximum value pixel is made at a process block 360-26-24c. Upon finding the maximum value pixel, there are two options to pursue depending upon the type of reference coordination used in the pixel array. If the reference coordination is based upon Cartesian coordinates, then at process block 360-26-24e, the peripheral pixels are reoriented about the maximum pixel value in a Cartesian coordinate or XY fashion. If, on the other hand, the pixels are distributed about a circular array, then the peripheral pixels are reorientated in polar coordinates about the maximum value pixel at process block 360-26-24g. Thereafter depending upon which coordination system that was used in making the pixel arrays of the identifiers at process block 360-26-24j, the peripheral pixels are recreated either in a pigment-based printing process or in a stamping based process for non-pigmented pixels within the identifiers.

Figure 33B:
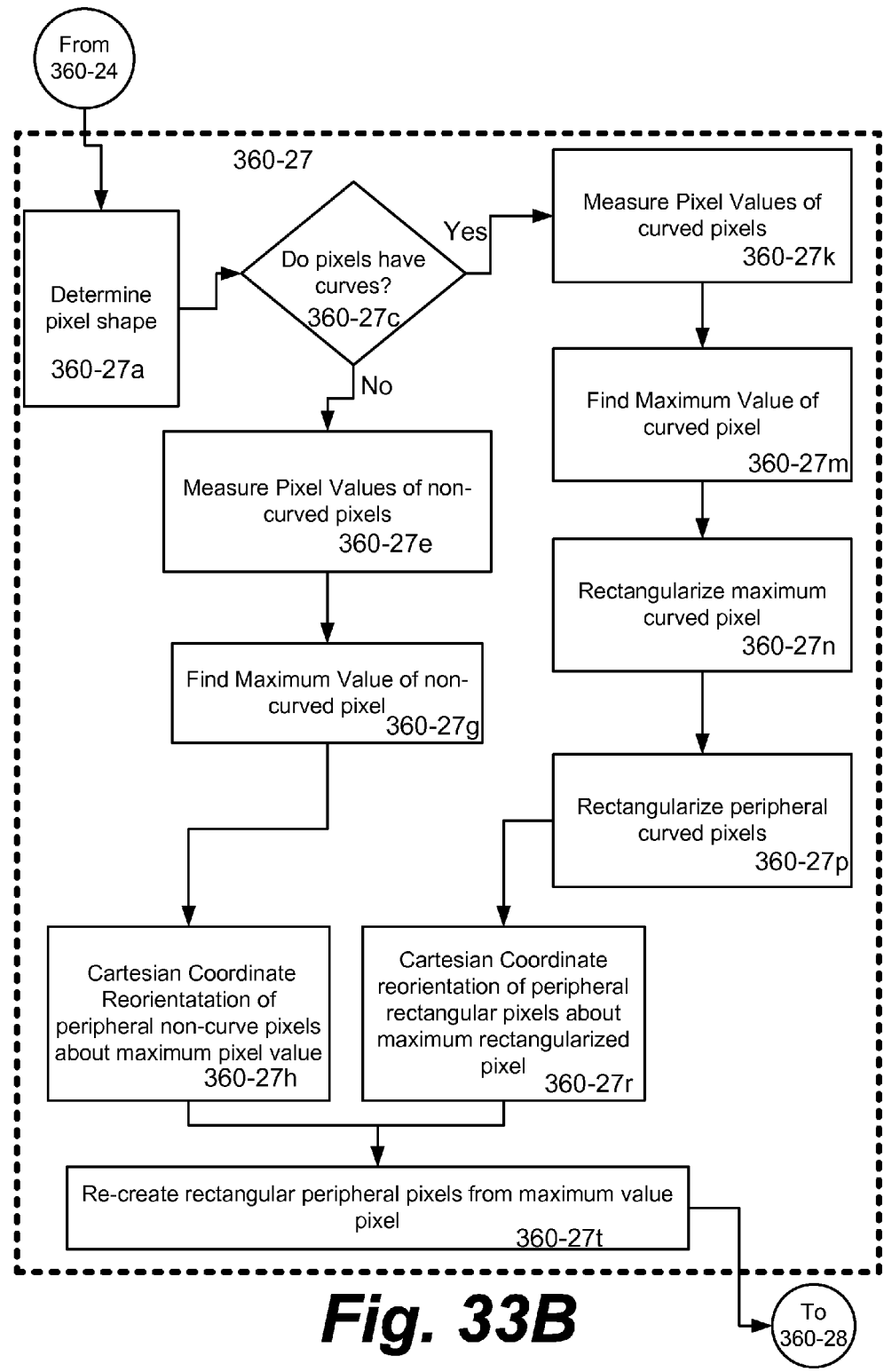
FIG. 33B is an expansion of the algorithm contained within block 360-27 from FIG. 31B.

FIG. 33B is an expansion of the algorithm contained within block 360-27 from FIG. 31B. Block 360-27 concerns changing the shape of a pixel from its original shape in the original identifier to a different shape in a reproduced identifier. Block 360-27 begins with block 360-27a to determine the pixel shape. Thereafter, at decision diamond 360-27c, a query is presented, "Do pixels have curves?" If the answer to this question is no, then process block 360-27e is reached wherein pixel values of non-curved pixels are measured. By pixel values, it is meant the intensity level of the pixel. At process block 360-27g, a maximum value of non-curve pixel process block is reached. Once the maximum value of the non-curve pixel is determined, then at process block 360-27h, a reorientation of peripheral non-curve pixels about the maximum non-curve pixel along Cartesian coordinance is performed at process block 360-27h. Once re-orientation along Cartesian coordinates has occurred, then at process block 360-27t, the rectangular peripheral pixels are recreated from the maximum value pixel. Process block 360-27 is exited to decision diamond 360-28 of the prior illustrated method figures. Returning to decision diamond 360-27c, for the query, "Do pixels have curves?" If the answer is "yes" to this query, then process block 360-27k is reached wherein the pixel value intensity of curved pixels is measured. At process block 360-27m, the maximum value of the curved pixel is determined. At process block 360-27n, the maximum curved pixel is rectangularized or "squared up". The rectangularization of the maximum curved pixel is achieved via a mathematical algorithm that has the effect of taking 90° tangents to the external curved regions and filling in the intersecting 90° tangents with an intensity value equivalent to the maximum curved pixel. After rectangularization of the maximum curved pixel, at process block 360-27p, the rectangularization of peripheral curved pixels is achieved. Similar to the enclosing or circumscribing of 90° tangent lines process of 360-27n, a similar fill-like process for the peripheral curved pixels is undertaken, wherein rectangularized and filled in peripheral pixels are formed in process block 360-27p. Once the maximum curve and peripheral curve pixels are rectangularized and filled in, the peripheral rectangularized pixels are then reoriented about the maximum rectangularized pixel along Cartesian coordinates in process block 360-27r. The rectangular peripheral pixels are recreated from the maximum value pixel at process block 360-27t. Then process block 360-27 is exited to decision diamond 360-28.

Figure 34:
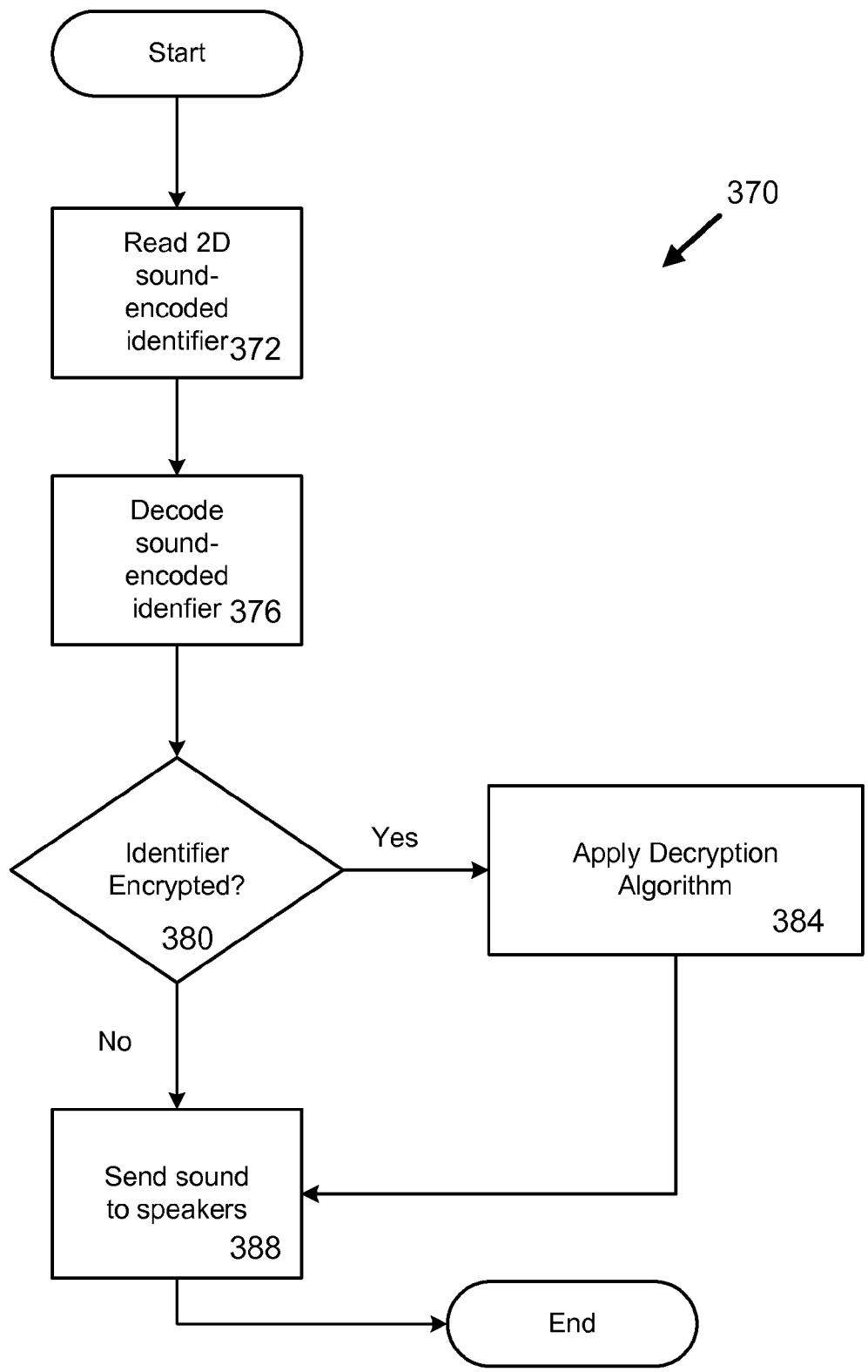
FIG. 34 is a flowchart that describes a read-and-decode method for the decryption of identifiers, according to another embodiment of the invention.

FIG. 34 is a flowchart that describes a read-and-decode method 370 for the decryption of identifiers, according to another embodiment of the invention. At block 372, the identifier is read using one of the disclosed embodiments, as discussed in detail above. At block 376, the identifier is decoded. At block 380, it is determined whether the identifier is encrypted. If the identifier is not encrypted, then the audio content is transferred to a speaker, as shown at block 388. On the other hand, if the identifier is encrypted, then a decryption algorithm is selected and applied to the audio content at a process block 384.

Figure 35:
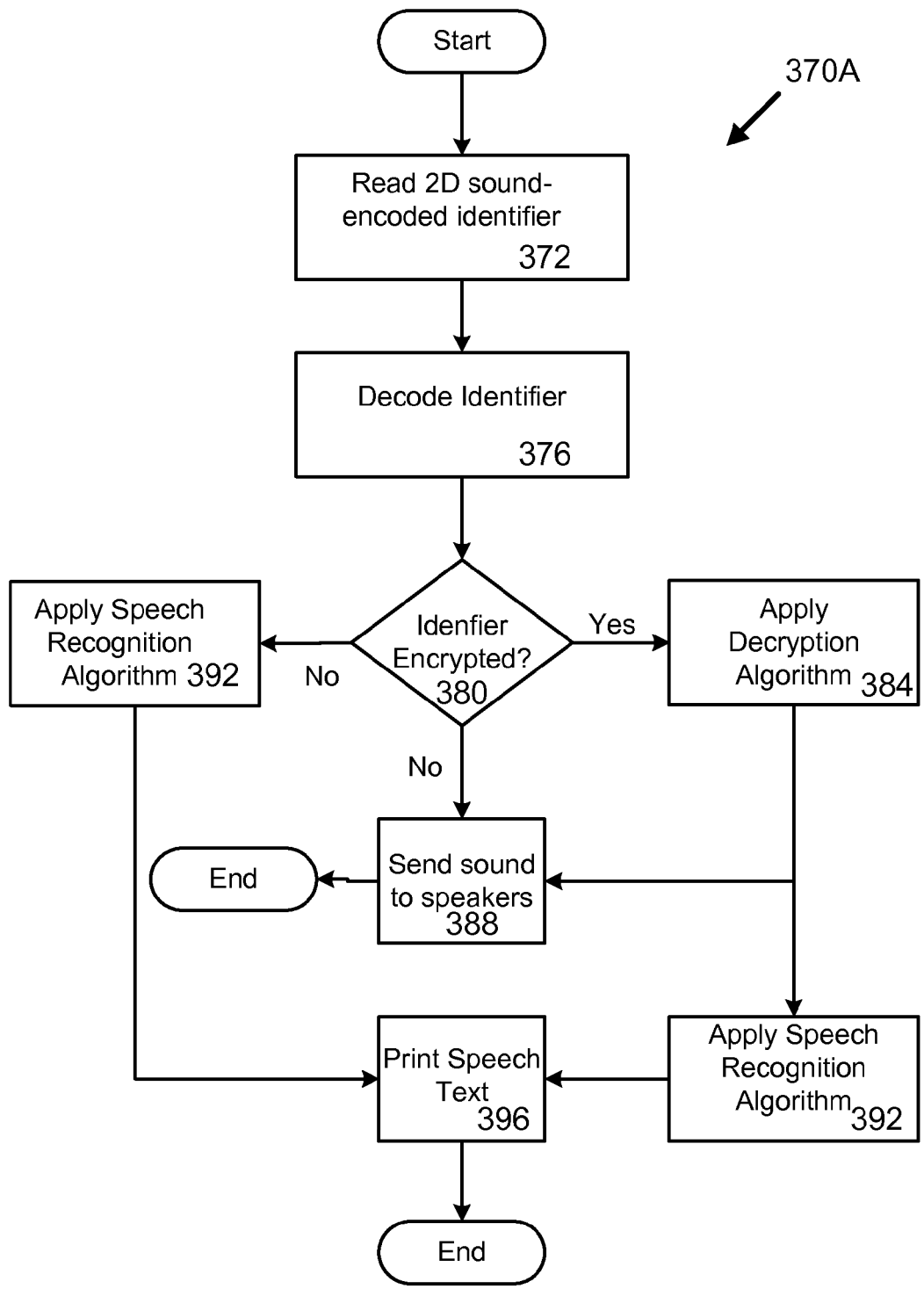
FIG. 35 is a flowchart that describes a speech read-and-decode method for the decryption of identifiers, according to another embodiment of the invention is a method embodiment of a speech read-and-decode algorithm.

FIG. 35 is a flowchart that describes a speech read-and-decode method 370A for the decryption of identifiers, according to another embodiment of the invention. At block 372, the identifier is read. At block 376, the identifier is decoded by a reader, as described in detail above. At block 380, it is determined whether the identifier is encrypted. If the identifier is encrypted the method 370A branches to block 384, and a suitable decryption algorithm is applied. A speech recognition algorithm may then be applied, as shown at block 392. If the identifier is not encrypted, the method 370A branches to a block 392, and a speech recognition algorithm is applied, and a printed text of the audio content is generated at block 396. Alternately, a voice recognition algorithm operable to associate an identity with a voice may also be applied at block 392. The method 270A may also branch to block 388 if the identifier is not decrypted so that the audio content extracted from the identifier may be a speaker, as shown at block 388.

Figure 36:
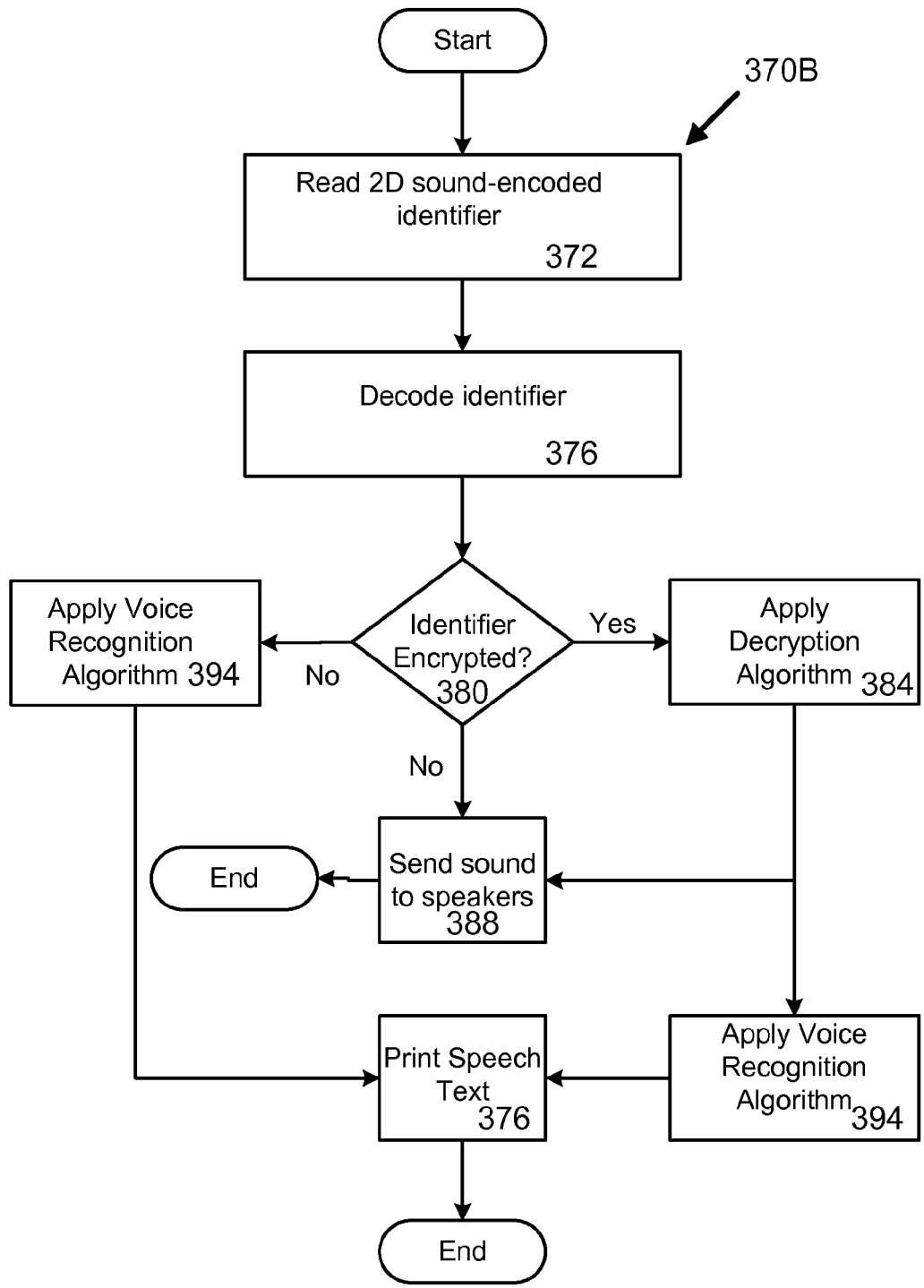
FIG. 36 is a flowchart that illustrates a method of voice read-and-decode algorithm decoding, decrypting, and identifying a voice encoded within an identifier, according to an embodiment of the invention.

FIG. 36 is a flowchart that illustrates a method 370B of voice read-and-decode algorithm decoding, decrypting, and identifying a voice encoded within an identifier, according to an embodiment of the invention. The decoding process 370b resembles the decoding process 370a, and includes a voice recognition algorithm at block 394.

Figure 37:
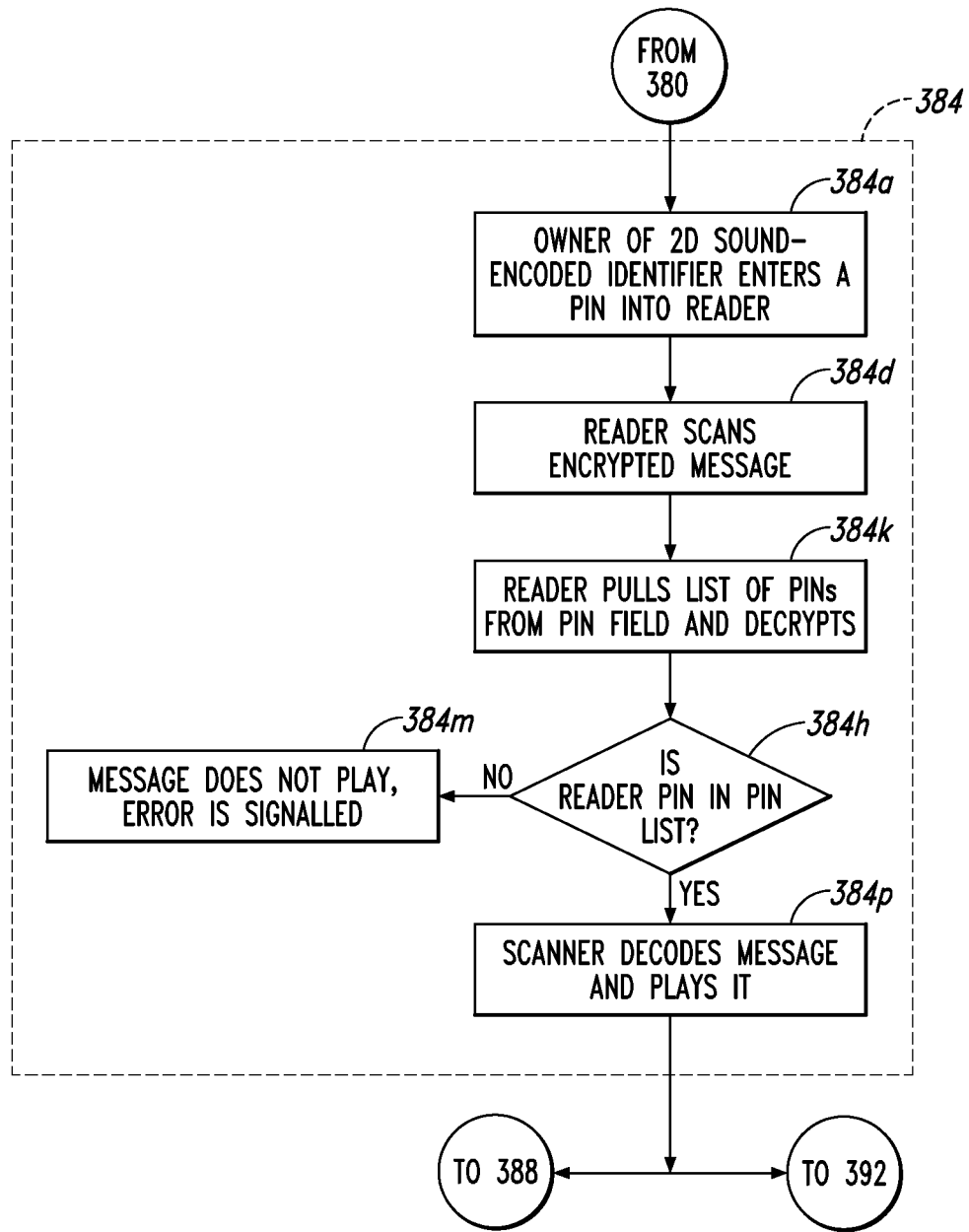
FIG. 37 is a flowchart that will be used to further describe the block 384 of FIGS. 34 35, and 36.

FIG. 37 is a flowchart that will be used to further describe the block 384 of FIGS. 34 35, and 36. Block 384 block 384a allows an owner of an identifier to enter a personal identification number (PIN) or a public/private key combination into a reader. At block 384d, the reader scans the encrypted message. At block 384k, the reader retrieves a list of PIN numbers from a PIN field stored in a database and decrypts them. At block 384h a determination is made as to whether the reader PIN is in the retrieved PIN list. If the reader PIN is not in the PIN list, the audio content is not reproduced (on a speaker or a printer, for example) and an error is presented, as shown at block 384m. If, on the other hand, the reader PIN number is present in the PIN list, the reader decodes the message and reproduces the message, as shown at block 384p.

Figure 38:
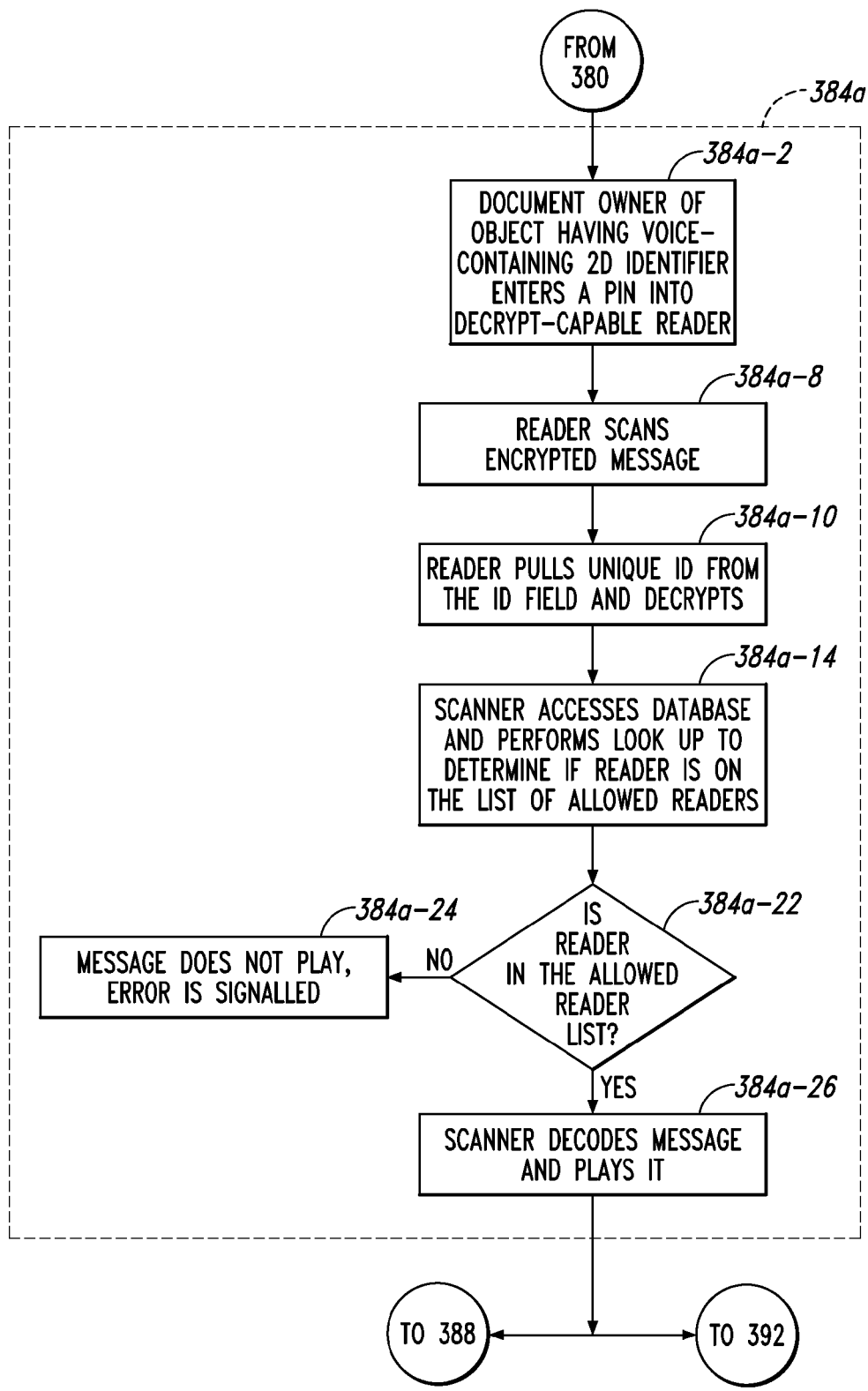
FIG. 38 is a flowchart that will be used to further describe the block 384a of FIG. 37.

FIG. 38 is a flowchart that will be used to further describe the block 384a of FIG. 37. At block 384a-2, a document owner or object owner having an identifier affixed to the document or object enters the personal identification number (PIN) or public/private key combination into the reader. The reader scans the encrypted message at a block 384a-8. At block 384a-10, the scanner retrieves an identification (ID) number from the ID field and decrypts. At block 384a-14, the reader accesses the database and performs a look-up routine to determine if the reader is on a list of allowed readers. At block 384a-22, it is determined if a reader is an allowed reader. If the reader is not allowed, then at the message is not reproduced, as shown at block 384a-24, and an error message is generated. Alternately, if it is determined that the reader is not allowed the reader decodes the message and reproduces it, as shown at block 384a-26.

Figure 39:
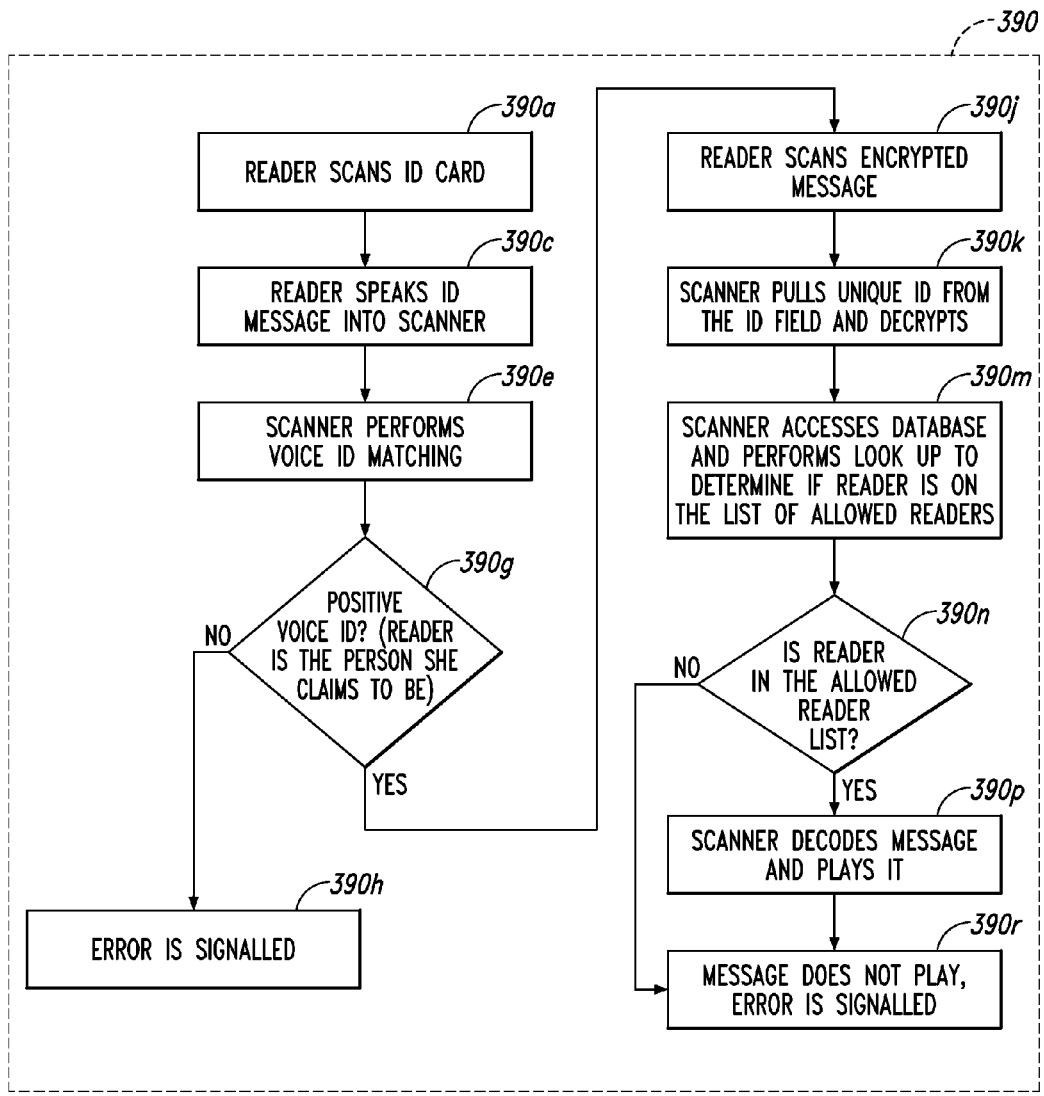
FIG. 39 is a flowchart that will be used to describe a voice identification method for the system shown in FIG. 14.

FIG. 39 is a flowchart that will be used to describe a voice identification method 390 for the system 250 shown in FIG. 14. At block 390a, a reader scans an identification (ID) card, such as the identification card 256 of FIG. 1. The identification card 256 has an identifier 252. The scanner 112D (FIG. 1) scans the identifier 252 to decode and decrypt the identifier 252. At block 390c the subject speaks an identifying message into the reader. At block 390e, the reader performs voice ID matching so that the signals 147k (FIG. 14) derived from the speaking subject 147 are conveyed to the computer 146 (also shown in FIG. 14). The voice encoded within the identifier 252 is relayed as a signal 252-a to the computer 146 and is displayed as a voice pattern signal 252-a on a display of the computer 146. At block 390g, a determination is made whether a positive voice identification is made. If the voice is not identified, an error message is generated at block 390h. If the voice is identified, however, the reader scans the encrypted message, as shown at block 390j. At block 390k, the reader retrieves the ID from the ID field and decrypts the ID. At block 390m, the reader accesses the database and searches a look-up table to determine whether the reader appears on the list of allowed readers. At block 390n, a determination is made as to whether the reader appears in the allowed reader list. If the reader is not on the list the message is not reproduced and an error is generated, as shown at block

390*r*. Alternately, if the reader appears on the list, then the reader decodes the message and reproduces the message, as shown at block 390*p*.

Figure 40A:
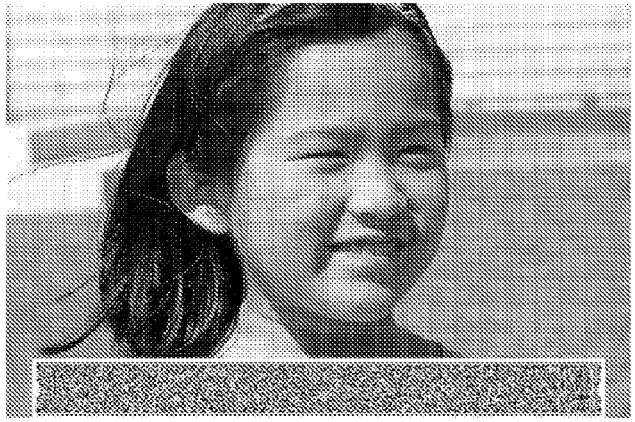
FIG. 40A through FIG. 40C illustrate different arrangements of associating or affixing identifiers with a printed image, according to an embodiment of the invention.
Figure 40B:
Figure 40C:

FIG. 40A through FIG. 40C illustrate different arrangements of associating or affixing identifiers with a printed image, according to an embodiment of the invention. In FIG. 40A, a single identifier is affixed to an image near the bottom of the image. In FIG. 40B, more than one identifier is affixed to the image. The identifiers applied to the image may be of different lengths, and may be positioned at different locations on the image. For example, the identifier positioned near the bottom edge of the image may include audio content obtained from a narrator describing the significance of the image. Other identifiers may include a commentary obtained from the person that appears in the image, or other suitable subject-related audio content. In FIG. 40C, more than one identifier may be affixed at a bottom edge of the image. The identifiers include audio content that permits a more detailed explanation of the image content by a narrator or the subject.

Figure 41:
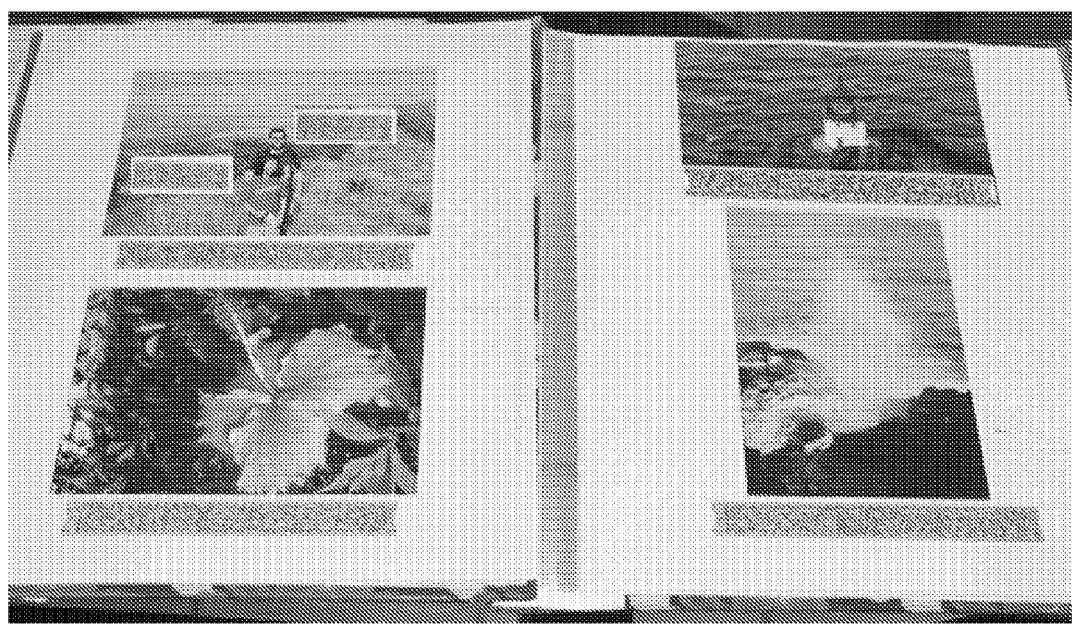
FIG. 41 is a pictorial view of a scrapbook that will be used to describe an application of the disclosed embodiments of the present invention.

FIG. 41 is a pictorial view of a scrapbook that will be used to describe an application of the disclosed embodiments of the present invention. The scrapbook includes a plurality of articles, such as photographs, clippings, or other similar materials having identifiers affixed near the bottom of the images or at other selected locations.

Figure 42:
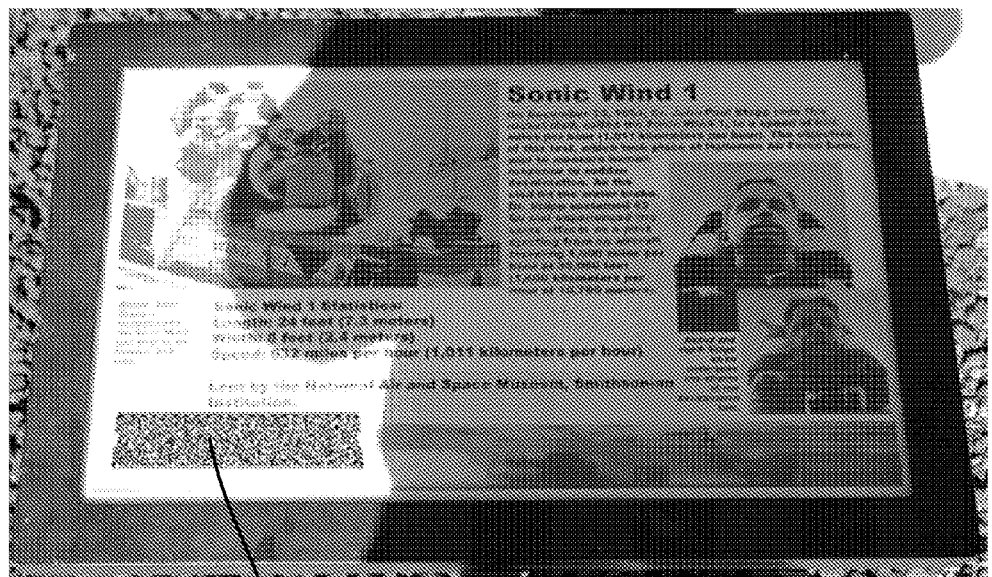
FIG. 42 is a pictorial view of a museum presentation panel that will be used to describe another application of the disclosed embodiments of the present invention.

FIG. 42 is a pictorial view of a museum presentation panel that will be used to describe another application of the disclosed embodiments of the present invention. The museum presentation panel includes one or more identifiers that are affixed to the panel that include audio content that may be suitably decoded to provide a further description of the subject matter on the panel.

Figure 43:
FIG. 43 is a pictorial view of a public display sign that will be used to describe still another application of the disclosed embodiments of the present invention.

FIG. 43 is a pictorial view of a public display sign that will be used to describe still another application of the disclosed embodiments of the present invention. The public display sign includes one or more identifiers having audio content that may be decoded to provide further information. For example, an identifier positioned on the "no smoking" sign may include audio content that may be used to direct a person that decodes the audio content to an area where smoking is permitted.

FIG. 44A through FIG. 44D are pictorial views that will be used to describe still another application of the disclosed embodiments of the invention. In the present application, multiple identifiers are applied to a manufactured article, such as, for example, a box of candy. In FIG. 44A, an identifier, such as a sem@code is generated by a reader, as described in greater detail above. In FIG. 44C, the reader reads the sem@code and the sem@code is applied to a selected candy article. In FIG. 44D the candy article having the sem@code is positioned adjacent to another piece of candy labeled with a different identifier from FIG. 44B.

Figure 45:
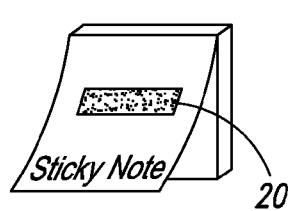
FIG. 45 are pictorial views that will be used to describe still further applications of the disclosed embodiments of the invention.
Figure 45:
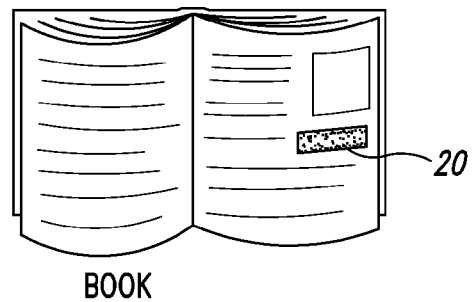
Figure 45:
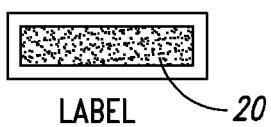
Figure 45:
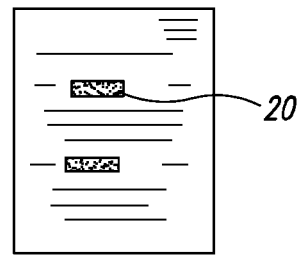
Figure 45:
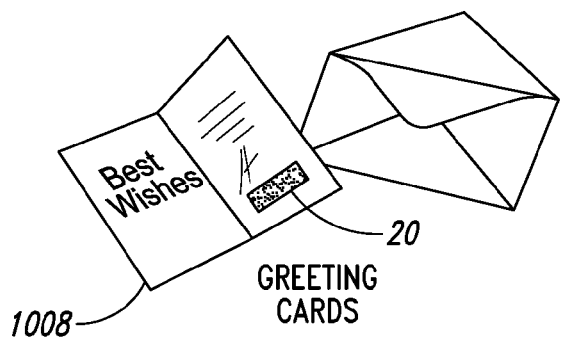
Figure 45:
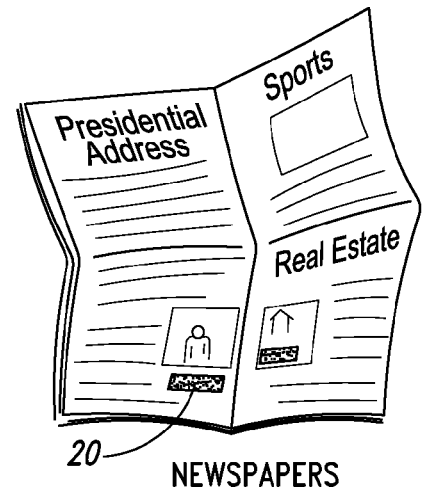
Figure 45:
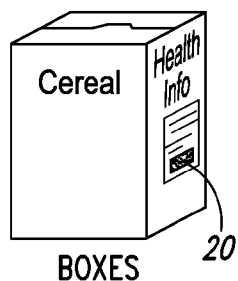

FIG. 45 are pictorial views that will be used to describe still further applications of the disclosed embodiments of the invention. In the present application, an identifier 20 is applied to a notepad book, a label, a resume, a greeting card, a newspaper, and on a container, such as a side of a box. A particular embodiment includes the identifier 20 having EXIF, pre-defined messages and time and/or date stamps. Under EXIF, generating replicates of original sound-containing identifiers are consistently duplicated to maintain the voice and sound fidelity of the original identifier. Other applications are possible, wherein one or more identifiers are applied to semi-rigid materials, or rigid materials, such a metal by stamping, embossing, or by other similar processes.

For greeting cards, for example, the identifier 20 may contain pre-recorded messages, such as "Merry Christmas" or "Happy New Year".

Figure 46:
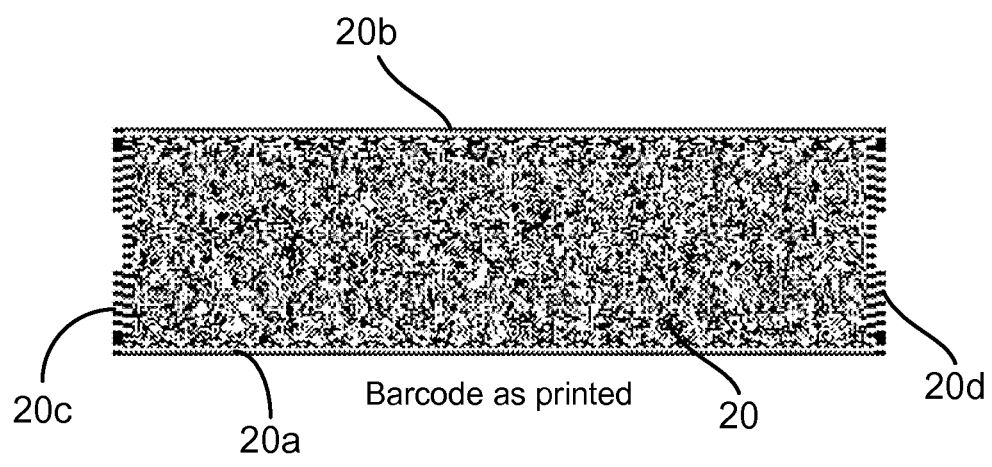
FIG. 46 is an illustration of a printed identifier according to an embodiment of the invention.

FIG. 46 is an illustration of a printed identifier 20 according to an embodiment of the invention. The identifier 20 includes an internal region 20*b* having a predetermined pattern of black and white boxes that form pixels. The arrangement of the pixels or equivalent digital data units generally depends on a selected coding algorithm used to encode speech and sound signals. The arrangement is further generally dependent on a desired degree of redundancy in the identifier. In a particular embodiment, up to 25% to 50% or more digital data units may be repeated. Such redundancy would prevent the loss information in a portion of the identifier that was damaged or loss. The pixels contained within the identifier 20 may also be subdivided into different regions that provide alphanumeric information and/or sound or a selected combination of alphanumeric information and sound. Various portions of the pixels within the identifier 20 may also provide a password protection using a PIN, public key cryptography, or password-challenge systems. Along a perimeter of the identifier 20, code patterns 20*a* and 20*b* may provide data information governing the framing and shape of the identifier 20. Patterns 20*c* and 20*d* may be left and right headers, respectively, and provide data information regarding image density of the pixels or other digital forms contained within the identifier 20. Digital data units may alternatively be stored in three dimensions. In one specific embodiment, a horizontal axis is less than approximately about six inches in length and a vertical axis is less than approximately about one-inch in length, although other suitable dimensions may also be used. In another embodiment, the digital data units may be configured to store up to a predetermined amount of speech or audio content. In a specific embodiment, the predetermined amount of speech or audio content is approximately about eight seconds. Data storage capacity may be increased by increasing an area of the identifier and/or by providing a higher pixel density. Digital data units may encode sound data, voice data, text data, image data, software, or any other data including encryption data. In one specific embodiment, the digital data units encode voice sounds. Therefore, in this embodiment, the digital data units are not merely reference data that points to pre-recorded voice sounds stored in a in memory device.

Figure 47A:
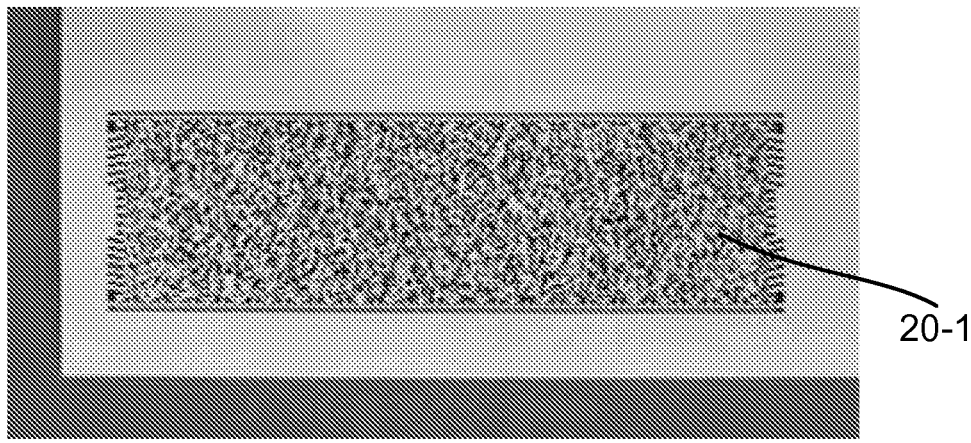
FIG. 47A and FIG. 47B are pictorial representations of identifiers 20-1 and 20-2, respectively, that will be used to describe a method of image enhancement that may be used to correct a degraded image of an identifier, according to still another embodiment of the invention.
Figure 47B:
Figure 47B:
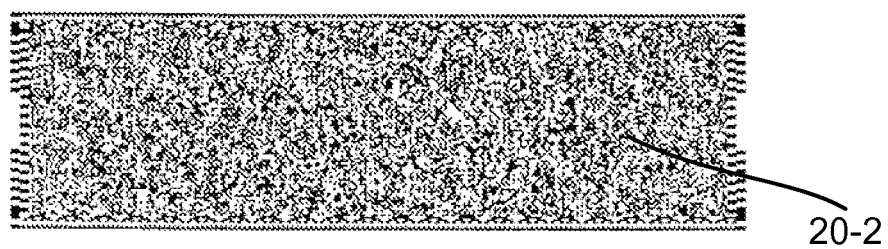

FIG. 47A and FIG. 47B are pictorial representations of identifiers 20-1 and 20-2, respectively, that will be used to describe a method of image enhancement that may be used to correct a degraded image of an identifier, according to still another embodiment of the invention. FIG. 47A shows an identifier 20-1 that is degraded by photographic reproduction, or by other similar processes. The identifier 20-1 accordingly exhibits an uneven background in which at least a portion of the pixels are not properly discernable due to blurring, or due to improper focus of a reproducing device. To restore the identifier 20-1 so that a suitable resolution and clarity is obtained, the image correction algorithms described in connection with FIG. 31 are applied to the identifier 20-1. For example, the gamma correction, unsharp filters, contrast filters and other filters that are described in detail above may be applied to the identifier 20-1 to obtain the identifier 20-2, as shown in FIG. 47B. It is understood that other image enhancements may be applied to the identifier 20-1 to obtain the identifier 20-2, including brightness corrections, contrast corrections, and sharpening and threshold corrections. The restored identifier 20-2 advantageously produces a high fidelity reproduction of the degraded identifier 20-1.

Figure 48:
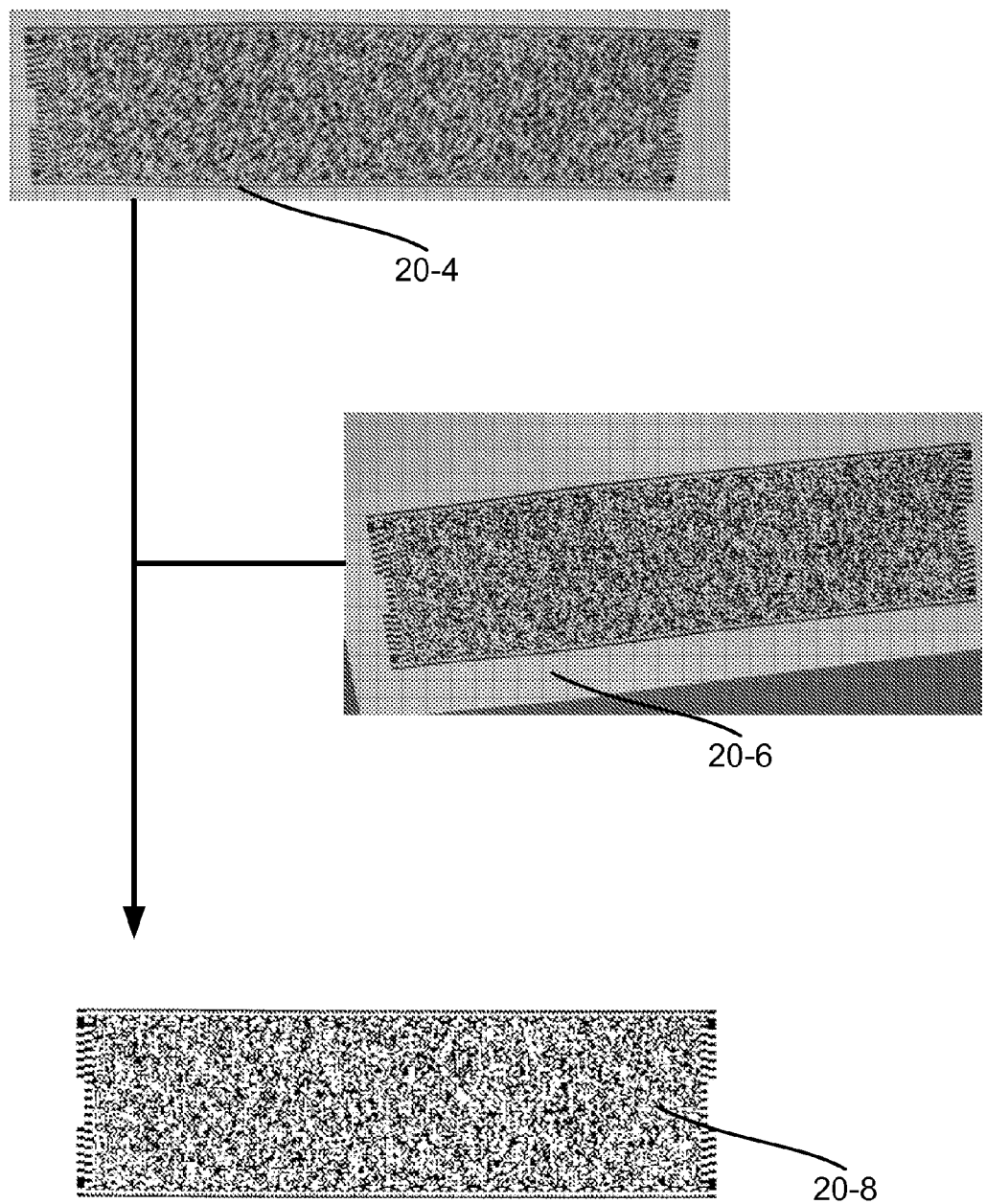
FIG. 48 includes pictorial representations of identifiers that will be used to further describe the enhancement of image-degraded identifiers.

FIG. 48 includes pictorial representations of identifiers 20-4, 20-6 and 20-8 that will be used to further describe the enhancement of image-degraded identifiers. An identifier 20-4 suffers from distortion caused by warping of a supporting surface or due to improper camera positioning. The identifier 20-6 is similarly distorted due to a skewing or a rotation. To restore the resolution and clarity of the original identifier 20 as shown, for example, in FIG. 46, image processing algorithms were applied to correct the identifiers 20-4 and 20-6. Specifically, the distortion correction algorithms from process block 360-26 of FIG. 31 have been applied. An image-enhanced identifier 20-8 results from applying the distortion correction algorithms outlined in FIG. 32. In particular, the identifier 20-8 benefits from of the de-skewing correction algorithm 360-26-1, the de-rotation algorithm 360-26-5, the de-barreling algorithm 360-26-9, the de-pincushioning algorithm 360-26-16, along with contrast enhancement algorithms 360-12 and threshold adjustment algorithm 360-22 of FIG. 32.

Figure 49:
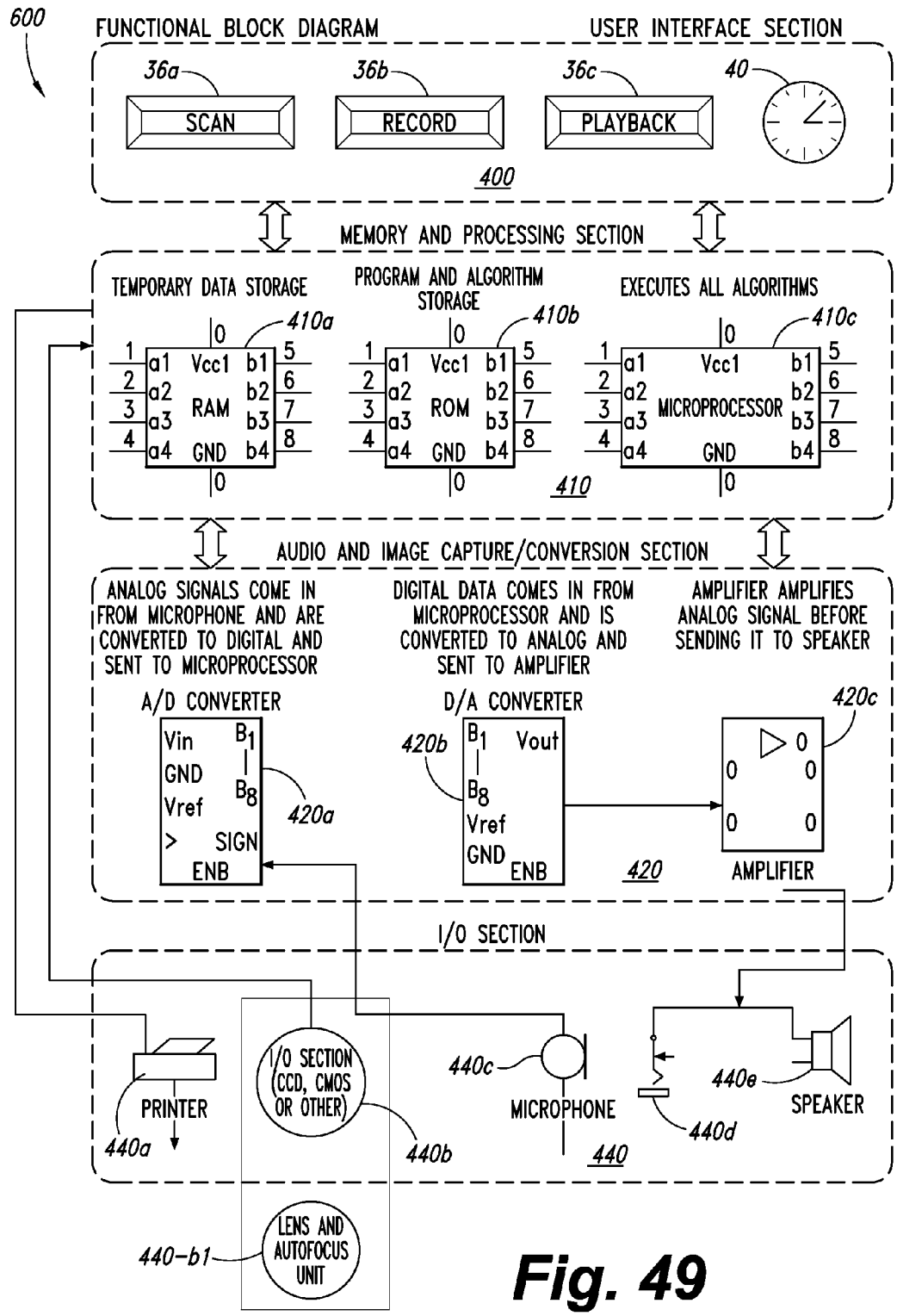
FIG. 49 is a functional block diagram of a handheld reader according to an embodiment of the invention is a functional block diagram of a handheld identifier reader.

FIG. 49 is a functional block diagram of a handheld reader 600, according to an embodiment of the invention. The reader 600 includes a button block 200 that further includes a scan button 36a, a record button 36b, a playback button 36c, and a timer display 40. The timer display 40 may provide an numeric representation of an elapsed time value, or it may present the representation of the elapsed time value in the well-known analog watch dial format. The button block 400 is functionally coupled to a memory and processing section 410 that further includes a RAM-based temporary data storage 410a, a ROM-based program and algorithm storage 410b, and a microprocessor-based algorithm executor 410c. The memory and processing section 410 is operably coupled to an audio and image capture conversion section 420 that performs analog-to-digital and digital-to-analog conversions. Accordingly, the audio and image capture conversion section 420 includes an A/D converter 420a, a D/A converter 420b, and an amplifier component 420c. The A/D converter 420a receives analog signals from a microphone 42 and converts the audio signals to digital signals that are suitable for further processing by the microprocessor 410c. The D/A converter 420b receives digital data from the microprocessor 410c and it converts it to analog form that may be communicated to a speaker. The amplifier 420c amplifies the audio analog signals, if required, before the audio signals are communicated to a speaker. The memory and processing section 410 and the audio image capture/conversion section 420 are also operably coupled with an input/output (I/O) section 440. The I/O section 440 may be operably coupled to a printer 440a, an imager 440b, a microphone 440c, an earphone jack 440d, and a speaker 440e. The imager 440b may also include camera-like devices, for example CCD, CMOS, Foveon or Foveon X3 direct image sensor devices, or other devices capable of recording an optical image. The printer I/O subsection component 440a operably interacts with the printer as previously illustrated in FIG. 11 and FIG. 12. Alternately, the printer 46a and other printers as shown in FIGS. 1, 3, 4, 6, 7, 13B, and 14A may also be used. The I/O subsection microphone 440c may operably interact with the microphones 42 and 142 shown in FIG. 2 through FIG. 10, FIG. 10C, and FIG. 14. The imager 440b may also include a lens and an auto focus unit 440b-1.

Figure 50:
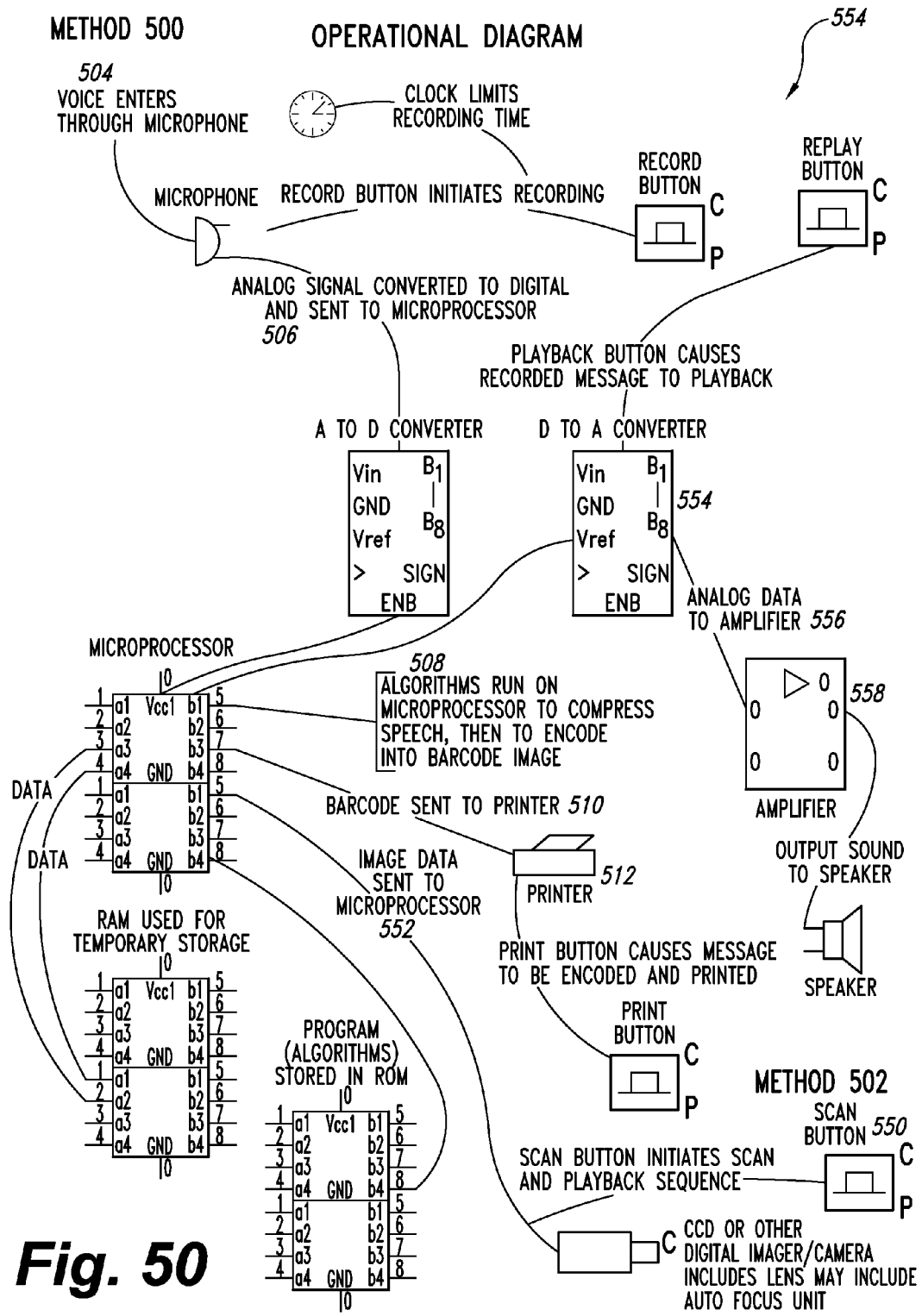
FIG. 50 is a schematic diagram that will be used to describe a method of recording audio content and generating identifiers, according to an embodiment of the invention.

FIG. 50 is a schematic diagram that will be used to describe a method 500 of recording audio content and generating identifiers, according to an embodiment of the invention. At block 504, analog audio and/or voice data is acquired by a microphone. The analog audio and/or voice signal is converted to a digital signal at block 506. Suitable algorithms within the microprocessor compress the digital signal and create the identifier pixel patterns at block 508. At block 510, the resulting pixel pattern is transferred to a printer operable to print the identifier at block 512. In one specific embodiment, the identifier is printed automatically as audio and/or voice data enters the microphone. Although block 512 includes a printing operation, it is understood that if the identifier is non-pigmented, the identifier may be applied to a semi-rigid or rigid substrate by stamping or embossing the identifier on the surface.

Alternately, at block 550, a user may indicate that an identifier is to be scanned by actuating a scan button. At block 552, the resulting scan image is sent to a microprocessor for processing. At block 554, the image data is converted to an analog signal by a digital to analog (D/A) converter. At block 556, the resulting analog data is sent to an amplifier to generate an analog signal having a sufficient power level to drive a loudspeaker. At block 558, the resulting amplified analog signal is transferred to a loudspeaker.

FIG. 51 is a table of compressor/decompressor algorithms (CODECs) for encoding audio sound into an identifier. The selected CODEC generally depends upon the amount of information contained within a given identifier and the desired level of audio quality to be recorded within the identifier. The audio quality level generally depends upon a selected CODEC since different bit rate responses are present in different CODECs to accommodate different recording requirements. Different CODECs may also exhibit different time delays even though a given CODEC offers a variable bit rate (VBR) to accommodate different audio environments. The different CODECs may also include packet loss concealment (PLC) that removes silent periods that may occur when there is a loss of data within the identifier or when the identifier is read. As shown in detail in FIG. 52, the CODECs may include Speex, iLBC, AMR-NB, AMR-WB, G.729, GSM-FR, GSM-EFR, G.723.1, G.728, and G.722, although other suitable alternatives may also be used.

Figure 52:
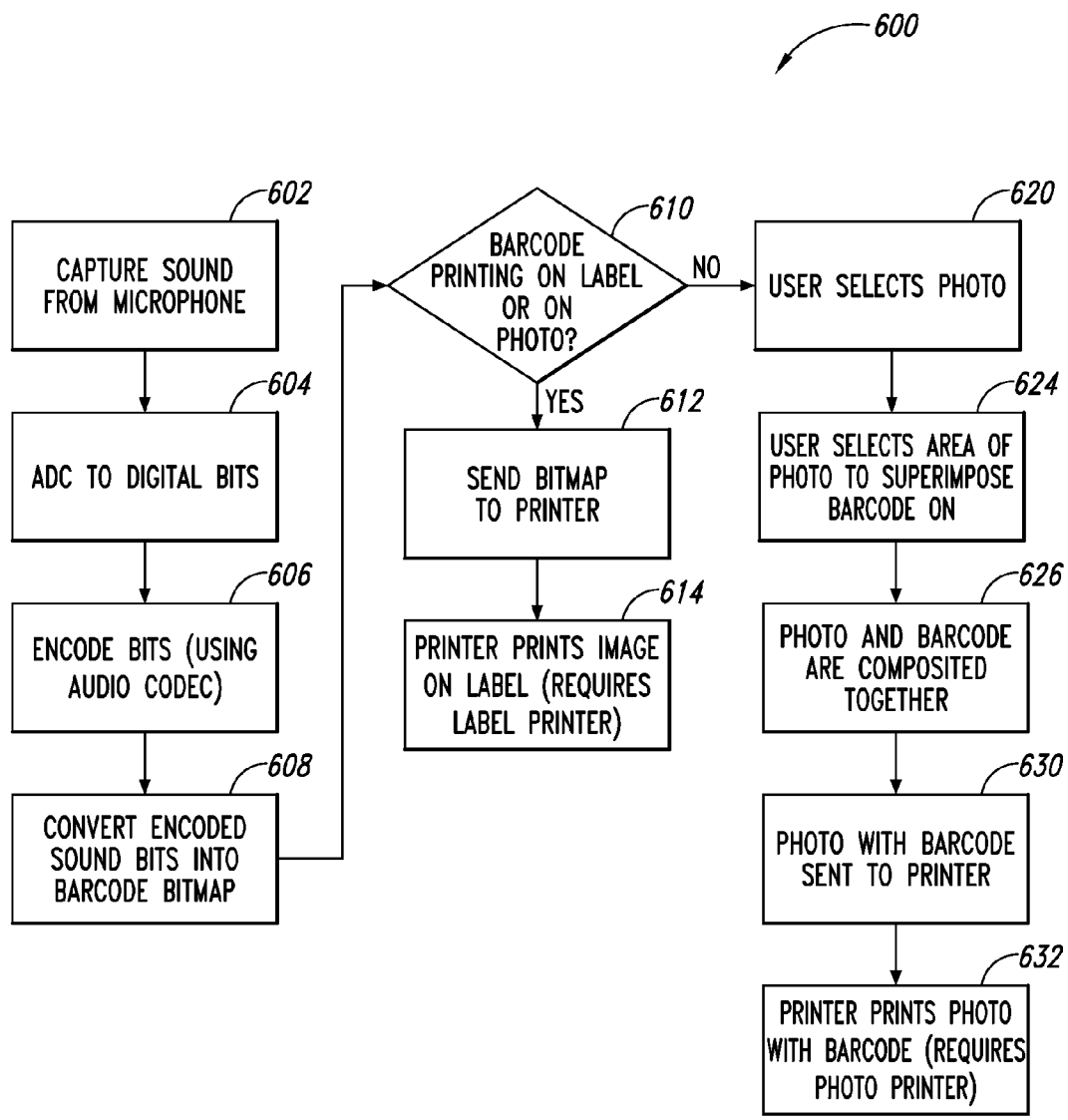
FIG. 52 is a basic encode algorithm.

FIG. 52 is a basic encode algorithm. The basic encode algorithm 600 of FIG. 52 begins with capturing sound from a microphone at block 602. The sound that is captured is converted to digital form at block 604. The digital form is encoded using an audio CODEC at block 606. At block 608, the encoded sound bits are converted into an identifier bitmap. Following process block 608, a decision diamond 610 is reached that has a query "barcode printing on label or on photo?" If the answer is to this query is "yes" then at block 612, the bitmap is sent to the printer. This affirmative branch from the decision diamond 610 then concludes with process block 614 wherein the printer prints the image of the identifier on a label. If on the other hand, the decision to the query posed in decision diamond 610 is "no" then the negative branch from decision diamond 610 begins with the user selecting a photo at block 620. Once the photo is selected, the user selects an area of the photo to superimpose the identifier upon. Thereafter, at block 626, the photo and the identifier are merged. The merged image is then sent to an image printer at block 630. Thereafter, the negative branch from the decision diamond 610 concludes with the printer printing the photo and the identifier together at block 632.

Figure 53:
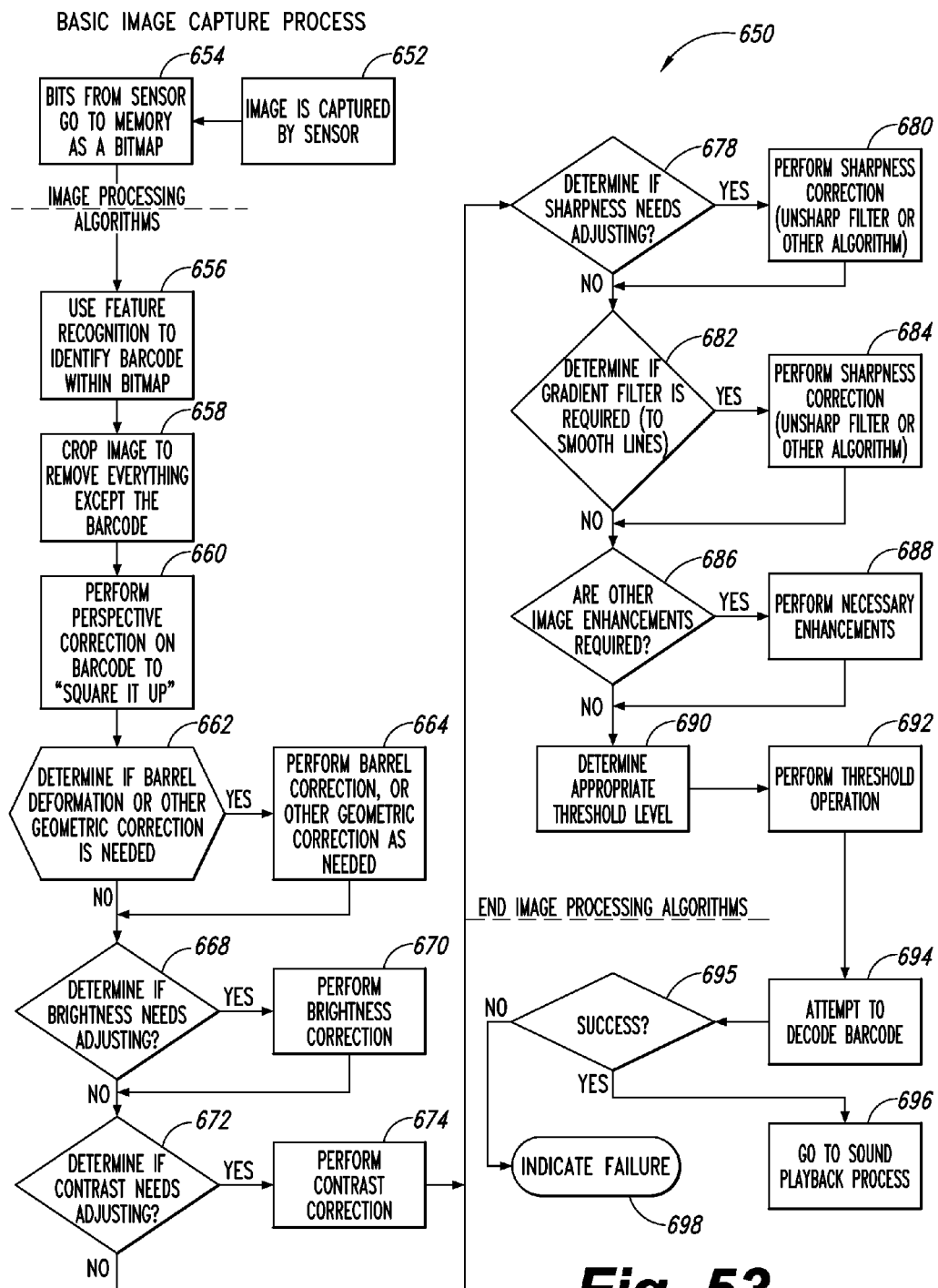
FIG. 53 is a basic image capture process algorithm.

FIG. 53 is a basic image capture process algorithm 650. The image capture process algorithm 650 begins with an image captured by a sensor at block 652. Once the image is captured by the sensor, bits from the sensor are directed into memory and stored as a bitmap file at block 654. After block 654, image processing algorithms commence at block 656 where the identifier within the bitmap is identified using a feature recognition algorithm. Once the identifier is identified, the image is cropped at block 658 to remove any extraneous content. Once the barcode is suitably cropped at block 660, a perspective correction algorithm is applied to ensure that the identifier is suitably rectangularized. Once the identifier is suitably rectangularized at decision diamond 662, a task is presented to determine if the barrel correction or other geometric correction is needed. If a barrel correction or other distortion algorithms is required for correction, then at block 664, barrel correction or other geometric correction algorithms are engaged to correct for this distortion. After correction of distortion at process block 664, a task decision is reached in decision diamond 668 with the task to determine if brightness needs adjustment. If the answer to this task decision is "yes", then at process block 670, a brightness process is performed. At decision diamond 672, if the contrast needs adjustment, then at process block 674, a contrast correcting algorithm is performed. The next task decision query is reached to determine if sharpness needs adjusting at decision diamond 678. If sharpness adjustments is required, then at process block 680 a sharpness correction algorithm is applied using an unsharp filter or comparable algorithm. Thereafter, at decision diamond 682, a determination is made to determine whether or not an image gradient filter needs to be applied. If an image gradient filter needs to be applied, then at block 684 an unsharp filter or comparable algorithm is used. Thereafter, another task query is presented at decision diamond 686 to determine if other image enhancements are required. If the answer to this query is "yes" then at process block 688, the necessary enhancements are performed. The basic image capture process algorithm then continues at process block 690 to determine the appropriate threshold level and followed by process block 692 to perform the threshold operation at the appropriate threshold level. After process block 692, the image processing algorithms are completed and attempts are made at process block 694 to determine whether or not the identifier has been successfully decoded. If there has been a successful decoding of the identifier, then at process block 696, the sound played back process algorithm is initiated. If the answer to this query is "no" then failure is so indicated at block 698.

Figure 54:
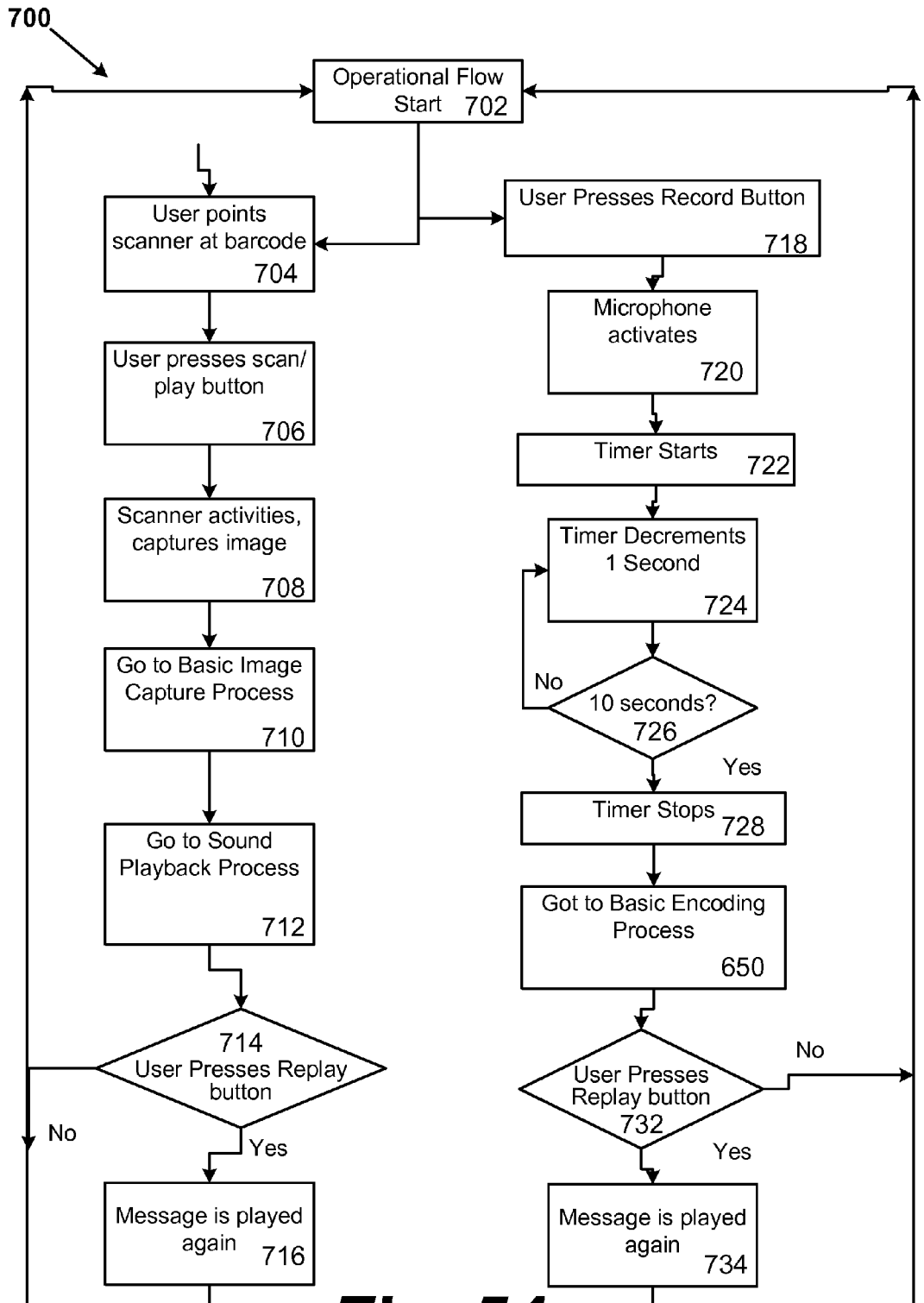
FIG. 54 is an operational flow process block diagram.

FIG. 54 is an operational flow process block diagram 700. At block 702, two-parallel cycle paths are engaged. At process block 704, a user points the scanner at the identifier followed by block 706 where a user activates the scan/play button. Upon activating the scan/play button at process block 708, the scanner activates and captures the image. Once the image is captured at process block 710, the basic image capture process algorithms are engaged as described in the preceding FIG. 53. Once the basic image capture process algorithms are engaged at process block 710, the sound playback process is engaged at process block 712. Thereafter, a decision diamond 714 is reached where a task is presented to a user for pressing the replay button. If the replay button is pressed under the "yes" exit point, then at process block 716, the message is played again. If on the other hand, the user does not press the playback button, then at the negative or "no" exit, the cycle begins again at start block 702. Another wing from the start block 702 begins with block 718 where the user presses the record button. Upon pressing the record button at block 720, the microphone is activated. Thereafter at block 722, the timer is started in which at block 724, the timer may be implemented in 1 second decrements, or other decremented values and a query is then presented in decision diamond 726 whether or not to use other larger decrements. If the answer to the query is negative, then the 1 second decrement of process block 724 is retained. If the decision is in the affirmative, then the larger time decrements are used, then block 728 is reached wherein the timer is stopped. Once the timer is stopped, then the basic encoding algorithms 650 are used as previously described. After using the basic encoding algorithms as outlined in process 650, a task query is presented in decision diamond 732 where the user determines whether or not to press the replay button. If the decision diamond is "yes" to press the replay button, then at block 734, the message is played again and the cycle repeats back to the start block 702. If the decision is not to press the replay, then the message is not played again and the process restarts at start block 702.

Figure 55:
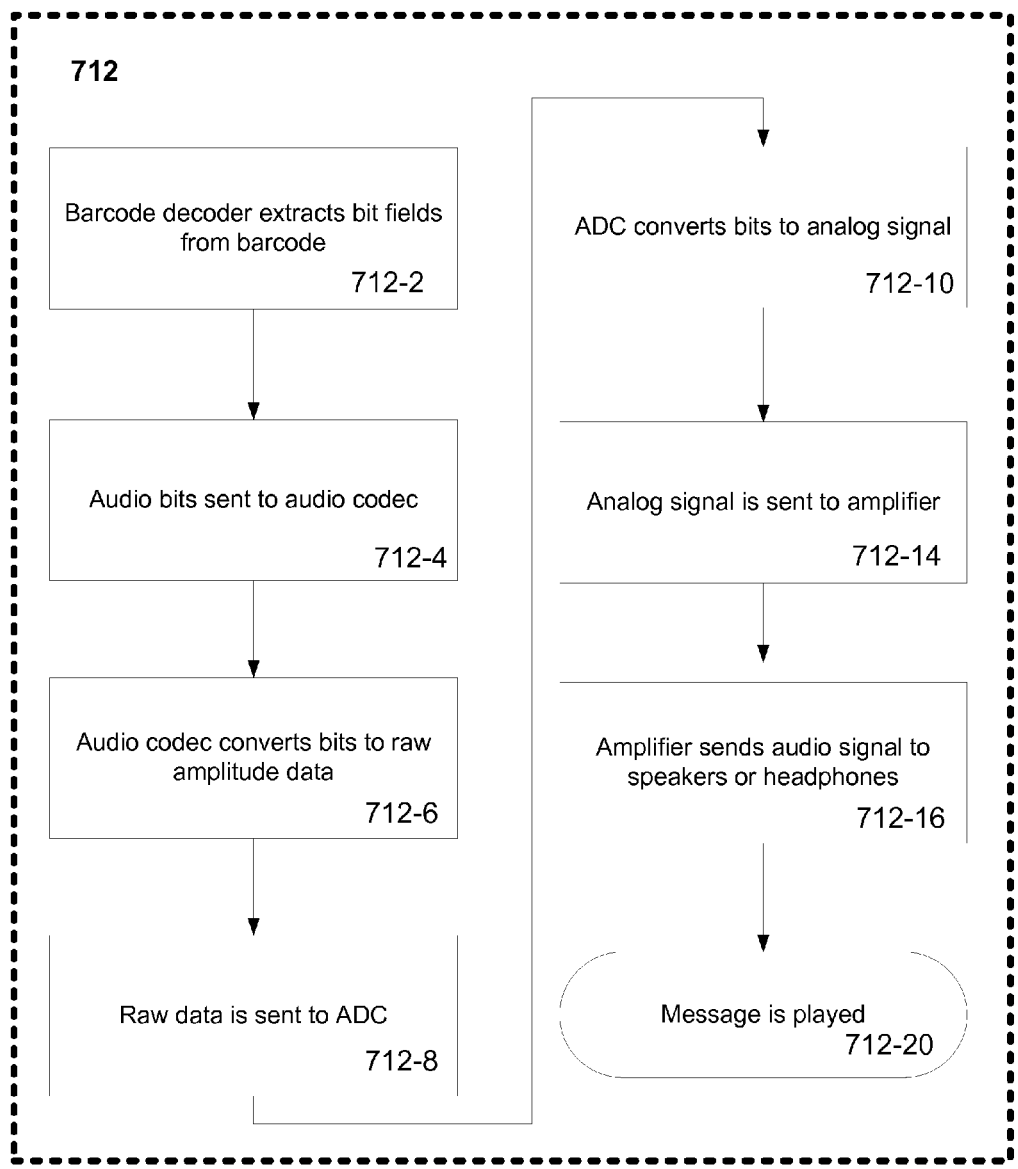
FIG. 55 is a sound playback algorithm.

FIG. 55 is an expansion of the sound playback algorithm 712. The sound playback algorithm 712 includes and begins with process block 712-2 where the identifier decoder extracts bit fields from the identifier. Once the bit fields are extracted, then at block 712-4, audio bits are sent to the audio CODEC. Once the audio bits have been received by the audio CODEC, then at block 712-6, the audio CODEC converts the bits to raw amplitude data. The raw amplitude data is then sent for analog digital conversion at process block 712-8. At process block 712-10, the ADC conversion is a reversal of an analog to digital in that the digital is converted to an analog signal. Thereafter, at process block 712-14, the analog signal is sent to an amplifier so that it may be amplified to a level that is discernable by a listener. At process block 712-16, the amplifier sends audio signals to speakers or headphones. Then the sound playback algorithm is completed at terminus 712-20 where the message is played and a listener hears the message either on speakers or headphones.

Figure 56A:
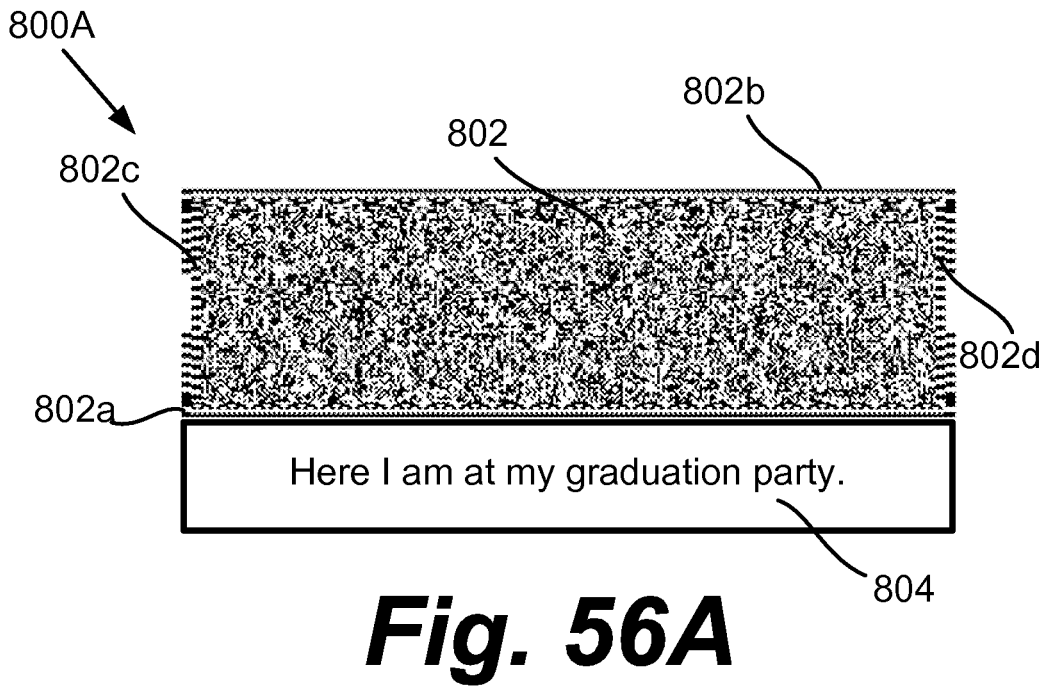
FIG. 56A is an alternate identifier embodiment.

FIG. 56A is an alternate identifier embodiment. Identifier 800A is a two section identifier having a 2D barcode pixel section 802 and an alphanumeric section 804. The pixel section 802 includes a bottom border 802a, a top border 802b, and side borders 802c and 802d. The pixel section 802 comprises substantially rectangular shaped pixels that contain encoded information, including encoded sounds and/or speech. The encoded information may be configured to have encoded speech and/or sound recordings from multiple sources. For example, a speaking subject and a speaking narrator may be suitably encoded on the identifier 800A. Adjacent to the pixel section 802 is the alphanumeric section 804 that includes a translation of the speech content of the voice or voices encoded in the pixel section 802. The identifier readers and generators of the previous systems may be configured to have respective speech-to-text and text-to-speech capabilities to perform respective generation and reading operations. The alphanumeric section 804 includes a text message that may include any desired text message. For example, the section 804 of FIG. 56A includes the text message: "Here I am at my graduation party." The alphanumeric section 804 is shown positioned below the pixel section 802, it may be placed on the top or on either side of the pixel section 802.

Figure 56B:
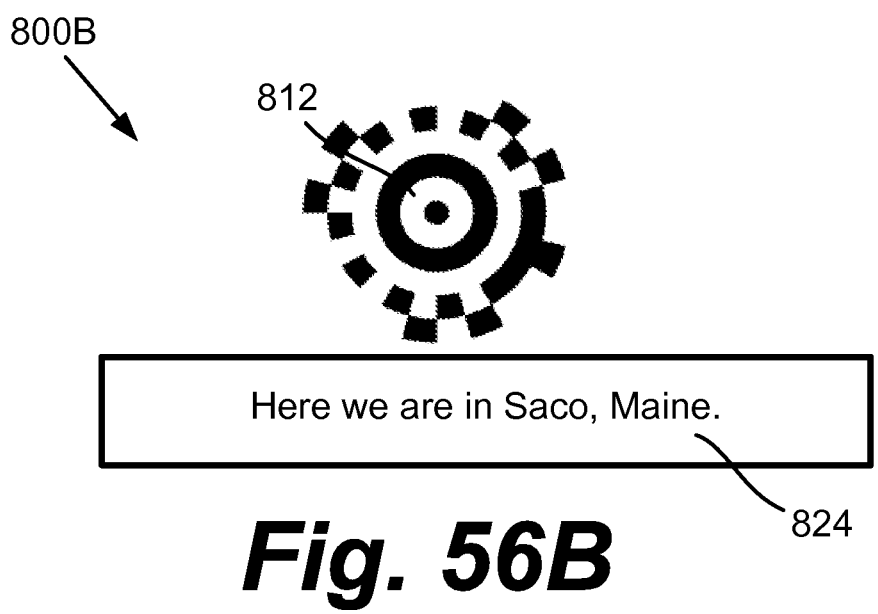
FIG. 56B is another identifier embodiment.

FIG. 56B is another identifier embodiment. Identifier 800B is comprised of a two section identifier having a 2D barcode pixel section 812 and an alphanumeric section 824 that is suitably shaped. The pixel section 812 has a circular configuration and includes concentric solid and dashed rings. The pixel section 812 contains encoded sound and/or speech and may be configured to have encoded speech and sound recordings from multiple sources, for example, a speaking subject and a speaking narrator (such as a cameraman). Adjacent to the pixel section 812 is the alphanumeric section 824 that has a text translation of the speech content of the voice or voices encoded in the pixel section 802. The identifier readers and generators of the previous systems may be configured to have respective speech-to-text and text-to-speech capabilities as needed to perform respective generation and reading operations of the circularly configured pixel section 802. The alphanumeric section 824 may include any desired text information. For example, the section 824 of FIG. 56B includes the message: "Here we are in Saco, Me." Other shapes are possible for the alphanumeric section 824 including an oval or circular or semi-circular shaped alphanumeric section 824 that is coaxially disposed around the pixel section 812.

Figure 56C:
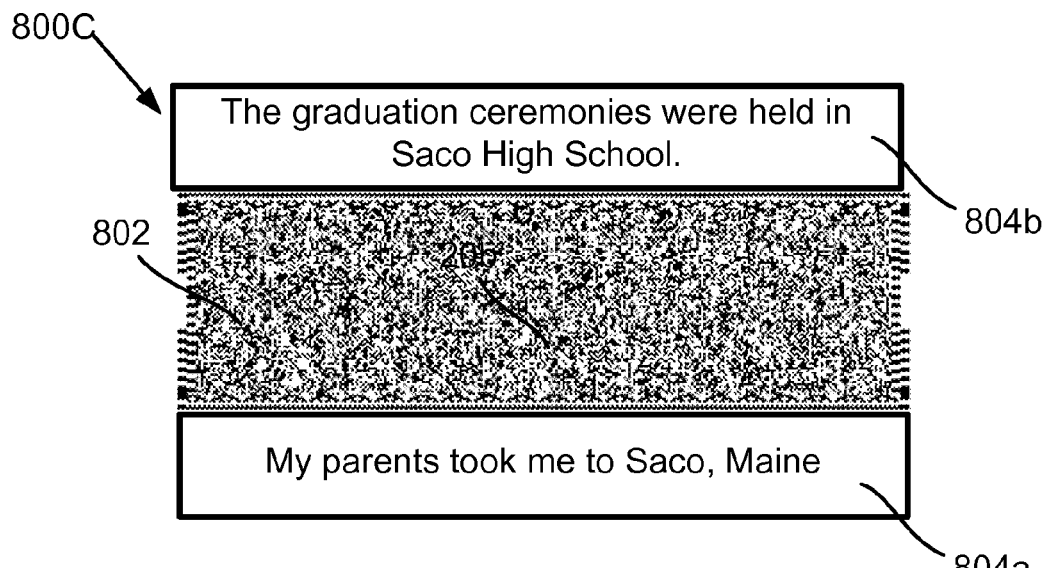
FIG. 56C is an alternate identifier embodiment.

FIG. 56C is an alternate identifier embodiment. Identifier 800C is a multi-section identifier having a suitably shaped 2D barcode pixel section 802 that is bounded by adjacent alphanumeric sections 804a and 804b. By example, the printed text message in the section 804a has a message translated from the subject-encoded portions of the pixel section 802 that reads "My parents took me to Saco, Me.". Similarly, the printed text message in the section 804b has a message translated from the narrator-encoded portions of the pixel section 802 that reads, "The graduation ceremonies were held in Saco High School".

Figure 56D:
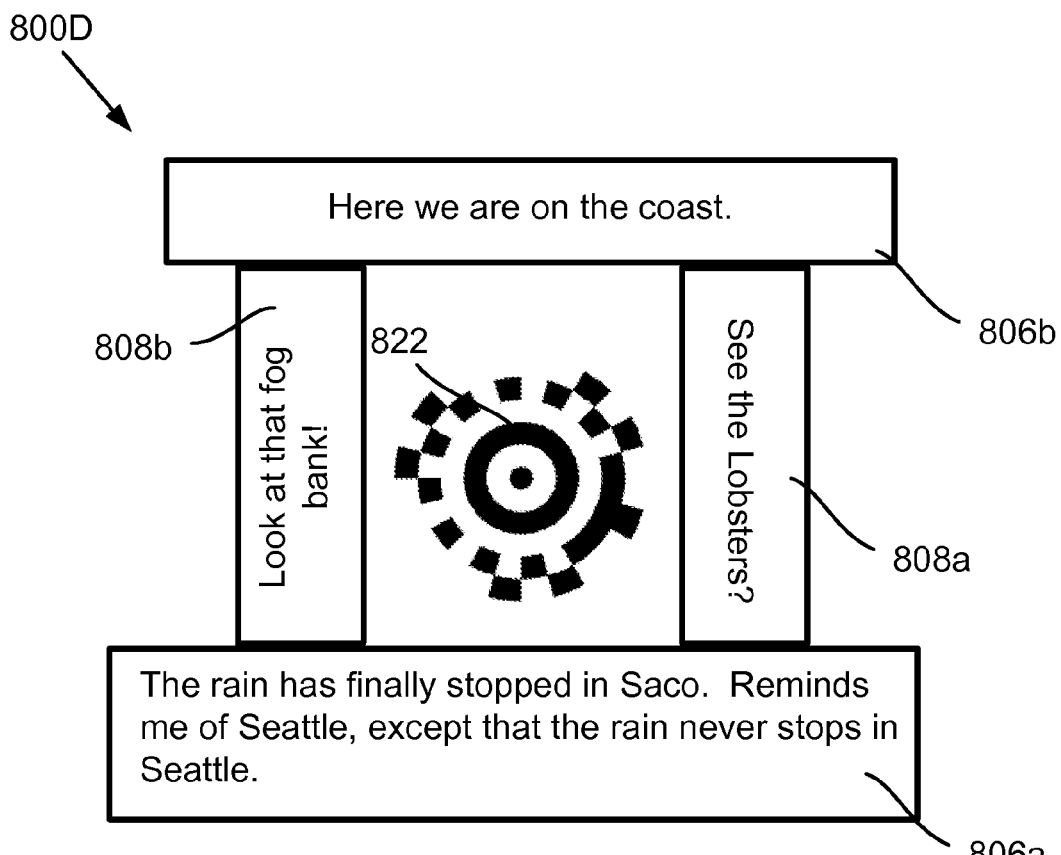
FIG. 56D is yet another identifier embodiment.

FIG. 56D is yet another identifier embodiment. Identifier 800D is a multi-section identifier having a generally circular shaped 2D barcode pixel section 822 that is bounded by alphanumeric sections 806a and 806b and alphanumeric sections 808a and 808b. As illustrated, the alphanumeric sections 806a-b and 808a-b are rectangular shaped, although they may be circular, elliptical, or semi-circular and coaxially disposed about the pixel section 822. Any desired text messaging may be included in the section 806a-b and 8-8a-b. By example, the printed text message in lower section 806a has a message translated from encoded portions of the pixel section 822 that reads, "The rain has finally stopped in Saco. Reminds me of Seattle, except that the rain never stops in Seattle". Similarly, the printed text message in the section 806b has a message that reads, "Here we are on the coast". The sections 808a and 808b respectively have printed messages that read "See the lobsters?" and "Look at that fog bank!" The messages in the sections 808a-b may be disposed in any desired orientation.

Figure 57:
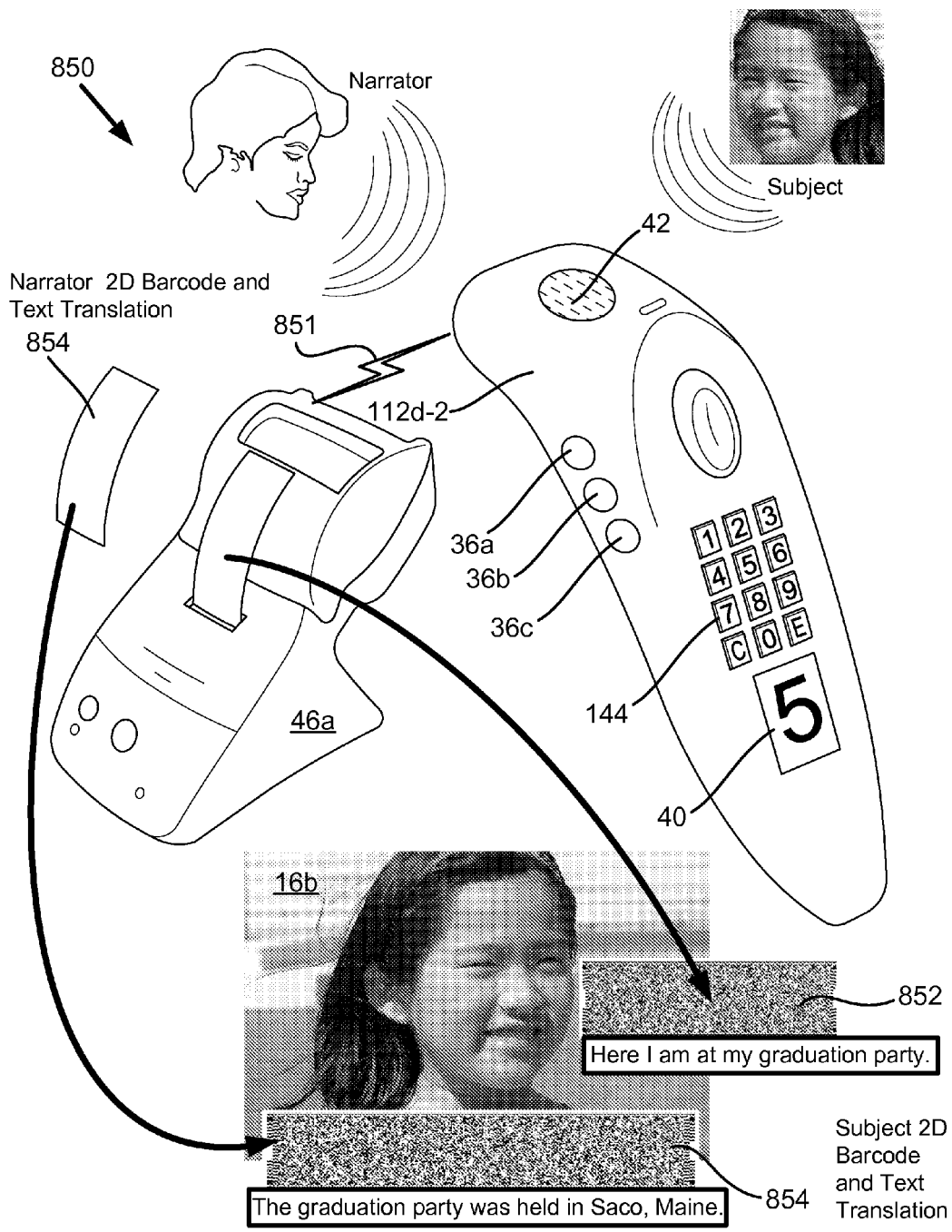
FIG. 57 schematically illustrates an alternate embodiment of an identifier generating system from a speaking subject and narrator.

FIG. 57 schematically illustrates an alternate embodiment of an identifier generating system 850 from a speaking subject and narrator. The generating system 850 includes a reader 112d-2 and a wireless printer 46a. The reader 112d-2 is a modification of the reader 112d in that reader 112d-2 further has microprocessors that execute algorithms to encode the speech into the pixel section of the identifier 852 and to perform speech-to-text translation that may be printed in an alphanumeric section of the identifier 852. The subject of image 16b speaks and the subject's voice is processed by the reader 112d-2 to encode the subject's speech into the pixel section of the identifier 852 and to perform the speech-to-text translation for the alphanumeric section of identifier 852. Information pertinent to the subject's identifier 852 is relayed to the printer 46a through a wireless signal 851. Information pertinent to the narrator's identifier 854 may also be conveyed to the printer 46a. The printer 46a prints the multi-section identifiers 852 and 854 for separate application to the image 16b. Alternatively, the printer 46a may have microprocessors that execute algorithms to encode the speech into the pixel section of the identifier 852 and to perform speech-to-text translation that may be printed in the alphanumeric section of the identifier 852.

Figure 58:
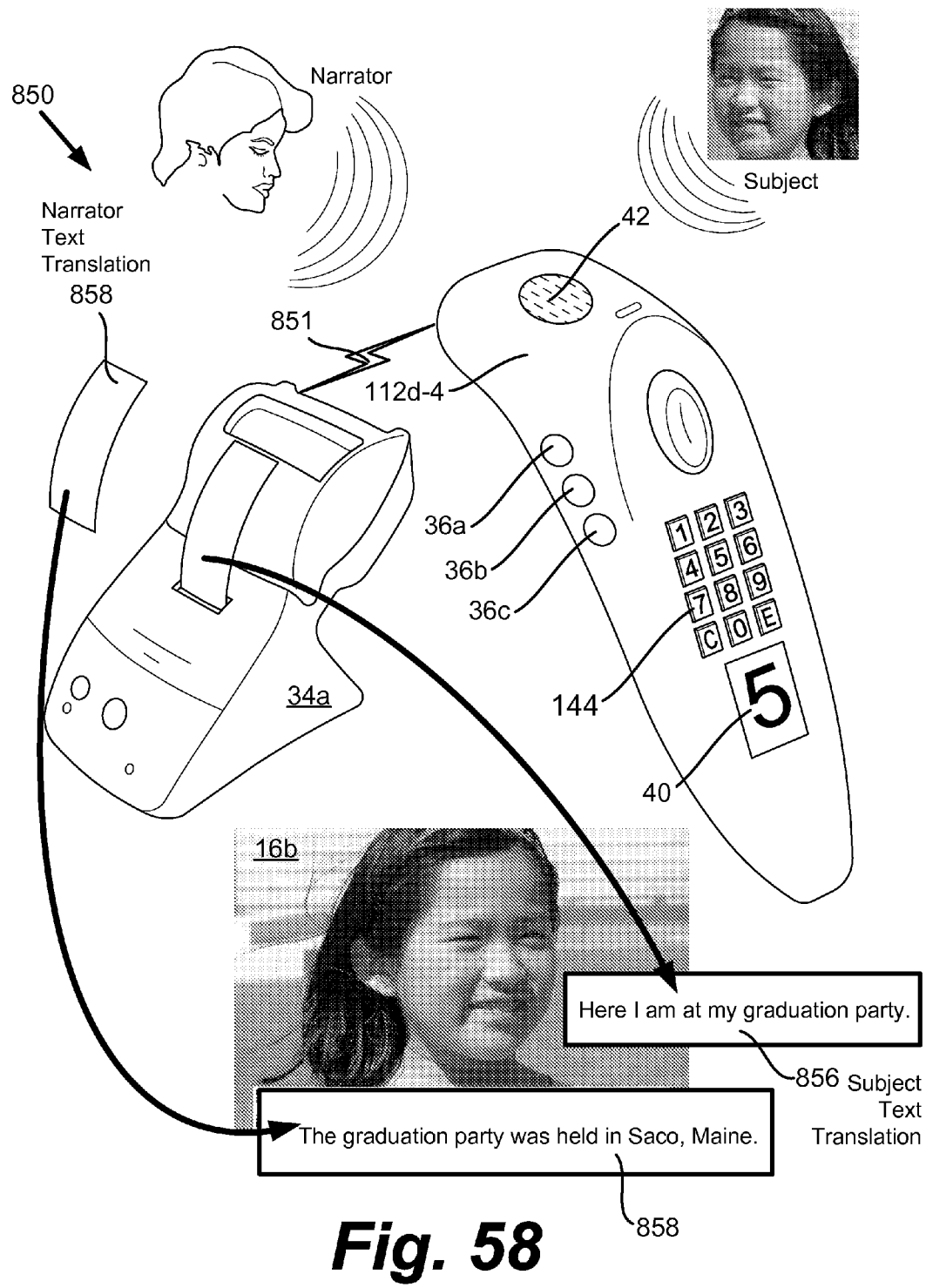
FIG. 58 illustrates another operation of the alternate embodiment depicted in FIG. 56.

FIG. 58 schematically illustrates another alternate embodiment of the system 850 of FIG. 56. The generating system 850 includes the reader 112d-2 that conveys information pertinent to the subject's identifier 856 and narrator's identifier 858 by a wireless signal 851. The printer 46a prints the subject and narrator's text translation with the alphanumeric sections of the respective identifiers 856 and 858. The printed translations for subject and narrator identifiers 856 and 858 may be separately applied to the image 16b.

Figure 59A:
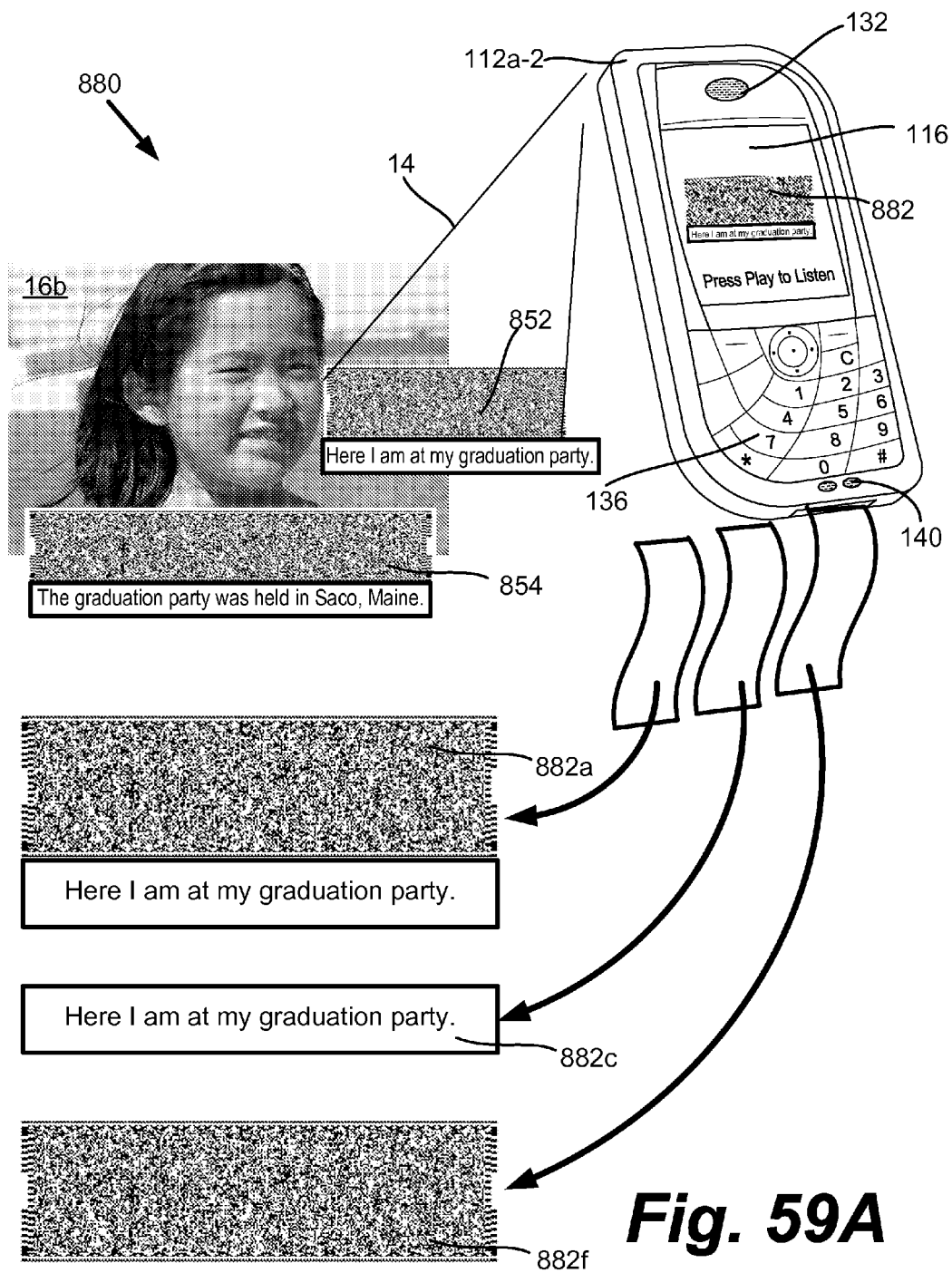
FIG. 59A is a schematic illustration of an alternate embodiment of an identifier generating system from an original identifier.

FIG. 59A is a schematic view of an alternate embodiment of an identifier generating system 880 from an original identifier. In the system 880, a combination reader/printer 112a-2 is employed. The reader/printer 112a-2 further includes suitable microprocessors that execute algorithms to reproduce identifiers that are duplicates that are replications of the pixel and alphanumeric sections, and the alphanumeric sections, or the pixel sections of a 2D identifier or barcode. As shown in FIG. 59, the subject identifier 852 that is affixed to the image 16b is scanned by the reader/printer 112a-2 and presents an identifier image 882 on the display 116. Through entries on the keypad 136, three identifier replicates, 882a-c of the original barcode 852 are generated by the reader/printer 112a-2. Identifier replicate 882a is a duplicate of the original identifier 852 in that the pixel and alphanumeric sections are printed. Identifier replicate 882b is a duplicate of the alphanumeric section in which a printed message "Here I am at my graduation party" of the original subject identifier 852 is duplicated. Identifier replicate 882f is a duplicate of the pixel section of the original identifier 852.

Figure 59B:
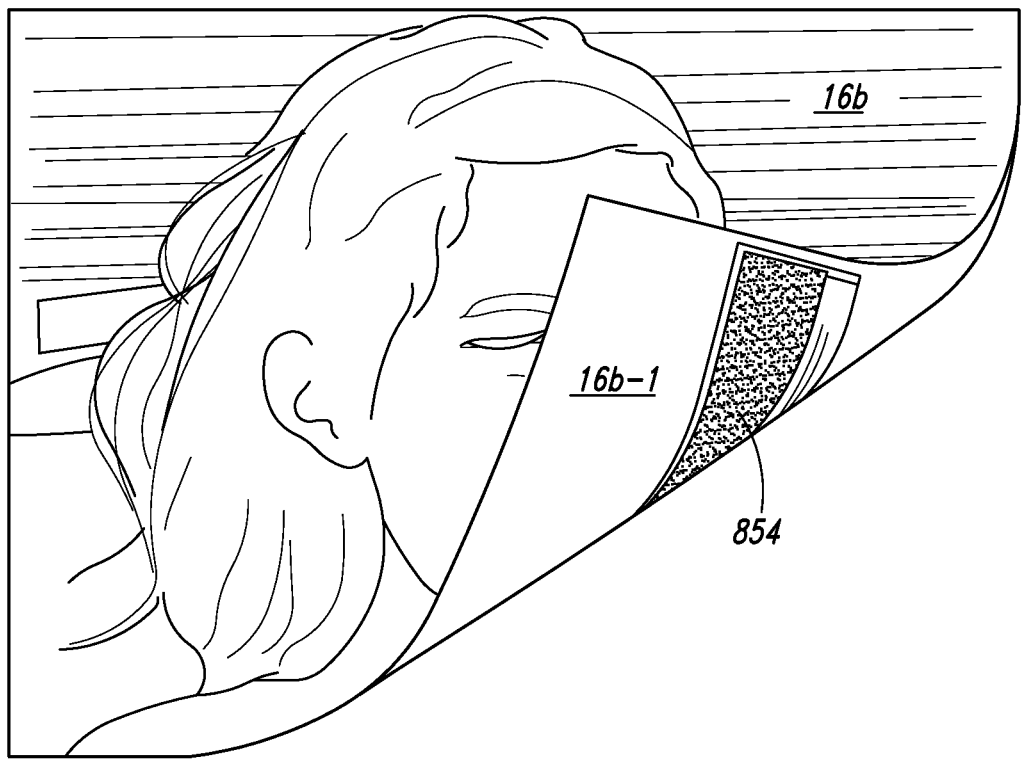
FIG. 59B schematically illustrates an alternate location for placing an identifier illustrated in FIG. 59A.

FIG. 59B schematically illustrates an alternate location for placing an identifier illustrated in FIG. 59A. The narrator identifier 854, reproduced similarly as the subject identifier or 2D barcode 852 from the original on the surface of image 16b, is placed on the backside 16b-1 of the sheet having the image 16B. The narrator identifier 854 includes the pixel section 802 and the alphanumeric section 804. In a like generic manner, the pixel section 802 or the alphanumeric section 804 may be applied or affixed to the backside 16b-1.

Figure 60:
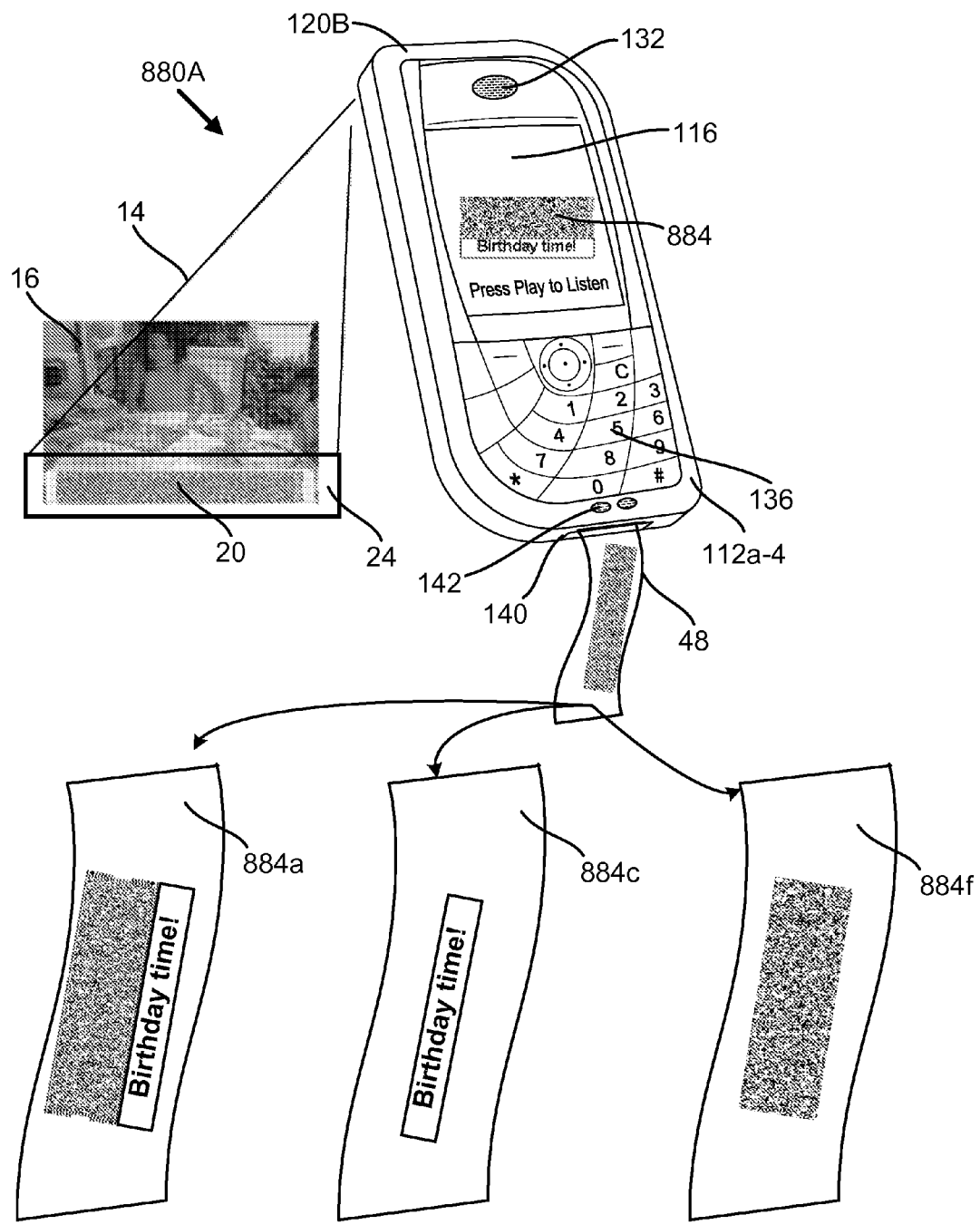
FIG. 60 is another alternate embodiment of an identifier generating system from an original identifier.

FIG. 60 is a schematic view of another alternate embodiment of an identifier generating system 880A from an original identifier. In the system 880A, a combination reader/printer 112a-4 is employed. The reader/printer 112a-4 further includes suitable microprocessors that execute algorithms to reproduce identifier pixel sections that are duplicates. The duplicates may be replications of the pixel sections or they may be translations of the pixel sections that include an original alphanumeric section, or a duplicate of the pixel section with an original alphanumeric section translation. The reader/printer 112a-4 reads and interprets the pixel portion of an identifier 20, translates the encoded speech contained within the original printed pixel array 20, and presents it as an image 884 having a pixel and text sections on the display 116. Through entries on the keypad 136, the identifier replicates, 884a-c of the original barcode 20 are generated by the reader/printer 112a-4. Identifier replicate 884a is a duplicate of the original identifier 20 with an original text translation printed in an alphanumeric section. The identifier replicate 884b is an original translation of the pixel identifier 20 message "Birthday Time!" The identifier replicate 884f is a duplicate of the original pixel identifier 20.

FIGS. 61A-D are schematic illustrations that will be used to describe the operation of another embodiment of the present invention. The system 900 of FIG. 61A-D includes a camera 200A and a printer 234 in wireless communication with the camera 200A. The printer 234 may also be suitably coupled to the camera 200A using metallic conductors or fiber optical conductors if desired.

Figure 61A:
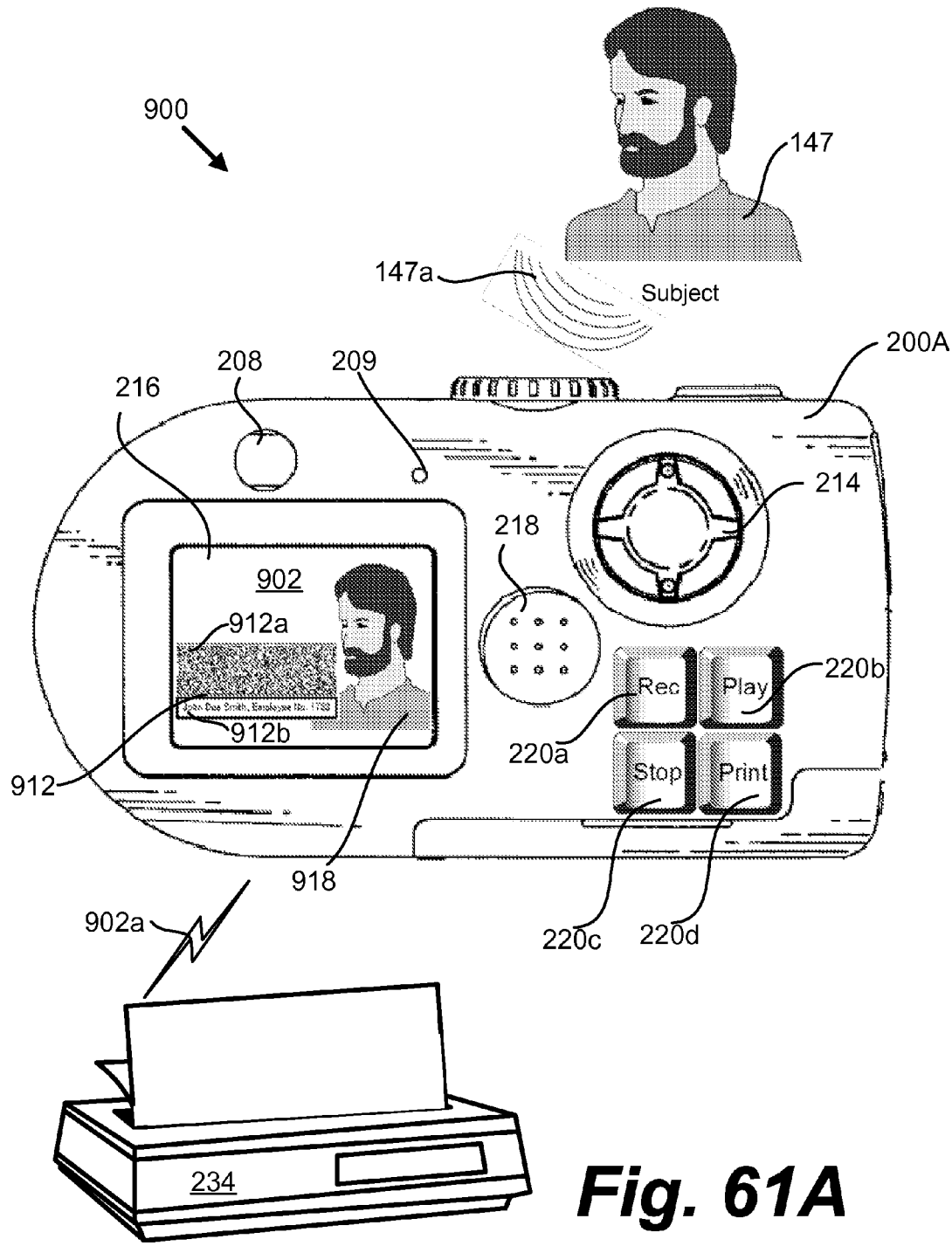
FIG. 61A illustrates the acquisition operation of sound and image of a speaking subject.

FIG. 61A illustrates the acquisition of a sound and an image of a speaking subject. The camera 200A includes suitable microprocessors that execute algorithms to process images and sound 147a acquired from the speaking subject 147 to generate a fused image 902. The fused image 902 may be viewed on the camera display 216, and includes an identifier component 912 merged with a subject image component 918. The identifier component 912 includes a multi-section identifier similar to the identifier 800A of FIG. 56A in that it has a pixel section 912a and a translated alphanumeric section 912b. The identifier component 912 of the fused image 902 may also include various details, as shown in FIGS. 56B-D. The identifier component 912 of the fused image 902 will be generated with the subject image component 918 so that a merged, printed image results. The identifier component 912b is an alphanumeric section with a displayed text that reads, "John Doe Smith, Employee No. 1783."

Figure 61B:
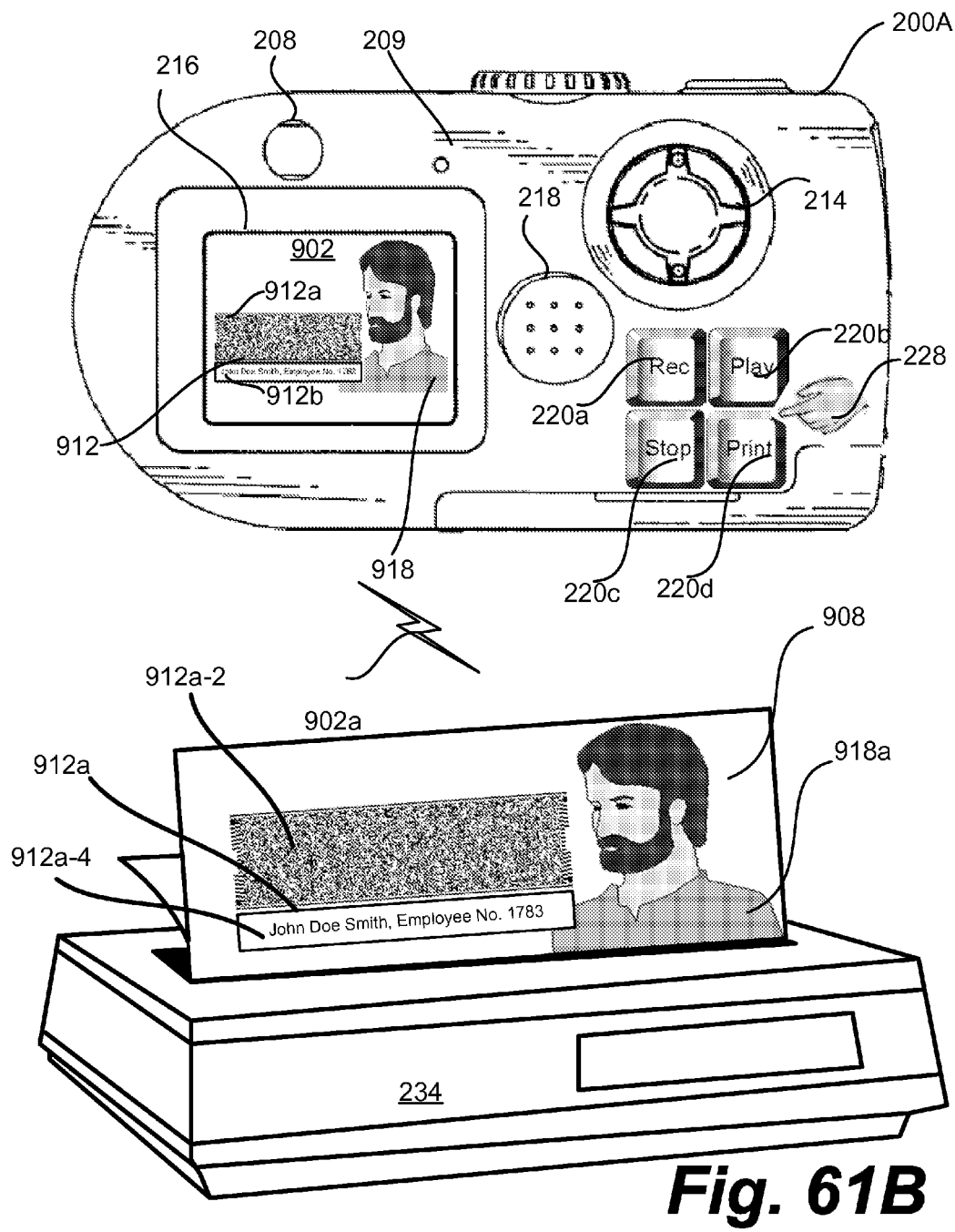
FIG. 61B illustrates a printing operation of the system shown in FIG. 61A.

FIG. 61B illustrates a printing operation of the system 900. An operator 228 presses the print key 220d so that the camera 200A sends information related to the fused image 902 to the printer 46a through wireless signals 902a. The printer 234 receives the signal 902a and the fused image 902 is printed on a paper 908. The identifier 912 is also printed as identifier 912a with the image 918 so that the image 918a results. The printed identifier 912a includes the pixel section 912a-2 and the alphanumeric section 912a-4. The alphanumeric section 912a-4 has the printed text message "John Doe Smith, Employee No. 1783", for example.

Figure 61C:
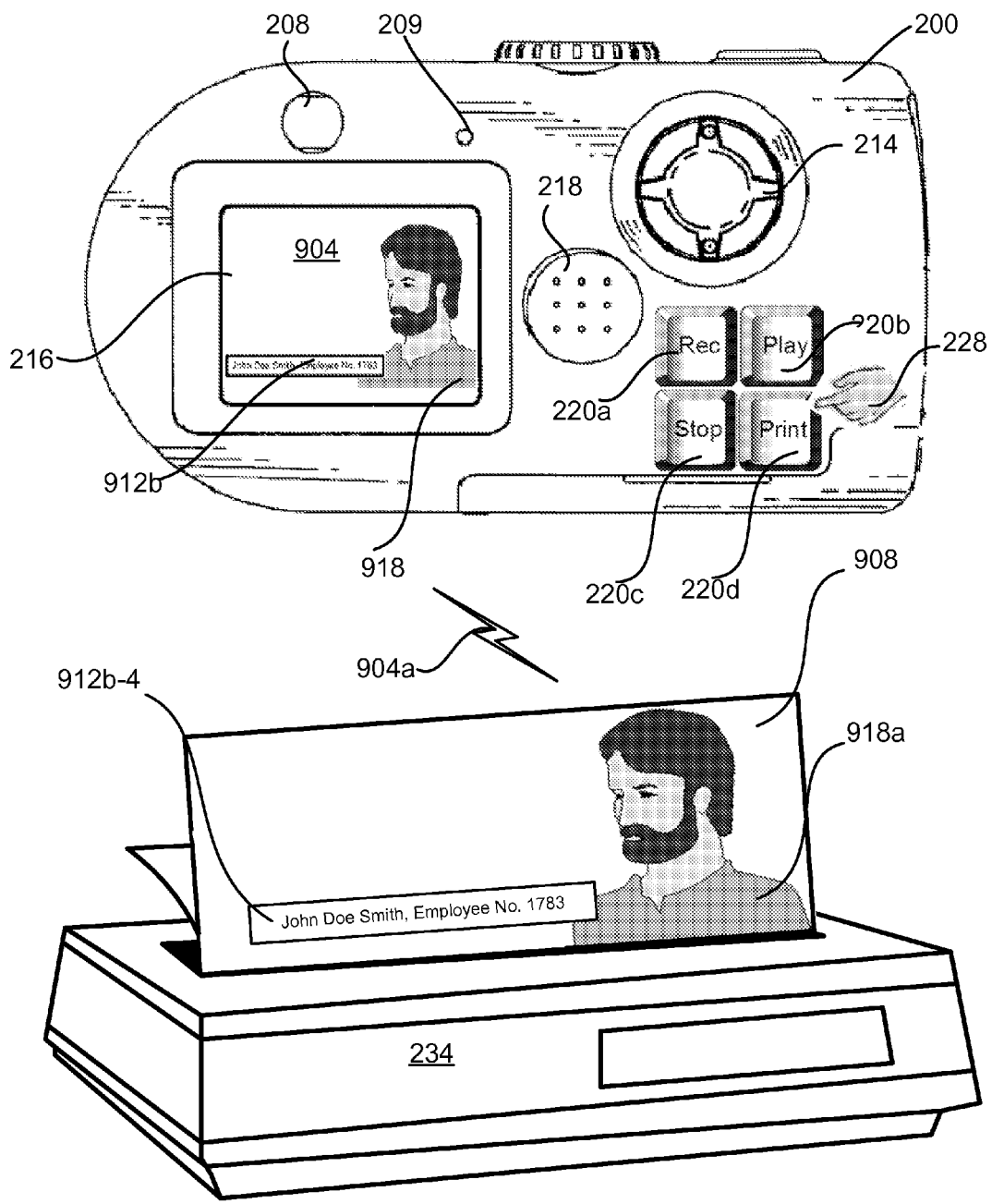
FIG. 61C illustrates another printing operation of the system shown in FIG. 61A.
Figure 61D:
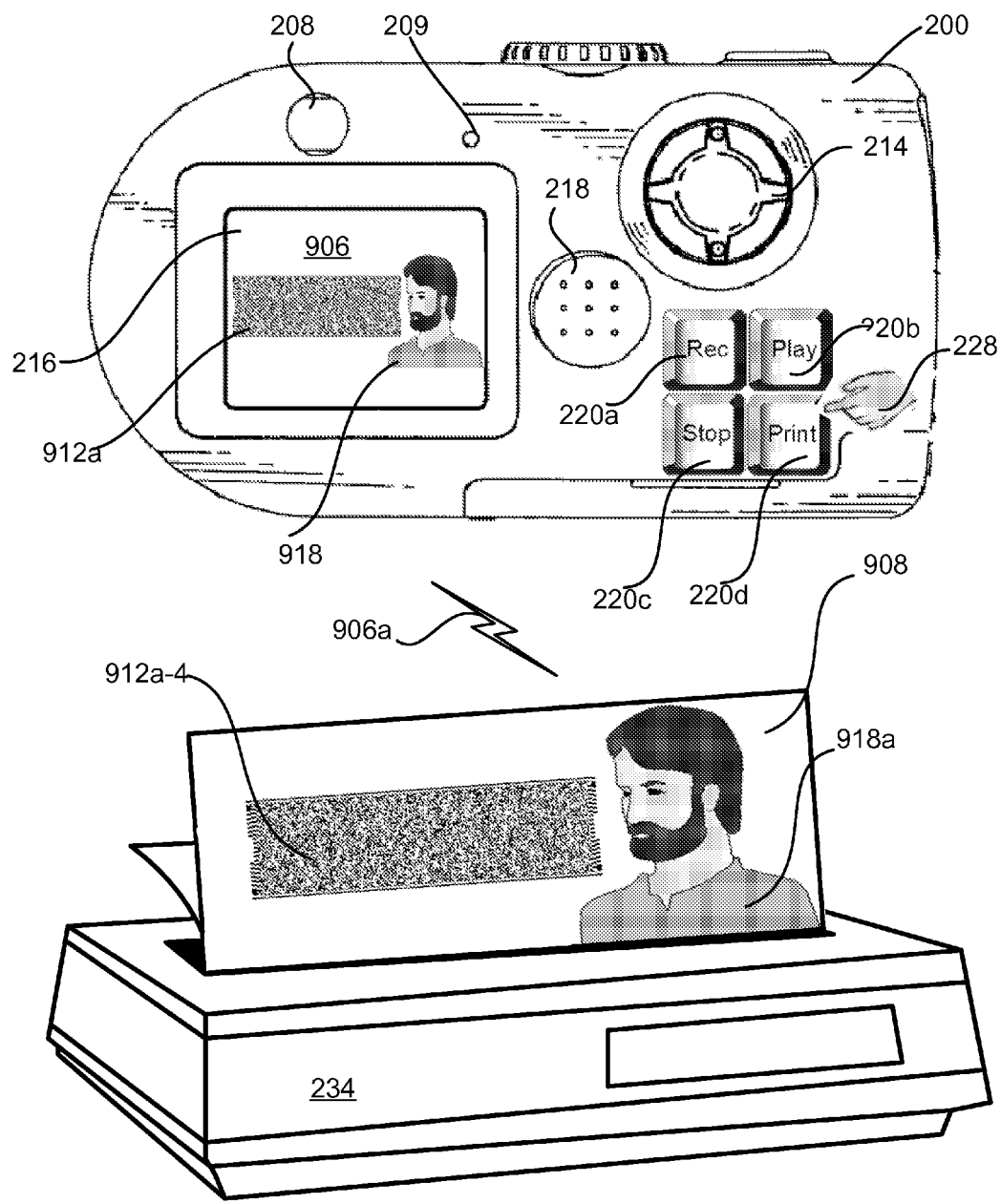
FIG. 61D illustrates yet another printing operation of the system shown in FIG. 61A.

FIG. 61C illustrates another printing operation of the system 900. The toggle switch 214 is operably configured to allow presentation of either both sections of the identifier 912, the pixel section 912a, or the alphanumeric section 912b on the camera display 216. In this case the toggle switch 214 is operated so that a fused image 904 is obtained that includes the alphanumeric section 912b with the subject image component 918. An operator 228 presses the print key 220d and causes the camera 200A to send information related to the fused image 904 to the printer 46a by a wireless signal 904a. The printer 234 receives the signal 904a and the fused image 904 is printed on paper 908. The image alphanumeric section 912b is also generated as printed identifier 912b-4 with image 918 being printed as image 918a. The alphanumeric section 912b-4 has the printed text message "John Doe Smith, Employee No. 1783", for example.

FIG. 61D illustrates yet another printing operation of the system 900. In this operation the toggle switch 214 is operated so that a fused image 906 is obtained that includes the pixel section 912a with the subject image component 918. An operator 228 presses the print key 220d that causes the camera 200A to send information related to the fused image 906 to the printer 46a through a wireless signal 906a. The printer 234 receives the signal 906a so that the fused image 906 is printed on paper 908. The image pixel section 912a is also printed as printed identifier 912a-4 with image 918 being printed as image 918a.

Figure 62:
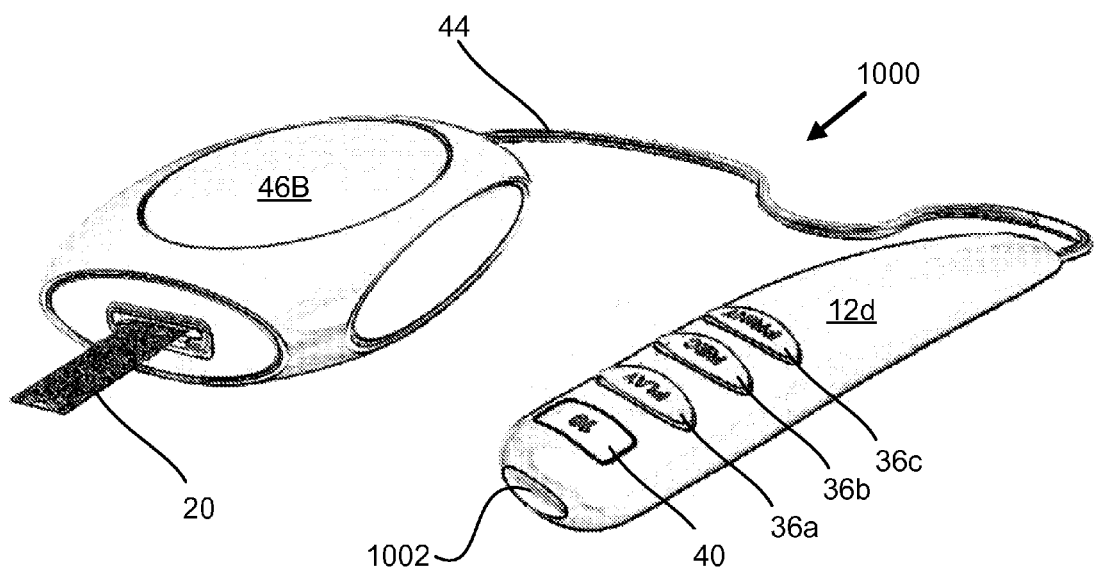
FIG. 62 is an isometric view of another embodiment of a handheld identifier reader system.

FIG. 62 is an isometric view of another embodiment of a handheld identifier reader system. Similar to the handheld identifiers 12-12c of FIGS. 1-4, the handheld identifier system 1000 includes a handheld scanner 12d equipped with the timer display 40 positioned near a combination speaker-microphone 1002 end of the scanner 12d. Scanner 12d also includes play button 36a, record button 36b, and print button 36c and is connected to a printer 46B via electrical cable 44. The printer 46B ejects a 2D barcode 20 upon pressing the print button 36c.

Figure 63:
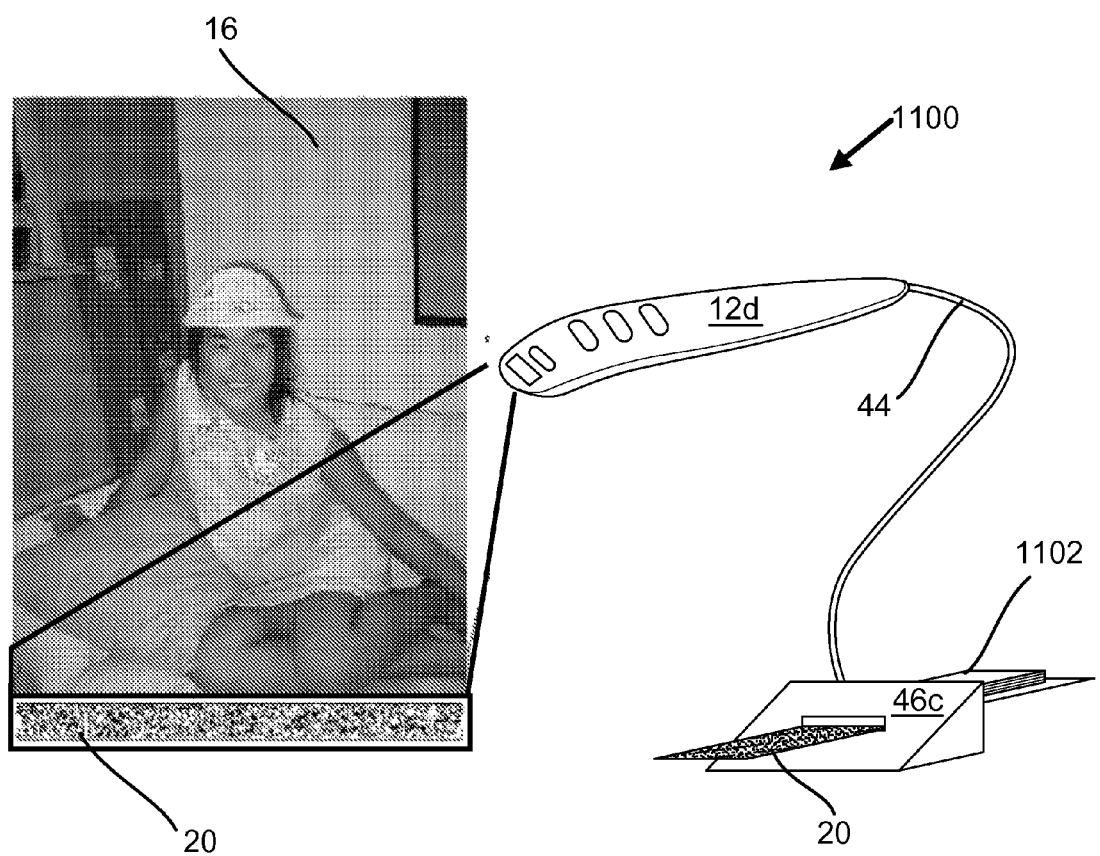
FIG. 63 schematically illustrates another embodiment of the handheld identifier reader system equipped with a paper cartridge.

FIG. 63 schematically illustrates the operation of another embodiment of the handheld identifier reader system equipped with a paper cartridge. Here system 1100 includes the scanner 12d of FIG. 62 to scan a barcode 20 previously affixed to image 16, replicates it, and ejects if printer 46c equipped with a paper cartridge 1102. The cartridge 1102 is loaded with a stack of sheets for printing single or multiple copies of the 2D barcode 20.

Figure 64:
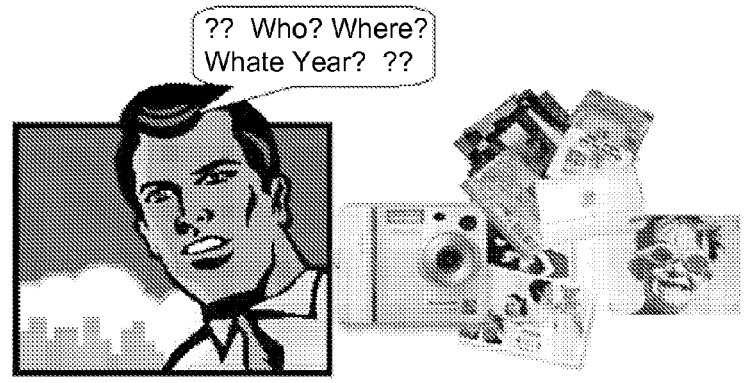
FIG. 64 illustrates a posed problem and a subsequent solution using the embodiment of FIGS. 62 and 63.
Figure 64:
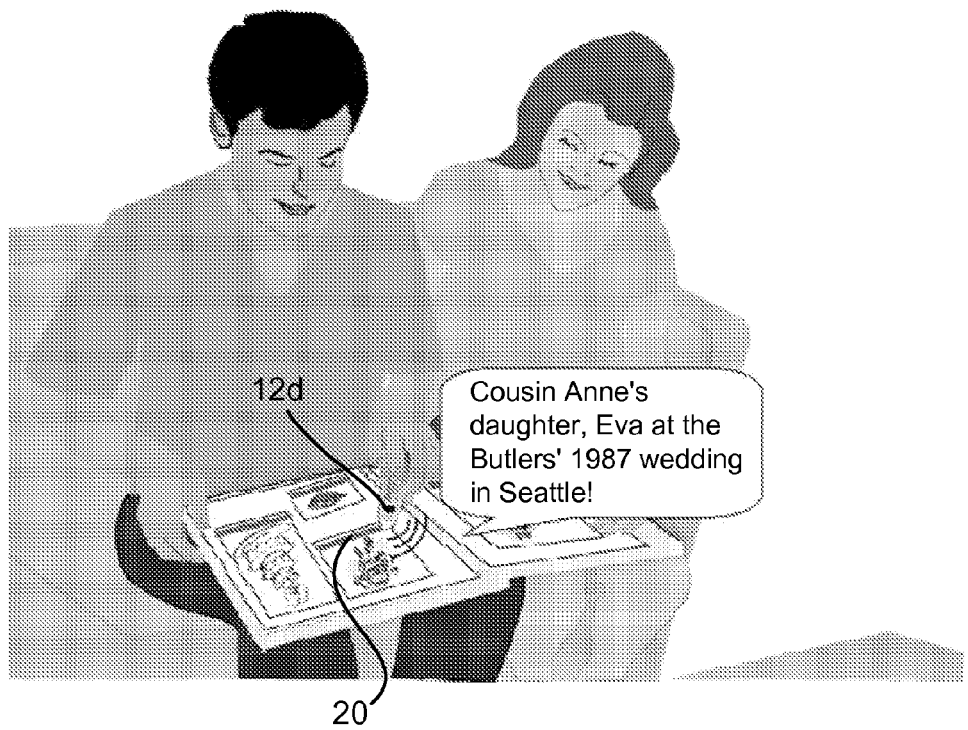

FIG. 64 schematically illustrates an example of a posed problem and a subsequent solution using the embodiments of FIGS. 62 and 63. The posed problem is schematically represented by a collection of photographs near a camera, with the head shot of a bewildered person presenting a query "Who? Where? What year?" as to which information pertains to certain images in the photograph collection. An answer is shown in the illustration beneath "The Solution". A sitting couple utilize the scanner 12d to read back barcodes 20 from images in a photograph book. The scanner 12d announces from speaker 42 "Cousin Anne's daughter, Eva at the Butlers' 1987 wedding in Seattle!".

Figure 65:
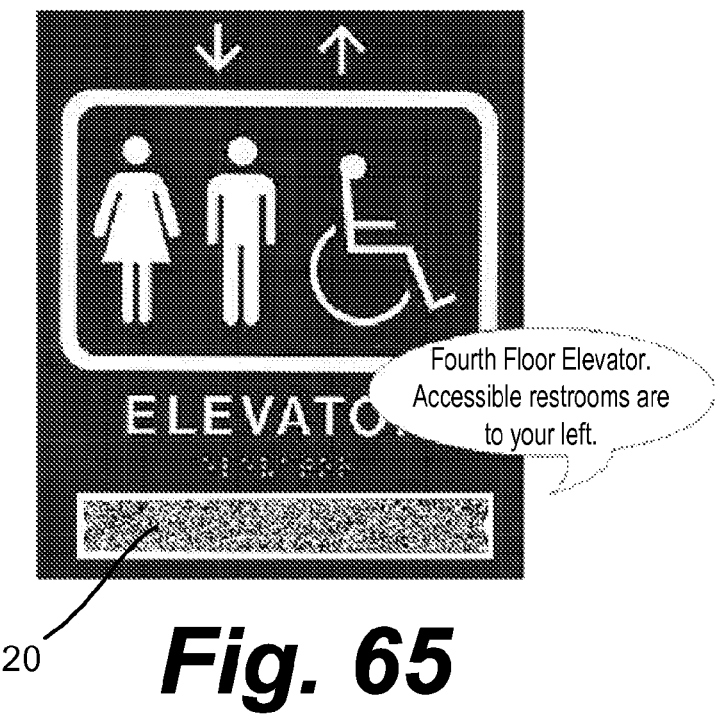
FIG. 65 illustrates an application of the prior embodiments to help the seeing impaired.

FIG. 65 schematically illustrates an application of the prior embodiments to help the visually impaired. Here a scanner (not shown) reads back a barcode 20 applied to the surface of an elevator sign and announces from the speaker 142 "Fourth Floor Elevator. Accessible restrooms are to your left".

Another example of the scanners 12-12d, 112-112a, and 1112 (discussed below) helping the impaired is provided in everyday living cases that require a document hardcopy of an oral transaction from the impaired person. For example, the recording of a visually impaired person or other person, for example a mentally challenged individual who unable to provide a signature acknowledging the contents of a contract, agreement, or instruction protocol but could at least convey a rudimentary understanding of the transaction in progress can be implemented in real time through the local use of on site scanners during a meeting. Other people present in the meeting and witnessing the negotiations may be confirmed in a series of documents to which the oral transaction are recorded in 2D barcodes 20 and subsequently affixed to the document. In such a scenario, the impaired person's voice is recorded by the scanners 12-12d, 112-112a, or 1112 to provide the local printing of 2D barcodes 20 for affixing to the document being discussed with the impaired person. The locally made barcode 20 provides a hardcopy record of an oral transaction event participated by the impaired person and is affixed to the document brought before the impaired person in real time. In cases when the visually impaired or mentally impaired person is able to voice an understanding of the document transaction, the witnessing person can make an oral pronouncement in a separate 2D barcode or other identifier in which the oral pronouncement either confirms, refutes, or otherwise disputes the understanding voiced and recorded in the impaired person's 2D barcode or other identifier. In another alternate embodiment, the impaired person's audio content and the witnessing person's audio content may be co-recorded within the same 2D barcode or other identifier. The document affixed barcodes, either separately produced by the impaired person and the witnessing person, or a co-produced as a combination impaired-witnessing 2D barcode may be signed and dated across the margins of the 2D barcodes in regions that do not compromise the data integrity of the pixels contained within the 2D barcodes.

Another barcode 20 identifying the witness to the transactions may also be made and affixed to the same document to which the impaired person's barcode 20 is affixed. In such a scenario, if ever questioned by a third party, adversarial or impartial, both the impaired person's barcode 20 and the witness person's barcode 20 may be scanned by the third party using scanners 12-12d, 112-112a, or 1112 for aural read back to the third party and all others present in listening range. In such a case, the recorded intent of the impaired person and the interest of the impaired person are protected. Furthermore, the witness or other person may sign and date across the periphery of the barcode 20 for both the witness and impaired person's barcodes 20 to further attest to the fidelity and to preserve the intactness or security of the document to which the impaired person has agreed to or otherwise acknowledged. Alternatively, a notary seal embossment with a notary's signature may be applied across the affixed witness and impaired person barcodes 20. Should a barcode 20 ever be removed from the document, a non-visually impaired document examiner will easily see signature or date and/or seal interruptions or discontinuities indicating document tampering or corruption.

Figure 66:
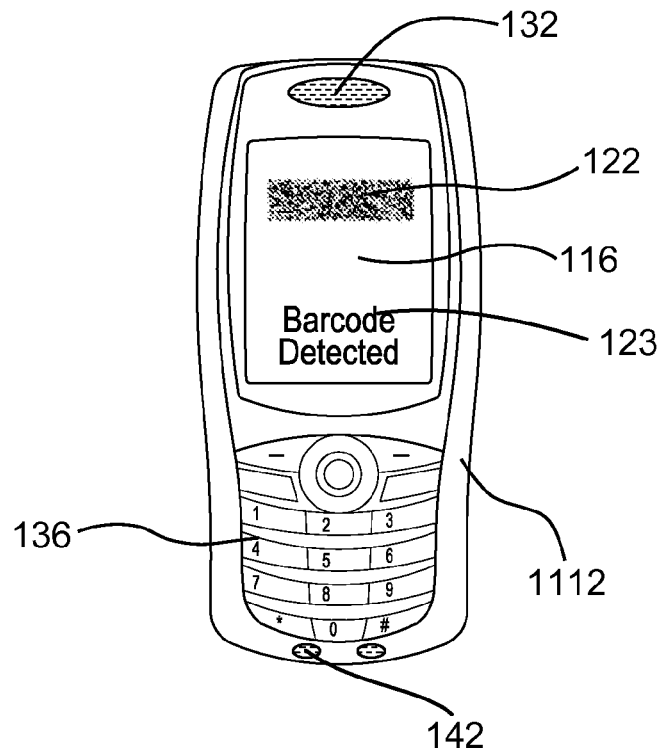
FIG. 66 illustrates an alternate cell phone embodiment of FIG. 5.

FIG. 66 illustrates an alternate cell scanner-phone 1112 embodiment of FIG. 5. Scanner-phone 1112 is programmed to present a screen image on display 116 showing barcode image 122 with an alphanumeric readable statement "Barcode detected" 123 to confirm the capturing and presentation of barcode image 122 of original barcode 20.

Figure 67:
FIG. 67 illustrates another problem and subsequent solution using the embodiment of FIG. 66.
Figure 67:
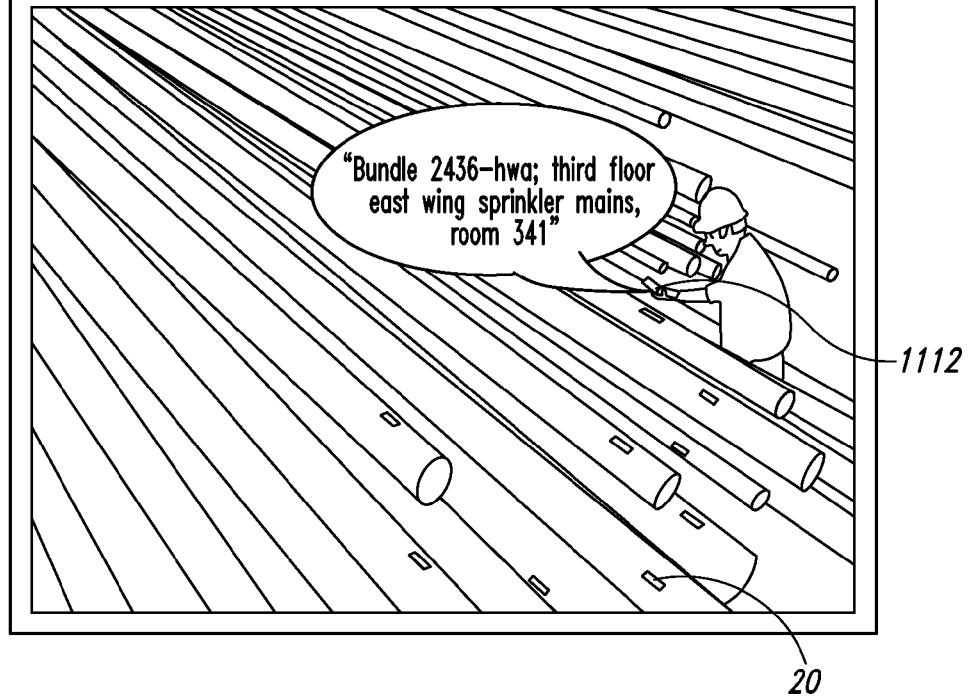

FIG. 67 schematically illustrates another example of a posed problem and a subsequent solution using the embodiment of FIG. 66. Here a workman near a stack of pipes holds the scanner-phone 1112 and calls in to ask "Hey Boss, what do I do with all these pipes?". When the boss is not available, the solution or answer is at the ready. The worker then scans the barcode 20 affixed to the pipes and hears the audible instruction "Bundle 2436-hwa; third floor east wing sprinkler mains, room 341".

FIGS. 68-73 illustrates alternate algorithm embodiments for image processing segments of a 2D barcode and subsequent reassembly to form a single 2D barcode having a single audio stream recording or processing multiple 2D barcodes and subsequent reassembly to form a multiple audio stream recording. Entering from process block 352 of FIG. 25 above, FIGS. 68-73 concern the image-processing of sub-regions of an original 2D barcode object for subsequent re-assembly into a combined or composite barcode image that has substantially the same audio content as the original 2D barcode object. Alternate algorithm embodiments concerning FIGS. 68-73 provide for image processing segments of a 2D barcode and subsequent reassembly to form a single audio stream recording or processing multiple 2D barcodes and subsequent reassembly to form a multiple audio stream recording. In scenarios involving capturing sub-sections of a barcode, a complete series of still images of the whole barcode is similarly sub-divided and contained within image segments of the whole 2D barcode object. Image processing a whole 2D barcode that has been captured into smaller subsections when, for example, the whole barcode extends beyond or is otherwise larger than the filed of view of hand-held readers 12, 12*a-c*, hand-held computer 112-112*d*, and/or camera 200 camera. The 2D barcodes, also known as Soundpaper barcodes, are created as a series of segments within a larger barcode. A segment separator precedes each segment. The segment separator includes a scheme for identifying each segment by number. Since each segment is numbered it is possible to recreate the entire barcode even when the segments are recovered out of order.

The hand-held readers 12, 12*a-c*, hand-held computer 112-112*d*, and/or camera 200 camera is configured to take a series of pictures. The image processing routine can take each picture and attempt to retrieve as many segments as possible from each image. The assumption is that the barcode as a whole is wider than the field of view of the camera, therefore a number of images can be required to piece together the whole barcode. In addition, it is assumed that the quality of the images may be very poor and it may be possible to recover only a limited number of segments from each image, including cases where there are no good segments recovered at all. Commonly an image sub-section captures up to 60 percent of the barcode.

The image sections, in a particular embodiment, are returned from the camera in "raw" format, 256 bits per pixel, either grayscale, color, or high contrast black and white. A series of image sections are acquired and examined for decodability using a video stream (VS) decoder before submitting the image sections to the more exacting sub-algorithms of FIGS. 68-73 described below. The VS decoder determines whether each segment is decodable or not. If it is decodable it is decoded and the data are stored for later decoding by cellular phone radio video coder/decoder, similar to the adaptive multi-rate (AMR) voice decoder. The decoder may wait until all the segments are available or, alternatively, continue until some audio threshold of decodable segments are acquired so that a minimum of the audio content is reproduced, and then resume decoding.

Figure 68:
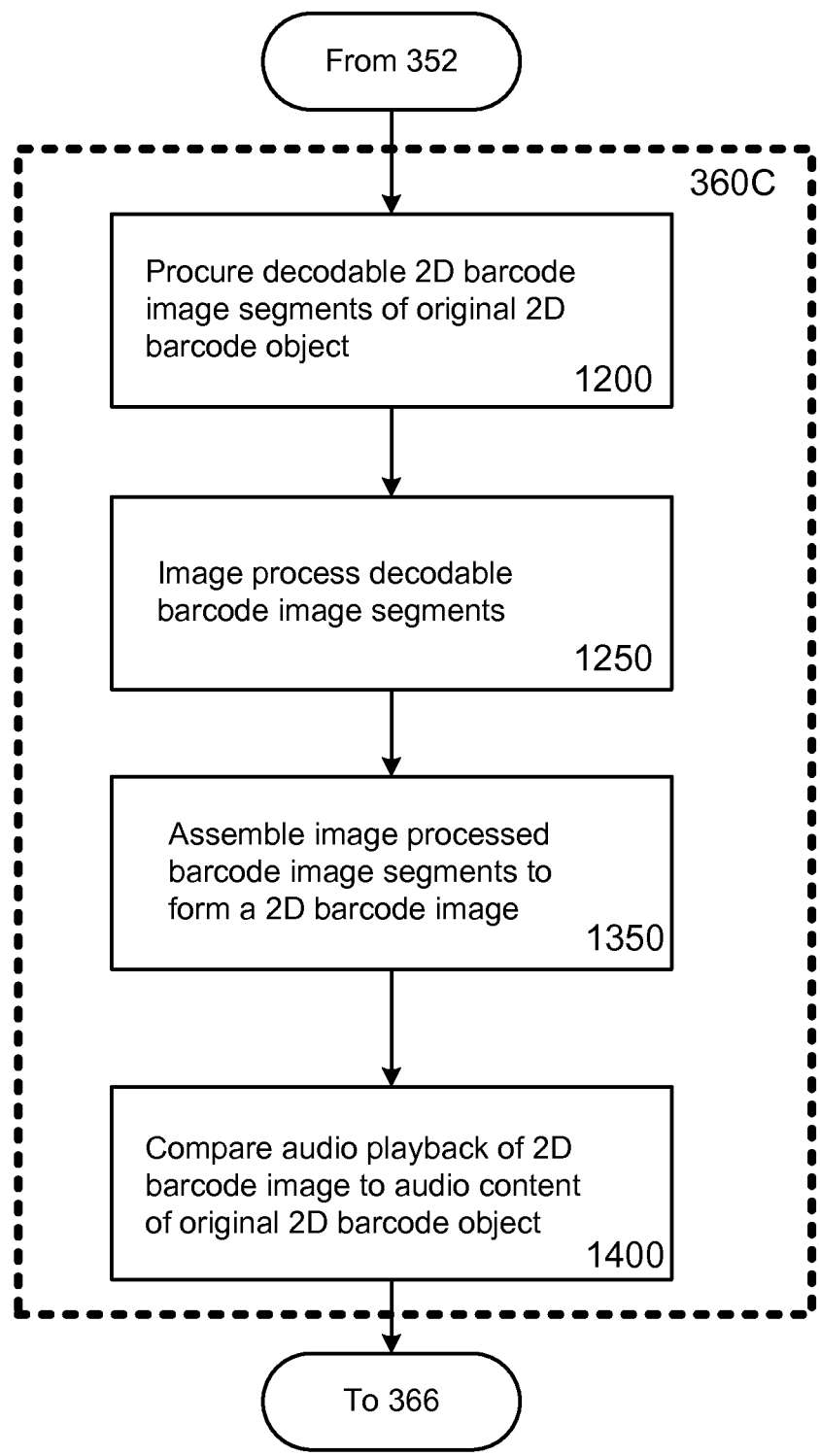
FIGS. 68-73 illustrates alternate algorithm embodiments for image processing segments of a 2D barcode and subsequent reassembly to form a single 2D barcode having a single audio stream recording or processing multiple 2D barcodes and subsequent reassembly to form a multiple audio stream recording.
Figure 79:
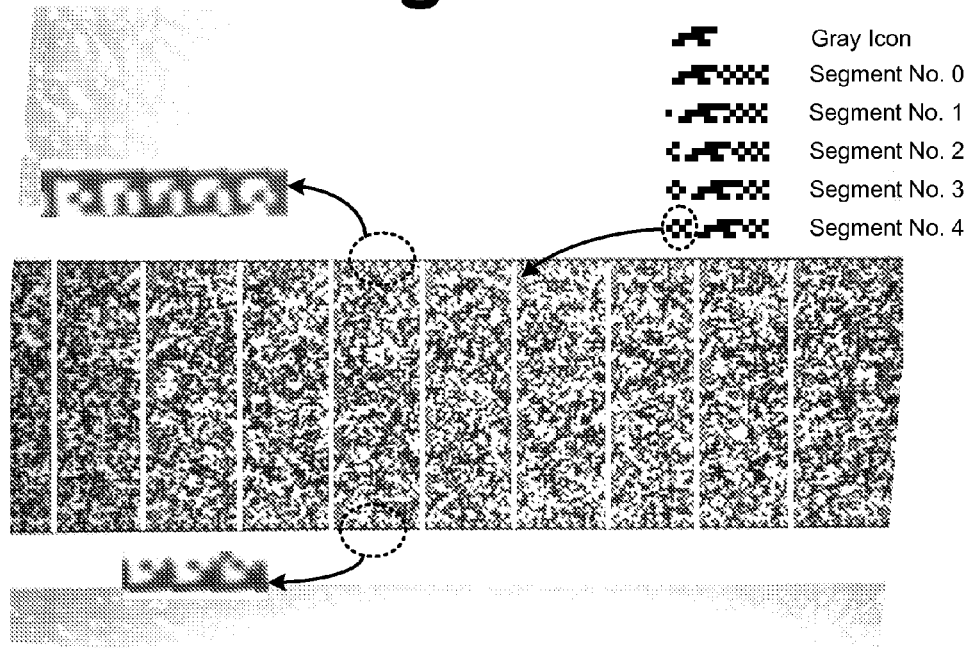

FIG. 68 present an overview of sub-algorithm 360C that describes a processing routine called ProcessImage. Computer executable code for ProcessImage is detailed in the Appendix. In general terms, The image processing algorithms employed in ProcessImage involves the following steps: Assume the final segment is 84 (length) by 30 (high). Step across each pixel in the segment (84). Step down each row in the segment (30). Find the equivalent spot in the larger image. That is, map the larger image into the smaller image. Copy that pixel (sample) into the smaller segment image. Alternate embodiments of the image processing code concern "Finding the equivalent spot in the larger image." This routine takes into account that the segment in the larger image is not a square, but most likely trapezoidal. Roughly speaking you step over "imageScale" for each smaller pixel, and then adjust by how much the lines bend in or out, or up and down. The basic approach to ProcessImage is to divide the segment vertically into 5 or more zones. Then examine each zone to see how high the gray code or segment number identifier icon is from the bottom of the zone. If it's at the bottom then it's a zero, up one pixel then it's a one, etc, as shown in FIG. 79 below.

Entering from process block 352 from FIG. 25, sub-algorithm ProcessImage 360C begins with process block 1200 where at least one, and usually a multiple of decodable 2D barcode image segments are obtained form an original 2D barcode object. Thereafter, at process block 1250, image processing algorithms are applied to the decoded barcode segments. Then, at process block 1350, the identification of the segment number for the segment or segments is/are identified and may be decoded using the 2D barcode decoder. The segment or segments contains a subset of the entire audio content or sound message payload of the larger 2D barcode and may be completely decoded as a standalone sub-portion of the 2D barcode. Thereafter, in process block 1400 the segment is sent to a 2D barcode decoder (VS in this particular embodiment), and then to the sound decoder. Using the scanning and playback function of the hand-held readers 12, 12*a-c*, handheld computer 112-112*d*, and/or camera 200 camera, the audio message of the re-assembled 2D barcode of is either directly listened to by the user and compared with the playback of the original 2D barcode object, or otherwise compared by acoustic analysis using audio testing equipment. If substantially the same, the re-assembled barcode is mass produced or otherwise used. Thereafter, process block 360 is completed and exits to process block 366 of FIG. 25. Microprocessor executable software code operating within sub-algorithm 360 may be found in the appendix under the heading ProcessImage. Microprocessor executable code for sub-routines within ProcessImage include Blines, SegmentNumber, inRange, FindSyncCode, FindGrayCode, hand shaking, KBVerticalLine and others listed in the Appendix.

Figure 69:
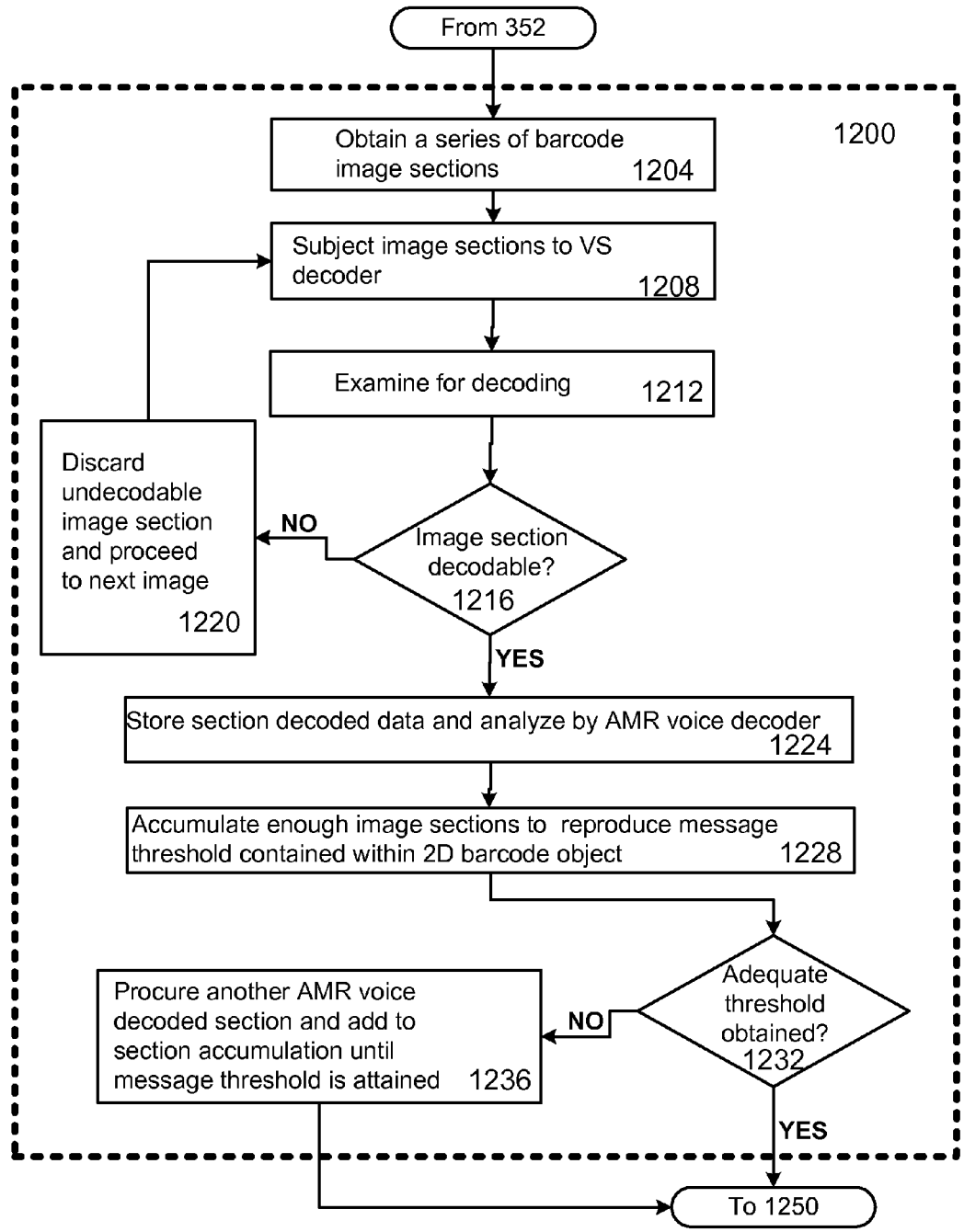

FIG. 69 is an expansion of sub-algorithm 1200 of FIG. 68. Entering from process block 352 of FIG. 25, sub-algorithm 1200 begins with process block 1204 in which a series of barcode image sections are obtained of the original 2D barcode object. Then, at process block 1208, the image sections are subjected to decoding by a V.S. decoder, and examined for decoding at processing block 1212. Thereafter, at decision diamond 1216, a query "Image sections decodable?" is presented. If the answer is negative for decodability, sub-algorithm 1200 continues to process block 1220 in which data from the undecodable image is discarded and the next image section is selected and re-routed to processing at process block 1208. If the answer is positive for decodability, sub-algorithm 1200 continues to process block 1224 wherein the decoded data of the image sections is stored an analyzed by an adaptive multi-rate (AMR) decoder. Thereafter, at process block 1228, enough data sets of image sections are accumulated to an audio threshold that is generally defined to be that which substantially reproduces the audio message contained within the original 2D barcode object. At decision diamond 1232, a query "Adequate threshold obtained" is presented. If the answer is positive for obtaining an adequate threshold, sub-algorithm 1200 is complete and exits to sub-algorithm 1250. If the answer is negative for obtaining an adequate threshold, sub-algorithm 1200 continues to process block 1236 in which another AMR voice decoded section is acquired and added to the section accumulation until an adequate message threshold is attained. Once the message threshold and/or audio content threshold obtained, sub-algorithm 1200 is completed and exits to process block 1250 of FIG. 68. Images may be captured using a standalone camera or as part of the overall image processing algorithms. Variations of the VS barcode and AMR decorder and may be inserted into the processing blocks where called out in the algorithms.

Figure 70:
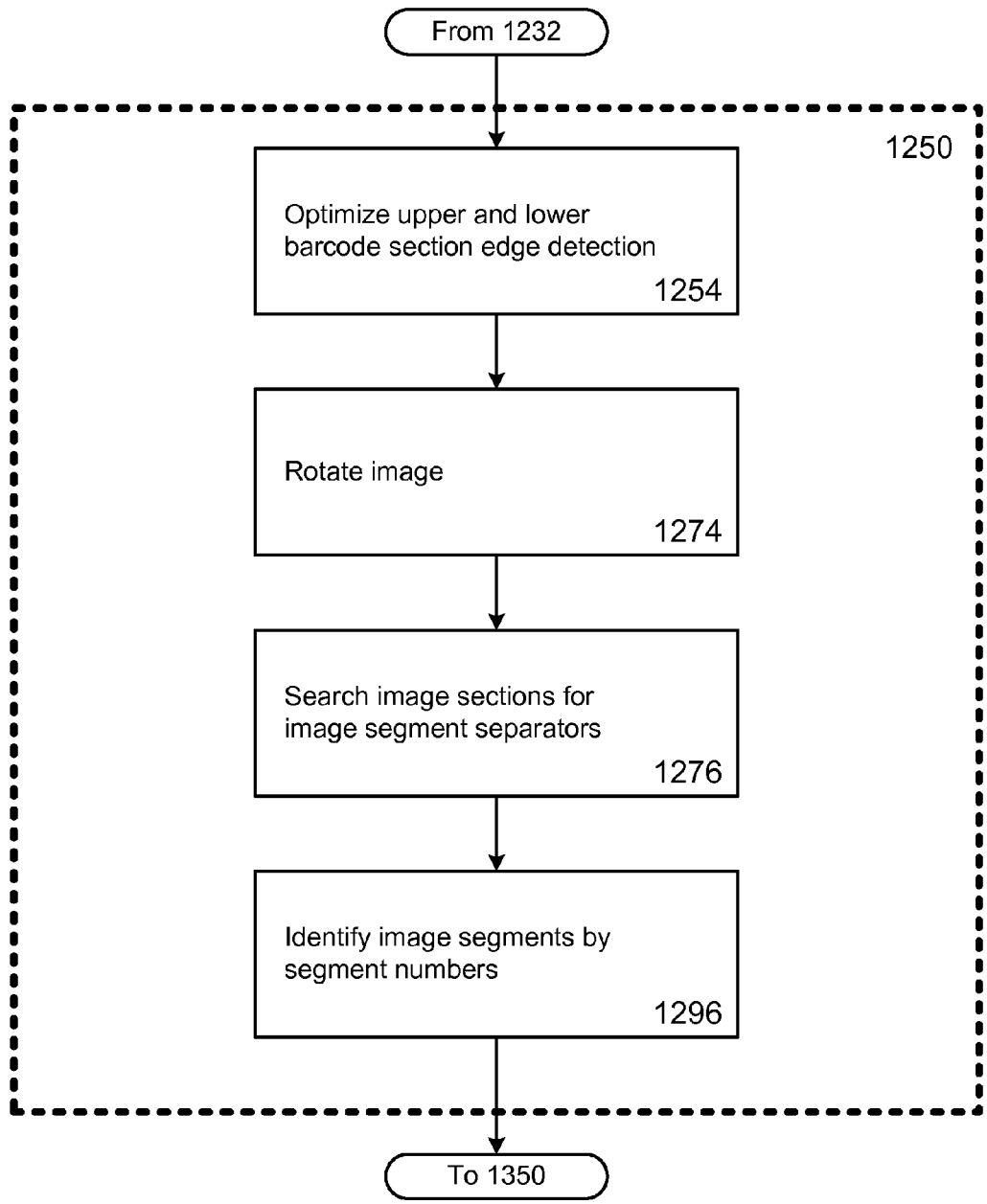

FIG. 70 is an expansion of sub-algorithm 1250 of FIG. 68. Entering from process block 1232 from FIG. 70, sub-algorithm 1250 begins with process block 1254 where at least one, and usually both the upper and lower barcode edges are optimized for boundary detection of the edges. Then, at process block 1274, the images of the barcode photo sections, either individually and/or as an aggregate, are rotated. Thereafter, at process block 1276, the photo sections, either individually or as an aggregate, are searched for the pixel patterns defining the identification number for a given segment separator. An example of the pixel patterns defining series of segment separators are shown in FIG. 79 for segment separators numbers 0-4. Then, at process block 1296, segment separator numbers identifies the segments within the photo sections. Thereafter, sub-algorithm 1250 is completed and exits to process block 1350 of FIG. 68.

Figure 71:
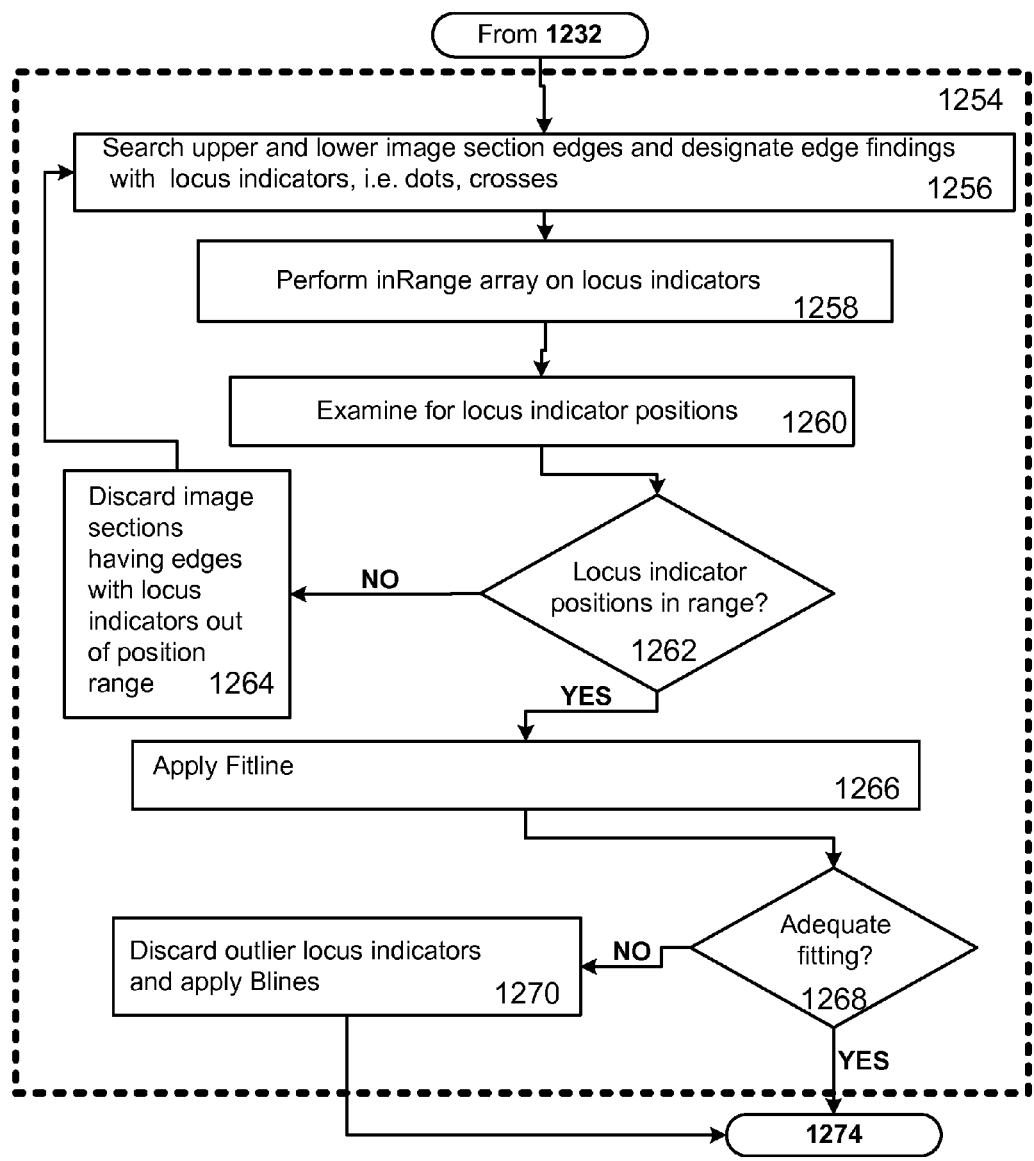

FIG. 71 is an expansion of sub-algorithm 1254 of FIG. 70. Entering from process block 1232 of FIG. 69, sub-algorithm 1254 begins with process block 1256 in which the upper and lower image sections edges are searched, and the edge findings are designated by overlaying locus indicators onto the edges. For example, white dots and crosses similar to the white dots 1452 and white crosses 1456 illustrated in FIGS. 75 and 76 below represent locus indicators that may be overlaid. Then, at process block 1258, inRange software code is executed to the array of locus indicators. Thereafter, at process block 1260, the locus indicator positions are examined. Then, at decision diamond 1262, a query "Locus indicator positions in range?" is presented. If the answer is negative for locus position being in range, sub-algorithm 1254 continues to process block 1264 in which data concerning the out-of-range locus indicators is discarded and the next image section is selected and re-routed for processing at process block 1256. If the answer is positive for locus position being in range, sub-algorithm 1254 continues to process block 1266 wherein Fitline software code is executed to the in range locus indicators. Thereafter, at decision diamond 1268, a query "Adequate fitting?" is presented. If the answer is positive for adequate fitting, sub-algorithm 1254 exits to sub-algorithm 1274. If the answer is negative for adequate fitting, sub-algorithm 1254 continues to process block 1270 in which locus indicator outliers are discarded and Blines software code is executed to the outlier-depleted locus indicators. Sub-algorithm 1254 is then completed and exits to sub-algorithm 1274 of FIG. 70.

Figure 72:
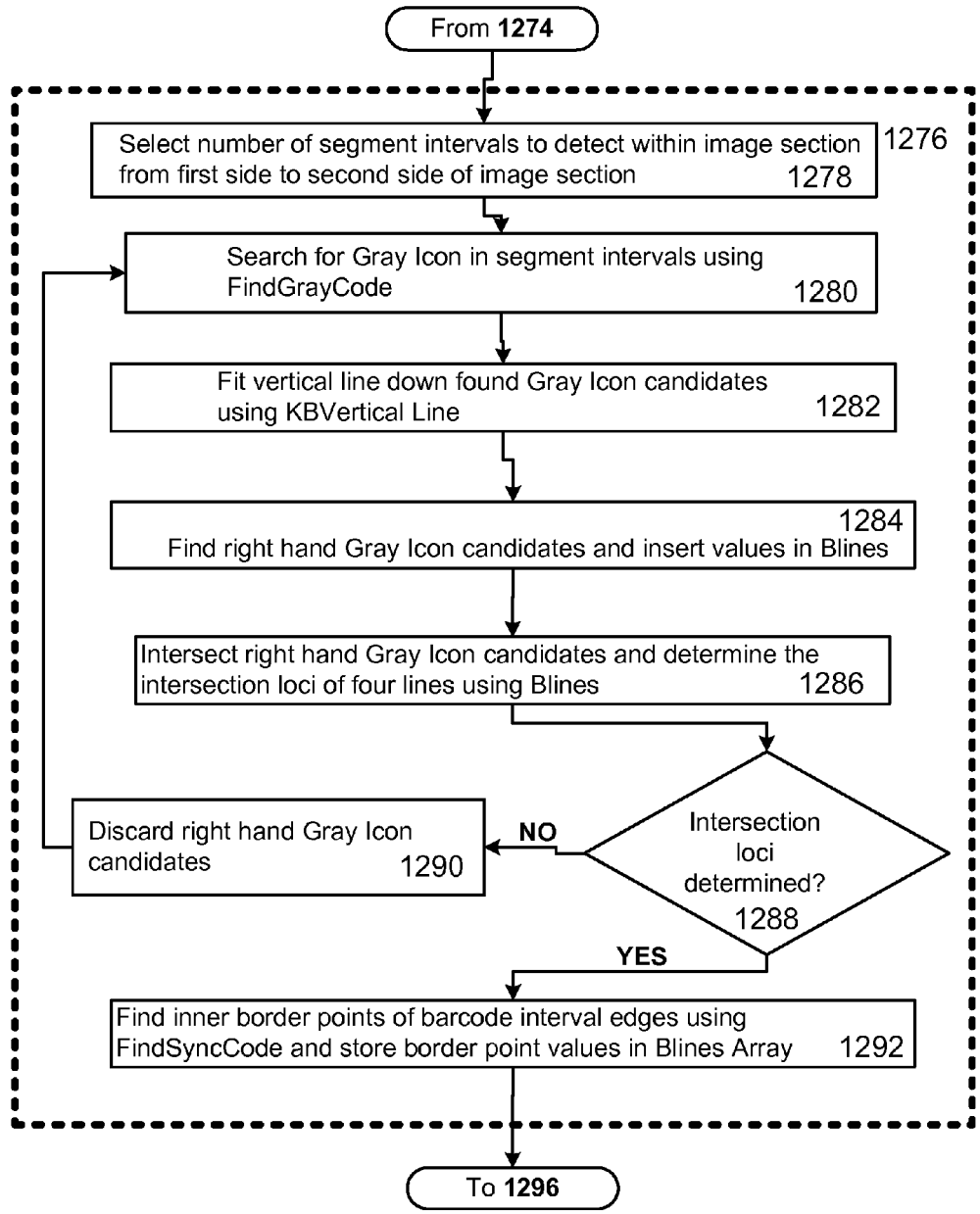

FIG. 72 is an expansion of sub-algorithm 1276 of FIG. 70. Entering from process block 1274 of FIG. 70, sub-algorithm 1276 begins with process block 1278 the number of segment intervals is selected for detection within the image sections and generally proceed from the left to the right side of the image section, or the near side to the far side, or left to right. Alternate embodiments allow for reversing the direction from right to left. The number of interval segments that is searched need not be fixed but may adjustable. Then, at process block 1280, FindGrayCode software code is executed to find the pixel patterns exemplary illustrated in FIG. 79 to the chosen number of separator intervals. Thereafter, at process block 1282, KBVerticalLine software code is executed to the found gray icon candidates. Then, at process block 1284, the gray icon codes are searched for right hand candidates, to which at process block 1286, Blines software code is executed to the right hand gray icon candidates, and then examined for intersection loci points that have four lines intersect through. Then, at decision diamond 1288, a query "Intersection Loci Determined?" is presented. If the answer is negative for intersection loci, at process block 1290, the gray icon candidates are discarded and a new search for gray icon candidates resumes at process block 1280. If the answer is positive for intersection loci, then sub-algorithm 1276 continues to process block 1292 in which the inner points of barcode interval edges are found via the execution of FindSyncCode software code. At decision diamond 1232, a query "Adequate threshold obtained" is presented. If the answer is positive for obtaining an adequate threshold, sub-algorithm 1200 is complete and exits to sub-algorithm 1250. If the answer is negative for obtaining an adequate threshold, sub-algorithm 1200

Figure 73:
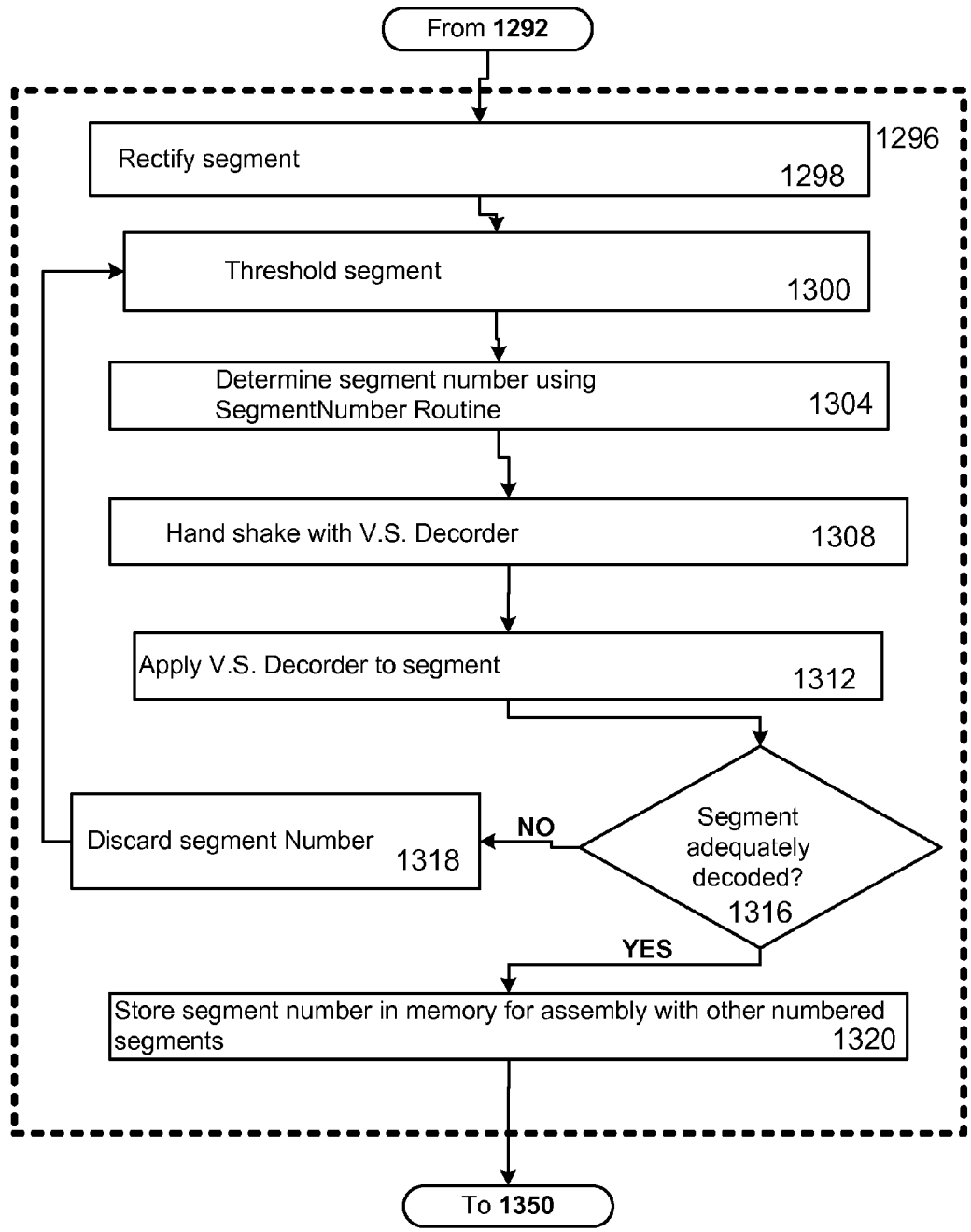

FIG. 73 is an expansion of sub-algorithm 1296 of FIG. 70. Entering from process block 1272 of FIG. 70, sub-algorithm 1296 begins with process block 1298, Rectify segment, in which the segment is rectified, and at process block 1300, subsequently thresholded. FIGS. 80-85 below represent examples of rectification, thresholding, and other algorithm processes within sub-algorithm 1296. After thresholding, the segment numbers within the 2D barcode images is determined by software code SegmentNumber in process block 1304. Once the segment number or numbers is determined, communication with software code available from communication or handshaking with microprocessor is achieved using VS decoder at process block 1308. Hand shaking may be executable by the microprocessor to run asynchronously in which the VS decoder waits for segments to be fed to it from the image processing system which is running as a different process. In an alternate embodiment, the camera takes a picture and sends it to the image processing program, sends all the segments to the VS Decoder to determine which segments are valid and then take another image. At the same time it has to take images very quickly so that the user has a good experience and doesn't perceive a delay in taking and processing pictures. Ideally the user is not aware that pictures are being taken—the user simply aims the scanner at the barcode, presses a button, waves the scanner around and hears a sound that a series of images was taken—all to occur in within generally one second.

After hand shaking, the segment is subjected to VS decoding at process block 1312. The VS decode is pretty fast per segment so that when an image comes in with a half dozen segments rapid decoding is possible, even when the image rate is ranges from 5 to 10 images per second. Alternate embodiments provide that segments may be pulled out of each image and send them to the decoder in a batch, or may be further processed each segment as it emerges from of the image processor. Thereafter, at decision diamond 1316, a query "segment adequately decoded" is presented. If the answer is negative for adequate decoding, sub-algorithm 1296 continues to process block 1318 in which the segment number is discarded and re-routes to process block 1300 to re-threshold the segment. If the answer is affirmative for adequate decoding, sub-algorithm 1296 continues to process block 1320 where the segment numbers are stored in memory for assembly with other numbered segments. Sub-algorithm 1296 is then completed and exits to subalgorithm 1350 of FIG. 68.

FIGS. 74-88 illustrate a series of 2D barcode image segments undergoing the image processing algorithms described in FIGS. 68-73.

Figure 74:
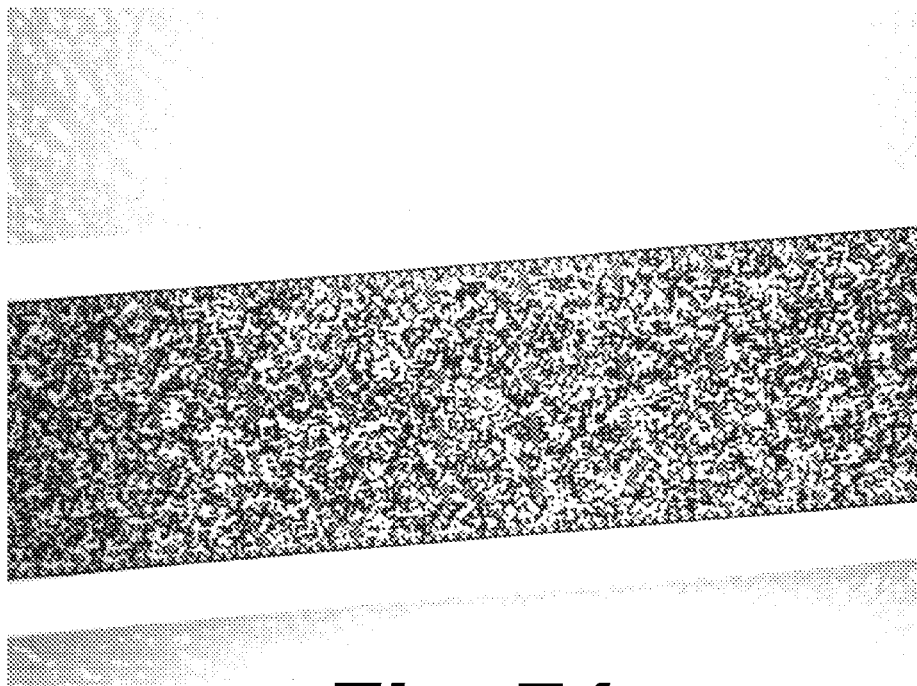
FIGS. 74-88 illustrate a series of 2D barcode image segments undergoing the image processing algorithms illustrated in FIGS. 68-73.

FIG. 74 illustrates an unprocessed image of a 2D barcode object. Multiple image sections taken of this original 2D barcode object is then subjected to the image processing algorithms described for FIGS. 68-73.

Figure 75:
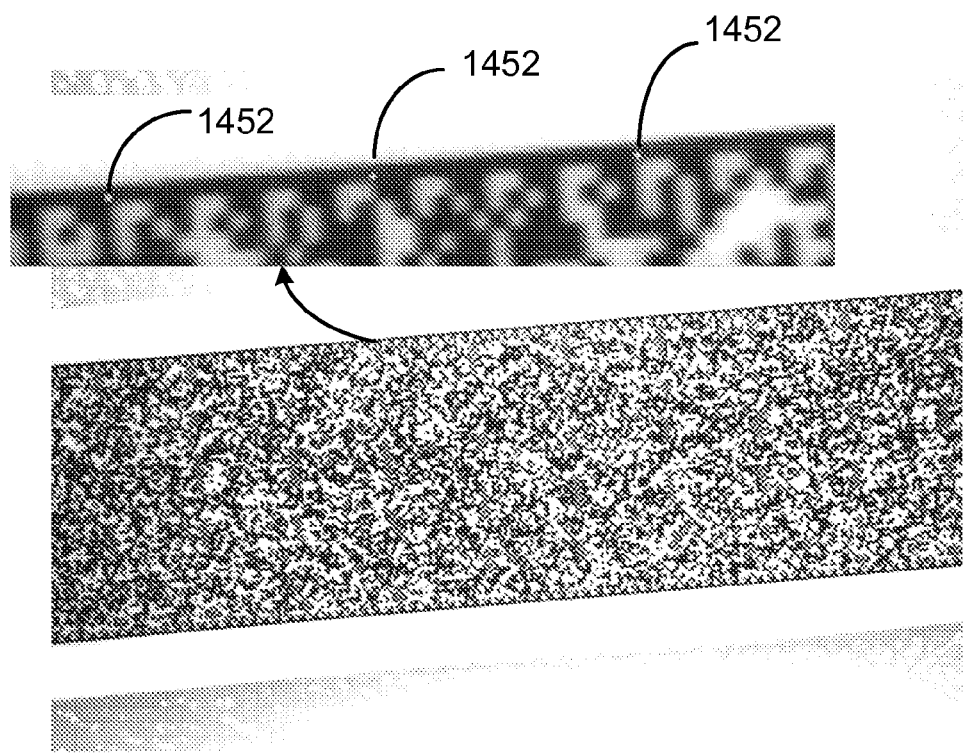

FIG. 75 illustrates an image of FIG. 74 that supplies the image data that can undergo the processing described for FIGS. 68-73. In brief, ProcessImage is used to identify the location of the barcode within the image. It uses the FindEdge routine to identify edge locations, then FitLine routine to fit a straight line across the points on the edge. As shown in the inset, a magnified section of the upper edge illustrates a series of white dots 1452 is overlayed along the upper border of the section image to designate where the edge of the upper border of the 2D barcode was discerned.

Figure 76:
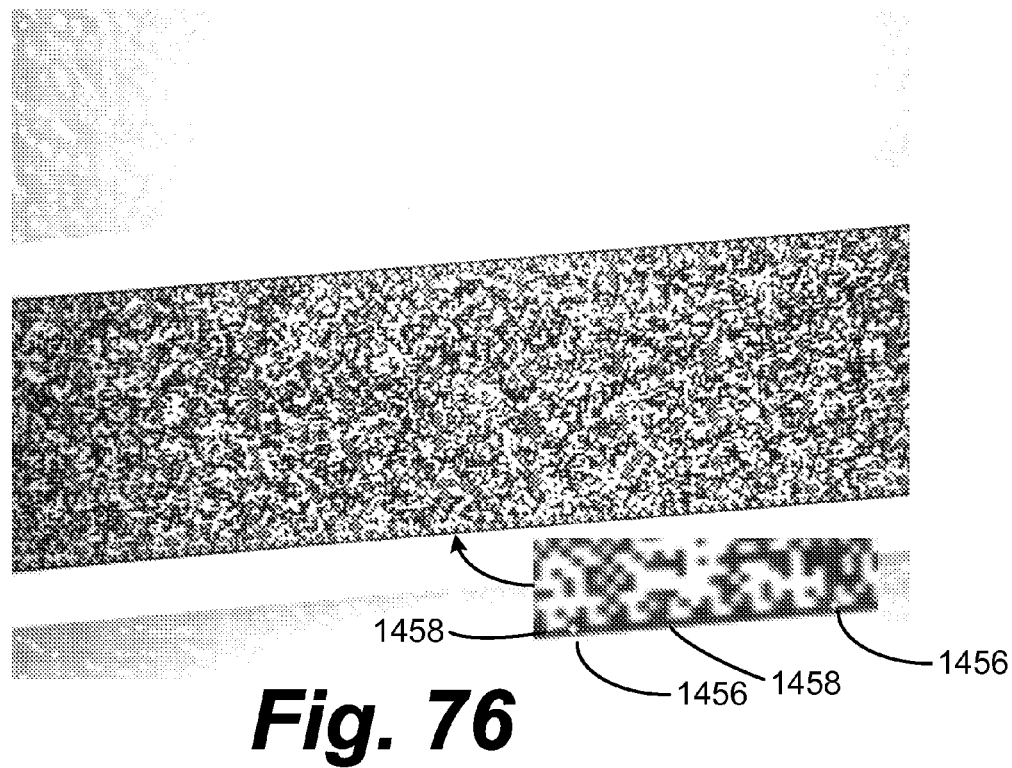

FIG. 76 illustrates an image to which a series of white crosses 1456 and white dots 1458 are overlayed along the lower border where the edge of the lower border of the 2D barcode was discerned.

Figure 77:
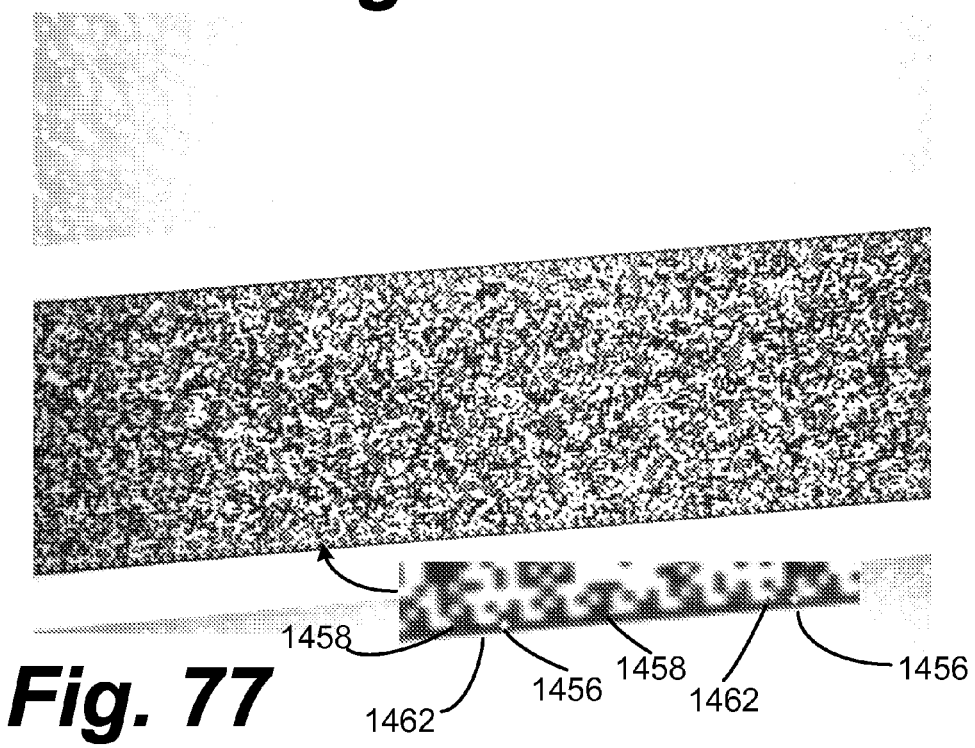

FIG. 77 illustrates the image of FIG. 76 and shows the lower 2D boundary after fitline improves the line using black dots 1462 to designate the fitted boundary location.

Figure 78:
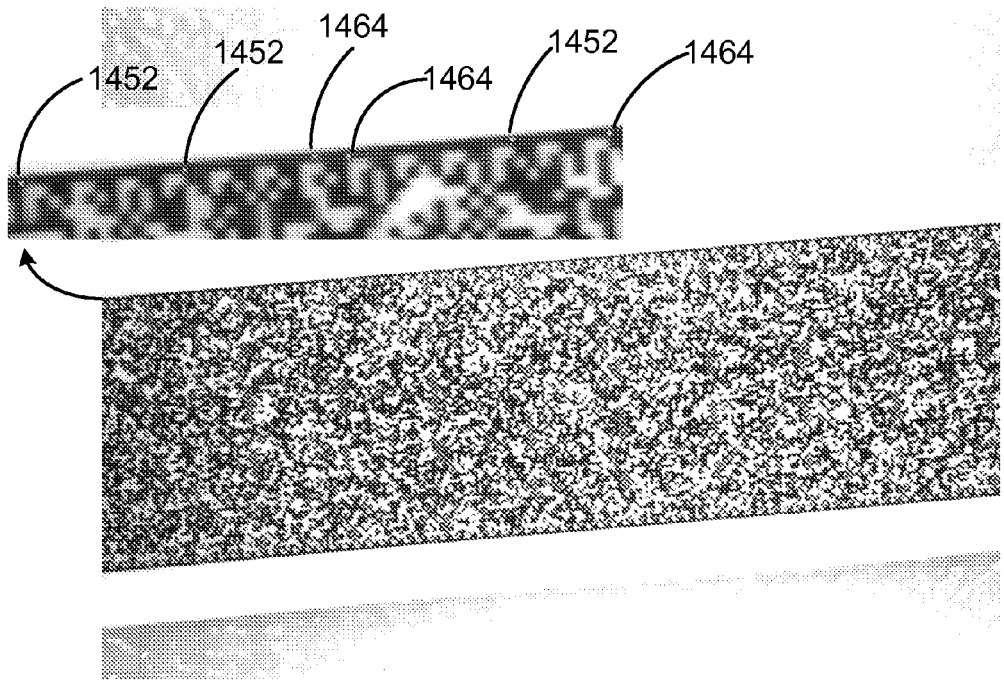

FIG. 78 illustrates an improvement of the upper barcode edge boundary after employing fitline. The improved boundary is designated by overlayed white dots 1464.

FIG. 79 illustrates the optimized edge detection of barcode segments per sub-algorithm 1254 that, as an aggregated image is rotated per sub-algorithm 1274. The rotated image is ready for undergoing segment searching as described for sub-algorithm 1276. Three-pixel wide separators are interspaced between 2D barcode segments and contain a grey icon that is associated with a checker board pixel pattern. Insets above the rotated 2D barcode illustrate the gray icon, along with a representative sampling of segment numbers 0-4 in which a checkerboard pixel variation positioned about the gray icon. As illustrated, a selection of gray icon series is shown having different checkerboard patterns that designates a particular segment number described within a unique 3 by 16 pixel array. The subroutine FindGrayCode identifies the gray code icon and associated checkerboard pattern to determine the 2D barcode segment number. A left-to-right or a right-to-left direction may selected to initiate and complete FindGrayCode. As illustrated, nine white bars that approximate the leftward edge of each 3-pixel wide separator illustrate the boundaries of eleven partial to complete barcode segments. Magnified insets illustrate the upper and lower 3-pixel wide edge patterns. The checkerboard pattern lassoed from separator number 4 points to an example of a pixel checkerboard patterns to the right the white bars. The computer executable code aligns the white bars along the edges of the separators under conditions when the barcode image section is distorted, and the barcode separators are angled from the vertical, or horizontal, for example when the rotated barcode image section remains tilted or otherwise askew as compared to being fully squared off. Other alternate embodiments allow for finding segment separators having pixel patterns other than the 3 by 16 pixel arrays of the gray code icon series.

Figure 80:
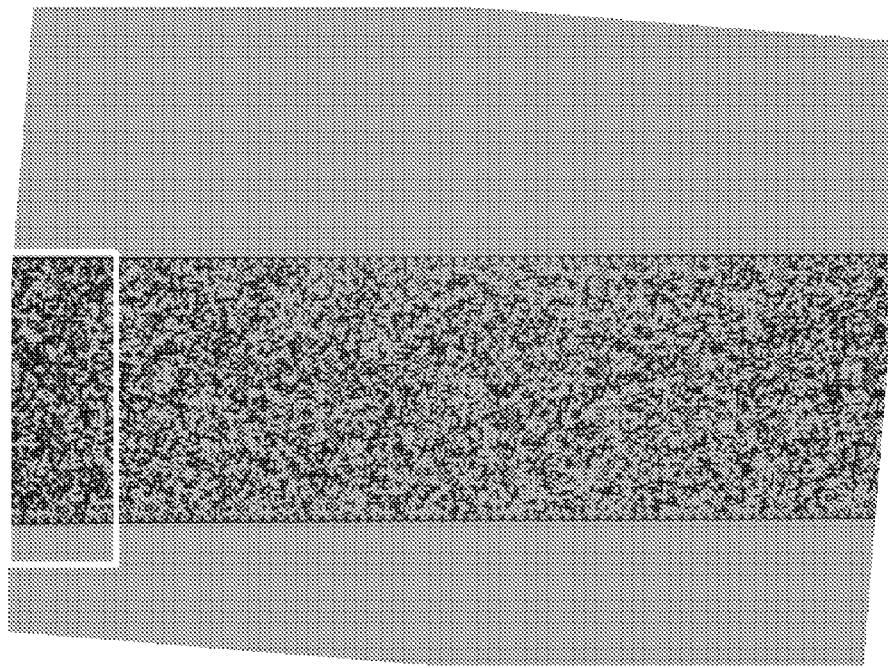

FIG. 80 illustrates an image having a white-bordered rectangular search region. The background has been darkened to make the search region stand out. The routine FindGrayCode is used to identify the Gray Codes.

Figure 81:
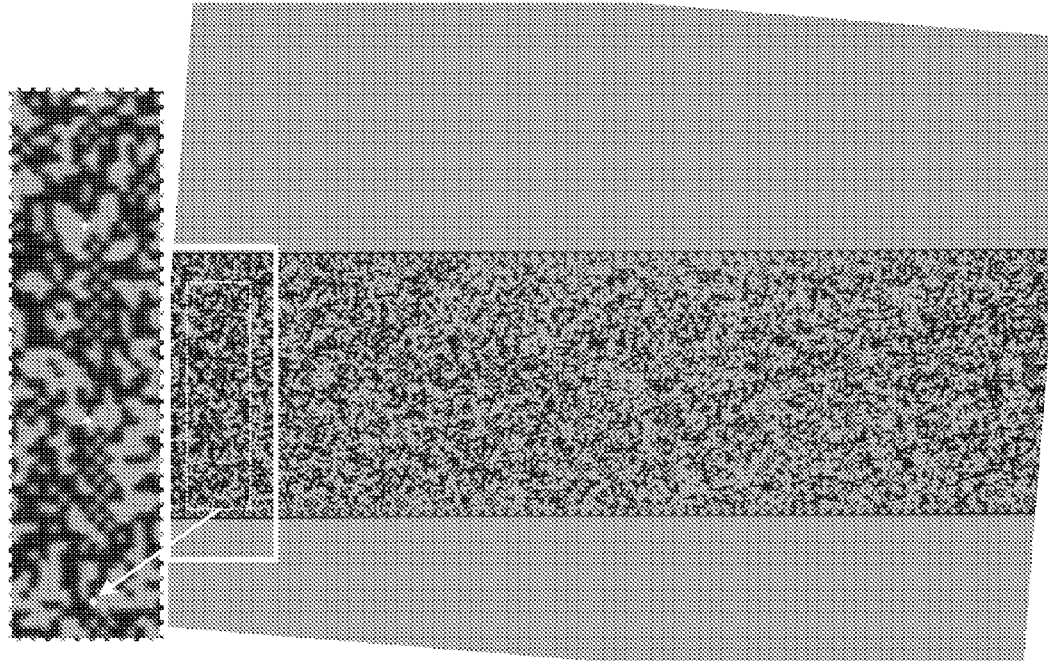

FIG. 81 illustrates a dashed white bordered sub-rectangle within the larger white-bordered search region in which white crosses are overlayed to designate the gray codes that provide segment loci to undergo the routine KBFindverticalLine that fits a line down the Gray Codes. This line can be close to vertical, but may vary should the image be distorted, in particular by key stoning, or a trapezoid-like distortion occurs where the top or bottom is elongated. Having found the left side Gray Codes it then moves on to find the right side gray codes. Alternatively, the left hand gray codes may be stored as they can be the next segment's left hand gray codes.

Figure 82:

FIG. 82 illustrates an image with a rectangle drawn around the newly identified region, based on the lower left corner and height and width. Without image distortion, FIG. 82 is substantially equivalent to FIG. 81 when the lines are drawn based on the actual contents of the BLines array. However, when distorted, FIG. 82 can appear differently than FIG. 81.

The program then attempts to find the intersection of each of the lines described by BLines. This process converts the lines from being described by mid-points and slopes to corners. The corners are stored in array IPoints. Any problem with finding the intersections causes the program to give up on this segment and return to the beginning of the segment loop.

Figure 83:

FIG. 83 illustrates an 2D barcode image and shows new segment boundaries. At this point the vertical lines are geometrically consistent, but the horizontal lines are too varied. The next section of code improves the horizontal lines. As described in the barcode documentation there is a triple border around the barcode as a whole. The inner border is a checkerboard pattern. In the code it is referred as the "sync code". Findsynccode is used to find first the top sync codes, then the bottom sync codes. New lines are computed using Fitline across the sync code locations and put into BLines. Note that we needed to go from BLines to IPoints then back to BLines and (below) back to iPoints.

Figure 84:
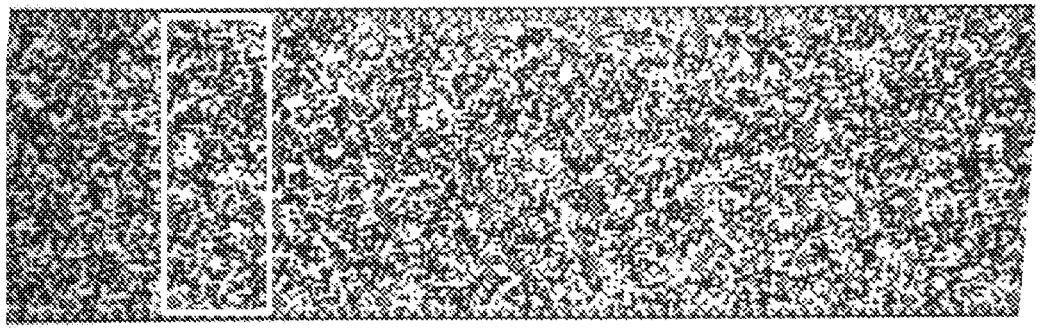

FIG. 84 illustrates a 2D barcode image and shows the top and bottom sync codes marked. Then the intersection routine again to recreate the IPoints array with the new top and bottom lines.

Figure 85:
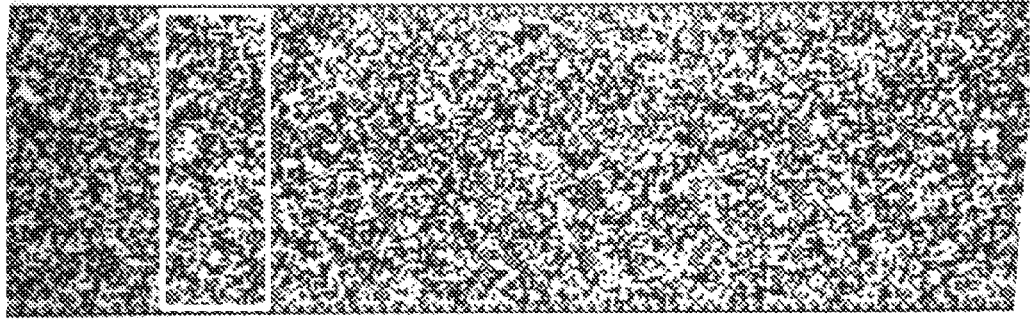

FIG. 85 illustrates a 2D barcode image having new segment boundaries that are substantially improved. Alternate embodiments provide for the optimization to improve the original horizontal edge finder so that the sync codes are not needed to find these lines that are nor longed required. Removing the sync codes provides memory conservation. The code in the subroutine KBVerticalLine employs Gray Codes to identify the vertical lines.

At this point working on the segment image may begin. The first job is to identify the segment number. Routine SegmentNumber does this (described below). SegmentNumber returns −1 if it fails to identify the segment, this image is discarded and a new segment is analyzed. Thereafter, the image segment is subjected to the microprocessor executable code of RectifySegment followed by ThresholdSegment. Executable code is listed in the appendix.

Thereafter, the segment is recreated and subjected to the VS Decoder algorithms. In alternate embodiments the current code leaves the segment separator on. Other alternate embodiments may remove or strip off the separators of the recreated and VS Decoded images.

Figure 86:
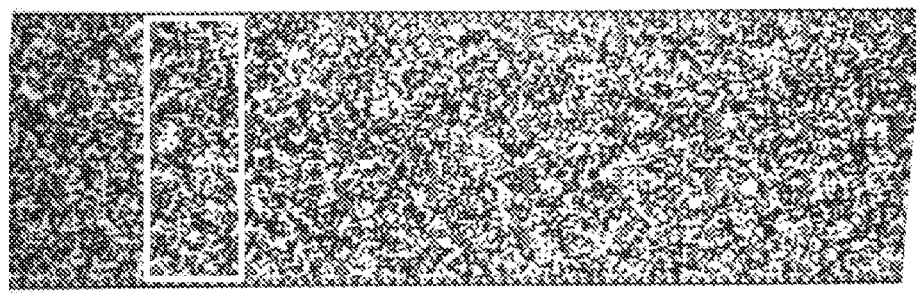

FIG. 86 shows the illustrated image after the barcode has undergone microprocessor executable code of RectifySegment sub-algorithm 1298. A white rectangle highlights the barcode segment undergoing RectifySegment.

Figure 87:
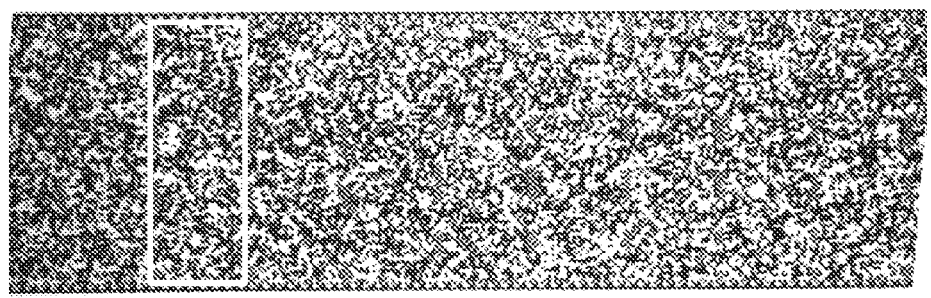

FIG. 87 shows the illustrated image after the barcode has undergone ThresholdSegment sub-algorithm 1300. A white rectangle highlights the barcode segment undergoing ThresholdSegment.

Figure 88:
Figure 88:
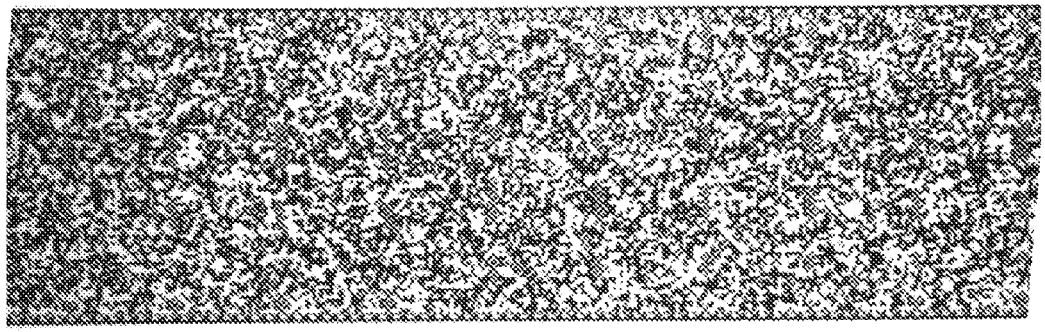
Figure 88:

FIG. 88 shows the illustrated image after the barcode has undergone ThresholdSegment sub-algorithm 1300 and is re-assembled. This re-assembled 2D barcode image then undergoes a audio content check to verify that the audio message contained in the re-assembled image is substantially the same as the audio content of the original 2D barcode per process block 1400 of FIG. 68. Using the scanning and playback function of the hand-held readers 12, 12*a-c*, hand-held computer 112-112*d*, and/or camera 200 camera, the audio message of the re-assembled 2D barcode of FIG. 88 is listened to by the user and compared with the playback of the original 2D barcode. If substantially the same, the re-assembled barcode is mass produced or otherwise made used. Alternatively, audio analysis of the re-assembled 2D barcode and its original object may be undertaken to establish substantial equivalency in acoustic characteristics.

While embodiments of the present invention have been illustrated and described, it is understood that changes may be made without departing from the spirit and scope of the invention. For example, vendors who print images from customer-supplied digital media may be equipped with microphone-equipped readers that record a customer's voice and generates a sound-encoded or voice-encoded identifier to accompany the digital image files presented by the customer. Accordingly, the scope of the invention is not limited by the disclosure of the preferred embodiments. Instead, the invention is to be determined entirely by reference to the claims that follow.

Appendix

Source code and notes

Console.cpp is mostly handshaking code, reading and writing files:

```
#include "stdafx.h"
include <stdio.h>
#include "consoleDSP.h"
#ifdef WIN32_BUILD
include <conio.h>
include <windows.h>
endif
#include "typedefs.h"
#include "CameraControl.h"
#include "HandShake.h"
#include "Graphics.h"
#include "ImageRoutines.h"
#include "Rectify.h"
#include "Rotate.h"
#include <math.h>
#include "ProcessImage.h"
#include "FileOperations.h"
#include "Find.h"
#include "SegmentLoop.h"
//typedef int bool;
extern FILE *fp;
extern FILE *dfile;
extern int imageCount;
extern int camera;
extern int decodeStatus[MAXSEGS];
extern unsigned char imageTemp[NROWS*NCOLS];
extern unsigned char imageDiag[NROWS*NCOLS];
extern unsigned char imageSync[NROWS*NCOLS];
bool ProcessImage( unsigned char * image, int ii)
{// set up the call to FindEdge with pointer into the array hDIB offset to
    // skip past the header info
    // first search for bottom edge
    // edge scan parameters  ROI for edge
    // additions for file output
    //FILE *fp; See above
    // KB - added parameter ii - number of picture being worked on - used for diagnostics
    // Boundary lines for a segment
    float BLines[4][3];    //
                            // Points: 0 = bottom edge (all segments)
```

```
                            // 1 = top edge (all segments)
                            // 2 = left edge (each segment)
                            // 3 = right edge (each segment)
                            // KB BLines hold the center of each line, [0] =
x [1] = y [2] = slope
        //   int xarray[MAX_POINTS];      // Store a set of points along the edge of
the barcode: room for 20 - X location
        //   int yarray[MAX_POINTS];      // Y location of edge points
             float Xmean, Ymean, slope;
             float imageScale;            // number of pixels per feature/element -
instead of pixels for the most part you deal in "imagescales"
             int bottomY, topY;   // KB store the bottom and top y values for use in
identifying segments
             int segCount = 0;    // counts number of segments generated so far: note,
this is not the same as segNum (id for each segment)
             char segStatus[MAXSEGS * 2];  // Store the contents of the
decodestatus.txt file, 2 bytes per entry
             unsigned char segment[ SEGROWS * SEGCOLS];
             //int interval = 0;           // Spacing in x from one segment
to next
             unsigned char *rotated;      // For the rotated image - stores the
rotated image - most processing is done on this array
             // defines region of interest during search for strip
             //region_t findroi = {0,0,0,0,0};
             //region_t foo = {0,0,0,0,0}
             // xSarray - x value of search points (both top and bottom)
             // yBarray - y value of the bottom point
             // yTarray - y value of the top point
             bool inRange[SEARCH_POINTS];  // stores a flag to indicate if this point is
in the range we are interested in
             int     xSarray[SEARCH_POINTS],     yBarray[SEARCH_POINTS],
yTarray[SEARCH_POINTS ];
             int sHeight[SEARCH_POINTS]; // estimate of the height from top - bottom in
column
             int rangeStart, rangeEnd;   // range of values in the above arrays that are of
interest
             // scan region values
             int scanInterval;
             int scanWidth;
             int iStart, iEnd;  // pixel for start and end of the regio
             int scanHeight;
             int i,j,k;
             float radians1;
             float radians2;  // used for rotating the image to horizontal
             float rotSlope;
```

```
        float ytOffset; // Fudge factor to adjust top of barcode because FindEdge does
not find the exact top of the edge
        float ybOffset; // Similar fudge factor for the bottom
                        // NOTE: If FindEdge changes, these factors will change
        // Following variables store information for each segment separator up to
maximum number of segments
        int xpos1[MAXSEGS][GCNUM], ypos1[MAXSEGS][GCNUM]; // locations
to store found pattern matches
        float Xmeans[MAXSEGS], Ymeans[MAXSEGS], slopes[MAXSEGS]; //
Stores values from KBFindVerticalLines
        int         counts[MAXSEGS],         leftYpos[MAXSEGS][GCNUM],
goodYpoints[MAXSEGS]; // And more values from KBFindVerticalLines
        // counts is the number of gray codes going into kbfindvert
        // leftYpos are the "good" y positions coming out of kbfindvert (that is,
gray codes that line up nicely vertically
        // goodypoints are the number of these good points in each segment
        float Corners[MAXSEGS][4][2]; // A set of 4 points (x,y) for each segment,
up to maxsegs segments, used to be iPoints
        // Corners: Intersection lines for corners of an ROI and then segments
                        // Correct: 0 = upper left, 1 = upper
right,2 = lower right, 3 = lower left (clockwise from upper left)

// KB IPoints holds the corners where
each of the 4 lines in BLines intersects
                        // second index is x then y
                        // so IPoints[0][0] is the upper left corner
x value
        float TempCorners[4][2];
        int segNums[MAXSEGS]; // stores the computed segment number for each
segment (based on Gray Codes)
        bool badSegs[MAXSEGS];   // true means the segment is bad (set in the
interesection test) false is OK
        int rectCount; // counter for rectify attempts
        int     segmentSegNum;   //    segment    number    returned    by
SegmentNumberFromSegment
    #if DEBUG >= 3
        int npts, xf0;
    #endif
        //int xg0 = 1; // just to get past the start of the while loop
        int yg0 = 0;
        //int Lastxg0 = 0;
        int fullSegs;   // hold number of full segments (segs with both left and right
separators)
        float x1, y1, x2, y2; // used for searching for segment top and bottom lines
```

```
        int inp;  // test for input to look for a kill character
#if DEBUG >= 1
        fp = fopen("support.txt", "a");
        fprintf(fp, "Starting image # %d\n",ii); // indicate which pic number
#endif
#if DEBUG >= 0
        printf("Processing Image # %d\n",ii);
#endif
#if DEBUG >= 3
        // KB Load the  diagnostic image arry with the data
        memcpy( imageDiag, image, NROWS * NCOLS);
#endif
        // NOTE: The following code is executed ONCE per IMAGE until indicated otherwise
        // do a preliminary search for top and bottom edges, return the data in these
        // arrays which are then used for range checking, next
        SearchTopBottom(image, ii, xSarray, yBarray, yTarray, sHeight, inRange, &scanWidth, &scanHeight);

// Look to see if there are a number of points on the (likely) barcode that are in the expected
        // size range (vertically) of the barcode.  Must be at least 3 in a row
        if ( !FindRange(ii, inRange, xSarray, &iStart, &iEnd, &rangeStart, &rangeEnd, &scanInterval))
                return false;
        // Now to continue with find and line fit in the selected region
        // BOTTOM
        SearchBottom(image, ii, yBarray, BLines,  scanWidth, scanInterval, iStart, rangeStart,rangeEnd);
        // SearchBottom loads it's results into BLines[0][..] the bottom line
        radians1 = (float)atan(BLines[0][2]); // slope
        // TOP
        SearchTop(image, ii, yBarray, BLines,  scanWidth, scanInterval, iStart, rangeStart,rangeEnd);
        radians2 = (float)atan(BLines[1][2]); // slope - used for rotating the image to horizontal
        rotSlope = -(radians1 + radians2)/(float)2.0;
        // SCALE
        //Estimate the scale by distance from (Xmean, Ymean) to other line = 90 pixels
        Xmean = BLines[1][0 ];
        Ymean = BLines[1][1 ];   // point centered at xmean, ymean, ok, but not perfect
        //slope = BLines[1][2 ];
```

```
            imageScale = DistanceToLine( Xmean, Ymean,     BLines[0][0        ],
BLines[0][1 ], BLines[0][2 ]);
            imageScale = imageScale/(4.3f + SEGROWS - 1 );  // org: BORDORROWS
+ SEGROWS -1
            if (imageScale < 1.f)  // if imagescale is small it probably means we have a
bad image, kill it and move on
            {#if DEBUG >= 1
            fprintf( fp, "IMAGESCALE TOO SMALL.  The image scale is %9.5f pixels
per dot.\n", imageScale );
            #endif
            #if DEBUG >= 2
            printf( "\nIMAGESCALE TOO SMALL. The image scale is %9.5f pixels per
dot.\n", imageScale );
            #endif return false;}
            #if DEBUG >= 1
            fprintf( fp, "The image scale is %9.5f pixels per dot.\n", imageScale );
            fprintf( fp, "The average is %9.5f radians, or %9.2f degrees\n", rotSlope,
57.297 * rotSlope);
            #endif
            #if DEBUG >= 2
            printf( "\nThe image scale is %9.5f pixels per dot.\n", imageScale );
            #endif
            // ROTATE Image into "rotated"
            // this image is rotated to start with to give mid line horizontal
            rotated = (unsigned char *)malloc( NROWS * NCOLS);
            memset( rotated, 255, NROWS * NCOLS);
            RotateImage( image, rotated, NROWS, NCOLS, NCOLS, rotSlope );
            #if DEBUG >= 3
            // KB write out the rotated image
            ImageData(rotated, 500000+(ii*1000)+imageCount++, NROWS*NCOLS);
            #endif
            #if DEBUG >= 3
            memcpy( imageTemp, image, NROWS * NCOLS); //org
            //memcpy( imageTemp, rotated, NROWS * NCOLS);
            for( npts=0, xf0 = iStart; npts<EDGE_POINTS; npts++, xf0 += scanInterval )
            {// Mark the bottom
                    int edge = (int) (BLines[0][1] + BLines[0][2] * (xf0 - BLines[0][0]));
                    imageTemp[(edge-1)* NCOLS + xf0 + scanWidth/2  ] = 249;
                    imageTemp[(edge  )* NCOLS + xf0 + scanWidth/2  ] = 249;
                    imageTemp[(edge+1)* NCOLS + xf0 + scanWidth/2  ] = 249;
                    imageTemp[(edge  )* NCOLS + xf0 + scanWidth/2+1] = 249;
                    imageTemp[(edge  )* NCOLS + xf0 + scanWidth/2-1] = 249;
                    // Now for top
                    edge = (int) (BLines[1][1] + BLines[1][2] * (xf0 - BLines[1][0]));
                    imageTemp[(edge-1)* NCOLS + xf0 + scanWidth/2  ] = 249;
```

```
            imageTemp[(edge )* NCOLS + xf0 + scanWidth/2  ] = 249;
            imageTemp[(edge+1)* NCOLS + xf0 + scanWidth/2  ] = 249;
            imageTemp[(edge )* NCOLS + xf0 + scanWidth/2+1] = 249;
            imageTemp[(edge )* NCOLS + xf0 + scanWidth/2-1] = 249;}
            ImageData(    imageTemp,    600000+(ii*1000)+imageCount++,
NROWS*NCOLS);  // original
       #endif
            // ROTATE LINES
            RotateLines( rotSlope, BLines);
            // KB Top and Bottom Lines are now rotated to fit rotated image
            // Magic numbers to go from found line positions
            // to the boundary of the sampled pixels
            // rectangle must be approx. imagescale* 30 (horizontal)
            // by imagescale * 84 (vertical)
            // from the left side of the left Gray code (inclusive)
            // to the left side of the right Gray code (not included)
            // NOTE: this needs to be cleaned up! ORG
            // KB - seems to work...
            //BLines[0][1] +=  2.94f * imageScale ; // bottom
            //BLines[1][1] +=  2.34f * imageScale ; // top  -??
            ytOffset = .5f * imageScale;
            //BLines[1][1 ] -= Ymean + ytOffset;
            BLines[1][1 ] -= ytOffset;
            ybOffset = .33f * imageScale;
            BLines[0][1] -= ybOffset;
            // KB Top and bottom lines are now scaled to match image
            // KB and ready to be used.
       #if DEBUG >= 3
            bottomY = (int)BLines[0][1]; // KB used only for marking
            topY = (int)BLines[1][1];
            // mark the top and bottom
            memcpy( imageTemp, rotated, NROWS * NCOLS); // rotated
            imageTemp[bottomY * NCOLS + 500] = 255; //  arbitrary x location
            imageTemp[topY * NCOLS + 500] = 255;
            imageTemp[bottomY * NCOLS + 501] = 255;
            imageTemp[topY * NCOLS + 501] = 255;
            imageTemp[bottomY * NCOLS + 499] = 255;
            imageTemp[topY * NCOLS + 499] = 255;
            ImageData(    imageTemp,    700000+(ii*1000)+imageCount++,
NROWS*NCOLS);  // original
            memcpy( imageSync, rotated, NROWS * NCOLS); // set this up for
diagnostic viewing the sync codes later
       #endif
            // Everything now rotated
            // SEGMENT IDENTIFICATION LOOP
```

```
                    // Find all the Gray Code separators and put the x and y values in xpos1 and
ypos1
                    // number of separators found is in segCount
                    yg0 = yBarray[rangeStart] - 2 * SEARCH_MIN;
                    SegmentIDLoop( rotated,ii, imageScale, yBarray,
                                        yg0, iStart, xpos1, ypos1, counts, &segCount );
                    if (segCount == 0) // No segments found, finished with this image
                    {#if DEBUG >= 2
                            printf("No Segments found.\n");
        #endif
                            return false;}
                    // set all the badSegs to false, that is, there are no bad segments yet
                    for (i = 0 ; i < segCount; i++)
                    {badSegs[i] = false; }
                    // FIND VERTICAL LINES LOOP
                    // Fit a vertical line to each set of Gray Codes previously found (note: near
vertical, not vertical)
                    for (i = 0 ; i < segCount; i++)
                    {if (!KBFindVerticalLine( imageScale, xpos1[i], ypos1[i], &Xmeans[i],
&Ymeans[i], &slopes[i], counts[i], leftYpos[i], &goodYpoints[i]))
                            {#if DEBUG >= 2
                            printf("Bad Segment, VerticalLine is false, I = %d\n",i);
        #endif
                            badSegs[i] = true; // bad segment}}
        #if DEBUG >= 3
                    // display the vertical lines
                    memcpy( imageDiag, rotated, NROWS * NCOLS); //org
                    for (i = 0; i < segCount; i++)
                    {if (badSegs[i]) continue;  // skip bad segments
                            DrawLine(imageDiag,    (int)Xmeans[i],    (int)BLines[0][1],
(int)Xmeans[i], (int)BLines[1][1], 255); // Left
                            ImageData(imageDiag,    1100000+(ii*1000)+imageCount++,
NROWS*NCOLS);}
        #endif
                    // FIND INTERSECTIONS LOOP
                    // KB - Intersection returns true if point is in legal range
                    // Converts the points in Blines (which already contains the top and bottom
line information)
                    // and Xmeans and Ymeans (which contain the vertical line information) to the
x, y coordinates
                    // to be stored in Corners (lower x, lower y, upper x, upper y)
                    // Only work on segments that have both a left and right side. if we have an
odd
                    // number of segments, ignore the final one
        #if DEBUG >= 3
```

```
            memcpy( imageDiag, rotated, NROWS * NCOLS);
#endif
        fullSegs = !(segCount % 2) ? segCount:segCount - 1;
        for (i = 0; i < fullSegs; i++)
        {if (badSegs[i]) continue;  // skip the bad segments
            BLines[2][0] = Xmeans[i];    // left hand side
            BLines[2][1] = Ymeans[i];
            BLines[2][2] = slopes[i];
            BLines[3][0] = Xmeans[i+1];  // right hand side
            BLines[3][1] = Ymeans[i+1];
            BLines[3][2] = slopes[i+1];
            if(!Intersection( BLines, Corners[i], 0, 2, 3))
            {#if DEBUG >= 2
                printf("Bad Segment from Intersection failure 1, I = %d\n",i);
#endif
                badSegs[i] = true; // bad intersection, mark the segment as bad
                continue;}
            if(!Intersection( BLines, Corners[i], 1, 2, 0))
            {#if DEBUG >= 2
                printf("Bad Segment from Intersection failure 2, I = %d\n",i);
#endif
                badSegs[i] = true;
                continue;}
            if(!Intersection( BLines, Corners[i], 1, 3, 1))
            {#if DEBUG >= 2
                printf("Bad Segment from Intersection failure 3, I = %d\n",i);
#endif
                badSegs[i] = true;
                continue;}
            if(!Intersection( BLines, Corners[i], 0, 3, 2))
            {#if DEBUG >= 2
                printf("Bad Segment from Intersection failure 4, I = %d\n",i);
#endif
                badSegs[i] = true;
                continue;}
#if DEBUG >= 3
            memcpy( imageTemp, rotated, NROWS * NCOLS);
            // draw a box, line by line, clockwise from upper left
            DrawLine(imageTemp,   (int)Corners[i][0][0],   (int)Corners[i][0][1],
(int)Corners[i][1][0], (int)Corners[i][1][1], 255); // Top
            DrawLine(imageTemp,   (int)Corners[i][1][0],   (int)Corners[i][1][1],
(int)Corners[i][2][0], (int)Corners[i][2][1], 255); // Right
            DrawLine(imageTemp,   (int)Corners[i][2][0],   (int)Corners[i][2][1],
(int)Corners[i][3][0], (int)Corners[i][3][1], 255); // Bottom
```

```
                    DrawLine(imageTemp,  (int)Corners[i][3][0],  (int)Corners[i][3][1],
(int)Corners[i][0][0], (int)Corners[i][0][1], 255); // Left
                    ImageData(   imageTemp,   1200000+(ii*1000)+imageCount++,
NROWS*NCOLS);
          #endif
                    x1 = Corners[i][0][0];
                    y1 = Corners[i][0][1];
                    x2 = Corners[i][1][0];
                    y2 = Corners[i][1][1];
                    SearchSegmentTop(rotated, ii, imageScale, x1, y1, x2, y2, BLines);
                    x1 = Corners[i][3][0];
                    y1 = Corners[i][3][1];
                    x2 = Corners[i][2][0];
                    y2 = Corners[i][2][1];
                    SearchSegmentBottom(rotated, ii, imageScale, x1, y1, x2, y2, BLines);
                    // now look for intersections again
                              if(!Intersection( BLines, Corners[i], 0, 2, 3))
                              {#if DEBUG >= 2
                                        printf("Bad Segment from Intersection 2 failure 1, I = %d\n",i);
#endif
                                        badSegs[i] = true; // bad intersection, mark the segment as bad
                                        continue;}
                              if(!Intersection( BLines, Corners[i], 1, 2, 0))
                              {#if DEBUG >= 2
                                        printf("Bad Segment from Intersection 2 failure 2, I = %d\n",i);
#endif
                                        badSegs[i] = true;
                                        continue;}
                              if(!Intersection( BLines, Corners[i], 1, 3, 1))
                              {#if DEBUG >= 2
                                        printf("Bad Segment from Intersection 2 failure 3, I = %d\n",i);
#endif
                                        badSegs[i] = true;
                                        continue;}
                              if(!Intersection( BLines, Corners[i], 0, 3, 2))
                              {#if DEBUG >= 2
                                        printf("Bad Segment from Intersection 2 failure 4, I = %d\n",i);
#endif
                                        badSegs[i] = true;
                                        continue;}
#if DEBUG >= 3
                    //memcpy( imageTemp, rotated, NROWS * NCOLS);
                    // draw a box, line by line, clockwise from upper left
                    DrawLine(imageDiag,  (int)Corners[i][0][0],  (int)Corners[i][0][1],
(int)Corners[i][1][0], (int)Corners[i][1][1], 255); // Top
```

```
                    DrawLine(imageDiag,  (int)Corners[i][1][0],  (int)Corners[i][1][1],
(int)Corners[i][2][0], (int)Corners[i][2][1], 255); // Right
                    DrawLine(imageDiag,  (int)Corners[i][2][0],  (int)Corners[i][2][1],
(int)Corners[i][3][0], (int)Corners[i][3][1], 255); // Bottom
                    DrawLine(imageDiag,  (int)Corners[i][3][0],  (int)Corners[i][3][1],
(int)Corners[i][0][0], (int)Corners[i][0][1], 255); // Left
                    ImageData(  imageDiag,    1270000+(ii*1000)+imageCount++,
NROWS*NCOLS);
        #endif}
                // SYNC CODE ID AND HORIZONAL LINE ADJUSTMENT
                // This section of code identifies the sync code locations for improving the
horizontal lines
                // do it segment by segment
                //SyncLoop( rotated, fullSegs, imageScale, ii, badSegs, Xmeans, Ymeans,
slopes, Corners, BLines);
                // SEGMENT NUMBER IDENTIFICATION
                // use only the points on the left vertical line
                // For each segment, use the left hand points and even then only the good
points in goodYpoints
        //      for (i = 0; i < fullSegs; i++)
        //      {if (badSegs[i]) continue; // skip the bad segments
        //              segNums[i] = SegmentNumber( rotated, ii, Corners[i], leftYpos[i],
goodYpoints[i], imageScale);
        //#if DEBUG >= 0
        //              printf("I = %d, SEGMENT Number: %d, in IMAGE # %d,\n\n",i,
segNums[i],ii);
        //#endif
        //              if (segNums[i] == -1)
        //              {#if DEBUG >= 0
        //                      printf ("Segment Number returned ERROR, i = %d\n\n",i);
        //#endif}}
                //segsize = SEGROWS * SEGCOLS;
                //unsigned  char  *  segment  =  (unsigned  char  *)malloc(  SEGROWS  *
SEGCOLS );
                for (i = 0; i < fullSegs; i++)
                {if (badSegs[i])
                        continue; // and previously noted bad segments
        #if DEBUG >= 3
                        memcpy( imageTemp, rotated, NROWS * NCOLS);
        #endif
                        RectifySegment(  0,  Corners[i],  rotated,  segment,  ii,
imageScale);
                        ThresholdSegment( segment);
                        segmentSegNum = SegmentNumberFromSegment(segment,ii);
                        if (segmentSegNum == -1)
```

```
                    {#if DEBUG >= 3
                        printf("Bad segment, i = %d, image = %d\n", i, ii);
    #endif
                        continue;  //bad segment}
                        if( decodeStatus[segmentSegNum] >= 0) //  >= 0 it has not
been decoded, else skip it
                        {if (!read_segstatus(segCount, segStatus, decodeStatus))   //
read the status file
                            {#if DEBUG >= 0
                                printf ("read_segstatus failed in processimage,
on Segnment # %d, continuing in any case\n", segmentSegNum);
        #endif}
                        if( decodeStatus[segmentSegNum] >= 0) //  then check again  >=0 it has not
been decoded, else skip it
            {if (!TestAndWait(segmentSegNum, segCount, segStatus, decodeStatus)
                {#if DEBUG >= 0
            printf ("TestAndWait Failed on   Segnment # %d, continuing in any case\n",
segmentSegNum);
            #endif}
            // test and wait
            #if DEBUG >= 0
            printf ("Attempting to write segment # %d, image #: %d\n", segmentSegNum, ii);
            #endif
            //#if DEBUG >= 3
            //memcpy( imageTemp, rotated, NROWS * NCOLS); // clean it for diagnostics inside
rectify routine
            //#endif
            #if DEBUG >= 1
            // Write out the segment image
            fprintf( fp, "Writing the thresholded segment count %d decoded segment number is
%d\n",
            segCount, segNums[i]);
            #endif
            #if DEBUG >= 0
            printf ("About to write Segment # %d, in Image #%d\n", segmentSegNum,ii);
            #endif
            SegmentData( segment, segmentSegNum, SEGROWS * SEGCOLS );  // -3 if 27 row
output} // inner decodestatus test} // outer decodestatus test} // for each segment loop
            //       for (i = 0; i < fullSegs; i++)
            //             if (badSegs[i]) continue;  // and previously noted bad segments
            //             // rectify once to get the segment number...
            //             for (j = 0; j < 4; j++)
            //                 for (k = 0; k < 2; k++)
            //                     TempCorners[j][k] = Corners[i][j][k];
            //             RectifySegment( 0, TempCorners, rotated, segment, ii, imageScale);
```

```
//              ThresholdSegment( segment);
//              segmentSegNum = SegmentNumberFromSegment(segment,ii);
//              if( decodeStatus[segmentSegNum] < 0) // <0 been decoded, so skip to next segment continue;
//       // now rectify multiple times with variations
//       // until it is done right.
//       Rectification, Thresholding, Saving File and Handshaking with Dave's demo program
//       for (rectCount = 1; rectCount < RECTATTEMPT; rectCount++)
//       { {// Handshaking with demo program - not important for DSP version
//              // roughly speaking, check and see if this segment has successfully decoded
//              // if so, toss it on the floor
//              // if not, then send it to dave's demo program to decode the vs barcode
//                      // NOTE Here is where it gets interesting again
//                      // Take the segment which is is still just a piece of the image
//                      // and turn it into a clean VS barcode
//                      for (j = 0; j < 4; j++)
//                             for (k = 0; k < 2; k++)
//                                    TempCorners[j][k] = Corners[i][j][k];
//              RectifySegment( rectCount, TempCorners, rotated, segment, ii, imageScale);
//       ThresholdSegment( segment);
//       read_segstatus(segCount, segStatus, decodeStatus); // check the segment status by reading the decodestatus.txt file, then deleting it// ignore non-threshold for now
       segsize = SEGROWS * SEGCOLS;
////unsigned char * segment = (unsigned char *)malloc( SEGROWS * SEGCOLS );
//       if( decodeStatus[segmentSegNum] >= 0) // >= 0 means the segment has not yet been decoded
//                      {// now do a second check to see if the segment file already exits.
//                      // don't proceed until it has been processed and the
//                      // decodeStatus file read yet again (which takes place internal to this routine.
       /if (!TestAndWait(segmentSegNum, segCount, segStatus, decodeStatus))
       {#if DEBUG >= 0
//              printf ("TestAndWait Failed on  Segnment # %d, continuing in any case\n", segmentSegNum);
       //#endif}
       //#if DEBUG >= 0
       //printf ("Attempting to write segment # %d, image #: %d\n", segmentSegNum, ii);
       //#endif
       // Put sampled values into segment array
       //#if DEBUG >= 3
       //memcpy( imageTemp, rotated, NROWS * NCOLS); // clean it for diagnostics inside rectify routine
```

```
//#endif
//#if DEBUG >= 1          // Write out the segment image
//                        fprintf( fp, "Writing the thresholded segment count %d decoded segment number is %d\n",
                          segCount, segNums[i]);
//#endif
//SegmentData( segment, segmentSegNum, SEGROWS * SEGCOLS ); // -3 if 27 row output}
// end of process if not done
//else // It is already done - in that case write out a dummy segment to prompt creation of a new decodestatus.txt file
//#if DEBUG >= 0
//printf("This segment, # %d, has ALREADY been processed\n",segmentSegNum);
//#endif
//#if DEBUG >= 1
//       fprintf( fp, "This segment, # %d, has already been processed\n", segmentSegNum);
//#endif
//       if (!TestAndWait(35, segCount, segStatus, decodeStatus)) // dummy segment
//              {
//#if DEBUG >= 0
//       printf ("TestAndWait Failed on # %d, continuing in any case\n", 35);
//#endif} // model segment
//       SegmentData( segment, 35, SEGROWS * (SEGCOLS) ); // anything greater than 35 and less than 63 will be ignored
//#if DEBUG >= 0
//       printf("DUMMY segment 35 written.\n"); break;
//#endif}}
// END
Rectification, Thresholding, Saving File and Handshaking with demo program
//printf("in between loops\n");
//if( decodeStatus[segmentSegNum] < 0) // already processed, skip loop
//       {printf("BREAKING in between loops\n");
//       break;}}
// END RECTATTEMPT
       free( rotated);
       return true;
```

*Sub-routines:*

KBFindVerticalLine:

```
        bool KBFindVerticalLine( int *x, int *y, float *Xmean, float *Ymean,
    float *slope, int nPoints, int *ygood, int *goodpoints)
        // KB
        // Looks for a vertical line through the points in x[].
```

// fills array ygood with the points that are on the vertical line and goodpoints contains the number of points on the line and discard the points that aren't on the line
// the good points are used in the SegNumber routine to determine the segment number
// Algorithm:
//     if there are at least 2 points +/- VERT_DIST_TEST then the line goes through
// the mean of those points.
// create a set of buckets for each of the points provided (nPoints number of them)
// for each bucket (1 thru nPoints) count how many points fit within +/- test distance and place in bucket
// ignore the case where there are 2 sets of points in two lines it's not very common
// 1. For each point, find all the points within vert_dist_test in x dimension
// 2. Find the point with the most nearby points (doesn't matter which one)
// 3. compute the y center (Ymean)
// 4. Xmean = mean of the values in buckets[n][0..m]
// 5. compute slope between the two most distant points (topmost and bottommost)
// 6. put the good points (those that are on the line) in ygood
// Note: there must be a more efficient way to code this
// Also returns an array with just the values that are on the line: ygood, and how many there are: goodpoints
// these are used for determining the segment number

Blines: The microprocessor executable code takes lines are originally stored as midpoints and slopes in Blines, then converts them to intersection points in IPoints.
    float BLines[4][3];
// Points: 0 = bottom edge (all segments)
// 1 = top edge (all segments)
// 2 = left edge (each segment)
// 3 = right edge (each segment)
// KB BLines hold the center of each
// line, [0] = x [1] = y [2] = slope
// KB IPoints holds the corners where each of the 4 lines in BLines intersect
    float IPoints[4][2];
// 0 = upper left, 1 = upper right, 2 = lower right, 3 = lower left (clockwise from upper left)
// second index is x then y
// so IPoints[0][0] is the upper left corner x value
int xarray[MAX_POINTS];

// Store a set of points along the edge of the barcode: room for 20 - X location
int yarray[MAX_POINTS];
// Y location of edge points
Xmean, Ymean, slope;
// used to hold the results from fitline, usually copied into BLines
float imageScale;
// number of pixels per feature/element - instead of pixels for the most part you deal in "imagescales"

RectifySegment:
include "stdafx.h"

```
#include <stdio.h>
#include "consoleDSP.h"
#ifdef WIN32_BUILD
include <conio.h>
include <windows.h>
endif
#include "Rectify.h"
#include "FileOperations.h"
#include "typedefs.h"
#include "Graphics.h"
#include "Find.h"
#include <math.h>
typedef int bool;
 FILE *fp;
 FILE *dfile;
 int imageCount;
 int camera;
 unsigned char imageTemp[NROWS*NCOLS];
 unsigned char imageDiag[NROWS*NCOLS];unsigned char imageSync[NROWS*NCOLS];
 int SegmentNumber(unsigned char * rotated, int ii, float points[4][2], int yp[], int nGood, float imageScale)
 // decode the segment number from the lateral position of the gray code pattern
 // offset by the "found" position of the code
 // Image comes in flipped, that is we start the counting the zones from the bottom, moving up
 // but don't forget that the image itself is referenced from the bottom bigger number are nearer the
 // top of the image when viewed on the screen. (subtract y value from 768 to get position on the screen)
  {#define DOT_OFFSET  (float) 1.0 //  Grey Code is marked down 1 element from actual code
    // Fudge factors as in rectify.c, changes if FindEdge Changes
```

```c
        // brings the top and bottom in from the borders
        #define TOP_OFFSET(float) 6.0//7.0  // the borders plus 4 elements that are ignored (see specifications)   USED if NO sync code test
        #define BOT_OFFSET  (float) 2.0//3.0  // the borders  USED if NO sync code test
        //#define TOP_OFFSET(float) 4.0  // the borders plus 4 elements that are ignored (see specifications)   USED if WITH sync code test
        //#define BOT_OFFSET  (float) 0.0  // the borders  USED if WITH sync code test
        #define ZONESPERROW 5 // Number of zones across a row
        #define ELEMENTSPERZONE 16   //  There are 16 elements/slots/features in each zone
        #define MAXSNUM 8 // Number of different ways of generating the segment number
        #define FUDGE .75f // .5// fudge factor to adjust gray code location
        // This would be different if pattern were upside down
        float ZonePosition;  // Position of the Zone within the segment
        float DotPosition;   // Position of the Gray Code within the zone (pixels below the top) int Zone, Dot
        // zone is the zone number, dot is the dot location (0-7) of the Grey Code within the zone
            int code[GCNUM];  // room for phase of 5 zones
                int sNum[MAXSNUM];// room for computing the segment number 8 different ways for error correction
            int sNumIndex[MAXSNUM]; //place to store sNum values when picking the most common one
                int i, j, n, ww;
                float ZoneSize;
    float DotSize;
                float scale;
                float top;
                float bot;
                //int count;
                int biggest;
        #if DEBUG >= 3
                    memcpy( imageTemp, rotated, NROWS * NCOLS);
        #endif
        // Fudge factors the same as in rectify.c, changes if FindEdge Changes
        // brings the top and bottom in from the borders
        top = points[1][1] - (TOP_OFFSET * imageScale);  // upper right y;
        bot = points[3][1] + (BOT_OFFSET * imageScale); // lower left y ;
        #if DEBUG >= 3
                    // draw the "top" line and "bot" line
```

```
                              DrawLine(imageTemp,       (int)points[0][0],
(int)top, (int)points[1][0], (int)top, 200); // top
                              DrawLine(imageTemp,       (int)points[3][0],
(int)bot, (int)points[2][0], (int)bot, 200); // bot
                              ImageData(                imageTemp,
1300000+(ii*1000)+imageCount++, NROWS*NCOLS);
    #endif
              scale = imageScale;
    //scale = (top - bot)/((float) (SEGROWS - 2 - 1 - 1)); // pixels per dot
        //top -= (TOP_OFFSET * scale);
    ZoneSize = (top - bot) / ZONESPERROW;
    DotSize = scale; //ZoneSize / (float) ELEMENTSPERZONE;
    // ORG float pixPerZone = (float)16.0 * scale; //by definition of the
Gray pattern
    //                ImageData(                imageTemp,
1200000+(ii*1000)+imageCount++, NROWS*NCOLS);
    for( ww = 0; ww < nGood; ww++) code[ww] = -1; //means undefined
    // go through the list assume 5 patterns found
    #if DEBUG >= 3
            for (n = 0; n < 5; n++)

// draw the zone lines
                    {DrawLine(imageTemp,       (int)points[0][0],
(int)(top-(top-bot)/5 * n), (int)points[1][0], (int)(top-(top-bot)/5 * n), 245); //
top
                    //ImageData(                imageTemp,
1310000+(ii*1000)+imageCount++, NROWS*NCOLS);}
    #endif
    #if DEBUG >= 3
            for (n = 0; n < nGood; n++)
            // draw the gray code locations
                    {imageTemp[(yp[n] + (int)(FUDGE * scale)) *
NCOLS + (int)points[0][0]] = 250;
                    imageTemp[(yp[n] + (int)(FUDGE * scale)) *
NCOLS + ((int)points[0][0]+1)] = 250;
                    imageTemp[(yp[n] + (int)(FUDGE * scale)) *
NCOLS + ((int)points[0][0]-1)] = 250;
                    imageTemp[((yp[n] + (int)(FUDGE * scale)-1))
* NCOLS + ((int)points[0][0])] = 250;
                    imageTemp[((yp[n] + (int)(FUDGE * scale)+1))
* NCOLS + (int)points[0][0]] = 250;}
    ImageData(    imageTemp,    1320000+(ii*1000)+imageCount++,
NROWS*NCOLS);
    #endif
            for( n = 0; n < nGood; n++)
```

```
                {// ZonePosition = top - ((float)yp[n] ;// pixels
from origin  // KB org
                ZonePosition = top - ((float)yp[n] + (FUDGE *
scale));  // adjust up 1/4 element as gray codes seem marked a little low
                Zone = (int)(ZonePosition /ZoneSize);
    // Peter's original
                // position  =  (bot  -  (float)yp[n]  ]/
ZONESPERROW) - (TOP_OFFSET * scale);
                // org zone = int (5 - (int)(position / pixPerZone
)) ; //which of 5 zones (invert the zone location)
                // org zone = max( 0, min( 4, zone));  // kb why?
                //zone = (top - yp[n] -(TOP_OFFSET * scale)) /
ZoneSize;
                //dot = (int)( 16.0 * (( position / pixPerZone) -
(float)zone) - DOT_OFFSET);  // ORG
                //dot = max( 0, min( 7, dot));  // ORG
                DotPosition = ZonePosition - (Zone *
ZoneSize) ;  // pixels from the top of the zone
                Dot      =      ELEMENTSPERZONE      -
(int)((DotPosition+DotSize)/ DotSize) ;  // most recent
                //Dot = (int)(ELEMENTSPERZONE -
((DotPosition+DotSize)/ DotSize)) ; was working - not
                if (Zone < 0 || Zone > GCNUM-1)
                        return 34; //-1; // error
                        code[Zone] = Dot;
#if DEBUG >= 2
                printf("ZonePosition %f, zone %d, Dot %d\n",
ZonePosition, Zone, Dot);
        #endif
                // fyi for testing first separator (segment 0)
should be 0 0 7 7 0 from bottom}
    // original simplest reconstruction, no error correction
    //sNum = code[2]* 8 + (7 - code[3]);  // ORG
    //sNum = max( 0, min( 63, sNum));  // ORG
    // Generate the segment number from the various combinations of
    // most signficant and least segnificant digits, some of which are
inverted
        // see documentation for details
        sNum[0] = code[4]+ (code[3] * 8);
     sNum[1] = ((7 - code[2]) + (code[3] * 8));
     sNum[2] = code[4] + ((7 - code[1]) * 8);
     sNum[3] = (7 - code[2])+ ((7 - code[1]) * 8);
       sNum[4] = code[0] + ((7 - code[1]) * 8);
         sNum[5] = (code[3] * 8) + code[0];
        sNum[6] = (code[3] * 8) + (7 - code[2]);
```

```
            sNum[7] = (code[3] * 8) + code[4];
// NOTE: There is an efficient algorithm for determining which sNum to use
// Most common sNum out of the 8 computed values
// one = 2; four = 1 ; and 2 = 3, then the result to return is 1 because it has the most entries
// Now pick the most common sNum (vote)
    for ( i = 0; i < MAXSNUM; i ++)
                                        sNumIndex[i] = 0;
// count the number of entries for each unique number
    for (i = 0; i < MAXSNUM; i++)
    {for (j = 0; j < MAXSNUM; j++)
        {// ignore negative numbers
            if ((sNum[i] >= 0)&& (sNum[i] == sNum[j]))
sNumIndex[i]++;}}
// now pick the biggest value in the index array
            //count = -1;
            biggest = -1;
    for ( i = 0; i < MAXSNUM; i++)
        {if (sNumIndex[i] > biggest)
            {//count = sNumIndex[i];
            biggest = i;}}
#if DEBUG >= 2
printf("sNum returned = %d\n", sNum[biggest]);
#endif
    if (sNum[biggest] < 0 || sNum[biggest] > MAXSEGS) return 34; //error
            return sNum[biggest];}
    void RectifySegment(int rectCount, float IPoints[4][2], UCHAR *imageR, UCHAR *segment, int imageNum, float imageScale)
// KB This routine will need to be re-written, but will retain much the
// Same structure, see comments, embedded
// Function:
// This routine takes a section of the original image that is supposed to contain a full segment including
// the separator on the left
// It attempts to determine, for each element in a 30 by 84 segment (again including separator) whether
// each element is a 1 or a 0 (white or black). It must deal with segments that are distorted.
// It should deal with vertical lines leaning left or right and horizontal lines going up or down
// or any combination (think: trapezoid)
// In addition I have adjusted the edges in slightly, because the lines in IPoints are slightly off
```

// These adjustments may be further tuned
// When we look at each point we must look at the center of the point, not the corners, hence the adjustments
// Rough algorithm:
Original image is usually 3 to 4 times larger than the final 30 by 84 segment (where each element is exactly 1 pixel)
// Compute the scale difference (floating point value between 3 and 4)
// Step across the x dimension of the original image
// For each point, step down the y dimensioni
// Compute when to create a sample point (these are the equations that will change)
// At the computed point look at the original and copy the pixel (which is from 0 to 256) into the segment array (30x84)
// However at the same time we are rotating the segment 90 degrees from horizontal to vertical
// And mirroring it (would be a "flip", but we just rotated it 90 degrees, so it's a mirror)
// The real magic is computing when to take the sample, because the original image is distorted (trapezoid not rectangle)
// Peter's comments:
// Get data from the line intersection points
// Calculate the rectify coefficients
// Interger arithematic is done to the number of points processed each
// time is just one segment, 84 x 30, this will be about 1/60 of pixels in the image.

```
#define length 84
#define width  30
#define PixPerRow 1024
    float A, B, C, D, E, F, G, H;
      float sx, sy, denom;
float DeltaXTop; // Distance across top of segment
float DeltaXBottom; // Distance across bottom of segment
float TopScaleFactor;  // scale factor measured at top = C
    float BottomScaleFactor; // at bottom
        float LeftScaleFactor;                    // left side
      float RightScaleFactor; // right side
//float DDXTopBottom;  // Difference between top scale and bottom scale factors
//float DDXTopBottomPerLine; // increment the step across the X dimension by this amount each time you move down Y by one
    float DeltaYLeft;  // Distance up and down left side
    float DeltaYRight; // Distance up and down right side
      float TopLeftX; //same as A (original)
      float TopLeftY; // same as D (original)
        float DeltaLeftTopBottom;
```

```
            float DeltaLeftTopBottomPerElement;
            float DeltaRightTopBottom;
            float DeltaRightTopBottomPerElement;
            float DeltaTopRightLeft;
            float DeltaTopRightLeftPerElement;
            float DeltaBottomRightLeft;
            float DeltaBottomRightLeftPerElement;
            //float DeltaHorzScaleFactorPerLine;
            //float DeltaVertScaleFactorPerLine;
            int imageSize;
            int xi, yi;
            int sample;
            float fxr, fyr;
            int xr, yr;
            int ib;
            float fxi; //fxib;
            float fyi; // fyib;
            float adjust = .25;
    // Compute a scale factor based on the width of the whole rectangle
        DeltaXTop = IPoints[1][0] - IPoints[0][0];   // Distance across top of segment
        DeltaYLeft = IPoints[0][1] - IPoints[3][1];  // Distance across left side of segment
        DeltaXBottom = IPoints[1][0] - IPoints[3][0];  // Distance across bottom of segment
        DeltaYRight = IPoints[1][1] - IPoints[2][1];  // Distance across right side of segment
        TopScaleFactor = (DeltaXTop) / (width - 1);  // scale factor measured at top = C
        LeftScaleFactor = (DeltaYLeft) / ((length+6) -1);  // scale factor measured at top = C include the border size
        BottomScaleFactor = (DeltaXBottom) / (width - 1);  // scale factor measured at top = C
        RightScaleFactor = (DeltaYRight) / ((length+6) -1);  // scale factor measured at top = C include the border size
        #if DEBUG >= 3
            // Draw pluses on the corners of the larger box
            // top leftimageTemp[((int)IPoints[0][1] * NCOLS) + (int)IPoints[0][0]] = 250;
                    imageTemp[((int)IPoints[0][1] * NCOLS) + ((int)IPoints[0][0]+1)] = 250;imageTemp[((int)IPoints[0][1] * NCOLS) + ((int)IPoints[0][0]-1)] = 250;
                    imageTemp[(((int)IPoints[0][1]-1) * NCOLS) + (int)IPoints[0][0]] = 250;
```

(int)IPoints[0][0]] = 250;

imageTemp[(((int)IPoints[0][1]+1) * NCOLS) + (int)IPoints[0][0]] = 250;

// bottom left
imageTemp[(((int)IPoints[3][1] * NCOLS) + (int)IPoints[3][0]] = 250;

imageTemp[(((int)IPoints[3][1] * NCOLS) + ((int)IPoints[3][0]+1)] = 250;

imageTemp[(((int)IPoints[3][1] * NCOLS) + ((int)IPoints[3][0]-1)] = 250;

imageTemp[(((int)IPoints[3][1]-1) * NCOLS) + (int)IPoints[3][0]] = 250;

imageTemp[(((int)IPoints[3][1]+1) * NCOLS) + (int)IPoints[3][0]] = 250;

// top right
imageTemp[(((int)IPoints[1][1] * NCOLS) + (int)IPoints[1][0]] = 250;

imageTemp[(((int)IPoints[1][1] * NCOLS) + ((int)IPoints[1][0]+1)] = 250;

imageTemp[(((int)IPoints[1][1] * NCOLS) + ((int)IPoints[1][0]-1)] = 250;

imageTemp[(((int)IPoints[1][1]-1) * NCOLS) + (int)IPoints[1][0]] = 250;

imageTemp[(((int)IPoints[1][1]+1) * NCOLS) + (int)IPoints[1][0]] = 250;

// bottom right
imageTemp[(((int)IPoints[2][1] * NCOLS) + (int)IPoints[2][0]] = 250;

imageTemp[(((int)IPoints[2][1] * NCOLS) + ((int)IPoints[2][0]+1)] = 250;

imageTemp[(((int)IPoints[2][1] * NCOLS) + ((int)IPoints[2][0]-1)] = 250;

imageTemp[(((int)IPoints[2][1]-1) * NCOLS) + (int)IPoints[2][0]] = 250;

imageTemp[(((int)IPoints[2][1]+1) * NCOLS) + (int)IPoints[2][0]] = 250;

endif
// adjust to a smaller rectangle, only the segment, no borders and centered
// in the elements, instead of at the edges of the elements
IPoints[0][0] += 0.50f * TopScaleFactor; // upper left x
IPoints[0][1] -= 2.75f * LeftScaleFactor; // upper left y   3.33 if no sync codes used
IPoints[3][0] += 0.50f * BottomScaleFactor; // lower left x
IPoints[3][1] += 2.75f * LeftScaleFactor; // lower left y   3.33 if no sync codes used

```
IPoints[1][0] -= 0.50f * TopScaleFactor;  // upper right x
   IPoints[1][1] -= 2.75f * RightScaleFactor;  // upper right y 3.33 if no
sync codes used
   IPoints[2][0] -= 0.50f * BottomScaleFactor;  // lower right x
   IPoints[2][1] += 2.75f * RightScaleFactor;  // lower right y 3.33 if no
sync codes used
      switch (rectCount) {case 0: break;
            case 1:  IPoints[0][1]  +=  adjust  *
LeftScaleFactor;       IPoints[1][1]  +=  adjust  *  RightScaleFactor;
break;
            case 2: IPoints[0][1] -= adjust * LeftScaleFactor
   IPoints[1][1] -= adjust * RightScaleFactor; break;
   case 3: IPoints[1][1] += adjust * RightScaleFactor;
   IPoints[3][1] += adjust * LeftScaleFactor; break;
   case 4: IPoints[1][1] -= adjust * RightScaleFactor;
   IPoints[3][1] -= adjust * LeftScaleFactor; break;
            case  5:  IPoints[2][1]  +=  adjust  *
RightScaleFactor;     IPoints[3][1] -= adjust * LeftScaleFactor; break;
            case  6:  IPoints[2][1]  -=  adjust  *
RightScaleFactor;     IPoints[3][1] -= adjust * LeftScaleFactor; break;
            case  7:  IPoints[3][1]  +=  adjust  *
LeftScaleFactor;
   IPoints[0][1] -= adjust * LeftScaleFactor; break;
            case  8:  IPoints[3][1]  -=  adjust  *
LeftScaleFactor;
   IPoints[0][1] += adjust * LeftScaleFactor;}
         // Original coefficients
   // width-1 and length-1 is due to the number of spaces, not the number
of points (think square on a chess board)
   sx = - IPoints[0][0] + IPoints[1][0] - IPoints[2][0] + IPoints[3][0];
   sy = - IPoints[0][1] + IPoints[1][1] - IPoints[2][1] + IPoints[3][1];
   denom       =       IPoints[1][0]*(IPoints[3][1]-
IPoints[2][1])+IPoints[2][0]*(IPoints[1][1]-IPoints[3][1])
            +IPoints[3][0]*(IPoints[2][1]-IPoints[1][1]);
   H    =    (sx*(IPoints[2][1]-IPoints[3][1])-sy*(IPoints[2][0]-
IPoints[3][0]))/((width-1)*denom);
   G    =    (sy*(IPoints[2][0]-IPoints[1][0])-sx*(IPoints[2][1]-
IPoints[1][1]))/((length-1)*denom);
   F = H * IPoints[1][1]-(IPoints[0][1]-IPoints[1][1])/(width-1);
   E = G * IPoints[3][1] - (IPoints[0][1]-IPoints[3][1])/(length-1);
      D = IPoints[0][1];
   C = H * IPoints[1][0]-(IPoints[0][0]-IPoints[1][0])/(width-1);
   B = G * IPoints[3][0] - (IPoints[0][0]-IPoints[3][0])/(length-1);
      A = IPoints[0][0];
```

```
            // now re-compute the scale factors based on the adjusted rectangle
size
            DeltaXTop = IPoints[1][0] - IPoints[0][0];  // Distance across top of
segment
            DeltaYLeft = IPoints[0][1] - IPoints[3][1]; // Distance across left side
of segment
            DeltaXBottom = IPoints[2][0] - IPoints[3][0];  // Distance across
bottom of segment
            DeltaYRight = IPoints[1][1] - IPoints[2][1]; // Distance across right
side of segment
            TopScaleFactor = ((DeltaXTop) / (width - 1));   // scale factor
measured at top = C
            LeftScaleFactor = ((DeltaYLeft) / (length -1));   // scale factor
measured at top = C  don't include the border size this time
            BottomScaleFactor = ((DeltaXBottom) / (width - 1));  // scale factor
measured at top = C
            RightScaleFactor = ((DeltaYRight) / (length - 1));  // scale factor
measured at top = C  don't include the border size this time
            //DeltaHorzScaleFactorPerLine    =    (BottomScaleFactor    -
TopScaleFactor) / (width - 1);  // figure out plus or minus
            //DeltaVertScaleFactorPerLine = (RightScaleFactor - LeftScaleFactor)
/ (length - 1); // figure out pluss or minus
            #if DEBUG >= 3
            // draw pluses at the corners of the segment itself
                                                                    // top left
                        imageTemp[((int)IPoints[0][1]   *   NCOLS)   +
(int)IPoints[0][0]] = 250;
                        imageTemp[((int)IPoints[0][1]   *   NCOLS)   +
((int)IPoints[0][0]+1)] = 250;
                        imageTemp[((int)IPoints[0][1]   *   NCOLS)   +
((int)IPoints[0][0]-1)] = 250;
                        imageTemp[(((int)IPoints[0][1]-1) * NCOLS) +
(int)IPoints[0][0]] = 250;
                        imageTemp[(((int)IPoints[0][1]+1) * NCOLS) +
(int)IPoints[0][0]] = 250;
                                                                    // bottom left
                        imageTemp[((int)IPoints[3][1]   *   NCOLS)   +
(int)IPoints[3][0]] = 250;
                        imageTemp[((int)IPoints[3][1]   *   NCOLS)   +
((int)IPoints[3][0]+1)] = 250;
                        imageTemp[((int)IPoints[3][1]   *   NCOLS)   +
((int)IPoints[3][0]-1)] = 250;
                        imageTemp[(((int)IPoints[3][1]-1) * NCOLS) +
(int)IPoints[3][0]] = 250;
```

```
imageTemp[(((int)IPoints[3][1]+1) * NCOLS) + (int)IPoints[3][0]] = 250;
                                                    // top right
imageTemp[((int)IPoints[1][1] * NCOLS) + (int)IPoints[1][0]] = 250;
imageTemp[((int)IPoints[1][1] * NCOLS) + ((int)IPoints[1][0]+1)] = 250;
imageTemp[((int)IPoints[1][1] * NCOLS) + ((int)IPoints[1][0]-1)] = 250;
imageTemp[(((int)IPoints[1][1]-1) * NCOLS) + (int)IPoints[1][0]] = 250;
imageTemp[(((int)IPoints[1][1]+1) * NCOLS) + (int)IPoints[1][0]] = 250;
                                                    // bottom right
imageTemp[((int)IPoints[2][1] * NCOLS) + (int)IPoints[2][0]] = 250;
imageTemp[((int)IPoints[2][1] * NCOLS) + ((int)IPoints[2][0]+1)] = 250;
imageTemp[((int)IPoints[2][1] * NCOLS) + ((int)IPoints[2][0]-1)] = 250;
imageTemp[(((int)IPoints[2][1]-1) * NCOLS) + (int)IPoints[2][0]] = 250;
imageTemp[(((int)IPoints[2][1]+1) * NCOLS) + (int)IPoints[2][0]] = 250;
endif
    DeltaLeftTopBottom = IPoints[0][0] - IPoints[3][0] ; // diff up and down left side in X dimension
    DeltaLeftTopBottomPerElement = DeltaLeftTopBottom / ((length - 1) * (width - 1)); // Amount to change the left hand side in the x dimension when moving down each line
    DeltaRightTopBottom = IPoints[1][0] - IPoints[2][0] ; // diff up and down right side in X dimension
    DeltaRightTopBottomPerElement = DeltaRightTopBottom / ((length - 1) * (width - 1)); // Amount to change the right hand side in the x dimension when moving down each line
    DeltaTopRightLeft = IPoints[1][1] - IPoints[0][1] ; // diff between up and down (y) between left and right top points
    DeltaTopRightLeftPerElement = DeltaTopRightLeft / ((length - 1) * (width - 1));
    DeltaBottomRightLeft = IPoints[3][1] - IPoints[2][1]; // diff between up and down (y) between left and right bottom points
    DeltaBottomRightLeftPerElement = DeltaBottomRightLeft / ((length - 1) * (width - 1));
    TopLeftX = IPoints[0][0]; //same as A (original)
    TopLeftY = IPoints[0][1]; // same as D (original)
```

```
        // AdjustXTop = TopScaleFactor / (width-1);  // Adjust the step across
X (top side)
        //AdjustYLeft = LeftScaleFactor / (length-1);  // Adjust the step across
Y (left side)
        #if DEBUG >= 2
        printf("TopScaleFactor    =    %f,    LeftScaleFactor    =
%f\n",TopScaleFactor, LeftScaleFactor);
        #endif
              imageSize = NROWS * NCOLS;
        // From previous experiments, not currently used, might be in the
future, but probably not.
        //TopLeftX = TopLeftX + (TopScaleFactor * .5);
        //TopLeftY = TopLeftY - (LeftScaleFactor * .5);  // + or -?
              //D = D- imageScale;
        // if you ever want to calculate the mean pixel brightness
              //int pts = NROWS*NCOLS;
                    //int sum = 0;
              //for(int p = 0; p < pts; p++)
                    //              sum += (float)imageR[p];
        //int mean = (int)(sum / (float)pts);
        // These loops will remain the same
        // equations in the comments below are experiments, but not complete
              for( xr = 0; xr < length; xr++)
                    {fxr = (float)xr
        for( yr = 0; yr < width; yr++)
                    {fyr = (float)yr;//
              This equation may be varied
                          //fxib = ((TopLeftX + B * fxr + TopScaleFactor
* fyr)/(1 + G * fxr + H * fyr));// KB modified ORG
                          //xi = (int) ((A + B * fxr + C * fyr)/(1 + G * fxr
+ H * fyr));
                          //yi = (int) ((D + E * fxr + F * fyr)/(1 + G * fxr
+ H * fyr));
                          //float fxi = ((A + imageScale * fxr + C * fyr)/(1
+ G * fxr + H * fyr));
              //float fxi = (A + (imageScale * fxr));
                          //float fxi = TopLeftX + ((TopScaleFactor -
AdjustXTop) * fyr);  // kb
        // This equation may be varied
        fxi = ((A + B * fxr + C * fyr)/(1 + G * fxr + H * fyr));  // org, i think
        fyi =((D + E * fxr + F * fyr)/(1 + G * fxr + H * fyr));  // org
                          //fxib    =    TopLeftX    -
(DeltaLeftTopBottomPerLine    *    fxr)    +    ((TopScaleFactor    +
DeltaHorzScaleFactorPerLine) * fyr);  // - (DeltaRightTopBottomPerLine *
fxr);
```

```
        //fyib = TopLeftY - (DeltaTopRightLeftPerline
* fyr) - ((LeftScaleFactor - DeltaVertScaleFactorPerLine) * fxr); // -
(DeltaBottomRightLeftPerline * fyr);
        //fxib = TopLeftX + (TopScaleFactor * fyr)-
(DeltaLeftTopBottomPerElement * (fxr * (width - fyr))) -
(DeltaRightTopBottomPerElement * fxr * fyr);
        //fyib = TopLeftY - (LeftScaleFactor * fxr) +
(DeltaTopRightLeftPerElement *(fyr * (length - fxr)) -
(DeltaBottomRightLeftPerElement * fyr * fxr));
        //fyib = ((TopLeftY + E * fxr + F * fyr)/(1 + G
* fxr + H * fyr));
            xi = (int) fxi; // fxi is original
            xi = max( 1, min( 1022, xi));
            yi = (int) fyi;
            yi = max( 1, min( 766, yi));
            ib = yi * PixPerRow + xi;
    //float fyi = ((D + E * fxr + F * fyr)/(1 + G * fxr + H * fyr)); // KB org
    // This equation may be varied
    //float fyi = ((D + (-imageScale) * fxr + F * fyr)/(1 + G * fxr + H *
fyr));
        //float fyi = (D + (-imageScale * fyr));
        //float fyi = D - (imageScale * fxr);
            //float fyi = TopLeftY - ((LeftScaleFactor -
AdjustYLeft) * fxr); // kb
        // local sampling next 3 lines
        if( ib < 0 || ib > imageSize) sample = 128;// model inside the
image else
        {other ways of creating the sample:
            //sample =
4*imageR[ib]+3*(imageR[ib+1]+imageR[ib-
1]+imageR[ib+PixPerRow]+imageR[ib-PixPerRow])/16;
            //sample = (4*imageR[ib]+imageR[ib-
1]+imageR[ib+PixPerRow])/6;
            //sample = CenterOf(imageR, ib, imageScale,
6); // Choose the center of region
        = imageR[ib]; //org - this may vary}
    //segment[yr * length + xr] = sample; // without mirroring
    segment[yr * length + (length-1 - xr)] = sample; // mirror th// would be
flipping it, but as it is rotated
        //90 degrees (to horizonal) it bec
    // a mirror operation in stead
    #if DEBUG >= imageTemp[yi * PixPerRow + xi] = 255;
    #endif //imageTemp[yi * PixPerRow + xi] = 255;}
    #if DEBUG >= 3
```

```
            ImageData(                                    imageTemp,
1700000+(imageNum*1000)+imageCount++, NROWS*NCOLS);
    #endif return;}
    int SegmentNumberFromSegment(unsigned char * segment, int ii)
    // decode the segment number from the lateral position of the gray
code pattern
    // Takes a recified, thresholded segment
    // Assumes segment is rotated 90 degrees to horizonta
    {#define DOT_OFFSET  (float) 1.0 //  Grey Code is marked down 1
element from actual code
    // Fudge factors as in rectify.c, changes if FindEdge Changes
    // brings the top and bottom in from the borders
    #define RIGHT_OFFSET(float) 4.0//7.0  // 4 elements that are ignored
(see specifications)
    #define LEFT_OFFSET  (float)  0.0//3.0  // the borders  USED if NO
sync code test
    //#define TOP_OFFSET(float) 4.0  // the borders plus 4 elements that
are ignored (see specifications)   USED if WITH sync code test
    //#define BOT_OFFSET  (float) 0.0  // the borders  USED if WITH
sync code test
    #define ZONESPERROW 5 // Number of zones across a row
    #define    ELEMENTSPERZONE    16    //    There    are    16
elements/slots/features in each zone
    #define MAXSNUM 8 // Number of different ways of generating the
segment number
    #define FUDGE .75f // .5// fudge factor to adjust gray code location
    float ZonePosition;  // Position of the Zone within the segment
    float DotPosition;    // Position of the Gray Code within the zone
(pixels below the top)
            int Zone, Dot;
// zone is the zone number, dot is the dot location (0-7) of the Grey Code
within the zone
    int code[GCNUM];  // room for phase of 5 zones
            int sNum[MAXSNUM];// room for computing the segment
number 8 different ways for error correction
    int sNumIndex[MAXSNUM]; //place to store sNum values when
picking the most common one
            int i, j, n, ww;
            float ZoneSize;
            float DotSize;
            float scale;
            int right, left;
            int biggest;
            int grayCount;
            int searchWidth;
```

```
                int searchHeight;
                int xg0, yg0;
                int xp[5], yp[5];
    unsigned char tempSegment[ SEGROWS * SEGCOLS];
    memcpy( tempSegment, segment, nSegRows * nSegCols);
                xg0 = 0;
                yg0 = 0;
            searchWidth = 84;
            searchHeight = 10;
    grayCount = FindGrayCodeSegment( segment, xg0, yg0, searchWidth,
searchHeight, 1, xp, yp);
        // Remember to swap rows and cols because the segment has been
rotated 90 degrees
        // Fudge factors the same as in rectify.c, changes if FindEdge Changes
        // brings the top and bottom in from the borders
                left = 0;
        right = nSegRows - RIGHT_OFFSET;
    //#if DEBUG >= 3
        // draw the "top" line and "bot" line
        //DrawLine(imageTemp, left, 0, left, nSegCols, 200); // top
        //DrawLine(imageTemp, right, 0 , right, nSegCols, 200); // bot
        //SegmentData(    segment,    1300000+(ii*1000)+imageCount++,
nSegRows*nSegCols);
    //#endif
        ZoneSize = (right - left) / ZONESPERROW;
                DotSize = 1;
        // ORG float pixPerZone = (float)16.0 * scale; //by definition of the
Gray pattern
        //              ImageData(                      imageTemp,
1200000+(ii*1000)+imageCount++, NROWS*NCOLS);
        for( ww = 0; ww < grayCount; ww++) code[ww] = -1; //means
undefined
        // go through the list assume 5 patterns found
    //#if DEBUG >= 3
        //      for (n = 0; n < grayCount; n++)
        // draw the gray code locations
        //{tempSegment[(yp[n] + 1) * (nSegRows) + xp[n]] = 150;
        //                  tempSegment[(yp[n] + 2) * (nSegRows) +
xp[n]] = 150;
        //                  tempSegment[(yp[n] + 3) * (nSegRows) +
xp[n]] = 150;
        //                  tempSegment[(yp[n] + 4) * (nSegRows) +
xp[n]] = 150;
        //                  tempSegment[(yp[n] + 5) * (nSegRows) +
xp[n]] = 150;}
```

```
            //SegmentData( tempSegment, 1320000+(ii*1000)+imageCount++,
nSegRows*nSegCols);
            //#endif
                    for( n = 0; n < grayCount; n++)
            { ZonePosition = top - ((float)yp[n ] ;// pixels from origin   // KB org
                            ZonePosition =  right - xp[n];  // adjust here if
necessary
                            Zone = (int)((ZonePosition-1) /ZoneSize);
            // Original
                            //  position  =  (bot  -  (float)yp[n   ]/
ZONESPERROW) - (TOP_OFFSET * scale);
                            // org zone = int (5 - (int)(position / pixPerZone
)) ; //which of 5 zones (invert the zone location)
                            // org zone = max( 0, min( 4, zone));  // kb why?
                            //zone = (top - yp[n] -(TOP_OFFSET * scale)) /
ZoneSize;
                            //dot = (int)( 16.0 * (( position / pixPerZone) -
(float)zone) - DOT_OFFSET); // ORG
                            //dot = max( 0, min( 7, dot)); // ORG
                            DotPosition = ZonePosition -   (Zone *
ZoneSize) ; // pixels from the top of the zone
                            Dot   =         ELEMENTSPERZONE    -
(int)(DotPosition / DotSize) ; // most recent
                            //Dot =     (int)(ELEMENTSPERZONE    -
((DotPosition+DotSize)/ DotSize)) ; was working - not
                            if (Zone < 0 || Zone > GCNUM-1)

return -1; //34; //-1; // error
                                    code[Zone ] = Dot;
#if DEBUG >= 2
                            printf("ZonePosition %f, zone %d, Dot %d\n",
ZonePosition, Zone, Dot);
            #endif
                            // fyi for testing first separator (segment 0)
should be 0 0 7 7 0 from bottom
                            }
                    // Peter's original
            // simplest reconstruction, no error correction
            //sNum = code[2]* 8 + (7 - code[3]);  // ORG
            //sNum = max( 0, min( 63, sNum)); // ORG
            // Generate the segment number from the various combinations of
            // most signficant and least segnificant digits, some of which are
inverted
                    // see documentation for details
                    sNum[0] = code[4]+ (code[3] * 8);
```

```
        sNum[1] = ((7 - code[2]) + (code[3] * 8));
        sNum[2] =  code[4] + ((7 - code[1]) * 8);
        sNum[3] = (7 - code[2])+ ((7 - code[1]) * 8);
        sNum[4] = code[0] + ((7 - code[1]) * 8);
          sNum[5] = (code[3] * 8) + code[0];
        sNum[6] = (code[3] * 8) + (7 - code[2]);
          sNum[7] = (code[3] * 8) + code[4];
```
// NOTE: There is probably a more efficient algorithm for determining which sNum to use // I'm looking for the most common sNum, that is, if out of the 8 computed values // one = 2; four = 1 ; and 2 = 3, then the result to return is 1 because it has the most entries

```
        // Now pick the most common sNum (vote)
            for ( i = 0; i < MAXSNUM; i ++)
                                                sNumIndex[i] = 0;
        // count the number of entries for each unique number
            for (i = 0; i < MAXSNUM; i++)
            {for (j = 0; j < MAXSNUM; j++)
                                            {// ignore negative numbers
        if ((sNum[i] >= 0)&& (sNum[i] == sNum[j])) sNumIndex[i]++;}}
        // now pick the biggest value in the index array
                    //count = -1;
                    biggest  = -1;
            for ( i = 0; i < MAXSNUM; i++)
                {if (sNumIndex[i] > biggest)
                {//count = sNumIndex[i];
                        biggest = i;}}
#if DEBUG >= 2
printf("sNum returned = %d\n", sNum[biggest]);
#endif
if (sNum[biggest] < 0 || sNum[biggest] > MAXSEGS)
                                            return -1;//34; //error
                    return sNum[biggest];
```
ThresholdSegment: Looks for the mean pixel value of the whole segment and determines if each pixel is above the mean, then it's black, else below it--it is white.

Camera Control:

```
#include "consoleDSP.h"
#include "stdafx.h"
include <stdio.h>
ifdef WIN32_BUILD
include <conio.h>
include <windows.h>
endif
```

```
#include "CameraControl.h"
extern "C"#include "FileOperations.h"
#include "ProcessImage.h"
#include "HandShake.h}
#include <FGCamera.h>
extern "C" int camera;
unsigned char *image_buffer;
unsigned char *bmp_buffer;
int iret;
void read_pics(void)
{FILE *imfile;
        char    filename[64];
        int     i;
        int garb;
//starting image hack
        for (i = 0; i < MAXFRAMES; i++)
        {sprintf(filename,"file%d.raw",i);
#if DEBUG >= 0
                printf("\nOPENING file # %d\n", i);
endif if((imfile = fopen(filename,"rb")) == NULL)
                {#if DEBUG >= 0
                printf("Can not open %s\n", filename);
endif // KB pause here wait for keyboard input
                if (!camera)
                        {printf("Waiting for keyboard input to continue:");
                                int garb;
                                scanf("%d", &garb);
                                continue;}}
                image_buffer = (unsigned char *)malloc( NUMBYTES );
                fread(image_buffer,sizeof(unsigned char), NUMBYTES, imfile);
                fclose(imfile);
                //bmp_buffer = (unsigned char *)malloc( NUMBYTES );
                //memcpy(bmp_buffer, image_buffer, NUMBYTES);
#if DEBUG >= 0
                printf("\nCalling image data in image hack\n\n");
#endif
                ImageData(image_buffer,i,NUMBYTES);
                iret = ProcessImage( image_buffer, i);
                free(image_buffer);
                        if (!camera)
                        {printf("Press key to start next image:");scanf("%d", &garb);if
(garb == 0) exit(1);}}
        #if DEBUG >= 0
```

```
            printf("Done with %d images\n",MAXFRAMES);
#endif
        if (camera)
                pause_program()
        if (!camera)
        {printf("Press key to continue:");
                int garb;
                scanf("%d", &garb)}}
#ifdef WIN32_BUILD
void take_pics(void)
CFGCamera   Camera;
        UINT32          Result;
        FGNODEINFO      NodeInfo[3];
        UINT32          NodeCnt;
        FGFRAME         Frame;
        char        filename[64];
        int             i;
        FILE        *imfile;
        Result=FGInitModule(NULL);   // Init module
        if (Result != FCE_NOERROR) {
                printf("'FGInitModule()' == %d; exiting!\n", Result);}
        Result=FGGetNodeList(NodeInfo,3,&NodeCnt);    // Get list of connected
nodes
        if (Result != FCE_NOERROR) {
                printf("'GGetNodeList()' == %d; exiting!\n", Result);}
        Result=Camera.Connect(&NodeInfo[0].Guid); // Connect with node
        if (Result != FCE_NOERROR) {
                printf("'Camera.Connect()' == %d; exiting!\n", Result);}
        Result=Camera.OpenCapture();    // Start DMA logic
        if (Result != FCE_NOERROR) {
                printf("'Camera.OpenCapture()' == %d; exiting!\n", Result);}
        Result=Camera.StartDevice();   // Start image device
        if (Result != FCE_NOERROR) {
        printf("'Camera.StartDevice()' == %d; exiting!\n", Result);}
        Result=Camera.SetParameter(FGP_GAIN,379);
            if (Result != FCE_NOERROR) {printf("'Camera.SetParameter(FGP_GAIN)'
== %d; exiting!\n", Result);}
            Result=Camera.SetParameter(FGP_SHUTTER,30);
            if (Result != FCE_NOERROR) {
            printf("'Camera.SetParameter(FGP_SHUTTER)' == %d; exiting!\n", Result);}
            //take_pictures
            Result=Camera.DiscardFrames();   // clear triple buffering
    // Loop ...
    for (i = 0; i < MAXFRAMES; i++)
    {Result=Camera.GetFrame(&Frame,5000);
```

```
// ... Here you can processs image data in Frame.pData
   if(Result==FCE_NOERROR)
          {#if DEBUG >= 0
                printf("Frame received (%02X %02X %02X %02X ...)\n",
          Frame.pData[0],Frame.pData[1],Frame.pData[2],Frame.pData[3]);
                printf("Frame Flags =0x%x\n", Frame.Flags);
                printf("Frame Id =%d\n", Frame.Id);
                printf("Frame RxTime =%d\n", Frame.RxTime);
#endif}
       sprintf(filename,"file%d.raw",i);
       imfile = fopen(filename,"wb");
       fwrite(&Frame.pData[0], Frame.Length, 1, imfile);
       fclose(imfile);
   // Return frame to module
   if(Result==FCE_NOERROR)
                Result=Camera.PutFrame(&Frame);}
       Result = Camera.StopDevice(); // Stop the device
       if (Result != FCE_NOERROR) {
       printf("'Camera.StopDevice()' == %d; exiting!\n", Result);}
       Result = Camera.CloseCapture(); // Close capture
       if (Result != FCE_NOERROR) {
       printf("'Camera.CloseCapture()' == %d; exiting!\n", Result);}
       Result = Camera.Disconnect(); // Disconnect before ExitModule
       if (Result != FCE_NOERROR) {
       printf("'Camera.Disconnect()' == %d; exiting!\n", Result);}
FGExitModule(); // Exit module}
#else
void take_pics(void)
#endif
```

Find:

```
#include "stdafx.h"
include <stdio.h>
#include "ConsoleDSP.h"
#ifdef WIN32_BUILD
include <conio.h>
include <windows.h>
endif
#include "typedefs.h"
#include "HandShake.h"
#include "Graphics.h"
#include "ProcessImage.h"
#include "Find.h"
#include "ImageRoutines.h"
#include "FileOperations.h"
int imageCount;
```

```
int camera;
unsigned char imageTemp[NROWS*NCOLS];
unsigned char imageDiag[NROWS*NCOLS];
unsigned char imageSync[NROWS*NCOLS];
int decodeStatus[MAXSEGS];
FILE *fp;
FILE *dfile;
//extern void DrawLine(unsigned char *,int a,int b,int c,int d,int e );
    int KBFindVerticalLine(float imageScale, int *x, int *y, float *Xmean, float *Ymean,
float *slope, int nPoints, int *ygood, int *goodpoints)
    // KB
    // Looks for a vertical line through the points in x[].
    // fills array ygood with the points that are on the vertical line and goodpoints
contains the number of points on the line
    // eg - throws away the points that aren't on the line
    // the good points are used in the SegNumber routine to determine the segment
number
    // Algorithm:
    //      if there are at least 2 points +/- VERT_DIST_TEST then the line goes through
    // the mean of those points.
    // create a set of buckets for each of the points provided (nPoints number of them)
    // for each bucket (1 thru nPoints) count how many points fit within +/- test distance
and place in bucket
    // OLD - pick the biggest bucket
    // NEW -
    // For time being ignore the case where there are 2 sets of points in two lines it's not
very common
    // 1. For each point, find all the points within vert_dist_test in x dimension
    // 2. Find the point with the most nearby points (doesn't matter which one)
    // 3. compute the y center (Ymean)
    // 4. Xmean = mean of the values in buckets[n][0..m]
    // 5. compute slope between the two most distant points (topmost and bottommost)
    // 6. put the good points (those that are on the line) in ygood
    // Note: there must be a more efficient way to code this
    // Also returns an array with just the values that are on the line: ygood, and how many
there are: goodpoints
    // these are used for determining the segment number
    {int buckets[GCNUM*GCNUM];
        int yvalues[GCNUM*GCNUM];
        int counts[GCNUM];
        int i,l,j,ic;
#if DEBUG >= 3
        int n;
#endif
```

```
                int fullest = 0;  // got to have at least one bucket with at least 2 points in it eg =
1 as we don't count the point itself
                int foundpair = false;
                int YSmallest = NROWS;// biggest possible number
                int YLargest = 0;
                int Smallest = -1;  // index of smallest
                int Largest = -1;        // index of largest
                float sumx2 = 0.0;
                float sumxy = 0.0;
                float sumy2 = 0.0;
                float temp;
                if (nPoints < 2) return false;  // not enough points
                // buckets [n][m] = n is the point number  each m is a point close to n
                for ( i = 0; i < 25; i++)
                {buckets[i] = 0;
                yvalues[i] = 0;}
                for ( i = 0; i < 5; i++)
                counts[i] = 0;
                for ( l = 0; l < nPoints; l++)
                {for ( j = 0; j < nPoints; j++)
                        {if ( abs(x[l] - x[j]) <= VERT_DIST_TEST )
                        {buckets[(l*nPoints)+counts[l]] = (int)((float)x[j]);  // used to: - .25f *
imageScale);  // adjust to the left slightly yvalues[(l*nPoints)+counts[l]] = y[j];counts[l] =
counts[l] + 1;}}}
                for ( ic = 1; ic < nPoints; ic++)
                {if (counts[ic] >  0 && counts[ic] >= counts[fullest])  // both got 2 and is
bigger than previous bucket - 0 or 1 here?
                        {fullest = ic;foundpair = true;}}
                if (!foundpair)
                return false;  // did not get a bucket with at least 2 points in it
                //now buckets[fullest[fullest*nPoints] is the fullest bucket
                // copy it into ygood for later use
                *goodpoints = counts[fullest];
                for ( i = 0; i < *goodpoints;i++)
                        ygood[i] = yvalues[(fullest*nPoints)+i];
                // which leaves us just the Ymean and slope to compute
                // Then compute the new line via routine. Don't worry about rsq at this point
                //float rsq = FitLine( &yvalues[fullest*nPoints], &buckets[fullest*nPoints],
Ymean, Xmean, slope, counter);
                // Instead we want a line that goes exactly through the Gray Codes further
apart from each other (on y axis)
                // Then we compute the slope
                // Find the two most distant Gray Codes (biggest and smallest y values from
the buckets
                for ( i = 0; i < counts[fullest]; i++)
```

```
{if (yvalues[(fullest*nPoints)+i] <= YSmallest)
        {YSmallest = yvalues[(fullest*nPoints)+i];
Smallest = i;}
    if (yvalues[(fullest*nPoints)+i] >= YLargest)
        {YLargest = yvalues[(fullest*nPoints)+i];Largest = i;}}
    if (Smallest < 0 || Largest < 0 )
    {#if DEBUG >= 0
    printf("Error finding largest and smallest Gray codes in vertical line\n");
#endif return false;}
    // from here on down, we swap X and Y to compute slope of near vertical line, per fitline
    *Xmean = (float)(YSmallest + YLargest) / 2;  // YMean is really the mean of the 2 extreme values
    *Ymean     =     (float)(buckets[(fullest*nPoints)+Smallest]     +   buckets[(fullest*nPoints)+Largest]) / 2; // same for Xmean;
    //but in our case we only have two values, largest and smallest
    sumx2    =    (yvalues[(fullest*nPoints)+Smallest]   -   *Xmean)   *   (yvalues[(fullest*nPoints)+Smallest] - *Xmean);
    sumx2    +=   (yvalues[(fullest*nPoints)+Largest]    -   *Xmean)   *   (yvalues[(fullest*nPoints)+Largest] - *Xmean);
    sumxy    =    (yvalues[(fullest*nPoints)+Smallest]   -   *Xmean)   *   (buckets[(fullest*nPoints)+Smallest] - *Ymean);
    sumxy    +=   (yvalues[(fullest*nPoints)+Largest]    -   *Xmean)   *   (buckets[(fullest*nPoints)+Largest] - *Ymean);
    // available if i want to compute rsq some time in future
    sumy2    =    (buckets[(fullest*nPoints)+Smallest]   -   *Ymean)   *   (buckets[(fullest*nPoints)+Smallest] - *Ymean);
    sumy2    +=   (buckets[(fullest*nPoints)+Largest]    -   *Ymean)   *   (buckets[(fullest*nPoints)+Largest] - *Ymean);
    if (sumx2 == 0 )
        *slope = .78f; // vertical line
    else
        *slope    =    (float)(buckets[(fullest*nPoints)+Largest]   -   buckets[(fullest*nPoints)+Smallest]) /
                       (float)(yvalues[(fullest*nPoints)+Largest]   -   yvalues[(fullest*nPoints)+Smallest]);
    //*slope = sumxy / sumx2;   // slope = tan(angle)
    // now re-reverse xmean and ymean
    temp = *Ymean;
    *Ymean = *Xmean;
    *Xmean = temp;
#if DEBUG >=3
    for (n = 0; n < nPoints; n++)
    {// Draw pluses on the gray codes
        imageDiag[(y[n] * NCOLS) + x[n]] = 250;
```

```
            imageDiag[(y[n] * NCOLS) + (x[n]+1)] = 250;
            imageDiag[(y[n] * NCOLS) + (x[n]-1)] = 250;
            imageDiag[((y[n]-1) * NCOLS) + (x[n])] = 250;
            imageDiag[((y[n]+1) * NCOLS) + (x[n])] = 250;}
#endif
#if DEBUG >= 3
        // Draw the line
        DrawLine(imageDiag,1,1,2,2,255);
        //DrawLine(,          buckets[(fullest*nPoints)+Smallest],    YSmallest,
buckets[(fullest*nPoints)+Largest], YLargest,255);
        ImageData(imageDiag,             1000000+(5*1000)+imageCount++,
NROWS*NCOLS);
    #endif
    return true;}
void SearchTopBottom(unsigned char * image, int ii, int *xSarray, int *yBarray, int
*yTarray,
    int *sHeight, int *inRange, int *scanWidth, int *scanHeight)
{ new
// preliminary search to find the region of the image containing strip
// required when strip only partially in the image
// Preliminary search of image for top and bottom edges of barcode
// Returns arrays with points of interest and the width and height of the area scanned.
// Search for bottom edge
        int scanInterval;
        int whichEdge;
        int xf0, yf0;   // that is a zero in there
        int edge;
        int npts;
    #if DEBUG >=1
        int p;
    #endif
        // defines region of interest during search for strip
        region_t findroi = {0,0,0,0,0};
        region_t foo = {0,0,0,0,0};
        whichEdge = 0;      // 0 = bottom, !0 = top
        scanInterval = (NCOLS - 2 * SEARCH_MIN)/( SEARCH_POINTS);
        xf0 = SEARCH_MIN;
        //yf0 = SEARCH_MIN;  // KB org
        yf0 = NROWS - ((NROWS / 2)   + (HEIGHT_TARGET / 2) +
BORDER_SIZE);  // KB look out from the center of the image
                            // by 1/2 the expected height of the barcode
                                    // plus an arbitrary border
        *scanWidth = scanInterval / 3;  // arbitrary
        *scanHeight = min( MAX_ROWS, NROWS - HEIGHT_TARGET +
SEARCH_MIN );
```

```
            // look for the bottom edge
            // put found values in xs, yb arrays for later usage
            //findroi = &foo; // is this needed?
            for ( npts=0 ; npts<SEARCH_POINTS; npts++, xf0 += scanInterval )
            {findroi.x0 = xf0;
                    findroi.y0 = yf0;
                    findroi.width = *scanWidth;
                    findroi.height = *scanHeight;
                    edge = FindEdge( image, &findroi, NCOLS, whichEdge ) ;
                    xSarray[npts] = xf0;
                    yBarray[npts] = edge;
                    inRange[npts] = false;// prepare for the test in next loop}
            // search for top edge
            // put the found points in yT and compute the sHeight (height of the barcode)
from the previously found bottom points
            // if the height is in the range we are expecting (arbitrary) then flag these
entries by setting inRange[point] to true
            whichEdge = 1;       // 0 = bottom, !0 = top
            xf0 = SEARCH_MIN;
            yf0 = NROWS - HEIGHT_TARGET - 2 * SEARCH_MIN;
            *scanHeight = min( MAX_ROWS, NROWS - yf0 - SEARCH_MIN);
            for ( npts=0 ; npts<SEARCH_POINTS; npts++, xf0 += scanInterval )
            {//printf("Top: xf0 = %d, yf0 = %d\n", xf0, yf0);
                    foo.x0 = xf0;
                    foo.y0 = yf0;
                    foo.width = *scanWidth;
                    foo.height = *scanHeight;
                    edge = FindEdge( image, &foo, NCOLS, whichEdge ) ;
                    yTarray[npts] = edge;
                    sHeight[npts] = edge - yBarray[npts];
                    inRange[npts]    =    ((sHeight[npts]   -   HEIGHT_TARGET)   <
HEIGHT_TOL); // if in expected height, then true
    #if DEBUG >= 2
            printf("In Range = %d\n",inRange[npts]);
    #endif}
    #if DEBUG >= 3
            // KB display xSarry, yBarray, sTarray, sHeight  (xS is x, yB is y location, sT
is top and sH is height
            for( p = 0; p < SEARCH_POINTS; p++)
            {imageDiag[xSarray[p ]+ (yBarray[p]* NCOLS)] = 255; // KB bottom
                    imageDiag[xSarray[p ]+ (yTarray[p]* NCOLS)] = 255;       // Top}
            ImageData(imageDiag,                  100000+(ii*1000)+imageCount++,
NROWS*NCOLS);
    #endif
    #if DEBUG >= 1
```

```c
        for( p = 0; p < SEARCH_POINTS; p++)
            fprintf( fp, "Search Point # %d %6d %6d %6d %6d %6d \n",
                p, xSarray[p ], yTarray[p ], yBarray[p ], sHeight[p], inRange[p ]);
#endif return;}
    int FindRange(int ii, int *inRange, int *xSarray, int *iStart, int *iEnd, int *rangeStart,
int *rangeEnd, int *scanInterval )
    {// FIND IN RANGE POINTS
        // The following code looks to see if we have a series of points (at least 3 in row) that
        // are within the expected height arrange (as identified above)
        // if there is more than one range (series) of 3 then only use the last set
        // NOTE 1: this algorithm can be improved, there is no reason to use the last set, for instance
        // the first set might be better
        // NOTE 2: The algorithm as implemented below may be optimized to log points.
        // NOTE 3: this may be pulled into its own routine
        //int StartFlag;  // set true while working on a range
        //int EndFlag ;   // set true when we have a rangeEnd
        int FoundEnd;
        int FoundStart;
        int rangeCount;
        int p, q;
        *rangeStart = SEARCH_POINTS-1;
        *rangeEnd = SEARCH_POINTS-1;// start at the top - stop when we have a valid range
        //StartFlag = false;  // set true while working on a range
        //EndFlag = false;    // set true when we have a rangeEnd
        FoundEnd = false;
        FoundStart = false;
        rangeCount = 0;
        for( p = SEARCH_POINTS-1; p >= 1; p--)
        {rangeCount = 0;
            if (inRange[p])  // got an end
            {*rangeEnd = p;  // increment rangecount?
                FoundEnd = true;
                for ( q = p-1; q >= 0; q--) // inner loop look for the start of the range
                {if (inRange[q])
                    {rangeCount++;  // count number of trues}
                    else
                    if (rangeCount >= 2) // got at least 3 trues in a row
                        {FoundStart = true;
                        *rangeStart = q+1;
```

```
                                    break; // then we have completed the range
(found a false after at least 2 trues)}
                else // only found one or two true
                {FoundEnd = false; // reset everything
                FoundStart = false;
                rangeCount = 0;
                break; // out of q loop}} // end of q loop} // end of inrange[p]
                if (rangeCount == SEARCH_POINTS-1)
                {FoundStart = true; // special case all true
                *rangeStart = 0;}
                if (FoundStart && FoundEnd) break; // done
                FoundEnd = false;
                FoundStart = false;
                rangeCount = 0;}
        // if we didn't find any range of interest, then kill the image and return
        if (!(FoundStart && FoundEnd))
                return false;
#if DEBUG >= 1
                fprintf( fp, "Search window set for start at %d and end at %d\n",
xSarray[*rangeStart],xSarray[*rangeEnd])
        #endif
                // compute the scanInterval - how often to look for segments
                *iStart = xSarray[*rangeStart];
                *iEnd = xSarray[*rangeEnd -1 ];
                *scanInterval = (*iEnd - *iStart)/EDGE_POINTS;
        #if DEBUG >= 2
                printf("Done with edge search, image # %d\n",ii);
                printf("iStart = %d, iEnd = %d, scanInterval = %d\n", *iStart, *iEnd,
*scanInterval);
        #endif
                return true;
        int FindEdge( unsigned char *image, region_t *findroi, int PixelsPerRow, int pos )
        // FindEdge will attempt to locate the most prominent edge in the Region of Interest
        // defined by lower left corner (x0,y0) and size width and height
        // processing is done in array the size of height.
        // edgeLocation is the estimated position based on zero of second derivative.
        // pos = 0 for bottom edge, pos != 0 for top
        // KB - I believe this finds only the horizontal edge and returns a y value
        // all Peter's original code
        // NOTE: in full barcode search FindEdge finds a point 2/3 of way inside (towards
center of barcode) within the outer border
        // the define in consoleDSP.h BORDERROWS assumes this value, if FindEdge
changes, then BORDERROWS must change as well
        // NOTE: ytOffset and ybOffset in ProcessImage.c will also have to change
        {int xsum[MAX_ROWS];
```

```
            int xsmooth[MAX_ROWS] ;
            int xfirst[MAX_ROWS] ;
            int max, min;
            int pheight;
            int edgeFound;
            int xg0 = findroi->x0;
            int yg0 = findroi->y0;
            int width = findroi->width;
            int height = findroi->height;
            int nSmooth;
            int nSlope;
            int edgeLocation;
    //      int maxSlope = 0, minSlope = 0;
            int smooth[] = { 1, 4, 6, 4, 1};// convolution kernel for smothing the length
was { 1, 4, 6, 4, 1}
            int Dslope[] = { -2, -4, 4, 2};           //  differential    kernel    for
derivative // org { -2, -4, 4, 2};
            height = min( NROWS, yg0 + height) - yg0;
            // at each height, sum across the width
            index = yg0 * PixelsPerRow + xg0;   // lower left corner ROI
            max = 0; min = 10000;
            pheight = height; // gets reduced as convolution shrinks the length
            for( i = 0; i < pheight; i++)
            {sum = 0;
            for( j = 0; j < width; j++)
             sum += image[index+j];  // org
            // KB - following line provided as an option
    //sum += ((image[index+j] + image[index+NCOLS+j] + image[index-NCOLS+j])/3);
// average up and down one row
                    if(pos)
        xsum[pheight-1-i] = sum;
                    else
                    xsum[i] = sum;
                    index += PixelsPerRow;
                    if( sum>max)max=sum;
                    if( sum<min)min=sum;}
            // xsum now has the sums across the width of the ROI
            // smooth the data in the length direction
            nSmooth = sizeof( smooth ) / sizeof( int );
            pheight -= nSmooth;
            for( i = 0; i < pheight; i++)
            {sum = 0;
                    for( j = 0; j < nSmooth; j++)
                    {sum = sum + smooth[j] * xsum[j + i];}
                    xsmooth[i ] = sum;
```

```
                if( sum>max)max=sum;
                if( sum<min)min=sum;}
        // first derivative by convolution with slope kernel
        nSlope = sizeof( Dslope ) / sizeof( int );
        pheight -= nSlope;
        for( i = 0; i < pheight; i++)
        {sum = 0;
                for( j = 0; j < nSlope; j++)
                {sum = sum + Dslope[j] * xsmooth[j + i];}
                // save max and min for setting tolerance in next step
                if( sum>max)max=sum;
                if( sum<min)min=sum;
                xfirst[i ] = sum;}
        // second derivative by repeat convolution with slope kernel
        // keep track of max and min for finding the edge
        edgeLocation = 0; // kb added to prevent failure with small search height
        pheight -= nSlope;
        for( i = 0; i < pheight; i++)
                edgeFound = false;
                sum = 0;
                for( j = 0; j < nSlope; j++)
                {sum = sum + Dslope[j] * xfirst[j + i];}
                if( sum > (2*( max - min)/3))
                {edgeLocation = i;
                edgeFound = true;
                break;}
                if( !edgeFound)
                edgeLocation = 0;}
        if( pos)
                edgeLocation = yg0 + height -1 - edgeLocation - edgeOffset;
        else
                edgeLocation = yg0 + edgeLocation + edgeOffset;
        return edgeLocation}
int FindSyncCode( UCHAR *imageR, int xz0, int yz0, int swidth, int height,
 float imageScale, int *xbest, int *ybest, int orientation)
// KB All Peter's original code and notes, note that pattern does not need inverting
// go looking for some Sync codes on the rotated image border
// This routine finds the nbest correlated positions with the ROI when compared to
// the Sync code pattern. To prevent neighboring points of one from overshadowing
// other spot that are not quite aligned or focused, there is a neighbor test. A
// good point can't be within intscale of another. Only the better one is retained.
 // This makes sure that when we ask for nbest points, we (usually) get that many
different points.
        // The skipx, skipy are to speed the process when desirable.
        // the pattern is a bit tricky, it is inverted, 1 for white and 0 black
```

```
// sum will exceed a 16 bit integer.
{#define nbest 10
#define pixels 1024
        int corr[nbest];
        int baseH = 5;
        int baseW = 6;
        int basePattern[5][6] = {
                // Original
                {1,0,1,0,1,0},
                {1,1,0,0,1,1},
                {0,0,0,0,0,0},
                {1,1,1,1,1,1},
                {1,1,1,1,1,1}};
        // create the scaled pattern
        // Height of the pattern PatternH * imageScale
        int intScale = (int)imageScale;
        int PatternH = baseH * intScale;
        int PatternW = baseW * intScale;
        int neighborhood = (int)((float) 3.0 * imageScale);
        int sum;
        int skipx = 1; // Sampling to eliminate too much repetition
        int skipy = 1; // set to 2 for every other pt, etc.
        int x, y, h, w, i, j;
        int k;
        int dist;
        int found = false;
        // clear the arrays for the result
        height = min( NROWS, height + yz0 + PatternH) - yz0 - PatternH;
        for( i = 0; i<nbest; i++)
        {corr[i] = 0;
        xbest[i] = 0;
        ybest[i] = 0;}
        // search
        for ( x = xz0; x < xz0 + swidth ; x+=skipx)
        {for( y = yz0; y < yz0 + height; y+=skipy)
                {sum = 0;
                for( h = 0; h < PatternH; h++)
                {for( w = 0; w < PatternW; w++)
                {if( orientation)
                {if( basePattern[h / intScale][w / intScale])
                sum += imageR[(y + h) * pixels + ( x + w)];
                else
                sum -= imageR[(y + h) * pixels + ( x + w)];}
                        else
                {if( basePattern[h / intScale][w / intScale])
```

```
            sum += imageR[(y - h) * pixels + ( x + w)];
          else
            sum -= imageR[(y - h) * pixels + ( x + w)];}}}
    //check to see if this value belongs in the list of best
    if( sum > corr[nbest - 1])
    // yes it does, find where and insert it
    {// where on the list does it belong
            found = false;
            for( i = 0; i < nbest; i++)
            {if( sum > corr[i])
            { i is the spot where it belongs
    //should it replace a neighbor?
            found = false;
            for( k = 0; k < nbest -1; k++)
            {dist = abs(x - xbest[k])+ abs( y - ybest[k]);
            if( dist < neighborhood)
            {// it's a neighbor
            found = true;break;}}
                if( k < i) break;
                if( !found) k = nbest - 1;
                if( !( k == i))
                // move the others down
                for( j = k; j > i; j--)
                {corr[j] = corr[j-1]; xbest[j] = xbest[j-1];
                ybest[j] = ybest[j-1];}
                // insert the newbie
                corr[i] = sum;
                xbest[i] = x;
                ybest[i] = y;
                break;}}}}}
``` return nbest;}
include "stdafx.h"
include <stdio.h>
ifdef WIN32_BUILD
include <conio.h>
include <windows.h>
endif
include "consoleDSP.h"
include "FileOperations.h"
  int FindGrayCode( UCHAR *imageR, int xz0, int yz0, int swidth, int height, float imageScale, int *xbest, int *ybest)
  // Original, finds the Gray Code in the entire barcode
  // KB Notes:
  // This works pretty well as is, but is one of the slowest parts of the code

```
// Notes below indicate some ways of speeding it up and improving it's function
// But it seems to function well, just needs speed improvements
// go looking for some Gray code in the rotated image and anything else
// Notes on FindGrayCode:
// This routine finds the nbest correlated positions with the ROI when compared to
// the Gray code pattern. To prevent neighboring points of one from overshadowing
// other spot that are not quite aligned or focused, there is a neighbor test. A
// good point can't be within intscale of another. Only the better one is retained.
// This makes sure that when we ask for 20 points, we (usually) get 20 different points.
// The skipx, skipy are to speed the process when desirable.
// A. Break into two pieces, one to generate a more efficient pattern and
//    separate the search so it may be more generally useful. We may need that.
// B. Generate some structures for general use as well as here for such things as
//    struct sROI { int x0; int y0; int width; int height;} ROI;
//    struct sImage { int width; int height; unsigned char * image;} sImage;
// C. Remove some hard coded items nbeat > argument, 1024 > sImage.SEGROWS, skip > argument
// Da. Code the pattern generator to make full size pattern rather than scaleing down the indices.
// Db. Replace BaseGC[h / intScale][w / intScale] by GCPattern[w * GCPattern.SEGROWS + h] and then
// E. Rearrange the loop to eliminate multiply, increment by width from line to line.
{int corr[GCNUM];
    int    BaseGC[8][3] = {
        // original
        //{1,1,0},
        //{0,1,0},
        //{0,0,0},
        //{1,0,0},
        //{1,0,1},
        //{0,0,1},
        //{0,1,1},
        //{1,1,1}
        // inverted, this is the way the camera seems to feed the images - need to make sure it is the same on the dsp
        {1,1,1},
        {0,1,1},
        {0,0,1},
        {1,0,1},
        {1,0,0},
        {0,0,0},
        {0,1,0},
        {1,1,0}};
    //// create the scaled GC pattern
```

```
//// Height of the pattern 8 * imageScale
//int intScale = (int)imageScale;
//int PatternH = 8 * intScale;
//int PatternW = 3 * intScale;
//int neighborhood = (int)((float) 3.0 * imageScale);
// create the scaled GC pattern
// Height of the pattern 8 * imageScale
int intScale;
int PatternH;
int PatternW;
int neighborhood;
int i,j,x,y,h,w,k;
int sum;
int nRows, nCols;
int skipx = 1; // Sampling to eliminate too much repetition
int skipy = 1; // set to 2 for every other pt, etc.
intScale = (int)round2((double)imageScale);
//intScale = (int)imageScale;
nRows = NROWS;
nCols = NCOLS;
PatternH = 8 * intScale;
PatternW = 3 * intScale;
neighborhood = (int)round2(3.0f * imageScale);
//neighborhood = (int)(3.0f * imageScale);
// set arrays for the result
for( i = 0; i<GCNUM; i++)
{corr[i] = 0;
        xbest[i] = 0;
        ybest[i] = 0;}
// search
for ( x = xz0; x < xz0 + swidth ; x+=skipx)
{for( y = yz0; y < yz0 + height; y+=skipy)
        {sum = 0;
        for( h = 0; h < PatternH; h++)
        {if (y+h > nRows) break; // exceeding image size
        for( w = 0; w < PatternW; w++)
                {if(BaseGC[h / intScale][w / intScale])
                sum += imageR[(y + h)*nCols + ( x + w)];
                        else
                                sum -= imageR[(y + h)*nCols + ( x + w)];}}
        //check to see if this value belongs in the list of best
        if( sum > corr[GCNUM - 1])
                // yes it does, find where and insert it
        {// where on the list does it belong?
                for( i = 0; i < GCNUM; i++)
```

```
                    {if( sum > corr[i]){
                    // i is the spot where it belongs
                    //should it replace a neighbor?
                    int dist;
                    int found = false;
                    for( k = 0; k < GCNUM -1; k++)
                    {dist = abs(x - xbest[k])+ abs( y - ybest[k]);
                    if( dist < neighborhood)
                    // it's a neighbor
                    found = true;break;}}
                            if( k < i) break;
                            if( !found) k = GCNUM - 1;
                            if( !( k == i))
                            // move the others down
                            for( j = k; j > i; j--)
                            {corr[j] = corr[j-1];
                            xbest[j] = xbest[j-1];
                            ybest[j] = ybest[j-1];}
                            // insert the newbie
                            corr[i] = sum;
                            xbest[i] = x;
                            ybest[i] = y;
                            break;}}}}
        return GCNUM;}
        int SearchBottom(unsigned char * image, int ii, int *yBarray, float BLines[][3], int
scanWidth,
            int scanInterval, int iStart, int rangeStart, int rangeEnd)
        //Search for the bottom edge of the barcode
        {int scanHeight;
        int npts;
        int edge;
        int xarray[MAX_POINTS];//  Store a set of points along the edge of the barcode:
room for 20 - X location
                int yarray[MAX_POINTS];
        //  Y location of edge points
                int nBotPoints;
                float rsq;
                float Xmean, Ymean, slope;
                int xf0, yf0;
    #if DEBUG >= 1
            int p;
    #endif
                // defines region of interest during search for strip
                region_t findroi = {0,0,0,0,0};
        // Search for bottom edge
```

```
            xf0 = iStart;
            yf0 = min( yBarray[rangeStart], yBarray[rangeEnd]) - SEARCH_MIN;
            scanHeight = min( MAX_ROWS, min( NROWS, yf0 + HEIGHT_TARGET
+ HEIGHT_TOL) - yf0);
        #if DEBUG >= 2
            printf("Starting search for bottom edge, xf0 = %d, yf0 = %d, scanHeight =
%d\n", xf0, yf0, scanHeight);
        #endif
            for ( npts=0 ; npts<EDGE_POINTS; npts++, xf0 += scanInterval )
            { findroi.x0 = xf0;
                findroi.y0 = yf0;
                findroi.width = scanWidth;
                findroi.height = scanHeight;
                edge = FindEdge( image, &findroi, NCOLS, 0 ) ; // Bottom
        #if DEBUG >= 3
                // show the location of found edge, 250 is green, or white plus when
converted
                imageDiag[(edge-1)* NCOLS+xf0+scanWidth/2 ] = 250;
                imageDiag[(edge  )* NCOLS+xf0+scanWidth/2 ] = 250;
                imageDiag[(edge+1)* NCOLS+xf0+scanWidth/2 ] = 250;
                imageDiag[(edge  )* NCOLS+xf0+scanWidth/2+1] = 250;
                imageDiag[(edge  )* NCOLS+xf0+scanWidth/2-1] = 250;
        #endif
            xarray[npts] = xf0;
            yarray[npts] = edge;}
        #if DEBUG >= 3
            // KB Diagnostic print of bmp with points marked
            for( p = 0; p < SEARCH_POINTS; p++)
                    imageDiag[xarray[p ]+ (yarray[p]* NCOLS)] = 255;
            ImageData(imageDiag,                    200000+(ii*1000)+imageCount++,
NROWS*NCOLS);
        #endif
            nBotPoints = EDGE_POINTS;
            // Now fit the line (find the actual line by x,y and slope
            rsq = FitLine( xarray, yarray, &Xmean, &Ymean, &slope, nBotPoints);
            //while(( rsq <  DIST_TEST )&&( nBotPoints > 5))
            //{RemoveOutliers( xarray, yarray, Xmean, Ymean, slope, &nBotPoints );
            //rsq = FitLine( xarray, yarray, &Xmean, &Ymean, &slope, nBotPoints);}
        #if DEBUG >= 1
            fprintf(fp, "Got %d points of bottom line. Xm = %8.4f, Ym = %8.4f, slope =
%8.4f \n",nBotPoints, Xmean, Ymean, slope);
                for( p = 0; p < nBotPoints; p++)
                    fprintf( fp, "Point # %d %6d  %6d \n", p, xarray[p ], yarray[p ]);
        #endif
        #if DEBUG >= 3
```

```
            // kb add them to diagtemp
            // KB put the points into tempDiag as white;
            for( p = 0; p < nBotPoints; p++)
                imageDiag[xarray[p ]+ (yarray[p]* NCOLS)] = 0;
            // Diagnostic rignt
            ImageData(imageDiag,        300000+(ii*1000)+imageCount++,
NROWS*NCOLS);
        #endif
            // STILL BOTTOM
            // BLines[0] is the bottom edge
            BLines[0][0] = Xmean;   // BLines store the X, Y and slope for each of the 4
lines that a segment
            // the top (1) and bottom line (0) are the same for all segments and can be
            // computed now, just once per image
            BLines[0][1] = Ymean;
            BLines[0][2] = slope;
            return true;}
    int SearchTop(unsigned char * image, int ii, int *yBarray, float BLines[][3], int
scanWidth,
        int scanInterval, int iStart, int rangeStart, int rangeEnd)
        {int scanHeight;
            int npts;
            int edge;
            int xarray[MAX_POINTS];      // Store a set of points along the edge of
the barcode: room for 20 - X location
            int yarray[MAX_POINTS];      // Y location of edge points
            int nTopPoints;
            float rsq;
            float Xmean, Ymean, slope;
            int xf0, yf0;
        #if DEBUG >= 1
            int p;
        #endif
            // defines region of interest during search for strip
            region_t foo = {0,0,0,0,0};
            xf0 = iStart;
            yf0 = NROWS - 2 * SEARCH_MIN - HEIGHT_TARGET;
            scanHeight = min( MAX_ROWS, min( NROWS, yf0 - SEARCH_MIN));
            for ( npts=0; npts<EDGE_POINTS; npts++,xf0 += scanInterval )
            {foo.x0 = xf0;
                foo.y0 = yf0;
                foo.width = scanWidth;
                foo.height = scanHeight;
                edge = FindEdge( image, &foo, NCOLS, 1 );      // top
                xarray[npts] = xf0;
```

```
                    yarray[npts] = edge;}
        // Now fit the top line
        nTopPoints = EDGE_POINTS;
        rsq = FitLine( xarray, yarray, &Xmean, &Ymean, &slope, nTopPoints);
        while(( rsq <  DIST_TEST )&&( nTopPoints > 5))
        {RemoveOutliers( xarray, yarray, Xmean, Ymean, slope, &nTopPoints );
        rsq = FitLine( xarray, yarray, &Xmean, &Ymean, &slope, nTopPoints);}
#if DEBUG >= 1
        fprintf( fp, "Got %d points of top line. Xm = %8.4f, Ym = %8.4f, slope =
%8.4f\n",
                    nTopPoints, Xmean, Ymean, slope);
        for( p = 0; p < nTopPoints; p++)
                    fprintf( fp, "Point # %d %6d %6d \n", p, xarray[p ], yarray[p ]);
#endif
#if DEBUG >= 3
        // kb add them to diagtemp
        // KB put the points into tempDiag as white;
        for( p = 0; p < nTopPoints; p++)
                    imageDiag[xarray[p ]+ (yarray[p]* NCOLS)] = 255;
        ImageData(imageDiag,              400000+(ii*1000)+imageCount++,
NROWS*NCOLS);
        #endif
        // TOP
        // BLines[1] is the top edge
        BLines[1][0 ] = Xmean;
        BLines[1][1 ] = Ymean;   // point centered at xmean, ymean, ok, but not
perfect
        BLines[1][2 ] = slope;
        return true;}
    long round2(double x)
    {if (x >= 0)
         return (long) (x+0.5);
         return (long) (x-0.5);}
    void SearchSegmentTop(unsigned char * image, int ii, float imageScale, float x1,
float y1, float x2, float y2, float DLines[][3])
        // Findedge for top line lineof just the segment, should be more accurate than finding
the edge
        // of the whole strip (which may slant).
        // Returns 2 arrays of Xmean, Ymean and Slope, just like BLines, one for top line and
one for bottom line
        // executed in a loop for all the segments.
        // input is the xleft(x1), yleft (y1), xright (x2), yright (y2), corners of the top of the
segment
        {int scanHeight, scanWidth;
                int scanInterval;
```

```
            int npts;
            int edge;
            int xarray[MAX_POINTS];        // Store a set of points along the edge of
the barcode: room for 20 - X location
            int yarray[MAX_POINTS];        // Y location of edge points
            int nTopPoints;
            float rsq;
            float Xmean, Ymean, slope;
            int xf0, yf0;
    #if DEBUG >= 0
            int p;
    #endif
            // defines region of interest during search for strip
            region_t foo = {0,0,0,0,0};
            scanHeight = (int)imageScale * 20;// * 5; arbitrary number
            scanWidth = (int)imageScale * 4;
            scanInterval  =  3;  //  also  arbitrary  (int)(imageScale  *
nSegCols)*2/MAX_POINTS;  //  (int)((imageScale  *  nSegCols / MAX_POINTS)  +
SEARCH_MIN)/2;
            //scanInterval = (NCOLS - 2 * SEARCH_MIN)/( SEARCH_POINTS);   -
from searchtopbottom
            xf0 = (int)x1 - 5;
            yf0 = (int)y1 - 10;
            for ( npts=0; npts<MAX_POINTS; npts++,xf0 += scanInterval )
            {foo.x0 = xf0;
                    foo.y0 = yf0;
                    foo.width = scanWidth;
                    foo.height = scanHeight;
                    edge = FindEdge( image, &foo, NCOLS, 1 );       // top
                    xarray[npts] = xf0;
                    yarray[npts] = edge;}
            // Now fit the top line
            nTopPoints = MAX_POINTS;
            rsq = FitLine( xarray, yarray, &Xmean, &Ymean, &slope, nTopPoints);
            //while(( rsq < DIST_TEST )&&( nTopPoints > 5))
            //{
            //      RemoveOutliers( xarray, yarray, Xmean, Ymean, slope, &nTopPoints
);
            //      rsq  =  FitLine(  xarray,  yarray,  &Xmean,  &Ymean,  &slope,
nTopPoints);
            //}
    #if DEBUG >= 1
            fprintf( fp, "SearchSegmentTop: Got %d points of top line. Xm = %8.4f, Ym
= %8.4f, slope = %8.4f\n",
                    nTopPoints, Xmean, Ymean, slope);
```

```
                for( p = 0; p < nTopPoints; p++)
                        fprintf( fp, "Point # %d %6d %6d \n", p, xarray[p ], yarray[p ]);
        #endif
        #if DEBUG >= 4
                printf( "SearchSegmentTop: Got %d points of top line. Xm = %8.4f, Ym = %8.4f, slope = %8.4f \n",
                        nTopPoints, Xmean, Ymean, slope);
                for( p = 0; p < nTopPoints; p++)
                        printf( "SearchSegmentTop: Point # %d %6d %6d \n", p, xarray[p ], yarray[p ]);
        #endif
        #if DEBUG >= 3
                // kb add them to diagtemp
                // KB put the points into tempDiag as white;
                for( p = 0; p < nTopPoints; p++)
                        imageDiag[xarray[p ]+ (yarray[p]* NCOLS)] = 255;
                ImageData(imageDiag,            1250000+(ii*1000)+imageCount++, NROWS*NCOLS);
        #endif
                // TOP
                // BLines[1] is the top edge
                DLines[1][0 ] = Xmean;
                DLines[1][1 ] = Ymean;  // point centered at xmean, ymean, ok, but not perfect
                DLines[1][2 ] = slope;}
        void SearchSegmentBottom (unsigned char * image, int ii, float imageScale, float x1, float y1, float x2, float y2, float DLines[][3])
                // Findedge for top line lineof just the segment, should be more accurate than finding the edge
                // of the whole strip (which may slant).
                // Returns 2 arrays of Xmean, Ymean and Slope, just like BLines, one for top line and one for bottom line
                // executed in a loop for all the segments.
                // input is the xleft(x1), yleft (y1), xright (x2), yright (y2), corners of the top of the segment
                {int scanHeight, scanWidth;
                        int scanInterval;
                        int npts;
                        int edge;
                        int xarray[MAX_POINTS];       // Store a set of points along the edge of the barcode: room for 20 - X location
                        int yarray[MAX_POINTS];       // Y location of edge points
                        int nTopPoints;
                        float rsq;
                        float Xmean, Ymean, slope;
```

```
            int xf0, yf0;
#if DEBUG >= 0
            int p;
#endif
            // defines region of interest during search for strip
            region_t foo = {0,0,0,0,0};
            scanHeight = (int)imageScale * 20;// * 5; arbitrary number
            scanWidth = (int)imageScale * 4;
            scanInterval      =       3;//(int)((imageScale    *    nSegCols    /
/*EDGE_POINTS*/MAX_POINTS) + SEARCH_MIN)/2;
            //scanInterval = (NCOLS - 2 * SEARCH_MIN)/( SEARCH_POINTS);    -
from searchtopbottom
            xf0 = (int)x1 - 2;
            yf0 = (int)y1 - 10;
            for (   npts=0;  npts</*EDGE_POINTS*/MAX_POINTS;  npts++,xf0 +=
scanInterval )
            {foo.x0 = xf0;
                    foo.y0 = yf0;
                    foo.width = scanWidth;
                    foo.height = scanHeight;
                    edge = FindEdge( image, &foo, NCOLS, 0 ) ;       // bottom
                    xarray[npts] = xf0;
                    yarray[npts] = edge;}
            // Now fit the top line
            nTopPoints = MAX_POINTS;//EDGE_POINTS;
            rsq = FitLine( xarray, yarray, &Xmean, &Ymean, &slope, nTopPoints);
            while(( rsq < DIST_TEST )&&( nTopPoints > 5))
            {RemoveOutliers( xarray, yarray, Xmean, Ymean, slope, &nTopPoints );
                    rsq = FitLine( xarray, yarray, &Xmean, &Ymean, &slope, nTopPoints);}
#if DEBUG >= 1
            fprintf( fp, "SearchSegmentTop: Got %d points of top line. Xm = %8.4f, Ym
= %8.4f, slope = %8.4f \n",
                    nTopPoints, Xmean, Ymean, slope);
            for( p = 0; p < nTopPoints; p++)
                    fprintf( fp, "Point # %d %6d  %6d \n", p, xarray[p ], yarray[p ]);
#endif
#if DEBUG >= 4
            printf( "SearchSegmentBottom: Got %d points of bottom line. Xm = %8.4f,
Ym = %8.4f, slope = %8.4f \n",
                    nTopPoints, Xmean, Ymean, slope);
            for( p = 0; p < nTopPoints; p++)
                    printf( "SearchSegmentBottom: Point # %d %6d  %6d \n", p, xarray[p
], yarray[p ]);
#endif
#if DEBUG >= 3
```

```
                // kb add them to diagtemp
                // KB put the points into tempDiag as white;
                for( p = 0; p < nTopPoints; p++)
                        imageDiag[xarray[p ]+ (yarray[p]* NCOLS)] = 255;
                ImageData(imageDiag,            1260000+(ii*1000)+imageCount++,
NROWS*NCOLS);
        #endif
                // TOP
                // BLines[0] is the bottom edge
                DLines[0][0 ] = Xmean;
                DLines[0][1 ] = Ymean;   // point centered at xmean, ymean, ok, but not
perfect
                DLines[0][2 ] = slope;}
        int FindGrayCodeSegment( UCHAR *imageR, int xz0, int yz0, int swidth, int height,
float imageScale, int *xbest, int *ybest)
                // Finds the Gray Code in a rectified segment, which is also rotated
                // KB Notes:
                // This works pretty well as is, but is one of the slowest parts of the code
                // Peter's notes, below indicate some ways of speeding it up and improving it's
function
                // But it seems to function well, just needs speed improvements
                // These are all Peter's original notes and code.
                // go looking for some Gray code in the rotated image and anything else
                // Notes on FindGrayCode:
                // This routine finds the nbest correlated positions with the ROI when compared to
                // the Gray code pattern. To prevent neighboring points of one from overshadowing
                // other spot that are not quite aligned or focused, there is a neighbor test. A
                // good point can't be within intscale of another. Only the better one is retained.
                // This makes sure that when we ask for 20 points, we (usually) get 20 different
points.
                // The skipx, skipy are to speed the process when desirable.
                // A. Break into two pieces, one to generate a more efficient pattern and
                //    separate the search so it may be more generally useful. We may need that.
                // B. Generate some structures for general use as well as here for such things as
                //    struct sROI { int x0; int y0; int width; int height;} ROI;
                //    struct sImage { int width; int height; unsigned char * image;} sImage;
                // C. Remove some hard coded items nbeat > argument, 1024 > sImage.SEGROWS,
skip > argument
                // Da. Code the pattern generator to make full size pattern rather than scaleing down
the indices.
                // Db. Replace BaseGC[h / intScale][w / intScale] by GCPattern[w *
GCPattern.SEGROWS + h] and then
                // E. Rearrange the loop to eliminate multiply, increment by width from line to line.
                //
                {int corr[GCNUM];
```

```
        int     BaseGC[3][8] = {
                // original
                //{1,1,0},
                //{0,1,0},
                //{0,0,0},
                //{1,0,0},
                //{1,0,1},
                //{0,0,1},
                //{0,1,1},
                //{1,1,1}
                // inverted, this is the way the camera seems to feed the images - need
to make sure it is the same on the dsp
                //      {1,1,1},
                //      {0,1,1},
                //      {0,0,1},
                //      {1,0,1},
                //      {1,0,0},
                //      {0,0,0},
                //      {0,1,0},
                //      {1,1,0}
                // Inverted and rotated 90 degrees
                //{1,1,1,1,0,0,0,0},
                //{1,1,0,0,0,0,1,1},
                //{1,0,0,1,1,0,0,1}
                //{0,0,0,0,1,1,1,1},
                {1,0,0,1,1,0,0,1},
                {1,1,0,0,0,0,1,1},
                {1,1,1,1,0,0,0,0}};
        ///// create the scaled GC pattern
        ///// Height of the pattern 8 * imageScale
        //int intScale = (int)imageScale;
        //int PatternH = 8 * intScale;
        //int PatternW = 3 * intScale;
        //int neighborhood = (int)((float) 3.0 * imageScale);
        // create the scaled GC pattern
        // Height of the pattern 8 * imageScale
        int intScale;
        int PatternH;
        int PatternW;
        int neighborhood;
        int i,j,x,y,h,w,k;
        int sum;
        int nRows, nCols;
        int skipx = 1; // Sampling to eliminate too much repetition
        int skipy = 1; // set to 2 for every other pt, etc.
```

```
                intScale = (int)round2((double)imageScale);
                //intScale = (int)imageScale;
                nRows =   nSegCols ;  // swapped rows and columns because segment is
rotated
                nCols = nSegRows;
                PatternH = 3;
                PatternW = 8;
                neighborhood = 3;;
                //neighborhood = (int)(3.0f * imageScale);
                // set arrays for the result
                //SegmentData( imageR, 100, SEGROWS * SEGCOLS );
                for( i = 0; i<GCNUM; i++)
                {corr[i] = 0;
                        xbest[i] = 0;
                        ybest[i] = 0;}
                // search
                for ( x = xz0; x < xz0 + swidth ; x+=skipx)
                {for( y = yz0; y < yz0 + height; y+=skipy)
                        {sum = 0;
                        for( h = 0; h < PatternH; h++)
                        {if (y+h > nRows) break;  // exceeding image size
                                        for( w = 0; w < PatternW; w++)
                                        {if(BaseGC[h][w])
                                        sum += imageR[(y + h)*nCols + ( x + w)];
                                                else
                                        sum -= imageR[(y + h)*nCols + ( x + w)];}}
                //check to see if this value belongs in the list of best
                if( sum > corr[GCNUM - 1])
                        // yes it does, find where and insert it
                {// where on the list does it belong?
                        for( i = 0; i < GCNUM; i++)
                        {if( sum > corr[i])
                        {// i is the spot where it belongs
                        //should it replace a neighbor?
                                        int dist;
                                        int found = false;
                                        for( k = 0; k < GCNUM -1; k++)
                                                {dist = abs(x - xbest[k])+ abs( y - ybest[k]);
                        if( dist < neighborhood)
                                {// it's a neighbor
                                found = true;break;}}
                                                        if( k < i) break;
                                                        if( !found) k = GCNUM - 1;
                                                        if( !( k == i))
                                                                // move the others down
```

```
                                for( j = k; j > i; j--)
                                {corr[j] = corr[j-1];
                                xbest[j] = xbest[j-1];
                                ybest[j] = ybest[j-1];}
                        // insert the newbie
                        corr[i] = sum;
                        xbest[i] = x;
                        ybest[i] = y;
                        break;}}}}}}
        return GCNUM;
```

Segmentloop:

```
#include "stdafx.h"
include <stdio.h>
#include <conio.h>
include <windows.h>
#include "typedefs.h"
#include "consoleDSP.h"
#include "SegmentLoop.h"
extern FILE *fp;
extern int imageCount;
extern int camera;
extern unsigned char imageTemp[NROWS*NCOLS];
extern unsigned char imageDiag[NROWS*NCOLS];
extern unsigned char imageSync[NROWS*NCOLS];
int decodeStatus[MAXSEGS];
bool SegmentLoop( unsigned char * rotated, int ii, float imageScale, int *yBarray,
                        int yg0, int xpos[][GCNUM], int ypos[][GCNUM], int *segCount )
    {
            // Identify all the segment boundaries by find the each separator by identifying the Gray Code patterns and putting
            // their x and y locations into:
            //int xpos[][GCNUM], ypos[][GCNUM]; // locations to store found pattern matches
            // segCount - number of segments found
            // ii - number of picture being worked on - used for diagnostics only
            // image comes in "rotated" (in rotated array)
            // yg0 is the y location of the start of search (from bottom, yBarray[rangeStart]
            // yg0 = yBarray[rangeStart] - 2 * SEARCH_MIN;
            int interval;   // Spacing in x from one segment to next
            int count;              // number of gray codes actually found each time
            int searchHeight;
            int searchWidth;
            int xg0;
```

```
#if DEBUG >= 1
        fp = fopen("support.txt", "a");
        fprintf(fp, "Starting image # %d\n",ii); // indicate which pic number
#endif
#if DEBUG >= 0
        printf("Processing Image # %d\n",ii);
#endif
#if DEBUG >= 3
        // KB Load the diagnostic image arry with the data
        memcpy( imageDiag, rotated, NROWS * NCOLS);
#endif
        // set up the search area:
        interval = (int)((float)SEGCOLS * imageScale); // size of each segment
        searchWidth = (int)((float)SEGCOLS * imageScale) + SEARCH_MIN; // plus a little more
        searchHeight = (int)((float)SEGROWS * imageScale) + 4 * SEARCH_MIN; // height of segment plus a little more
        xg0 = 0; // starting at far left of image - can this be improved?
        // START LOOP HERE
        while( xg0 + interval < NCOLS ) // loop until you jump off the right hand side of the image
        {if( segCount > 0)
        xg0 += interval; // as long as you've found at least one segment, just jump to the next of interest
                else
        xg0 = max( 1, iStart - 4 * SEARCH_MIN);
#if DEBUG >= 3
        memcpy( imageTemp, rotated, NROWS * NCOLS); // copy of rotated image to decorate - if you want only the latest decorations
#endif
        // LEFT SIDE
#if DEBUG >= 2
        printf("\nLooking for next segment boundaries, segment # = %d.\n", segCount);
#endif
#if DEBUG >= 2
        printf("searchWidth = %d, searchHeight = %d\n", searchWidth, searchHeight);
#endif
#if DEBUG >= 3
                // KB decorate an image with the search rectangle
                DrawRect(imageTemp, xg0, yg0, searchWidth, searchHeight);
                // KB and save it
                ImageData( imageTemp, 800000+(ii*1000)+imageCount++, NROWS*NCOLS);
```

```
            #endif
                            // Find the next set of Gray Codes
                            // NOTE: As long as this isn't the very first set of Gray Codes then we
actually found them already
                            // when we looked for the right side gray codes of the previous
segment
                            // so the first optimization is to save the right side gray codes and plug
them in here
                            count = FindGrayCode( rotated, xg0, yg0, searchWidth, searchHeight,
imageScale, xpos, ypos);
            #if DEBUG >= 1
                            fprintf( fp, "Found %d Gray code icons\n", count);
            #endif
            #if DEBUG >= 3
                            for( g = 0; g < GCNUM; g++)
                            {// show on plot where they were found, green = 250
                                    imageTemp[(ypos[g])* NCOLS + (xpos[g])] = 250;
                                    imageTemp[(ypos[g])* NCOLS + (xpos[g]+1)] = 250;
                                    imageTemp[(ypos[g])* NCOLS + (xpos[g]-1)] = 250;
                                    imageTemp[(ypos[g]-1)* NCOLS + (xpos[g])] = 250;
                                    imageTemp[(ypos[g]+1)* NCOLS + (xpos[g])] = 250;
            #if DEBUG >= 1
                                    fprintf( fp, "leftGC %d, ( %d, %d )\n", g, xpos[g], ypos[g]);
            #endif
            #if DEBUG >= 2
                                    printf( "leftGC %d, ( %d, %d )\n", g, xpos[g], ypos[g]);
            #endif}
                            ImageData(    imageTemp,    900000+(ii*1000)+imageCount++,
NROWS*NCOLS);
                            #endif
            #if DEBUG >= 2
                            printf("Calling ImageData after finding Gray Codes\n");
            #endif
```

Console DSP:

```
// ConsoleDSP.cpp : Defines the entry point for the console application.
#include "stdafx.h"
include <stdio.h>
#include "consoleDSP.h"
#ifdef WIN32_BUILD
include <conio.h>
include <windows.h>
endif
extern "C"
{#include "HandShake.h"
#include "FileOperations.h"
```

```
#include "Find.h"}
#include "CameraControl.h"
// All global variables are either for debugging for related to the handshaking mechanism
// None are vital to the actual image processing
#if DEBUG >= 0
    extern unsigned char imageTemp[NROWS*NCOLS];      // KB write diagnostic images here
    extern unsigned char imageDiag[NROWS*NCOLS];      // KB another place to write diagnostic images
    extern unsigned char imageSync[NROWS*NCOLS];      // Display all the sync marks here for convenient viewing
#endif
// image dummy file used in imagedata routine everywhere
extern "C" int decodeStatus[MAXSEGS];
// decode status translated into 0 for (P)ass -1 for fail or anything else (handshaking)
extern "C" int camera;              // set true if there is a camera hooked up
extern "C" int imageCount;    // KB was -1; count of number of images processed
extern "C" FILE  *fp;         // for the debugging text output (into support.txt)
extern "C" FILE *dfile;
int main(int argc, char* argv[])
{int tmp;
    camera = false;
    set_up();
    FOREVER
    {FOREVER
        {if (tmp = is_it_time()) break;
        Sleep(10);}
        if (camera)
        take_pics();read_pics();
        if(time_to_pause()) pause_program();}}
void set_up()
// misc. start up activities
{ zero out the decodeStatus array, because no segment have been decoded yet
int i;
for (i = 0; i < MAXSEGS; i++) decodeStatus[i] = 0;
// open the dummy image file
if (!OpenDummyImageFile())
{#if DEBUG >= 0
    printf("Failed to open image dummy file in setup\n");
#endif}
return;
```

Image Routines:

```
#include "stdafx.h"
#include "consoleDSP.h"
```

```c
#include "ImageRoutines.h"
#include "math.h"
#include "typedefs.h"
typedef int bool;
extern int imageCount;
extern int camera;
extern unsigned char imageTemp[NROWS*NCOLS];
extern unsigned char imageDiag[NROWS*NCOLS];
extern unsigned char imageSync[NROWS*NCOLS];
void ThresholdSegment( UCHAR *segment)
// threshold to mean value
// basic adaptive thresholding algorithm, looks for the mean pixel value of the whole segment
// determines if each pixel is above the mean, then it's black, else below it it is white
{//#define rows 30
        //#define cols 84
        int p;
        float sum = 0;
        int pts;
        int mean;
        pts = SEGROWS * SEGCOLS;
        for( p = 0; p < pts; p++)
                sum += (float)segment[p];
        mean = (int)(sum / (float)pts);
        for( p = 0; p < pts; p++)
                segment[p] = (segment[p] > mean) ? 255:0;
        return;}
bool Intersection(float Clines[4][3], float JPoints[4][2], int hline, int vline, int point)
// Original code:
// find the intersection between one line in normal format and one in reversed
// x as a function of y, rotated 90 degrees
{bool pointsOK = true;
        float xi, yi;
        int tp;
        xi = (Clines[vline][2] * (Clines[hline][2] * Clines[hline][0]
                + ( Clines[hline][1] - Clines[vline][1])) + Clines[vline][0]) /
                ( (float)1.0 - Clines[vline][2] * Clines[hline][2]);
        yi = Clines[hline][2] * ( xi - Clines[hline][0]) + Clines[hline][1];
        if( xi < 0 || xi > NCOLS)
                pointsOK = false;
        if( yi < 0 || yi > NROWS)
                pointsOK = false;
        JPoints[point][0] = xi;
        JPoints[point][1] = yi;
        for( tp = 0; tp< 4; tp++)
```

```
{if( fabs(Clines[tp][2]) > 1.f) // KB  - vertical, right?  .78?
                    pointsOK = false;}
          return pointsOK;}
int RemoveOutliers(int *x, int *y, float Xmean, float Ymean, float Slope, int *pts )
// finds the points farthest from the line and removes them from list.
// default is only the worst goes although worst nWorst are avaliable
// return value is the deleted point number
// KB original code
{#define nWorst 20
      int i, j, k;
      float dist;
      float howFar[MAX_POINTS];
      int ptNum[MAX_POINTS];
      int limit = *pts;
      for( i = 0; i < limit; i++)
      {howFar[i]= 0.0;
      ptNum[i] = i;}
      for( i = 0; i< limit; i++)
      {dist = DistanceToLine((float) x[i ], (float) y[i ], Xmean, Ymean, Slope);
            if( dist < 0) dist = - dist;
            //check to see if this value belongs in the list of worst
            for( j = 0; j < limit; j++)
                    if( dist > howFar[j])
                    { // yes it does
                          for( k = limit - 1; k > j; k--)
                          {howFar[k] = howFar[k-1];
                          ptNum[k] = ptNum[k-1];}
                          howFar[j ]= dist;
                          ptNum[j ] = i;}}
      // just remove the worst offender
      x[ptNum[0]] = x[limit - 1];
      y[ptNum[0]] = y[limit - 1];
      *pts = limit -1;
      return ptNum[0 ];}
float DistanceToLine( float x, float y, float Xmean, float Ymean, float Slope)
// calculate the distance from a point to line of the given parameters
// for general distance, use absolute value of result
// KB - all Peter's original code
{// check sign
      float distance;
      distance = -(Slope * (x - Xmean) - (y - Ymean))/
            (float)sqrt(Slope * Slope + 1.f);
      if( distance < 0) distance = - distance;
      return distance;}
float FitLine( int x[], int y[], float *Xmean, float *Ymean, float *slope, int nPoints)
```

```
// determines the best fit line thru given points.
// line passes thru the point ( Xmean, Ymean)
// slope is tangent of angle of line wrt x axis
// return rsq pearson
// KB Notes
// This is all Peter's original code
// Please note that to fit a horizontal line you call Fitline with x,y
// To find a vertical line reverse the parameters and call it with y,x
{int         i;
    float sumx;
    float sumy;
    float sumx2;
    float sumxy;
    float sumy2;
    float rsq;
// best fit straight line goes thru the mean, find that first.
    sumx = 0.0;
    sumy = 0.0;
    for( i = 0; i < nPoints; i++)
    {sumx +=  x[i];
    sumy +=  y[i];}
    *Xmean = sumx / nPoints;
    *Ymean = sumy / nPoints;
// slope calculation
    sumx2 = 0.0;
    sumxy = 0.0;
    sumy2 = 0.0;
    for( i = 0; i < nPoints; i++)
    { sumx2 += (x[i] - *Xmean) * (x[i] - *Xmean);
    sumxy += (x[i] - *Xmean) * (y[i] - *Ymean);
    sumy2 += (y[i] - *Ymean) * (y[i] - *Ymean);}
    if (sumx2 == 0 )
    {*slope = .78f;
    return 1; }
    *slope =  sumxy / sumx2;   // slope = tan(angle)
    if ((sumx2 * sumy2) == 0)
            return 1;// vertical line
    rsq = ( sumxy *  sumxy )/( sumx2 * sumy2); // Pearson correlation coefficient
    /*    float dist, maxDistance = 0.0;  // i think commented out by peter et al
    for( i = 0; i < nPoints; i++)
    {dist = DistanceToLine( (float)x[i], (float)y[i], *Xmean, *Ymean, *slope);
    if( dist > maxDistance) maxDistance = dist;}
    return maxDistance;*/
    return rsq;}
```
*Other ProcessImage Notes:* bool ProcessImage( unsigned char * image, int nRows, int nCols, int ii)
image: byte array of the raw image, currently it is hardwired for 1024 by 768 images
nRows: 768
nCols: 1024 ii: image number, starting with 0

What is claimed is:

1. A handheld system for associating audio content with an object, comprising:
   a microphone;
   a speaker;
   a camera; and
   a processing device configured to:
      capture sound via the microphone,
      convert the captured sound into a digital data set,
      encode the digital data set into a graphical identifier,
      transmit the graphical identifier to a printing device, the identifier configured to be applied to a surface of the object;
      extract bit fields from the identifier via the camera; and
      convert the extracted bit fields into audio signals.

2. The system of claim 1, wherein the identifier further comprises one of a one-dimensional bar code and a two-dimensional bar code.

3. The system of claim 1, wherein the identifier includes a graphical content printed on a suitable substrate material that may be fixably applied to the surface.

4. The system of claim 3, wherein the graphical content is applied directly to the surface of the object.

5. The system of claim 3, wherein the graphical content is applied to the surface of the object using one of a stamping, an embossing, an etching, an engraving, and a photolithographic process.

6. The system of claim 1, further comprising a printer, the printer configured to reproduce the identifier on a selected medium.

7. The system of claim 1, further comprising a personal computer, the personal computer configured to store and display the identifier.

8. The system of claim 7, further comprising a database, wherein the personal computer is operably coupled to the database through a communications system.

9. The system of claim 1, wherein the handheld device is further configured to operably couple at least one of a personal digital assistant (PDA), a cellular telephone unit, and a digital camera device.

10. The system of claim 1, wherein the identifier includes a pixel section and an alphanumeric section.

11. A method of creating identifiers configured to encode selected audio content using a handheld device, comprising:
   capturing analog audio signals with the handheld device;
   converting the captured analog audio signals to digital audio signals using the handheld device; and
   producing an identifier into identifiable segments that encodes and contains the digital audio signals.

12. The method of claim 11, further comprising applying the identifier on a selected surface of an object.

13. The method of claim 11, wherein producing the identifier further comprises generating one of a pigment-based identifier and a non-pigmented identifier.

14. The method of claim 11, wherein converting the captured analog audio signals to digital audio signals further comprises applying an encryption algorithm to the captured audio signals.

15. The method of claim 11, wherein producing an identifier that encodes the digital audio signals further comprises applying a encoder/decoder (CODEC) algorithm to the digital signals.

16. The method of claim 11, wherein producing an identifier that encodes the digital audio signals further comprises applying the identifier to an object.

17. The method of claim 11, wherein applying the identifier to the object includes applying the identifier to a selected portion of a photograph, a display panel, a sign, and a printed publication.

18. A method of verifying an identity of an individual, comprising:
   producing an identifier that encodes a first spoken message acquired from the individual;
   applying the identifier having the encoded first spoken message to an identification article assigned to the individual;
   acquiring a second spoken message from the individual;
   comparing the first spoken message from the identifier with the second spoken message to verify the identity of the individual.

19. The method of claim 18, wherein producing the identifier further comprises providing the first spoken message to a handheld device operable to encode the identifier.

20. A computer-readable medium including instructions that, when executed by a processor of a handheld device including a microphone, a speaker and a camera, enables the processing device to perform a method comprising the steps of:
   capturing sound via the microphone;
   converting the captured sound into a digital data set;
   encoding the digital data set into a graphical identifier; and
   transmitting the graphical identifier to a printing device.

* * * * *